United States Patent
Tohi et al.

(10) Patent No.: US 6,444,603 B1
(45) Date of Patent: Sep. 3, 2002

(54) CATALYST COMPONENT FOR ETHYLENICALLY UNSATURATED MONOMER POLYMERIZATION, CATALYST FOR ETHYLENICALLY UNSATURATED MONOMER POLYMERIZATION, AND PROCESS FOR ETHYLENICALLY UNSATURATED MONOMER POLYMERIZATION USING SAID CATALYST

(75) Inventors: Yasushi Tohi; Haruyuki Makio; Terunori Fujita; Toshiyuki Tsutsui, all of Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/216,481

(22) Filed: Dec. 21, 1998

(30) Foreign Application Priority Data

Dec. 22, 1997 (JP) ................................. 9-353746
Oct. 23, 1998 (JP) ............................. 10-303095

(51) Int. Cl.$^7$ ................................. B01J 31/00
(52) U.S. Cl. ................... 502/103; 502/118; 502/122; 502/123; 502/125; 502/126; 502/127; 502/128; 502/152; 502/167; 502/172
(58) Field of Search ................... 502/103, 118, 502/122, 123, 125, 126, 127, 128, 152, 167, 172

(56) References Cited

U.S. PATENT DOCUMENTS

| | | | |
|---|---|---|---|
| 4,783,512 A | 11/1988 | Gessell | 526/142 |
| 4,910,272 A | 3/1990 | Marchand et al. | 526/129 |
| 5,447,895 A | 9/1995 | Marks et al. | |
| 5,834,393 A | * 11/1998 | Jacobsen et al. | 502/152 |

FOREIGN PATENT DOCUMENTS

| | | |
|---|---|---|
| EP | 0598543 A2 | 5/1994 |
| EP | 0781789 A2 | 7/1997 |
| EP | 0811627 A2 | 12/1997 |
| JP | 3-197514 A | 8/1991 |
| JP | 6- 25320 A | 2/1994 |
| JP | 6- 56927 A | 3/1994 |
| JP | 7-258323 A | 10/1995 |
| JP | 8- 34809 A | 2/1996 |
| JP | 8-183813 A | 7/1996 |
| JP | 9316118 | 12/1997 |
| JP | 9316147 | 12/1997 |
| JP | A-9895786 | 4/1998 |
| WO | WO9524269 | 9/1995 |
| WO | WO9634020 | 10/1996 |

OTHER PUBLICATIONS

L. K. Johnson et al., New Pd(II)–and Ni (II)–Based Catalysts for Polymerization of Ethylene and –Olefins, J. Am. Chem. Soc. 1995, 117, pp. 6414–6515, No Month.
Japanese Abstract—JP06206946, 19940726, DW1994–34.
Einarsrud, M. A. et al, Vibrational Spectroscopy, vol. 1, 1990, pp. 61–68, XP000913715, No Month.
Zawodzinski, T. et al, Inorganic Chemistry, vol. 29, No. 15, 1990, pp. 2842–2847, XP000913712, No Month.

* cited by examiner

*Primary Examiner*—Elizabeth D. Wood
(74) *Attorney, Agent, or Firm*—Birch, Stewart, Kolasch & Birch, LLP

(57) ABSTRACT

The invention relates to a catalyst component which can provide, in combination with a transition metal compound, a catalyst for ethylenically unsaturated monomer polymerization, a catalyst comprising the catalyst component and a transition metal compound, and a process for ethylenically unsaturated monomer polymerization using the catalyst. The catalyst component comprises a compound obtained by the reaction of, in any order, (i) a compound comprising a metal of Group 13 of the periodic table; (ii) a compound capable of reacting with the compound (i) to be bonded to two or more of the Group 13 metal; (iii) a compound capable of reacting the compound (i); and optionally (iv) a hydrocarbon compound or the like.

14 Claims, 1 Drawing Sheet

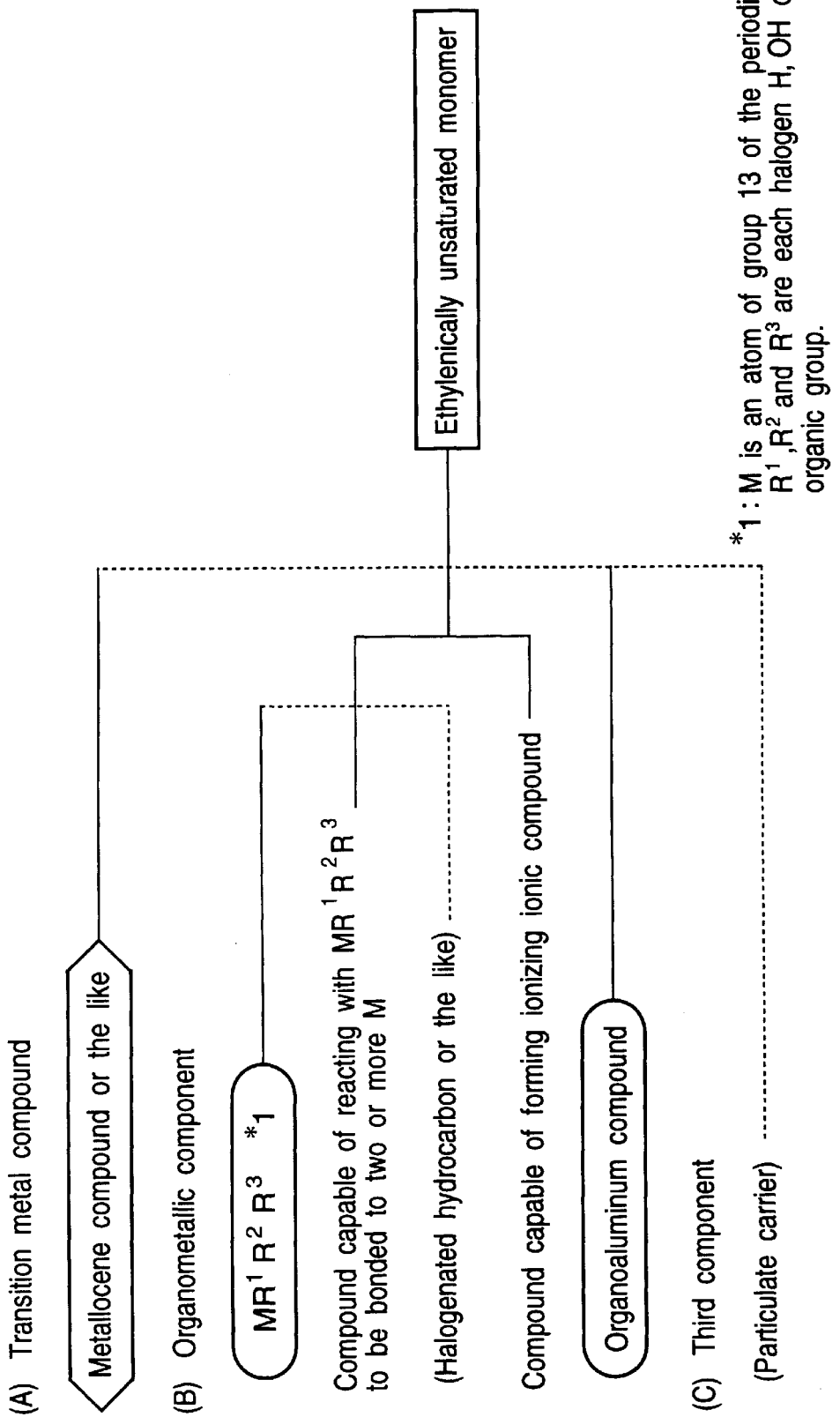

CATALYST COMPONENT FOR ETHYLENICALLY UNSATURATED MONOMER POLYMERIZATION, CATALYST FOR ETHYLENICALLY UNSATURATED MONOMER POLYMERIZATION, AND PROCESS FOR ETHYLENICALLY UNSATURATED MONOMER POLYMERIZATION USING SAID CATALYST

FIELD OF THE INVENTION

The present invention relates to a catalyst component capable of providing a highly active catalyst for ethylenically unsaturated monomer polymerization when used in combination with a transition metal compound such as a metallocene compound. The invention also relates to a catalyst for ethylenically unsaturated monomer polymerization which comprises said catalyst component and a transition metal compound such as a metallocene compound and to a process for ethylenically unsaturated monomer polymerization using said catalyst.

BACKGROUND OF THE INVENTION

Titanium catalysts comprising a titanium compound and an organoaluminum compound and vanadium catalysts comprising a vanadium compound and an organoaluminum compound have conventionally been known as catalysts for producing (co)polymers of ethylenically unsaturated monomers (sometimes referred to as "ethylenically unsaturated monomer (co)polymers" hereinafter), such as polyethylene, polypropylene, poly-4-methyl-1-pentene, ethylene/propylene copolymer, ethylene/styrene copolymer and ethylene/propylene/butene terpolymer.

Ziegler catalysts comprising a metallocene compound such as zirconocene and an organoaluminum oxy-compound (aluminoxane) or a boron compound such as tris (pentafluorophenyl)borane have been known as catalysts capable of producing olefin polymers with high activities.

Further, catalysts comprising a nickel compound or a palladium compound and a co-catalyst such as an aluminoxane or an ionic compound have been proposed (J. Am. Chem. Soc., 1995, 117, 6414–6415).

Because of their excellent mechanical properties, ethylenically unsaturated monomer (co)polymers such as polyolefins have been used in various fields such as for molded products. In recent years, there have been diverse demands for physical properties of the ethylenically unsaturated monomer (co)polymers, so that such polymers showing various properties have been desired.

Under such circumstances as mentioned above, there has been desired development of a novel co-catalyst component exhibiting an excellent polymerization activity and capable of producing ethylenically unsaturated monomer (co) polymers of excellent properties.

OBJECT OF THE INVENTION

The present invention has been made in view of the prior art as described above. It is an object of the invention to provide a novel catalyst component capable of exhibiting a high ethylenically unsaturated monomer polymerization activity when used in combination with a transition metal compound such as a metallocene compound.

It is another object of the invention to provide a highly active catalyst which comprises said catalyst component and capable of producing polymers of high molecular weight.

It is a further object of the invention to provide a process for ethylenically unsaturated monomer polymerization using said catalyst.

SUMMARY OF THE INVENTION

The catalyst component for ethylenically unsaturated monomer polymerization according to the invention comprises a compound obtained by the reaction of the following compounds (i), (ii), (iii) and optionally (iv) in any order:

(i) a compound comprising a metal of Group 13 of the periodic table:

(ii) a compound capable of reacting with the compound (i) to be bonded to two or more of the Group 13 metal;

(iii) a compound capable of reacting with a compound comprising a metal of Group 13 of the periodic table to form an ionizing ionic compound; and (iv) at least one compound selected from a hydrocarbon compound, a halogenated hydrocarbon compound, a hydroxyhydrocarbon compound, a silanol compound, a boronic acid compound, an organic carboxylic acid compound, an organic sulfonic acid compound, a hydroxylamine compound, a sufonamide compound, a ketoimide compound, an amide compound, an oxime compound, an amine compound, an imide compound, a diimine compound, an imine compound, a diketone compound, and metallic salts thereof.

The catalyst component for ethylenically unsaturated monomer polymerization according to another aspect of the invention comprises a compound obtained by the reaction of the following compounds (i), (ii) and optionally (iv) in any order, and then further the following compound (iii):

(i) a compound represented by the following formula:

wherein M is an atom of Group 13 of the periodic table; $R^1$, $R^2$ and $R^3$ nay be the same or different and are each a halogen atom, a hydrogen, atom, a hydroxy group or an organic group; and two groups of $R^1$, $R^2$ and $R^3$ may be bonded to form a ring;

(ii) a compound capable of reacting with the compound (i) to be bonded to two or more M;

(iii) a compound capable of reacting with a compound comprising a metal of Group 13 of the periodic table, preferably with the reactor. product obtained by reacting the compound (i), the compound (ii) and optionally the compound (iv) in any order, to form an ionizing ionic compound;

(iv) at least one compound selected from a hydrocarbon compound, a halogenated hydrocarbon compound, a hydroxyhydrocarbon compound, a silanol compound, a boronic acid compound, an organic carboxylic acid compound, an organic sulfonic acid compound, a hydroxylamine compound, a sufonamide compound, a ketoimide compound, an amide compound, an oxime compound, an amine compound, an imide compound, a diimine compound, an imine compound, a diketone compound, and metallic salts thereof.

The compound (i) is, for example, an aluminum compound represented by the following formula:

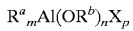

wherein $R^a$ and $R^b$ may be the same or different and are each a hydrocarbon group of 1 to 15 carbon atoms; X is a halogen atom; and m, n and p are numbers satisfying the conditions of $0 \leq m \leq 3$, $0 \leq n \leq 3$, $0 \leq p \leq 3$ and $m+n+p=3$.

The compound (ii) is, for example, at least one compound selected from the group consisting of $H_2O$, $H_2S$ and compounds represented by the following formulae:

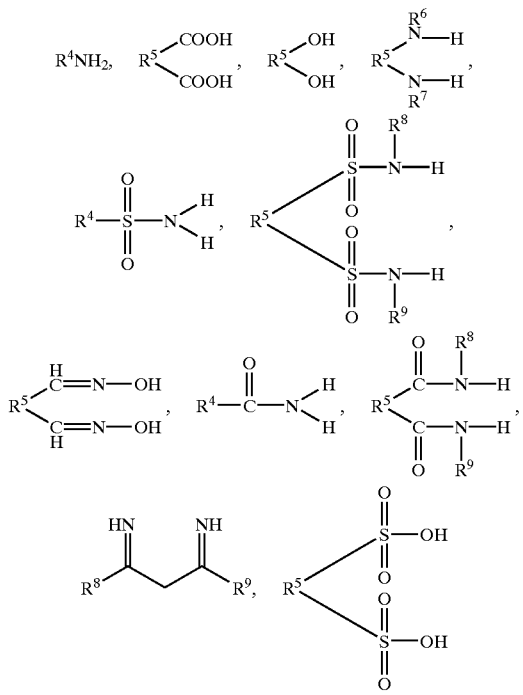

wherein $R^4$ is a hydrogen atom, a hydrocarbon group, a halogenated hydrocarbon group, a silicon-containing group, a germanium-containing group, a tin-containing group or an oxygen-containing group; $R^5$ is a divalent hydrocarbon group, a divalent halogenated hydrocarbon group, a divalent silicon-containing group, a divalent germanium-containing group, a divalent tin-containing group, a divalent boron-containing group or a single bond; $R^6$ and $R^7$ may be the same or different and are each a hydrogen atom, a hydrocarbon group, a halogenated hydrocarbon group, a silicon-containing group, a germanium-containing group, a tin-containing group or an oxygen-containing group; each of $R^6$ and $R^7$ may be bonded to a carbon atom for constituting $R^5$ to form a ring; and $R^8$ and $R^9$ may be the same or different and are each a hydrogen atom, a hydrocarbon group or a halogenated hydrocarbon group.

The compound (iii) is, for example, a compound capable of forming an ionizing ionic compound having a carbonium cation, an oxonium cation, an ammonium cation, a phosphonium cation, a cycloheptyltrienyl cation or a ferrocenium cation.

The compound (iv) is, for example, at least one compound selected from compounds represented by the following formulae:

$R^{10}X$,
$R^{10}H$,
$R^{10}OH$,
$R^{10}R^{11}NH$,
$R^{10}COOH$,
$R^{10}SO_3H$,
$R^{10}R^{11}CNOH$,
$R^{10}R^{11}NOH$,
$R^{10}CONHR^{11}$,
$R^{10}SO_2NHR^{11}$,
$R^{10}COCH_2COR^{11}$, and
$R^{10}C(=NH)CH_2COR^{11}$ wherein $R^{10}$ is a hydrocarbon group, a halogenated hydrocarbon group, a silicon-containing group, a germanium-containing group, a tin-containing group or a boron-containing group; $R^{11}$ is a hydrogen atom, an alkoxy group, or any of a hydrocarbon group, a halogenated hydrocarbon group, a silicon-containing group, a germanium-containing group, a tin-containing group and a boron-containing group each of which is the same as or different from $R^{10}$; and X is a halogen atom.

The other catalyst component for ethylenically unsaturated monomer polymerization according to the invention is represented by the following formula:

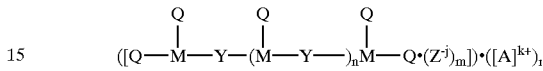

wherein each M may be the same or different and is an atom of Group 13 of the periodic table; n is an integer of 0 or more; Y is a divalent bonding group, and when n is 1 or more, plural Y may be the same or different; Z is a group capable of being bonded to one or more M; m is an integer of not less than 1 and not more than n+1; each Q may be the same or different and is a group selected from the following groups:

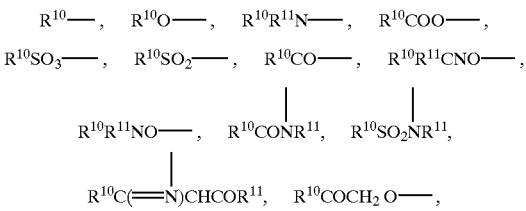

(wherein $R^{10}$ is a hydrocarbon group, a halogenated hydrocarbon group, a silicon-containing group, a germanium-containing group, a tin-containing group or a boron-containing group; and $R^{11}$ is a hydrogen atom, an alkoxy group or any of a hydrocarbon group, a halogenated hydrocarbon group, a silicon-containing group, a germanium-containing group, a tin-containing group and a boron-containing group each of which is the same as or different from $R^{10}$); A is a cation; and k is a number satisfying the condition of k=jm/r and is a valence of the cation A.

The divalent bonding group Y is a divalent bonding group selected from the following divalent bonding groups:

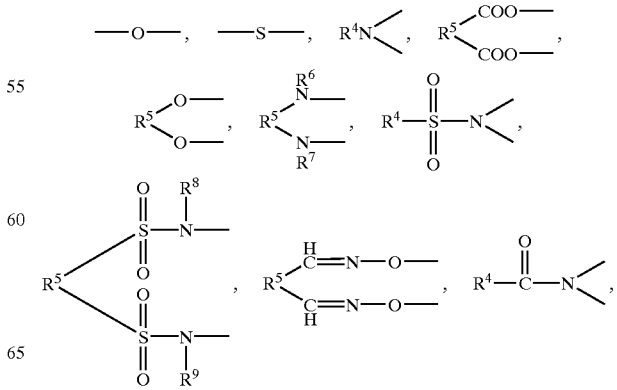

-continued

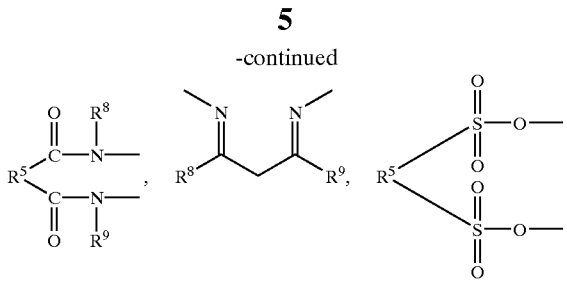

wherein $R^4$ is a hydrogen atom, a hydrocarbon group, a halogenated hydrocarbon group, a silicon-containing group, a germanium-containing group, a tin-containing group or an oxygen-containing group; $R^5$ is a divalent hydrocarbon group, a divalent halogenated hydrocarbon group, a divalent silicon-containing group, a divalent germanium-containing group, a divalent tin-containing group, a divalent boron-containing group or a single bond; $R^6$ and $R^7$ may be the same or different and are each a hydrogen atom, a hydrocarbon group, a halogenated hydrocarbon group, a silicon-containing group, a germanium-containing group a tin-containing group or an oxygen-containing group; each $R^6$ and $R^7$ may be bonded to a carbon atom for constituting $R^5$ to form a ring; and $R^8$ and $R^9$ may be the same or different and are each a hydrogen atom, a hydrocarbon group or a halogenated hydrocarbon group.

The group Z capable of being bonded to one or more M is a group selected from a halogen anion, a hydride, a carbanion, an alcoholate, an arylalcoholate, an alkylcarboxylate, an arylcarboxylate, a thiolate, a carbothiolate, a dithiocarbonate, a trithiocarbonate, a sulfonate, a sulfamate and a phosphate.

The cation A is, for example, a cation selected from the group consisting of a carbonium cation, an oxonium cation, an ammonium cation, a phosphonium cation, a cycloheptyltrienyl cation, a ferrocenium cation and metallic cations of Groups 1 and 11 of the periodic table, but not limited thereto.

The catalyst for ethylenically unsaturated monomer polymerization according to the invention comprises:

(A) a compound of a transition metal selected from Groups 3 to 12 of the periodic table, (B) the above-described catalyst component, and (C) an organic compound containing an element of Group 13 of the periodic table.

The catalyst for ethylenically unsaturated monomer polymerization according to the invention may further comprise a particulate carrier (D) on which only the component (A) is supported or the component (B) and/or the component (C) is supported together with the component (A).

The process for ethylenically unsaturated monomer polymerization according to the invention comprises polymerizing or copolymerizing an ethylenically unsaturated monomer in the presence of the above-described catalyst.

BRIEF DESCRIPTION OF THE DRAWING

FIG. 1 an explanatory view showing steps of a process for preparing a catalyst containing a catalyst component for ethylenically unsaturated monomer polymerization according to the present invention.

DETAILED DESCRIPTION OF THE INVENTION

The catalyst component for ethylenically unsaturated monomer polymerization, the catalyst for ethylenically unsaturated monomer polymerization and the process for ethylenically monomer polymerization according to the invention are described in detail hereinafter.

The catalyst component for ethylenically unsaturated monomer polymerization according to the invention comprises a compound obtained by the reaction of the following compounds (i), (ii), (iii) and optionally (iv) in any order, preferably a compound obtained by the reaction of the following compounds (i), (ii) and optionally (iv) in any order, and then further the following compound (iii):

(i) a compound comprising an atom of Group 13 of the periodic table, preferably a compound represented by the following formula:

$MR^1R^2R^3$ wherein M is an atom of Group 13 of the periodic table; $R^1$, $R^2$ and $R^3$ may be the same or different and are each a halogen atom, a hydrogen atom, a hydroxy group or an organic group; and two groups of $R^1$, $R^2$ and $R^3$ may be bonded to form a ring;

(ii) a compound capable of reacting with the compound (i) to be bonded to two or more of the Group 13 metals;

(iii) a compound capable of reacting with a compound comprising a metal of Group 13 of the periodic table, preferably with the reaction product obtained by reacting the compound (i), the compound (ii) and optionally the compound (iv) in any order, to form an ionizing ionic compound;

(iv) at least one compound selected from a hydrocarbon compound, a halogenated hydrocarbon compound, a hydroxylydrocarbon compound, a silanol compound, a boronic acid compound, an organic carboxylic acid compound, an organic sulfonic acid compound, a hydroxylamime compound, a sulfonamide compound, a ketoimide compound, an amide compound an oxime compound, an amine compound, an imide compound, a diimine compound, an imine compound, a diketone compound, and metallic salts thereof.

First of all, the constituents used for preparing the catalyst component for ethylenically unsaturated monomer polymerization according to the invention are describe.

(i) Compound Comprising a Metal of Group 13 of the Periodic Tale

The compound (i) comprising a metal of Group 13 of the periodic tale for use in the invention is preferably a compound represented by the formula $MR^1R^2R^3$.

In the compound (i) represented by the formula $MR^1R^2R^3$, M is an atom of Group 13, specifically boron, aluminum, gallium, indium or the like, particularly, preferably boron or aluminum.

$R^1$, $R^2$ and $R^3$ may be the same or different and are each a halogen atom, a hydrogen atom, a hydroxy group or an organic group. Two groups of $R^1$, $R^2$ and $R^3$ may be bonded to form a ring.

The halogen atom is fluorine, chlorine, bromine or iodine. Above all, chlorine or bromine is preferable.

The organic group is, for example, a hydrocarbon group, a halogenated hydrocarbon group, a hydrocarbon-substituted silyl group, an alkoxy group or an aryloxy group. Above all, a hydrocarbon group of 1 to 20 carbon atoms, a silyl group substituted with a hydrocarbon of 1 to 20 carbon atoms, an alkoxy group of 1 to 20 carbon atoms or an aryloxy group of 6 to 20 carbon atoms is preferable.

Examples of the hydrocarbon groups of 1 to 20 carbon atoms include alkyl groups, cycloalkyl groups, alkenyl groups, arylalkyl groups and aryl group. Specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenyethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups include the aforementioned hydrocarbon groups of 1 to 20 carbon atoms which are substituted with halogen atoms.

Examples of the silyl groups substituted with hydrocarbons of 1 to 20 carbon atoms include monohydrocarbon-substituted silyls, such as methylsilyl and phenylsilyl; dihydrocarbon-substituted silyls, such as dimethylsilyl and diphenylsilyl; and trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl.

Examples of the alkoxy groups of 1 to 20 carbon atoms include methoxy, ethoxy, propoxy and butoxy.

Examples of the aryloxy groups of 6 to 20 carbon atoms include phenoxy, methylphenoxy, dimethylphenoxy and naphthoxy.

Preferred examples of the compounds represented by $MR^1R^2R^3$ include aluminum compounds represented by the formula:

$$R^a{}_mAl(OR^b)_nX_p$$

wherein $R^a$ and $R^b$ may be the same or different and are each a hydrocarbon group of 1 to 15 carbon atoms, preferably 1 to 4 carbon atoms; X is a halogen atom; and m, n and p are numbers satisfying the conditions of $0 \leq m \leq 3$, $0 \leq n \leq 3$, $0p \leq 3$ and m+n+p=3.

More specifically, there can be mentioned:

(1) aluminum compounds represented by the formula:

$$R^a{}_mAl(OR^b)_{3-m}$$

wherein $R^a$ and $R^b$ may be the same or different and are each a hydrocarbon group of 1 to 15 carbon atoms, preferably 1 to 4 carbon atoms; and m is preferably a number satisfying the condition of $1.5 \leq m \leq 3$;

(2) aluminum compounds represented by the formula:

$$R^a{}_mAlX_{3-m}$$

wherein $R^a$ is a hydrocarbon group of 1 to 15 carbon atoms, preferably 1 to 4 carbon atoms; X is a halogen atom; and m is a number satisfying the condition of $0 \leq m \leq 3$; and (3) aluminum compounds represented by the formula:

$$R^a{}_mAl(OR^b)_nX_p$$

wherein $R^a$ and $R^b$ may be the same or different and are each a hydrocarbon group of 1 to 15 carbon atoms, preferably 1 to 4 carbon atoms; X is a halogen atom; and m, n and p are numbers satisfying the conditions of $0 \leq m \leq 3$, $0 \leq n \leq 3$, $0 \leq p \leq 3$ and m+n+p=3.

More specific examples of the aluminum compounds include:

tri-n-alkylaluminums, such as triethylaluminum, tri-n-butylaluminum and tri-n-octylaluminum;

tri-branched chain alkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum;

triarylaluminums, such as triphenylaluminum and tritolylaluminum;

trialkenylaluminums, such as triisoprenylaluminum;

alkylaluminum alkoxides, such as isobutylaluminum methoxide, isobutylaluminum ethoxide and isobutylaluminum isopropoxide;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $R^a{}_{2.5}Al(OR^b)_{0.5}$ or the like;

dialkylaluminum halides, such as diethylaluminum chloride, dibutylaluminum chloride and diethylaluminum bromide;

alkylaluminum sesquihalides, such as ethylaluminum sesquichloride, butylaluminum sesquichloride and ethylaluminum sesquibromide;

partially halogenated alkylaluminums, such as alkylaluminum dihalides, e.g., ethylaluminum dichloride, propylaluminum dichloride and butylaluminum dibromide;

partially alkoxylated and halogenated alkylaluminums, such as ethylaluminum ethoxychloride, butylaluminum butoxychloride and ethylaluminum ethoxybromide;

aluminum trihalides, such as aluminum trichloride and aluminum tribromide;

halogenated-arylaluminum, such as tris(pentafluorophenyl)aluminum; and halogenated-alkylaluminum, such as tris(trifluoromethyl)aluminum.

Further, preferable compounds of the formula $MR^1R^2R^3$ include:

halogerated-arylboron, such as tris(pentafluorophenyl)boron; and halogenated-alkylboron, such as tris(trifluoromethyl)boron.

Still further, as preferable examples of the compounds of formula $MR^1R^2R^3$, there may be mentioned $BH_3$, baronic acid, $B(CH)_3$, $Al(OH)_3$ and the like.

The compounds (i) mentioned above can be used singly or in combination of two or more kinds.

(ii) Compound Capable of Reacting With the Compound (i) to be Bonded to Two or more of the Group 13 Metal The compound (ii) capable of reacting with the compounds (i) to be bonded to two or more of the Group 13 metal is preferably a compound which can react with two or more molecules of the compound $MR^1R^2R^3$ and provide the resulting compound with a bridged structure wherein the compound (ii) is bonded to two or more M of the compounds (i). Specifically, the compound (ii) is at least one compound selected from the group consisting of $H_2O$, $H_2S$— and compounds represented by the following formulas:

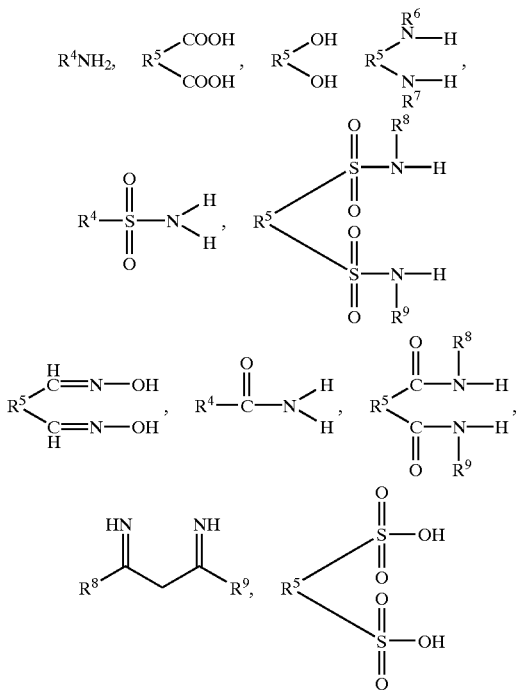

wherein $R^4$ is a hydrogen atom, a hydrocarbon group, a halogenated hydrocarbon group, a silicon-containing group, a germanium-containing group, a tin-containing group or an oxygen-containing group.

Examples of the halogenated hydrocarbon groups include those wherein the above-mentioned hydrocarbon groups of 1 to 20 carbon atoms are halogenated.

Examples of the silicon-containing groups include alkylsilyl groups, such as trimethylsilyl, triethylsilyl and dimethyltrifluoromethylsilyl; halogenated alkylsilyl groups; arylalkylsilyl groups, such as tribenzylsilyl, dimethylphenylsilyl and tri fluoromethyldiphenylsilyl; halogenated arylalkylsilyl groups; arylsilyl groups, such as triphenylsilyl and tripentafluorophenylsilyl; halogenated arylsilyl groups; alkylsilyloxy groups, such as trimethylsilyloxy, dimethylphenylsilyloxy and triphenylsilyloxy; arylalkylsilyloxy groups; and arylsilyloxy groups.

Examples of the germanium-containing groups include those wherein silicon is replaced with germanium in the above-exemplified silicon-containing groups.

Examples of the tin-containing groups include those wherein silicon is replaced with tin in the above-exemplified silicon-containing groups.

Examples of the oxygen-containing groups include alkylalkoxy groups, arylalkoxy groups and alkylarylalkoxy groups, such as methoxy, ethoxy, phenoxy, triphenylcarbinoxy and benzyloxy; and halogenated alkylalkoxy groups, halogenated arylalkoxy groups and halogenated alkylarylalkoxy groups, such as the above-mentioned groups which are partically halogenated.

Of the above groups, preferable are alkyl groups, aryl groups, halogen-substituted alkyl groups and halogen-substituted aryl groups.

$R^5$ is a divalent hydrocarbon group, a divalent halogenated hydrocarbon group, a divalent silicon-containing group, a divalent germanium-containing group, a divalent tin-containing group, a divalent boron-containing group or a single bond.

The preferable divalent hydrocarbon group is specifically a divalent hydrocarbon group of 1 to 20 carbon atoms, and examples thereof include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; arylalkylene groups, such as diphenylmethylene and diphenyl-1,2-ethylene; and arylene groups, such as phenylene and naphthylene.

Examples of the divalent halogenated hydrocarbon groups include those wherein the above-exemplified hydrocarbon groups of 1 to 20 carbon atoms are halogenated, such as chloromethylene.

Examples of the divalent silicon-containing groups include alkylsilylene groups, arylsilylene groups and alkylarylsilylene groups, such as silylene, methylsilylene, dimethylsilylene, diethylsilylene, diphenylsilylene and methylphenylsilylene; alkyldisilylene groups, aryldisilylene group and alkylaryldisilylene groups, such as tetramethyl-1,2-disilylene and tetraphenyl-1,2-disilylene; and halogenated alkylsilylene groups, halogenated aryl silylene groups, halogenated alkylarylsilylene groups, halogenated alkyldisilylene groups, halogenated aryldisilylene groups and halogenated alkylaryldisilylene groups, such as the above-mentioned groups which are partially halogenated.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

Examples of the divalent boron-containing groups include those of the formula $-BR^{5'}-$ ($R^{5'}$ is a hydrocarbon group of 1 to 20 carbon atoms, a halogenated hydrocarbon group of 1 to 20 carbon atoms or an oxygen-containing group, such as those described for $R^4$).

$R^6$ and $R^7$ may be the same or different and are each selected from a hydrogen atom, a hydrocarbon group, a halogenated hydrocarbon group, a silicon-containing group, a germanium-containing group, a tin-containing group and an oxygen-containing group. Examples of such groups include those previously described for $R^4$. $R^6$ may be bonded to a carbon atom for constituting $R^5$ to form a ring, and $R^7$ may also be bonded to a carbon atom for constituting $R^5$ to form a ring. Of these, preferable is an alkyl group.

$R^8$ and $R^9$ may be the same or different and are each selected from a hydrogen atom, a hydrocarbon group and a halogenated hydrocarbon group. Examples of such groups include those previously described for $R^1$ to $R^3$. Of these, preferable is an alkyl group.

Of the aforementioned compounds (ii), particularly preferable are $H_2O$ and those of the above formulae wherein $R^4$ or $R^5$ is an alkyl group, an aromatic hydrocarbon group, a silicon-containing group, a boron-containing group or a halogen-containing group.

It is presumed that the compounds (ii) react with the compounds (i) to form, for example, the following bridged structures in the resulting compounds.

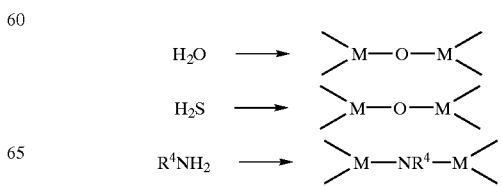

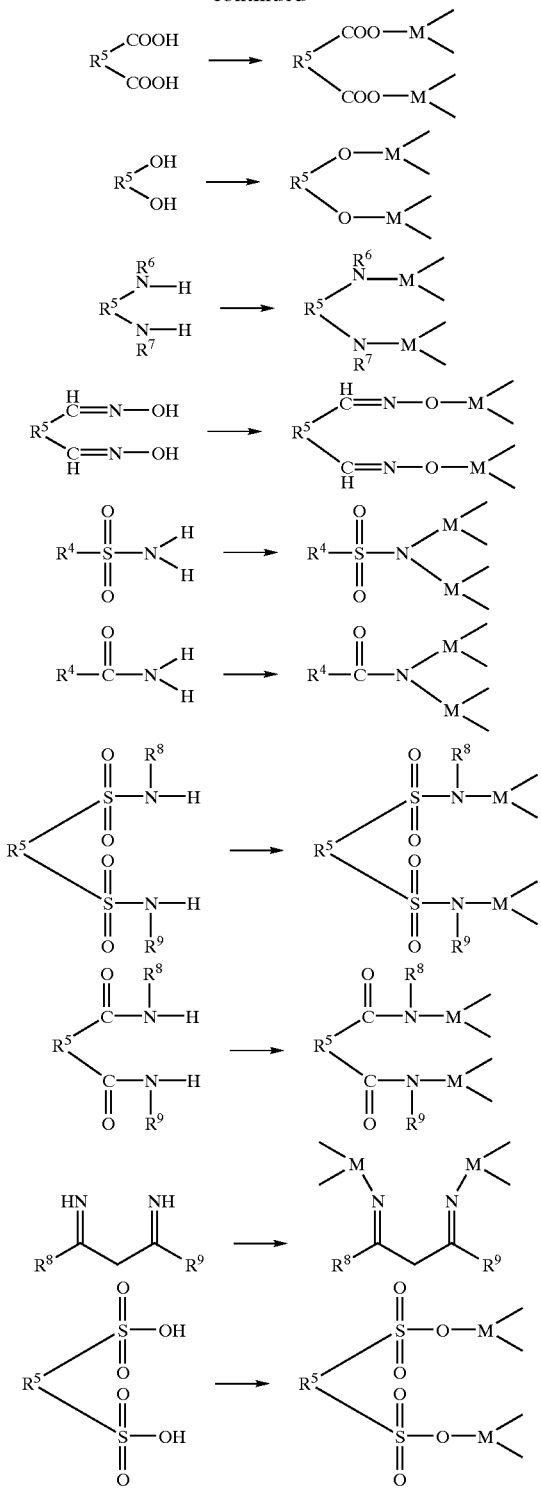

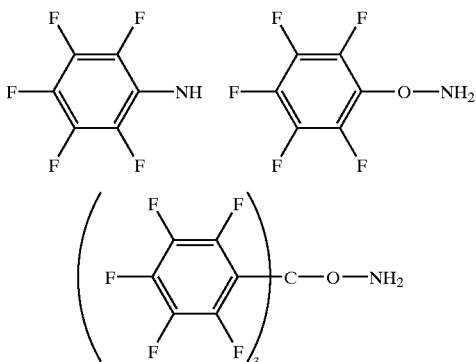

Examples of the compounds represented by $R^5 \begin{matrix} \text{COOH} \\ \text{COOH} \end{matrix}$ include

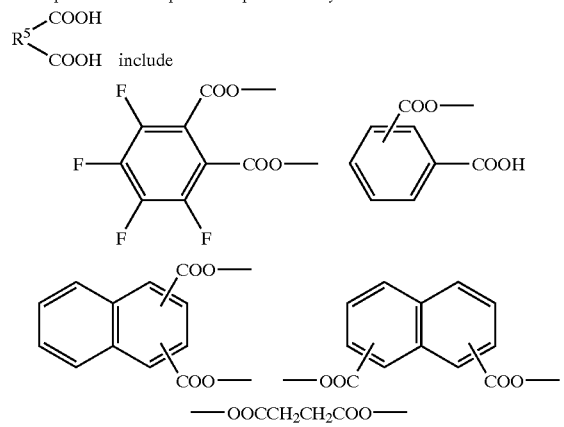

Examples of the compounds represented by $R^5 \begin{matrix} \text{OH} \\ \text{OH} \end{matrix}$ include $HOCH_2CH_2OH$, $Ph_2Si(OH)_2$, $Me_2Si(OH)_2$, $MeB(OH)_2$, $CH_3(CH_2)_3B(OH)_2$, $PhB(OH)_2$

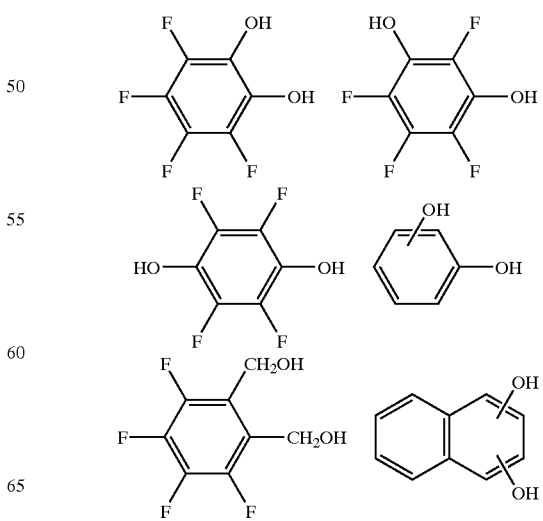

Examples of the compounds (ii) are given below:

Examples of the compounds represented by $R^4NH_2$ include $PhNH_2$, $EtNH_2$, $Ph_3CNH_2$, $Ph_3SiNH_2$, $Me_3SiNH_2$, $Ph-O-NH_2$, $Et-O-NH_2$, $Ph_3C-O-NH_2$, $Me_3Si-O-NH_2$, -continued

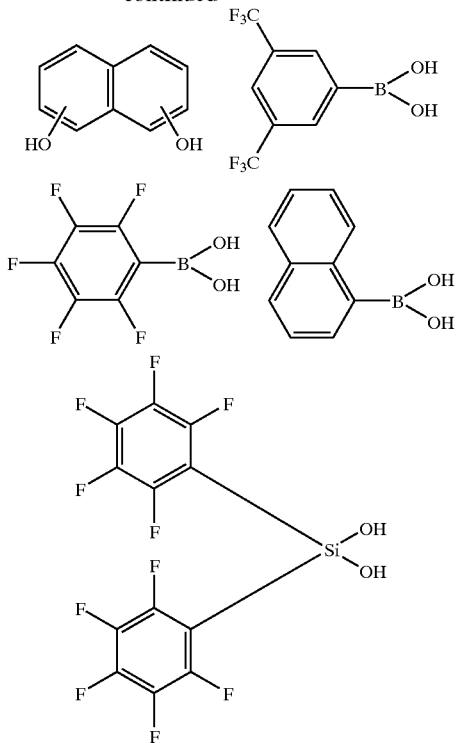

Examples of the compounds represented by

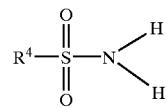

include PhSO$_2$NH$_2$, CF$_3$SO$_2$NH$_2$, CH$_3$SO$_2$NH$_2$,

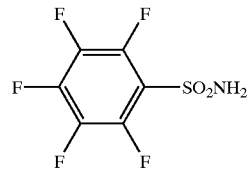

Examples of the compounds represented by

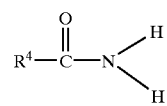

include PhCONH$_2$ and EtCONH$_2$.

Examples of the compounds represented by

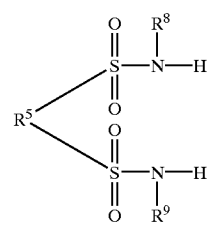

include CF$_3$CH(SO$_2$N(Me)H)$_2$, CF$_3$CH(SO$_2$NH),

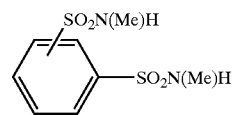

Examples of the compounds represented by

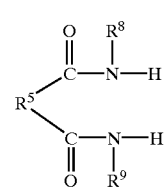

Examples of the compounds represented by

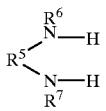

include

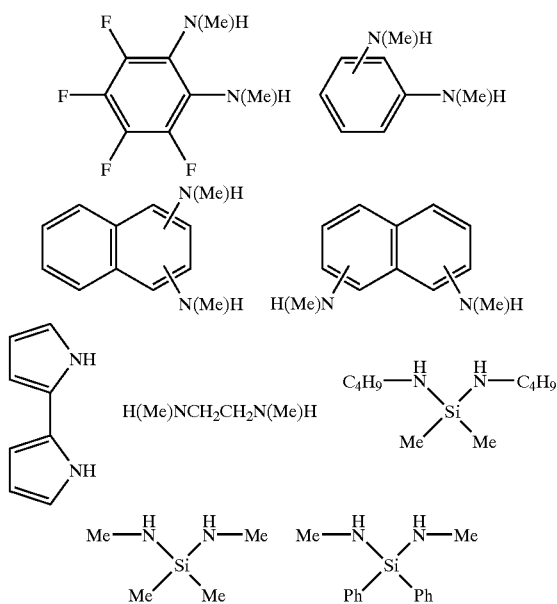

include

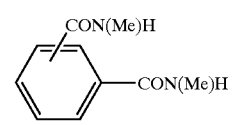

Examples of the compounds represented by

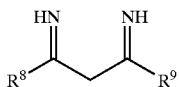

include

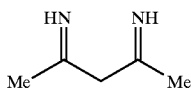

Examples of the compounds represented by

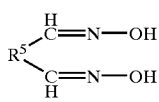

include

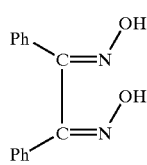

Examples of the compounds represented by

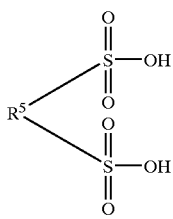

include

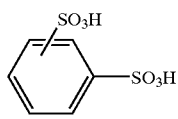

The compounds (ii) mentioned above can be used singly or in combination of two or more kinds.

(iii) Compound Capable of Reacting with Compound Comprising a Metal of Group 13 of the Peirodic Table to form Ionizing Ionic Compound The compound (iii) capeable of reacting with a compound comprising a metal of Group 13 of the peirodic table to form an ionizing ionic compound includes, for example, a compound capable of reacting with the above-mentioned compound $MR^1R^2R^3$ to form an ionizing ionic compound; a compound capable of reacting with the reaction product of the compound (i), the compound (ii) and optionally the later-described compound (iv) in any order of reaction to from a ionizing ionic compound; and a compound capable of reacting with $LiB(C_6F_5)_4$, $LiB(Ph)_4$, $LiAl(C_6F_5)_4$ or $LiAl(Ph)_4$ to form an ionizing ionic compound.

As preferred examples of the compounds capable of reacting with a compound comprising a Group 13 metal to form an ionizing ionic compound, there car be mentioned compoundscapable of forming ionizing ionic compounds having any of a cation which can impart a proton and a cation which does not impart a proton, such as a carbonium cation, an oxonium cation, an ammonium cation, a phosphonium. cation, a cycloheptyltrienyl cation and a ferrocenium cation.

Specifically, there can be mentioned alkyl metallic salts such as methyllithium, alkoxy metallic salts such as methoxylithium, triphenylchloromethane, acetyltriphenylmethane, potassium triethylboron hydride, bis(η-cyclopentadienyl)iron sulfate, N,N-dimethylanilinium chloride and triethylammonium chloride.

The compounds (iii) mentioned above can be used singly or in combination of two or more kinds.

Compound (iv)

The compound optionally used in the invention is a compound which provides a substituent useful as a co-catalyst to M derived from the compound (i), and is specifically at least one compound selected from a hydrocarbon compound, a halogenated hydrocarbon compound, a hydroxyhydrocarbon compound, a silanol compound, a boronic acid compound, an organic carboxylic acid compound, an organic sulfonic acid compound, a hydroxylamine compound, a sulfonamide compound, a ketoimide compound, an amide compound, an oxime compound, an amine compound, an imide compound, a diimine compound, an imine compound, a diketone compound, and metallic salts thereof.

Examples of the compounds (iv) include compounds represented by the following formulas and metallic salts thereof:

$R^{10}X$, $R^{10}H$, $R^{10}OH$, $R^{10}R^{11}NH$, $R^{10}COOH$, $R^{10}SO_3H$, $R^{10}R^{11}CNOH$, $R^{10}R^{11}NOH$, $R^{10}CONHR^{11}$, $R^{10}SO_2NHR^{11}$, $R^{10}COCH_2COR^{11}$, and $R^{10}C(=NH)CH_2COR^{11}$ wherein $R^{10}$ is a hydrocarbon group, a halogenated hydrocarbon group, a silicon-containing group, a germanium-containing group, a tin-containing group or a boron-containing group. Examples of such groups include the hydrocarbon groups, the halogenated hydrocarbon groups and the silicon-containing groups previously exemplified with respect to $R^4$.

Examples of the boron-containing groups include compounds of the formula $—BR^{10'}R^{10''}—$ ($R^{10'}$ and $R^{10''}$ may be the same or different and are each the hydrocarbon group of 1 to 20 carbon atoms, the halogenated hydrocarbon group of 1 to 20 carbon atoms or the oxygen-containing group previously described for by $R^4$; and $R^{10'}$ and $R^{10''}$ may be bonded to form a ring).

$R^{11}$ is a hydrogen atom, an alkoxy group, or any of a hydrocarbon group, a halogenated hydrocarbon group, a silicon-containing group, a germanium-containing group, a tin-containing group and a boron-containing group each of which is the same as or different from $R^{10}$. Examples of such groups include the alkoxy groups previously described with respect to $R^1$ to $R^3$, and the hydrocarbon groups, the halogenated hydrocarbon groups and the silicon-containing groups previously described with respect to $R^4$. Examples of the boron-containing groups include the groups described with respect to $R^{10}$.

$R^{10}$ and $R^{11}$ may be bonded to form a ring together with a nitrogen atom or a carbon atom to which $R^{10}$ and $R^{11}$ are bonded. This ring may have a double bond.

X is a halogen atom.

Examples of the compounds (iv) are given below:

Examples of the compounds represented by general formula $R^{10}X$ include PhBr, MeI, $Ph_3SiCl$, $Me_3SiCl$,

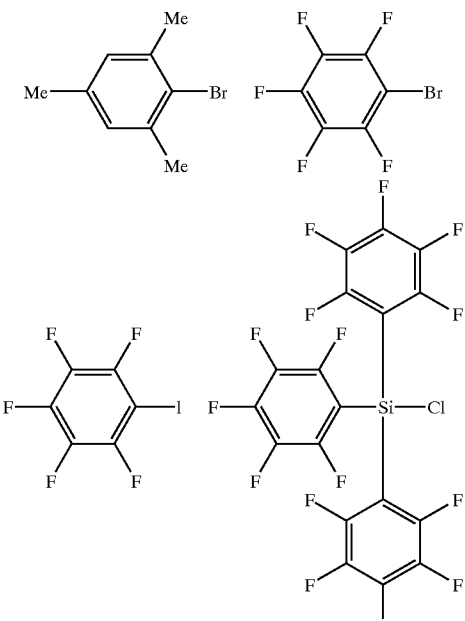

Examples of the compounds represented by general formula $R^{10}H$ include

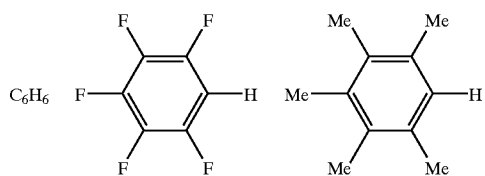

Examples of the compounds represented by general formula $R^{10}OH$ include

PhOH, MeOH, $CF_3CH_2OH$, $Ph_3SiOH$, $Me_3SiOH$, $Et_2BOH$, $Ph_2BOH$

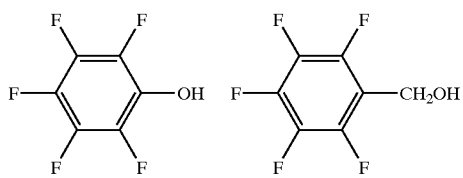

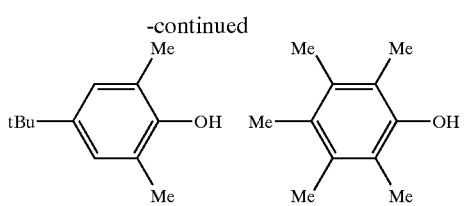

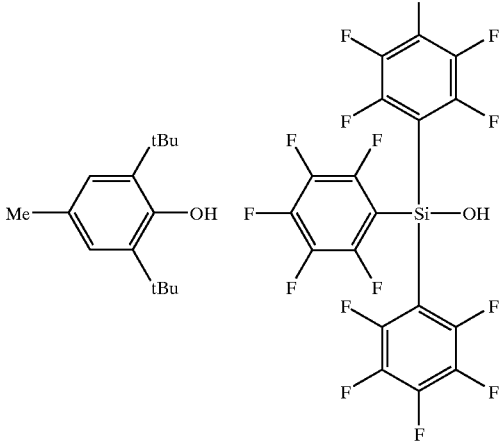

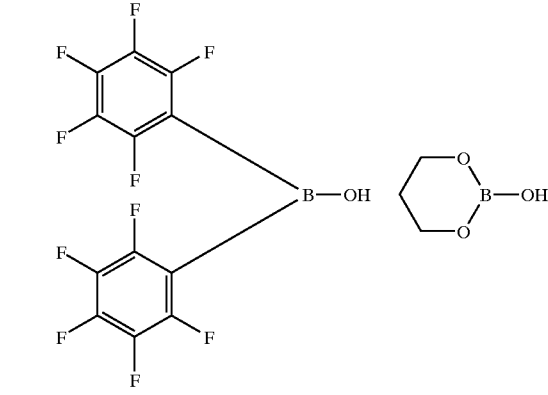

Examples of the compounds represented by general formula $R^{10}R^{11}NH$ include

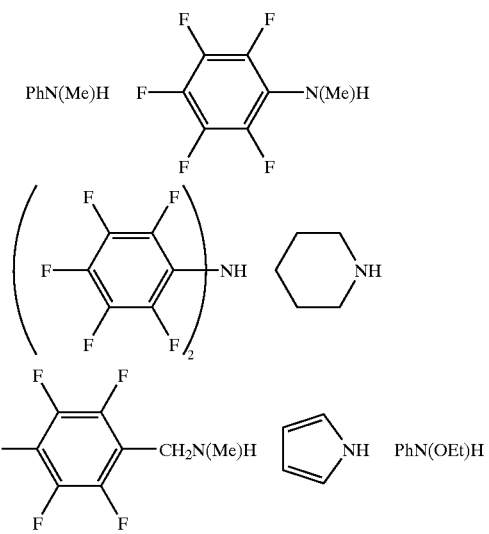

Examples of the compounds represented by general formula $R^{10}COOH$ include

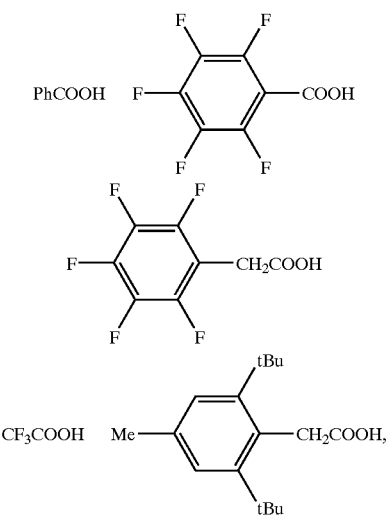

Examples of the compounds represented by general formula $R^{10}SO_3H$ include

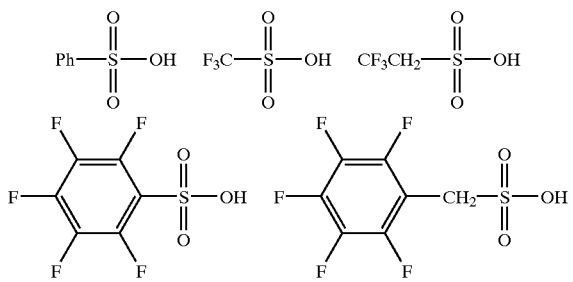

Examples of the compounds represented by general formula $R^{10}R^{11}NOH$ include
PhN(Me)OH(Me)$_2$NOH

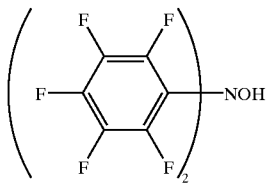

Examples of the compound represented by general formula $R^{10}R^{11}CNOH$ include

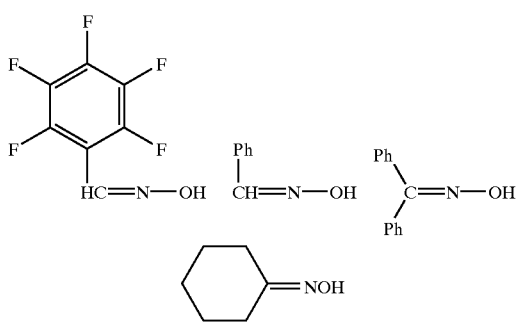

Examples of the compounds represented by general formula $R^{10}CONHR^{11}$ include Ph—CO—NH—Ph

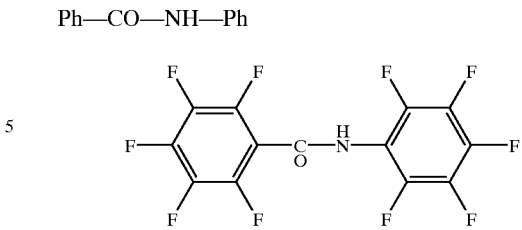

Examples of the compounds represented by general formula $R^{10}SO_2NHR^{11}$ include Ph—SOO—NH—Ph and Ph—SOO—NH—Me, Examples of the compounds represented by general formula $R^{10}COCH_2COR^{11}$ include

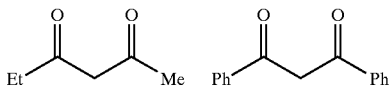

Examples of the compounds represented by general formula $R^{10}C(=NH)CH_2COR^{11}$ include

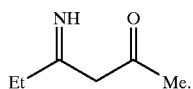

Of the compounds (iv), preferable are those of the above formulae wherein $R^{10}$ is a substituted aromatic hydrocarbon group or a fluorine-containing group, and also wherein at least one of $R^{10}$ and $R^{11}$ is a substituted aromatic hydrocarbon group or a fluorine-containing group.

Examples of the above substituted aromatic hydrocarbon groups include those having at least one substituent selected from, for example, alkyl groups, halogenated alkyl groups, alkoxy groups and halogen atoms (particularly preferably fluorine).

Examples of the above fluorine-containing groups include substituents having at least one fluorine atom.

Examples of metallic salts of the above compounds include $R^{10}Y$, $R^{10}OY$, $R^{10}R^{11}NY$, $R^{10}COOY$, $R^{10}SO_3Y$, $R^{10}R^{11}CNOY$, $R^{10}R^{11}NOY$, $R^{10}CONR^{11}Y$ and $R^{10}SO_2NR^{11}Y$ ($R^{10}$ and $R^{11}$ are each the same as above, and Y is an alkali metal such as lithium, sodium or potassium). Also available are compounds containing alkaline earth metals in the form of metallic salts, for example, $(R^{10}SO_3)_2Ba$ ($R^{10}$ is the same as above), specifically $(C_6F_5SO_3)_2Ba$.

The compounds (iv) mentioned above can be used singly or in combination of two or more kinds.

The catalyst component for ethylenically unsaturated monomer polymerization according to the invention can be prepared by the reaction of the compounds (i), (ii) and (iii) or by the reaction of the compounds (i), (ii), (iii) and (iv).

In the preparation of the catalyst component for ethylenically unsaturated monomer polymerization, the compound (i) can be used in an amount of 1 to 5 mol, preferably 2 to 3 mol, per mol of the compound (ii), and the compound (iii) can be used in an amount of 0.1 to 2 mol, preferably 0.5 to 1 mol, per mol of the compound (i). The compound (iv) can be optionally used in an amount of 1 to 6 mol, preferably 2 to 3 mol, per mol of the compound (i).

In the present invention, it is preferable to use the compound (i) in an amount of about 2 mol per mol of the compound (ii), the compound (iii) in an amount of about 0.5 mol per mol of the compound (i), and optionally the compound (iv) in an amount of about 2 or 3 mol per mol of the compound (i).

Examples of solvents employable in the reaction include aliphatic hydrocarbons, such as propane, butane, pentane, hexane, heptane, octane, decane and dodecane; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene, dichloromethane and chloroform; ether-containing aliphatic hydrocarbons and ether-containing alicyclic hydrocarbons, such as diethyl ether and tetrahydrofuran; and mixtures of these hydrocarbons.

For preparing the catalyst component for ethylenically unsaturated monomer polymerization according to the invention from at least one compound (i), at least one compound (ii) and at least one compound (iii), there can be employed, for example, a process wherein the compound (i) is reacted with the compound (ii) in a non-polar solvent such as toluene at −10 to +10° C., then stirring is conducted at room temperature or under heating, and the compound (iii) is added to react with the reaction product of the compound (i) and the compound (ii) at a temperature of −78° C. to room temperature.

Preferred examples of combinations of the compound (i), the compound (ii) and the compound (iii) used for preparing the catalyst component for ethylenically unsaturated monomer polymerization are set forth in Table 1.

TABLE 1

| (i) | (ii) | (iii) |
|---|---|---|
| Triethylaluminum | Water | Triphenyl-chloromethane |
| Triethylaluminum | Hydrogen sulfide | Triphenyl-chloromethane |
| Triethylaluminum | Aniline | Triphenyl-chloromethane |
| Trioctylaluminum | Water | Triphenyl-chloromethane |

For preparing the catalyst component for ethylenically unsaturated monomer polymerization according to the invention from at least one compound (i), at least one compound (ii), at least one compound (iii) and at least one compound (iv), there can be employed, for example, a process wherein the compound (i) is reacted with the compound (ii) in a non-polar solvent such as toluene at −10 to +10° C., then the compound (iv) is added to react with the reaction product of the compound (i) and the compound (ii) at −100 to −50° C., and the compound (iii) is further added to perform reaction.

Also available is a process wherein the compound (i) is reacted with the compound (iv) in a non-polar solvent such as toluene at −100 to −50° C., then the compound (ii) is added to react with the reaction product of the compound (i) and the compound (iv) at −10 to +10° C., and the compound (iii) is further added to a perform reaction.

Preferred examples of combinations of the compound (i), the compound (ii), the compound (iii) and the compound (iv) used for preparing the catalyst component for ethylenically unsaturated monomer polymerization are set forth in Table 2.

TABLE 2

| (i) | (ii) | (iii) | (iv) |
|---|---|---|---|
| Aluminum trichloride | Water | Triphenyl-chloromethane | $C_6F_5Li$ |
| Aluminum tribromide | Water | Triphenyl-chloromethane | $C_6F_5Li$ |
| Ethylaluminum dichloride | Water | Triphenyl-chloromethane | $C_6F_5Li$ |
| Triisobutyl-aluminum | Water | Triphenyl-chloromethane | $C_6F_5OH$ |
| Triisobutyl-aluminum | Water | Triphenyl-chloromethane | $C_6F_5COOH$ |

More specifically, in the preparation of the catalyst component for ethylenically unsaturated monomer polymerization according to the invention, when aluminum tribromide as the compound (i), water as the compound (ii), triphenylchloromethane as the compound (iii) and lithium pentafluorobenzene as the compound (iv) are used in molar ratios of: 2 mol of the compound (i) based on 1 mol of the compound (ii), 0.5 mol of the compound (iii) based on 1 mol of the compound (i) and 3 mol of the compound (iv) based on 1 mol of the compound (i), the following reaction product is presumed to be obtained.

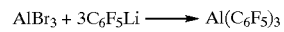

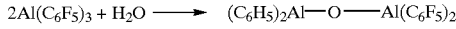

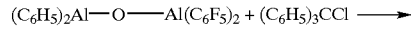

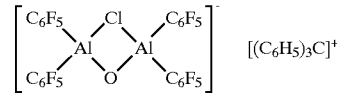

In another process wherein ethylaluminum dichloride as the compound (i), water as the compound (ii), triphenylchloromethane as the compound (iii) and lithium pentafluorobenzene as the compound (iv) are used in molar ratios of: 2 mol of the compound (i) based on 1 mol of the compound (ii), 0.5 mol of the compound (iii) based on 1 mol of the compound (i) and 4 mol of the compound (iv) based on 2 mol of the compound (i), the same reaction product as above is presumed to be obtained.

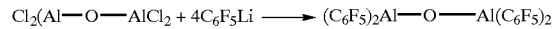

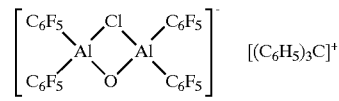

Another catalyst component for ethylenically unsaturated monomer polymerization according to the invention is a compound represented by the following formula.

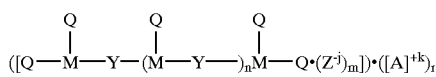

In the above formula, each M may be the same or different, and is an atom of Group 13 of the periodic table, specifically boron, aluminum, gallium, indium or the like, particularly preferably boron or aluminum.

n is an integer of 0 or more, preferably an integer of 0 to 5, more preferably an integer of 0 to 3. A compound of the above formula wherein n=0 is one of the most preferable embodiments.

Y is a divalent bonding group, and when n is 1 or more, plural Y may be the same or different.

Examples of the divalent bonding groups Y include the following bonding groups.

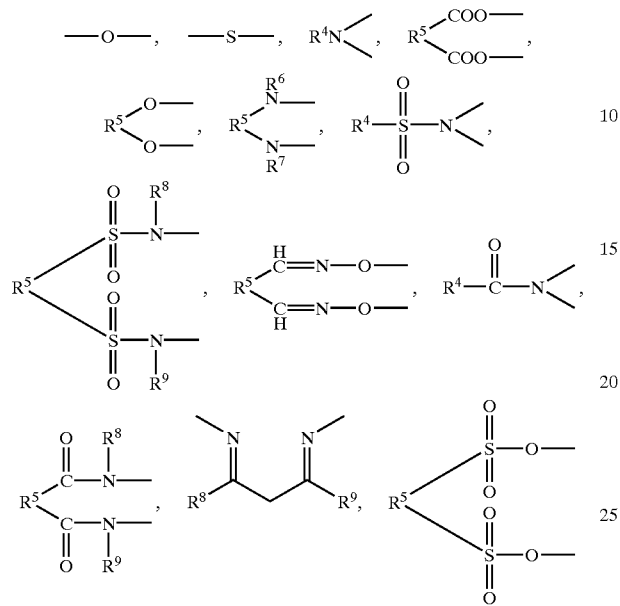

In the above formulas, $R^4$, $R^5$, $R^6$, $R^7$, $R^8$ and $R^9$ have the same meanings as those of $R^4$, $R^5$, $R^6$, $R^7$, $R^8$ and $R^9$ of the aforesaid compound (ii).

More specific examples of such bonding groups are given below:

Examples of the bonding groups represented by $$R^4N{<}$$

include

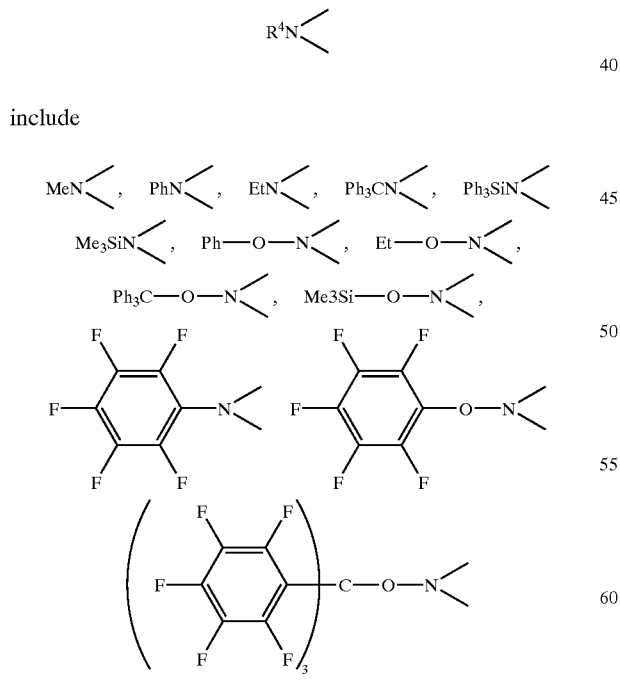

Examples of the bonding groups represented by $$R^5{<}{\begin{matrix}COO{-}\\COO{-}\end{matrix}}$$

include

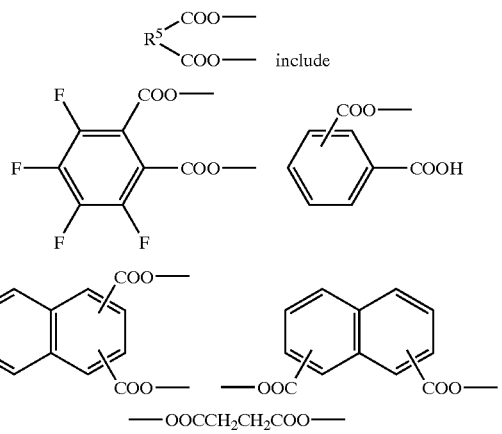

Examples of the bonding groups represented by $$R^5{<}{\begin{matrix}O{-}\\O{-}\end{matrix}}$$

include

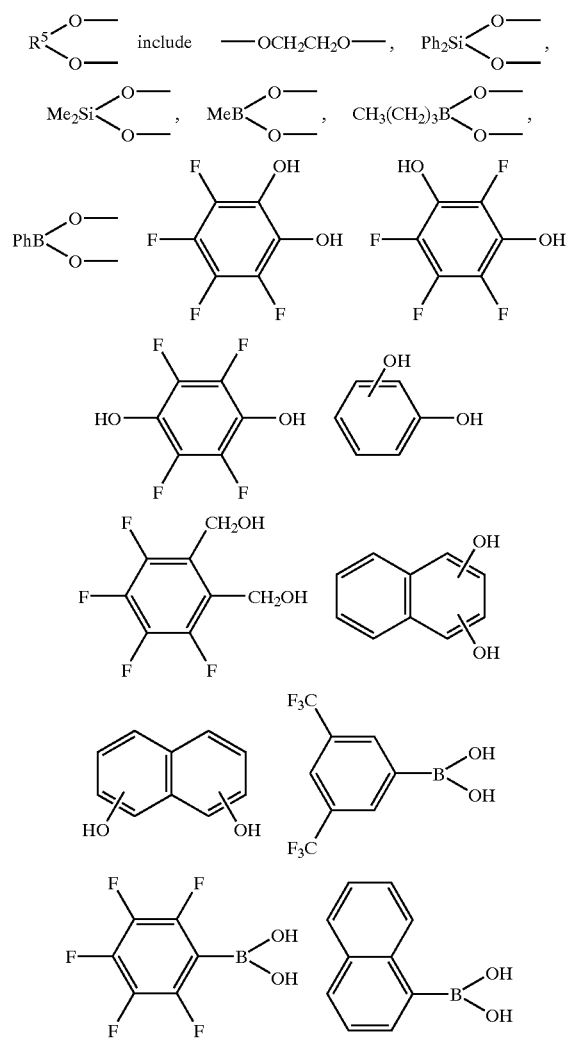

-continued
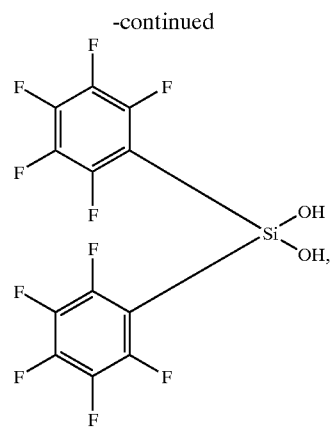
Examples of the bonding groups represented by
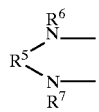
include
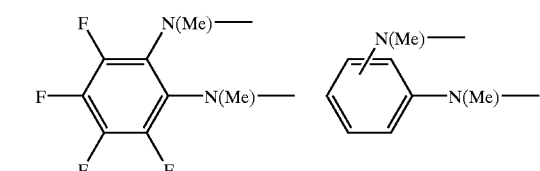
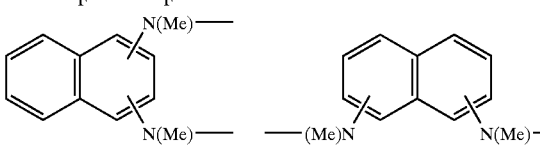
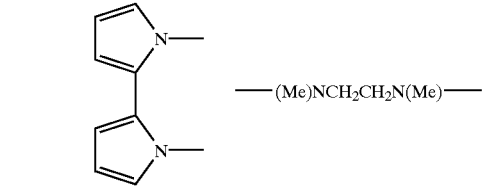
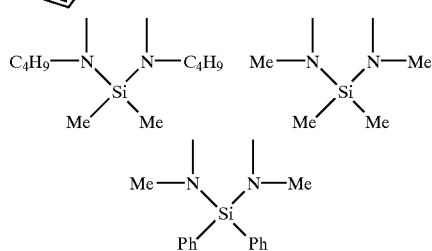
Examples of the bonding groups represented by
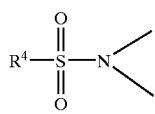
include
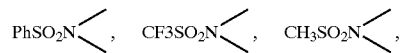
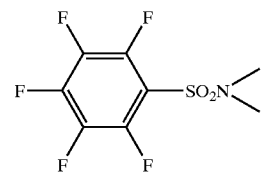
Examples of the bonding groups represented by
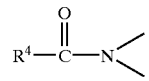
include
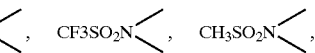
Example of the bonding groups represented by
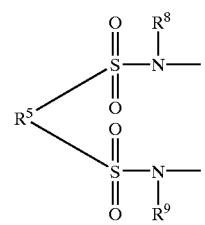
include
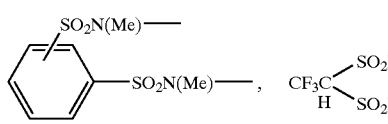
Examples of the bonding groups represented by
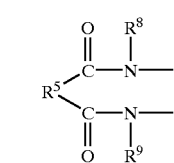
include
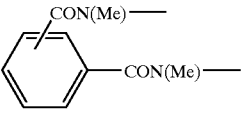

Examples of the bonding groups represented by

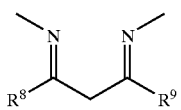

include

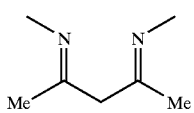

Examples of the bonding groups represented by

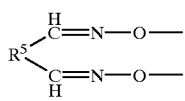

include

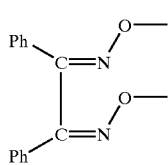

Examples of the bonding groups represented by

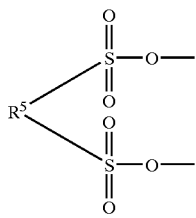

include

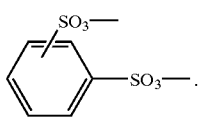

More preferable examples of Y are —O— and those bonding groups wherein $R^4$ and $R^5$ are each an alkyl group, an aromatic hydrocarbon group, a silicon-containing group, a boron-containing group or a halogen-containing group.

Z is a group capable of being bonded to one or more M, and specifically is a group selected from, for example, halogen, hydrogen, alkyl groups of 1 to 20 carbon atoms, preferably 1 to 10 carbon atoms, such as methyl, ethyl, propyl, butyl, hexyl, octyl, nonyl and dodecyl, alkoxy groups of 1 to 20 carbon atoms, preferably 1 to 10 carbon atoms, such as methoxy, ethoxy, propoxy and butoxy, an acetyl group, and a sulfuric acid anion.

j is a valence of Z. A compound of the above formula wherein j=1 is one of the most preferable embodiments.

m is the number of Z, and an integer of not less than 1 and not more than n+1, preferably an integer of 1 to 6, more preferably an integer of 1 to 4.

Each Q may be the same or different, and is a group selected from the following groups:

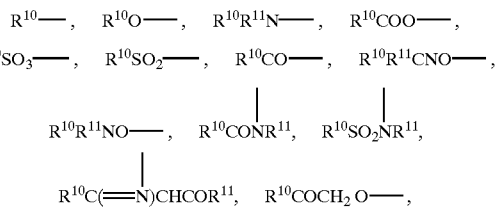

wherein in $R^{10}$ and $R^{11}$ have the same meanings as those of $R^{10}$ and $R^{11}$ of the aforesaid compound (iv).

Examples of the groups of formula $R^{10}O—$ include

PhO—, MeO—, $CF_3CH_2O—$, $Ph_3SiO—$, $Me_3SiO—$, $Et_2BO—$, $Ph_2BO—$

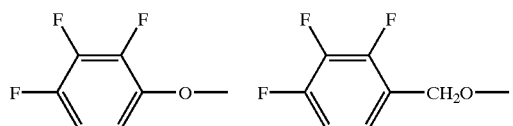

Examples of the groups of formula $R^{10}R^{11}N$ include

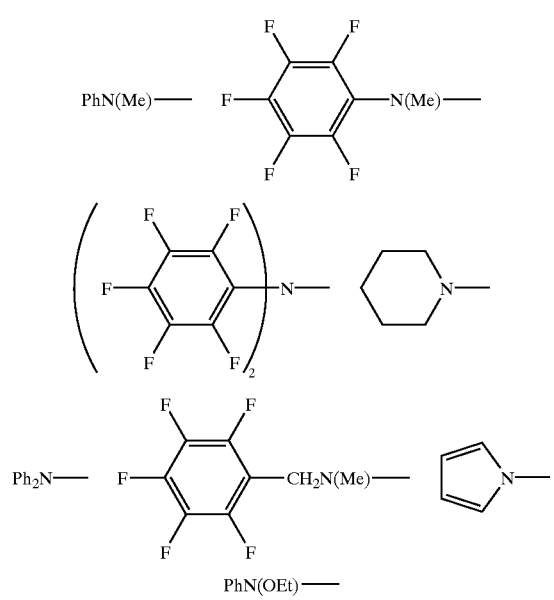

Examples of the groups of formula $R^{10}COO$— include

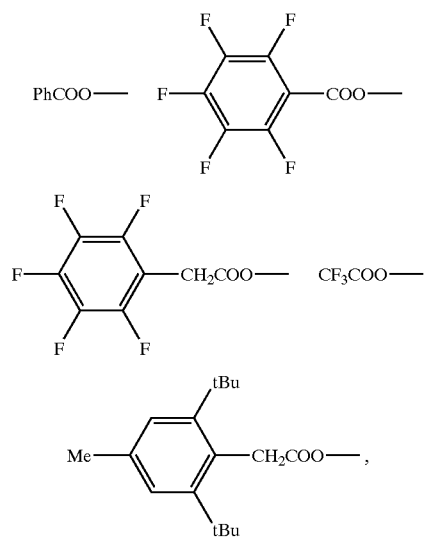

Examples of the groups of formula $R^{10}SO_3$— include

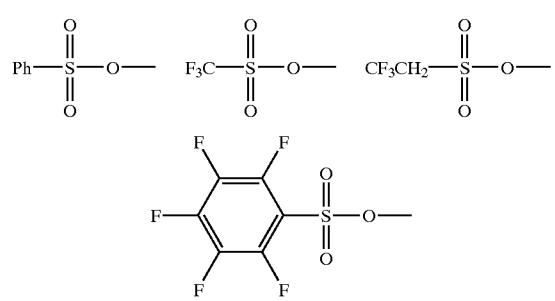

-continued

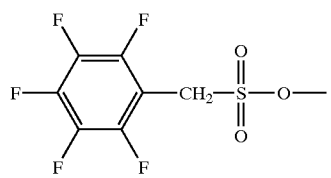

Examples of the groups of formula $R^{10}SO_2$— include

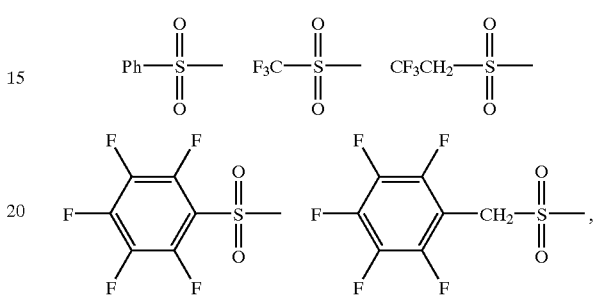

Examples of the groups of formula $R^{10}CO$— include MeCO—, EtCO— and PhCO—.

Examples of the groups of formula $R^{10}R^{11}NO$— include

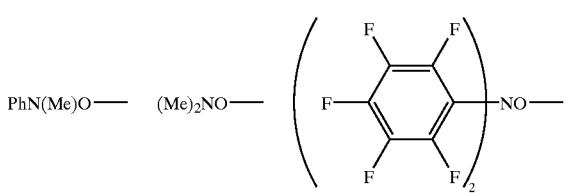

Example of the groups of formula $R^{10}R^{11}CNO$— include

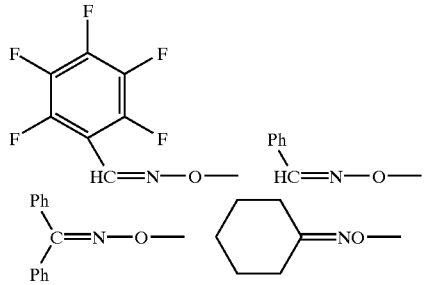

Examples of the groups of formula $R^{10}CONR^{11}$ include

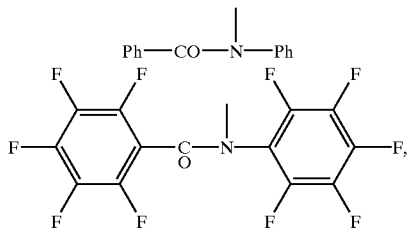

Examples of the groups of formula $R^{10}SO_2NR^{11}$ include

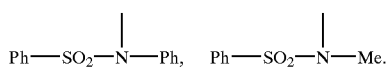

Examples of the groups of formula $R^{10}COCH_2CO-$ include

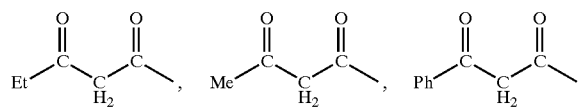

Examples of the groups of formula $R^{10}C(=N)CH_2COR^{11}$ include

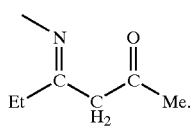

It is preferable that at least one of the groups Q is a group of the above formulae wherein $R^{10}$ is a substituted aromatic hydrocarbon group or a fluorine-containing group, and also wherein at least one of $R^{10}$ and $R^{11}$ is a substituted aromatic hydrocarbon group or a fluorine-containing group.

Examples of the above substituted aromatic hydrocarbon groups include those having at least one substituent selected from, for example, alkyl groups, halogenated alkyl groups, alkoxy groups and halogen atoms (particularly preferably fluorine).

Some examples of the anion moieties represented by the following formula:

in the catalyst component for ethylenically unsaturated monomer polymerization according to the invention represented by the aforesaid formula, are given below.

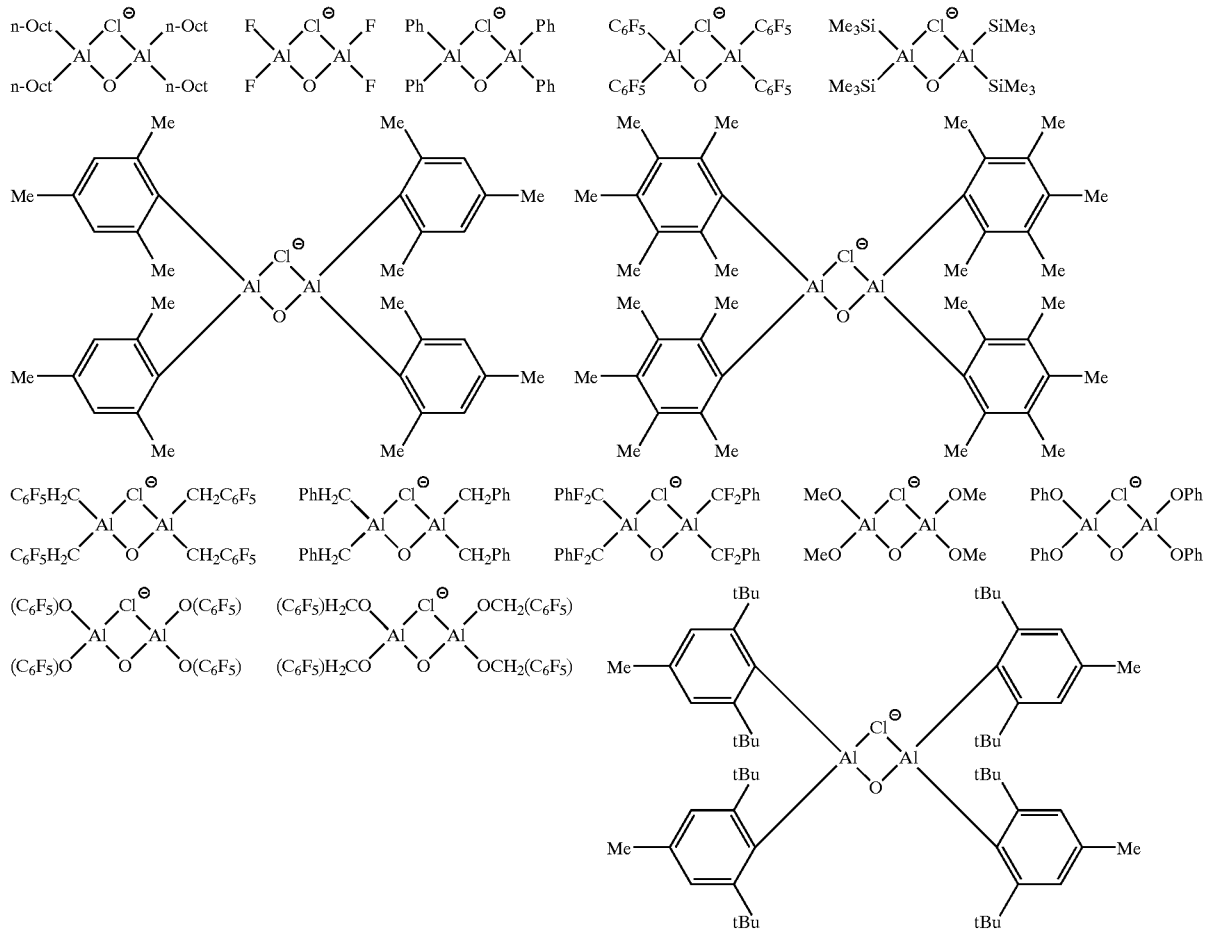

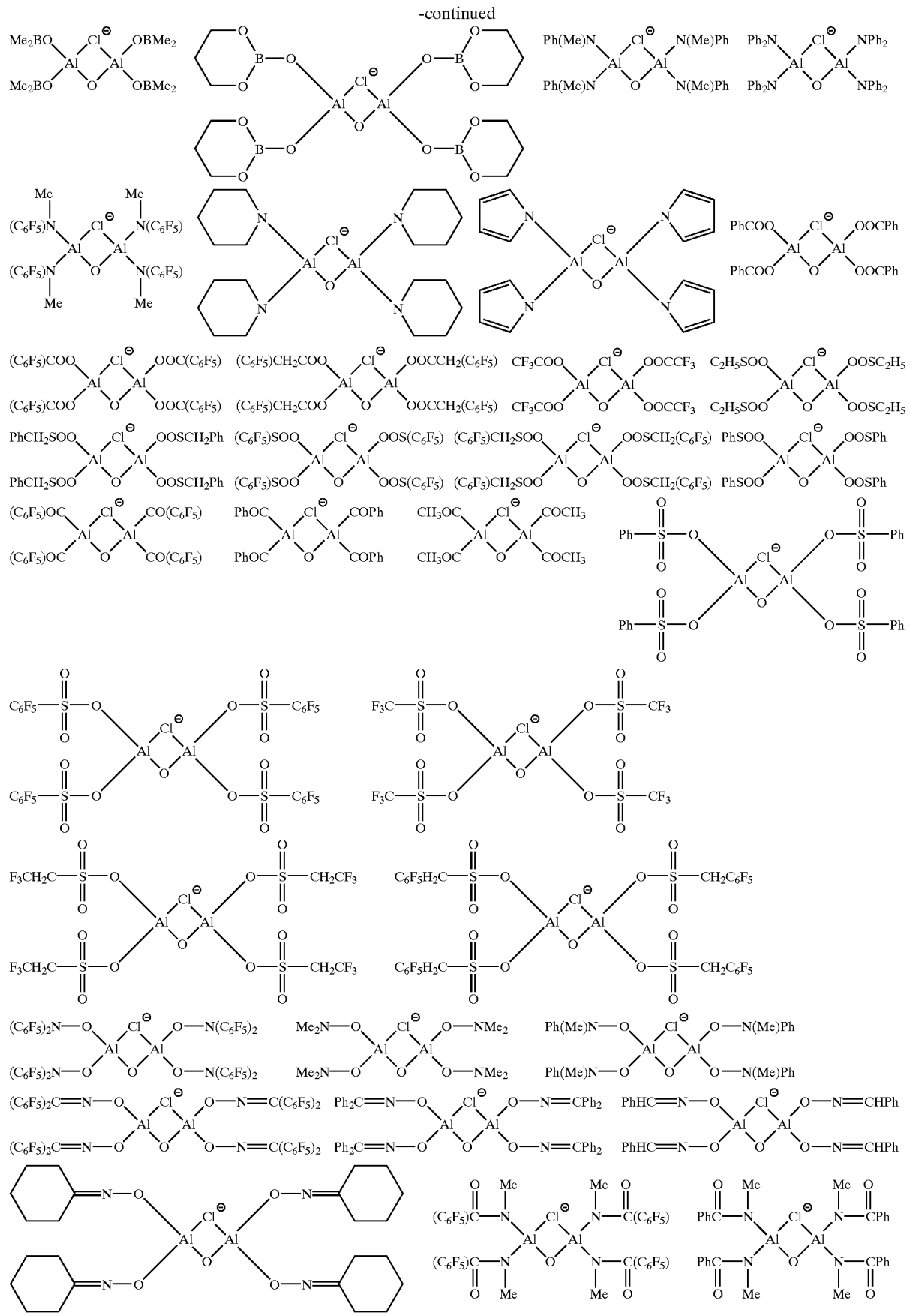

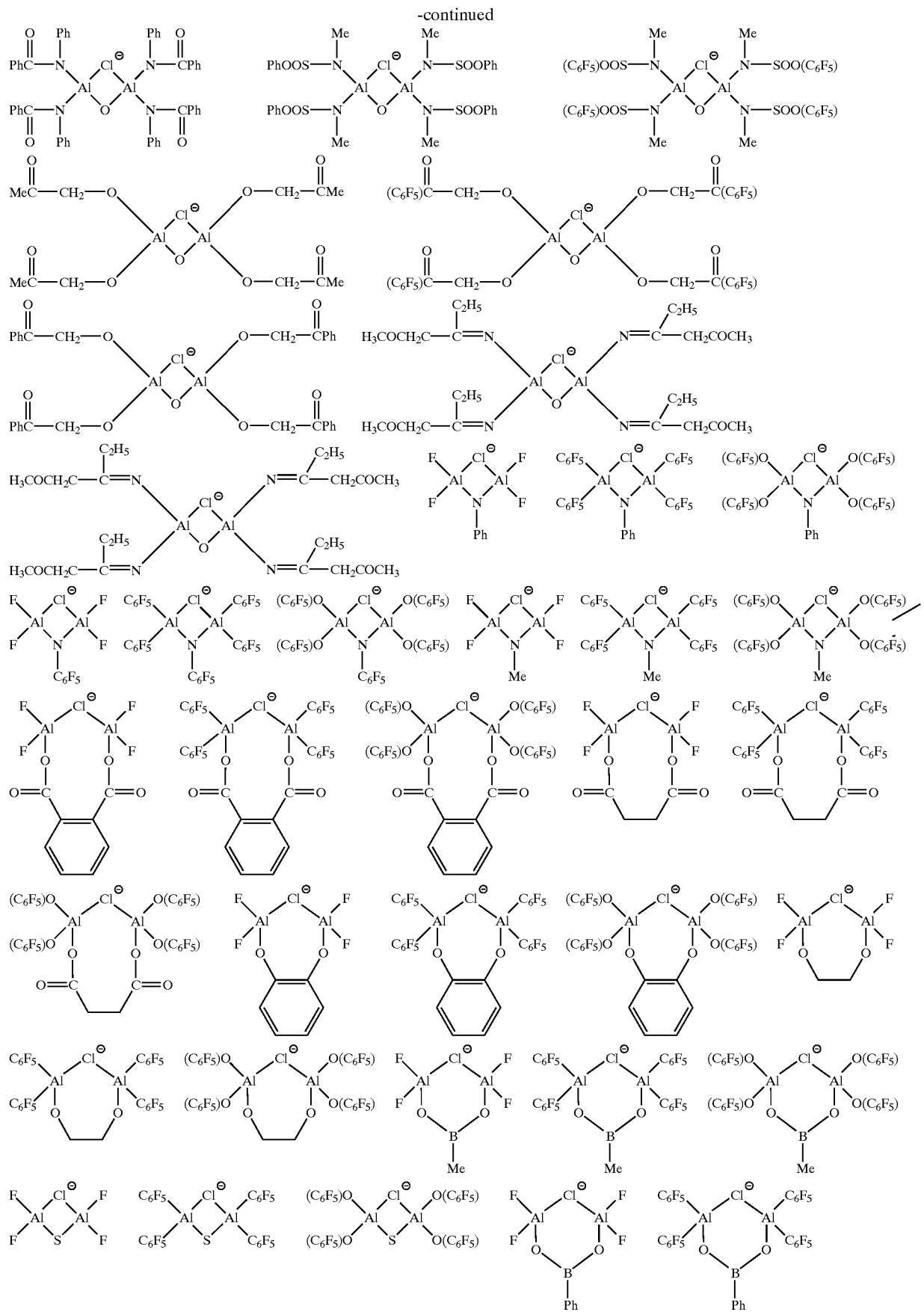

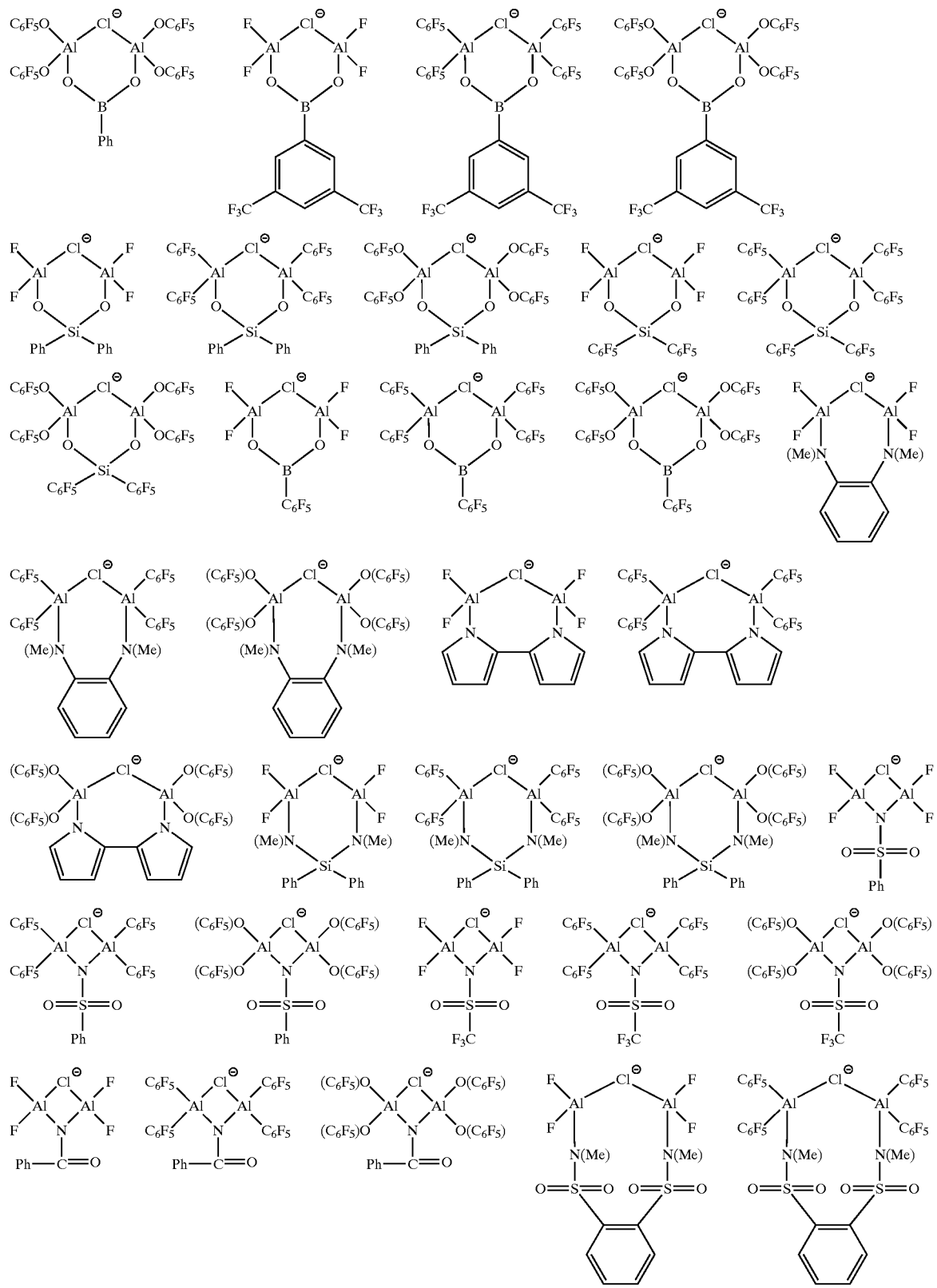

-continued
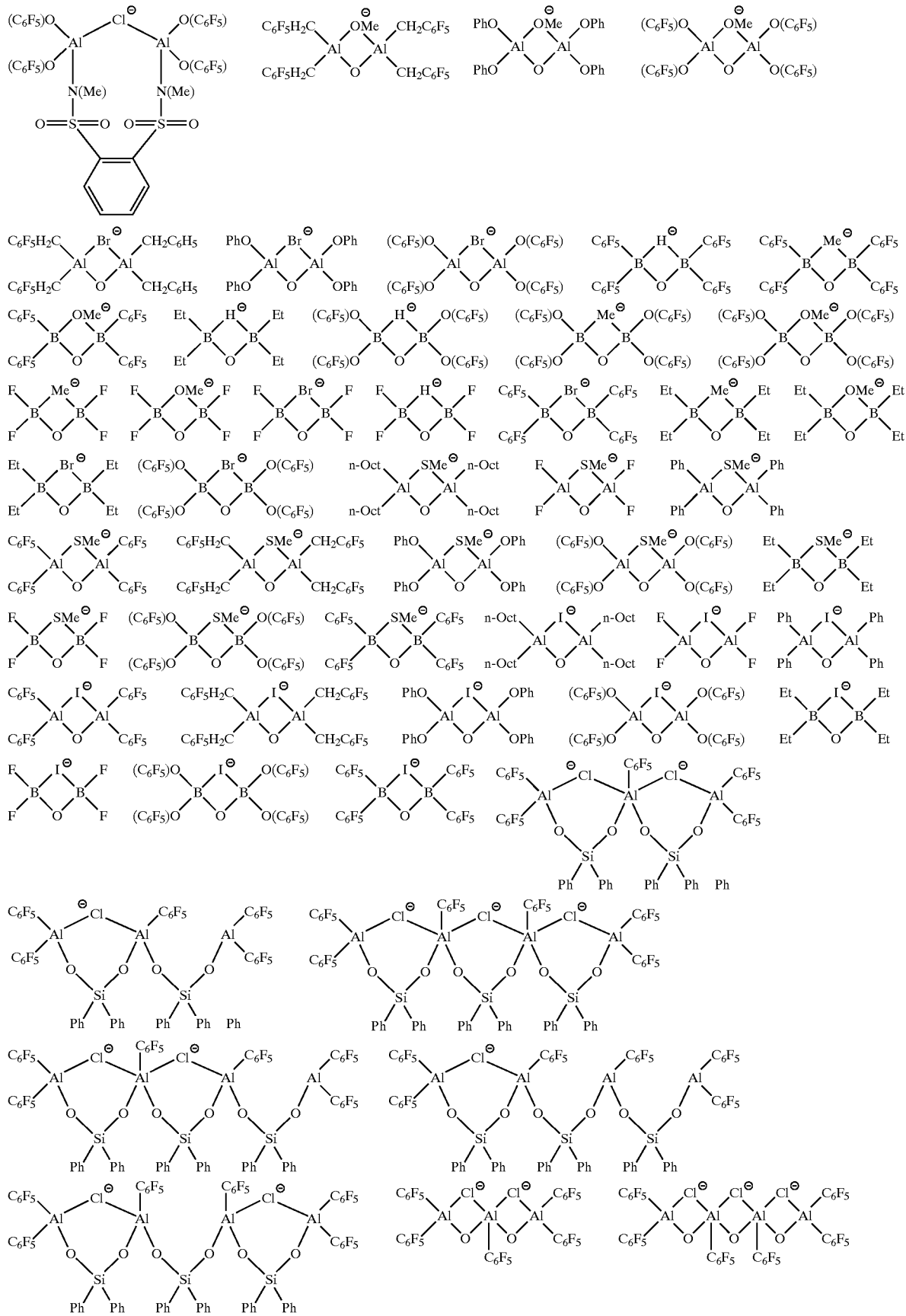

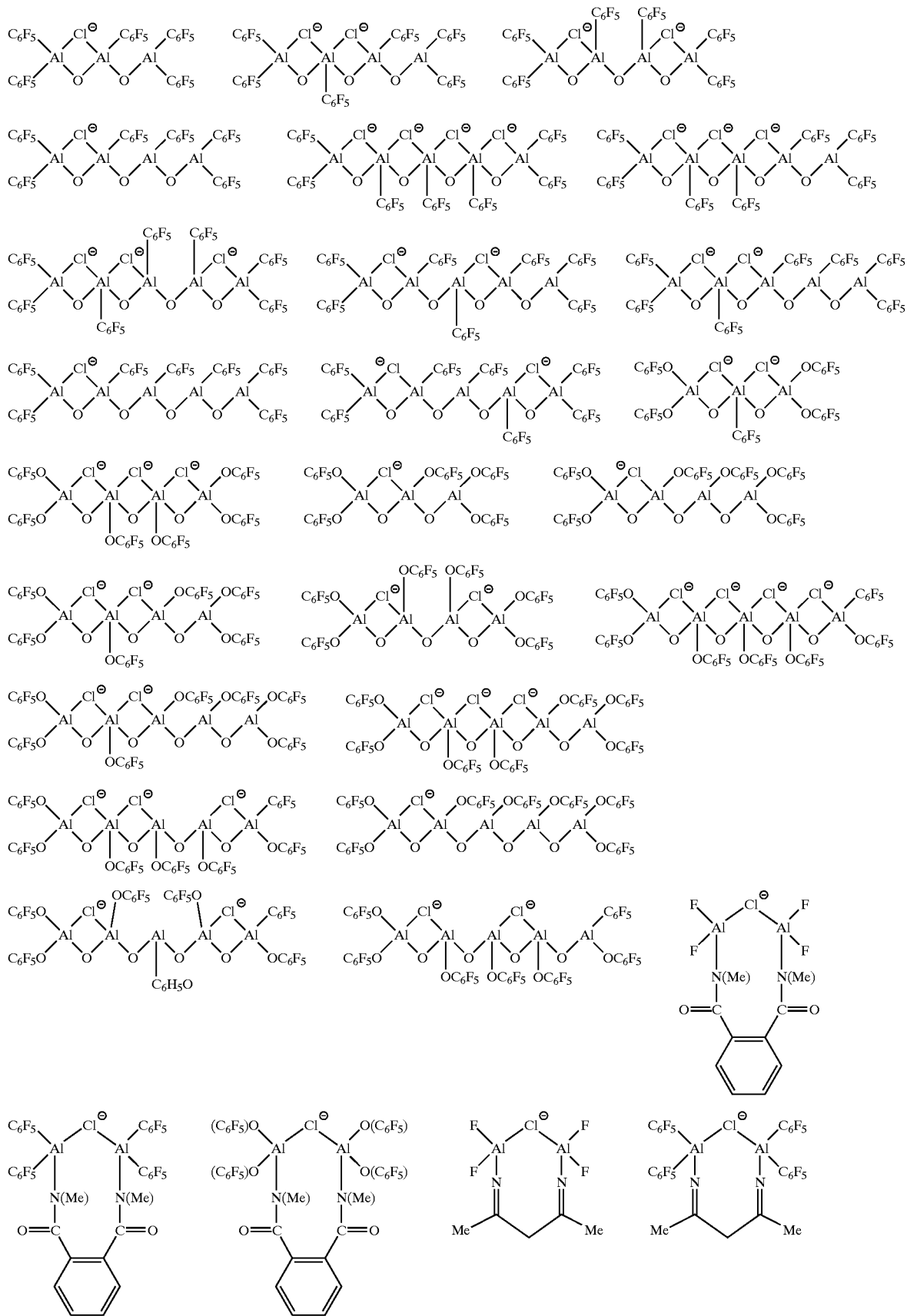

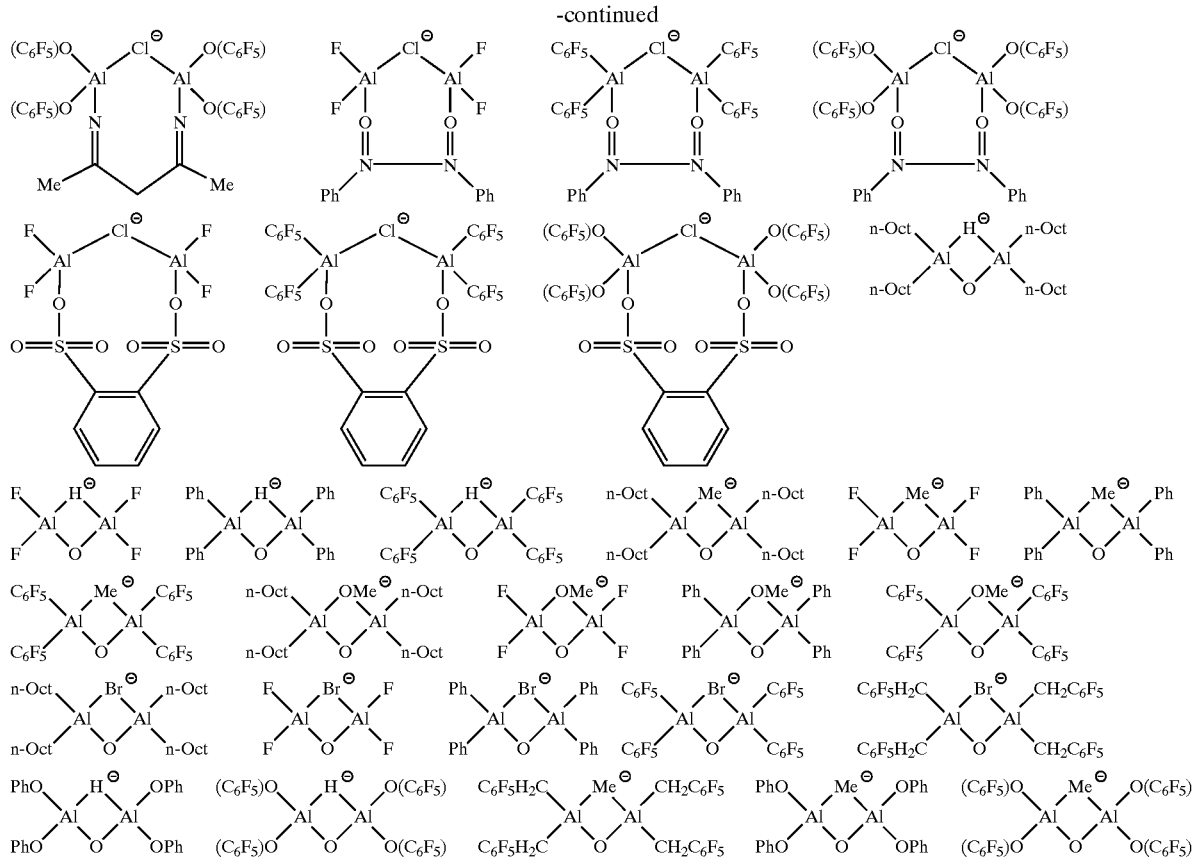

In the above examples, $C_6F_5$ denotes a pentafluorophenyl group, n-Oct denotes an n-octyl group, Ph denotes a phenyl group, and Me denotes a methyl group.

A is a cation, specifically a cation selected from the group consisting of a carbonium cation, an oxonium cation, an ammonium cation, a phosphonium cation, a cycloheptyltrienyl cation, a ferrocenium cation and metallic cations of Groups 1 and 11 of the periodic table, but not limited thereto.

Examples of the cations A include the following cations.

$[Li^+]$, $[Na^+]$, $[K^+]$, $[Ag^+]$, $[Li(Et_2O)_2^+]$, $[Ph_3C^+]$, $[KBEt_3^+]$, $[NaAlH(OCH_2CH_2OCH_3)_2^+]$, $[H_3O^+]$, $[Ph_4P^+]$, $[PhNMe_2H^+]$, $[Et_3NH^+]$, $[Me_3NH^+]$, $[(n-Bu)_3NH^+]$, $[MePh_2NH^+]$, $[Cp_2Fe^+]$,

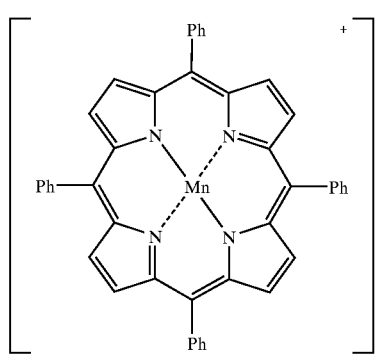

-continued

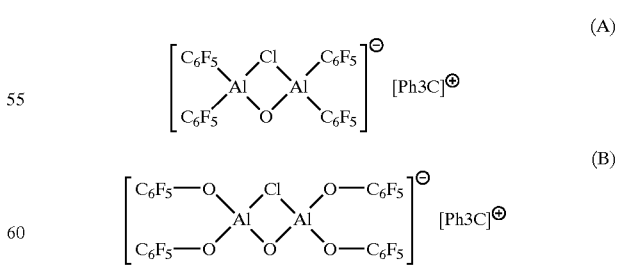

k is a valence of the cation A and is a number satisfying the condition of k=jm/r.

Some examples of the catalyst components for ethylenically unsaturated monomer polymerization according to the invention represented by the aforesaid formula are given below.

$$\begin{bmatrix} C_6F_5 & Cl & C_6F_5 \\ Al & Al & \\ C_6F_5 & O & C_6F_5 \end{bmatrix}^{\ominus} [Ph3C]^{\oplus} \quad (A)$$

$$\begin{bmatrix} C_6F_5-O & Cl & O-C_6F_5 \\ Al & Al & \\ C_6F_5-O & O & O-C_6F_5 \end{bmatrix}^{\ominus} [Ph3C]^{\oplus} \quad (B)$$

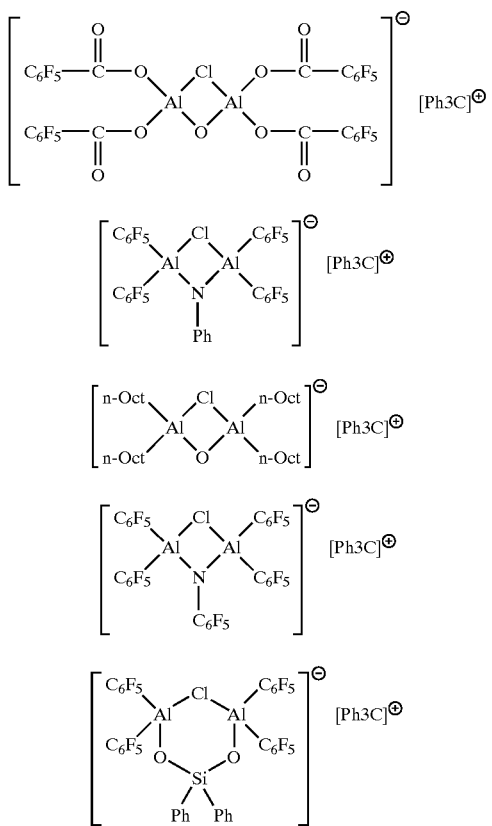

The catalyst component for ethylenically unsaturated monomer polymerization according to the invention represented by the aforesaid formula can be obtained by, for example, reacting the compound (i) with the compound (ii) and optionally the compound (iv) and then further reacting the reaction product with the compound (iii).

The catalyst component for ethylenically unsaturated monomer polymerization according to the invention is capable of providing a catalyst for ethylenically unsaturated monomer polymerization (ethylenically unsaturated monomer polymerization catalyst), which exhibits an excellent polymerization activity when used together with the later-described transition metal compound or the like.

Polymerization Catalyst

The catalyst for ethylenically unsaturated monomer polymerization (ethylenically unsaturated monomer polymerization catalyst) according to the invention comprises:

(A) a compound of a transition metal selected from groups 3 to 12 of the periodic table,
(B) the above-described catalyst component, and
(C) an organic compound containing an element of Group 13 of the periodic table.

(A) Compound of Transition Metal Selected from Groups 3 to 12

The compound (A) of a transition metal selected from Groups 3 to 12 of the periodic table for use in the invention may be a transition metal compound represented by any of the following formulae (I) to (VIII).

First, the compound represented by the formula (I) is described.

$$M^1L^1_x \qquad (I)$$

In the above formula, $M^1$ is a transition metal atom of Group 4 of the periodic table, specifically zirconium, titanium or hafnium, preferably zirconium.

x is a valence of the transition metal atom $M^1$ and represents the number of ligands $L^1$ coordinated to the transition metal atoms $M^1$.

$L^1$ is a ligand coordinated to the transition metal atom; at least one $L^1$ is a ligand having cyclopentadienyl skeleton; and $L^1$ other than the ligand having cyclopentadienyl skeleton is a hydrocarbon group of 1 to 20 carbon atoms, a halogenated hydrocarbon group of 1 to 20 carbon atoms, an oxygen-containing group, a sulfur-containing group, a nitrogen-containing group, a phosphorus-containing group, a silicon-containing group, a halogen atom or a hydrogen atom.

Examples of the ligands having cyclopentadienyl skeleton include a cyclopentadienyl group; alkyl substituted cyclopentadienyl groups, such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group and a hexylcyclopentadienyl group; an indenyl group; a 4,5,6,7-tetrahydroindenyl group; and a fluorenyl group. These groups may be substituted with optionally halogenated hydrocarbon groups of 1 to 20 carbon atoms, oxygen-containing groups, sulfur-containing groups, silicon-containing groups and halogen atoms.

When the compound represented by the formula (I) contains two or more ligands having cyclopentadienyl skeleton, two of them may be bonded through a divalent bonding group such as an optionally substituted alkylene group or an optionally substituted silylene group. The transition metal compound wherein two ligands having cyclopentadienyl skeleton are bonded through the divalent bonding group is, for example, the later-described transition metal compound represented by the formula (II) or (IIa).

Examples of the ligands $L^1$ other than the ligands having cyclopentadienyl skeleton are as follows.

Examples of the hydrocarbon groups of 1 to 20 carbon atoms include alkyl groups, cycloalkyl groups, alkenyl groups, arylalkyl groups and aryl groups. Specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups of 1 to 20 carbon atoms include those wherein the above-exemplified hydrocarbon groups of 1 to 20 carbon atoms are substituted with halogens.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Examples of the nitrogen-containing groups include amino group; alkylamino groups, such as methylamino, dimethylamino, diethylamino, dipropylamino, dibutylamino and dicyclohexylamino; and arylamino groups and alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the halogen atoms include a fluorine atom, a chlorine atom, a bromine atom and an iodine atom.

When the valence of the transition metal is 4, the transition metal compound is more specifically represented by the following formula (I').

  (I')

In the above formula, $M^1$ is a transition metal atom selected from Group 4 of the periodic table. Examples thereof are those previously described, and preferable is zirconium.

$R^{12}$ is a group (ligand) having cyclopentadienyl skeleton. $R^{13}$, $R^{14}$ and $R^{15}$ may be the same or different, and are each a group (ligand) having cyclopentadienyl skeleton, an optionally halogenated hydrocarbon group of 1 to 20 carbon atoms, an oxygen-containing group, a sulfur-containing group, a nitrogen-containing group, a phosphorus-containing group, a silicon-containing group, a halogen atom or a hydrogen atom.

Of the transition metal compounds represented by the formula (I'), preferably used in the invention are compounds wherein at least one of $R^{13}$, $R^{14}$ and $R^{15}$ is a group (ligand) having cyclopentadienyl skeleton, e.g., compounds wherein $R^{12}$ and $R^{13}$ are groups (ligands) having cyclopentadienyl skeleton. When $R^{12}$ and $R^{13}$ are groups (ligands) having cyclopentadienyl skeleton, $R^{14}$ and $R^{15}$ are each preferably a group having cyclopentadienyl skeleton, an alkyl group, a cycloalkyl group, an alkenyl group, an arylalkyl group, an aryl group, an alkoxy group, an aryloxy group, a trialkylsilyl group, a sulfonato group, a halogen atom or a hydrogen atom.

Examples of the transition metal compounds represented by the formula (I) wherein $M^1$ is zirconium include:
bis(cyclopentadienyl)zirconium monochloride monohydride, bis(cyclopentadienyl)zirconium dichloride, bis(cyclopentadienyl)zirconium dibromide, bis (cyclopentadienyl)methylzirconium monochloride, bis (cyclopentadienyl)zirconium phenoxymonochloride, bis (methylcyclopentadienyl)zirconium dichloride, bis (ethylcyclopentadienyl)zirconium dichloride, bis (propylcyclopentadienyl)zirconium dichloride, bis (butylcyclopentadienyl)zirconium dichloride, bis (hexylcyclopentadienyl)zirconium dichloride, bis (octylcyclopentadienyl)zirconium dichloride, bis(indenyl) zirconium dichloride, bis(4,5,6,7-tetrahydroindenyl) zirconium dichloride, bis(indenyl)zirconium dibromide, bis (cyclopentadienyl)zirconium dimethyl, bis (cyclopentadienyl)zirconium methoxychloride, bis (cyclopentadienyl)zirconium ethoxychloride, bis(fluorenyl) zirconium dichloride, bis(cyclopentadienyl)zirconiumbis (methanesulfonato), bis(cyclopentadienyl)zirconiumbis(p-toluenesulfonato), bis(cyclopentadienyl)zirconiumbis (trifluoromethanesulfonato), bis(methylcyclopentadienyl) zirconiumbis(trifluoromethanesulfonato), bis (ethylcyclopentadienyl)zirconiumbis (trifluoromethanesulfonato), bis(propylcyclopentadienyl) zirconiumbis(trifluoromethanesulfonato), bis (butylcyclopentadienyl)zirconiumbis (trifluoromethanesulfonato), bis(hexylcyclopentadienyl) zirconiumbis(trifluoromethanesulfonato), bis (dimethylcyclopentadienyl)zirconiumbis (trifluoromethanesulfonato), bis (methylethylcyclopentadienyl)zirconiumbis (trifluoromethanesulfonato), bis (methylpropylcyclopentadienyl)zirconiumbis (trifluoromethanesulfonato), bis (methylbutylcyclopentadienyl)zirconiumbis (trifluoromethanesulfonato), bis(dimethylcyclopentadienyl) zirconium dichloride, bis(methylpropylcyclopentadienyl) zirconium dichloride, bis(methylbutylcyclopentadienyl) zirconium dichloride, bis(methylhexylcyclopentadienyl) zirconium dichloride, bis(ethylbutylcyclopentadienyl) zirconium dichloride, bis(trimethylcyclopentadienyl) zirconium dichloride, bis(tetramethylcyclopentadienyl) zirconium dichloride, bis(pentamethylcyclopentadienyl) zirconium dichloride, bis(methylbenzylcyclopentadienyl) zirconium dichloride, bis(ethylhexylcyclopentadienyl) zirconium dichloride, bis (methylcyclohexylcyclopentadienyl)zirconium dichloride, bis(cyclopentadienyl)ethylzirconium monochloride, bis (cyclopentadienyl)cyclohexylzirconium monochloride, bis (cyclopentadienyl)phenylzirconium monochloride, bis (cyclopentadienyl) benzylzirconium monochloride, bis (cyclopentadienyl)methylzirconium monohydride, bis (cyclopentadienyl)diphenylzirconium, bis (cyclopentadienyl)dibenzylzirconium, bis(indenyl) zirconiumbis(p-toluenesulfonato), bis (dimethylcyclopentadienyl)zirconium ethoxychloride, bis (methylethylcycl6pentadienyl)zirconium dichloride, bis (propylcyclopentadienyl)zirconium dichloride, bis (methylbutylcyclopentadienyl)zirconiumbis (methanesulfonato), and bis(trimethylsilylcyclopentadienyl) zirconium dichloride.

In the above examples, the di-substituted cyclopentadienyl rings include 1,2-substituted and 1,3-substituted cyclopentadienyl rings. The tri-substituted cyclopentadienyl rings include 1,2,3-substituted and 1,2,4-substituted cyclopentadienyl rings. The alkyl groups such as propyl and butyl include isomers such as n-, i-, sec- and tert-alkyl groups.

Also available are compounds wherein zirconium is replaced with titanium or hafnium in the above-exemplified zirconium compounds.

The transition metal compound wherein two ligands having cyclopentadienyl skeleton are bonded through a divalent bonding group is, for example, a compound represented by the following formula (II).

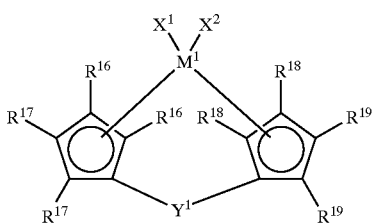
(II)

In the above formula, $M^1$ is a transition metal atom of Group 4 of the periodic table, specifically zirconium, titanium or hafnium, preferably zirconium.

$R^{16}, R^{17}, R^{18}$ and $R^{19}$ may be the same or different and are each a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, a hydrogen atom or a halogen atom. Of the groups $R^{16}$, $R^{17}$, $R^{18}$ and $R^{19}$, a part of the adjacent groups may be bonded to form a ring together with carbon atoms to which they are bonded. In the above formula, $R^{16}$, $R^{17}$, $R^{18}$ and $R^{19}$ are each present at two positions, and they (e.g., $R^{16}$ and $R^{16}$) may be the same or different. The groups R with the same suffix may be a preferable combination, respectively, when both are bonded to each other to form a ring.

Examples of the hydrocarbon groups of 1 to 20 carbon atoms include the groups previously described with respect to $L^1$ in the formula (I).

Examples of the rings formed by bonding the hydrocarbon groups include condensed rings, such as a benzene ring, a naphthalene ring, an acenaphthalene ring and an indene ring; and these condensed rings may be substituted, for example, with an alkyl group such as methyl, ethyl, propyl or butyl.

Examples of the halogenated hydrocarbon groups of 1 to 20 carbon atoms include those wherein the above-exemplified hydrocarbon groups of 1 to 20 carbon atoms are substituted with halogens.

Examples of the silicon-containing, the oxygen-containing, the nitrogen-containing and the phosphorus-containing groups include the same groups as previously described with respect to $L^1$ in the formula (I), respectively.

Examples of the sulfur-containing groups include substituents wherein oxygen is replaced with sulfur in the oxygen-containing groups previously exemplified.

Examples of the halogen atoms include a fluorine atom, a chlorine atom, a bromine atom and an iodine atom.

Of these, preferable are hydrocarbon groups of 1 to 20 carbon atoms. Particularly preferable are hydrocarbon groups of 1 to 4 carbon atoms, i.e., methyl, ethyl, propyl and butyl, a benzene ring formed by bonding the hydrocarbon groups, and such a benzene ring substituted with an alkyl group such as methyl, ethyl, n-propyl, iso-propyl, n-butyl, iso-butyl or tert-butyl.

$X^1$ and $X^2$ may be the same or different, and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom. Specifically, there can be mentioned those previously described with respect to $L^1$ in the formula (I).

Of these, preferable are halogen atoms, hydrocarbon groups of 1 to 20 carbon atoms and sulfinato groups.

$Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{20}$—, —P(R$^{20}$)—, —P(O)(R$^{20}$)—, —BR$^{20}$— or —AlR$^{20}$— (each R$^{20}$ may be the same or different and is a hydrocarbon group of 1 to 20 carbon atoms, a halogenated hydrocarbon group of 1 to 20 carbon atoms, a hydrogen atom or a halogen atom).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups of 1 to 20 carbon atoms include those wherein the above-exemplified hydrocarbon groups of 1 to 20 carbon atoms are halogenated, such as chloromethylene.

Examples of the divalent silicon-containing groups include a silylene group; alkylsilylene groups, alkylarylsilylene groups and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; alkyldisilylene groups, alkylaryldisilylene groups and aryldisilylene groups, such as tetramethyl-1,2-disilylene and tetraphenyl-1,2-disilylene, Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

Of these, particularly preferable are substituted silylene groups, such as dimethylsilylene, diphenylsilylene and methylphenylsilylene.

Further examples of R$^{20}$ are the halogen atoms, the hydrocarbon groups of 1 to 20 carbon atoms and the halogenated hydrocarbon groups of 1 to 20 carbon atoms previously described for $L^1$ in the formula (I).

Examples of the transition metal compounds represented by the formula (II) include:
ethylene-bis(indenyl)dimethylzirconium, ethylene-bis (indenyl)zirconium dichloride, ethylene-bis(indenyl) zirconiumbis(trifluoromethanesulfonato), ethylene-bis (indenyl)zirconiumbis(methanesulfonato), ethylene-bis (indenyl)zirconiumbis(p-toluenesulfonato), ethylene-bis (indenyl)zirconiumbis(p-chlorobenzenesulfonato), ethylene-bis(4,5,6,7-tetrahydroindenyl)zirconium dichloride, isopropylidene(cyclopentadienyl)(fluorenyl) zirconium dichloride, isopropylidene(cyclopentadienyl) (methylcyclopentadienyl)zirconium dichloride, dimethysilylene-bis(cyclopentadienyl)zirconium dichloride, dimethylsilylene-bis(methylcyclopentadienyl)zirconium dichloride, limethylsilylene-bis(dimethylcyclopentadienyl) zirconium dichloride, dimethylsilylene-bis (trimethylcyclopentadienyl)zirconium dichloride, dimethylsilylene-bis(indenyl)zirconium dichloride, dimethylsilylene-bis(indenyl)zirconiumbis (trifluoromethanesulfonato), dimethylsilylene-bis(4,5,6,7-tetrahydroindenyl)zirconium dichloride, dimethylsilylene (cyclopentadienyl)(fluorenyl)zirconium dichloride, diphenylsilylene-bis(indenyl)zirconium dichloride, methylphenylsilylene-bis(indenyl)zirconium dichloride, rac-dimethylsilylene-bis(2,3,5-trimethylcyclopentadienyl) zirconium dichloride, rac-dimethylsilylene-bis(2,4,7-trimethylcyclopentadienyl)zirconium dichloride, racdimethylsilylene-bis(2-methyl-4-tert-butylcyclopentadienyl)zirconium dichloride, isopropylidene (cyclopentadienyl)(fluorenyl)zirconium dichloride, dimethylsilylene(3-tert-butylcyclopentadienyl)(indenyl) zirconium dichloride, isopropylidene(4-methylcyclopentadienyl)(3-methylindenyl)zirconium dichloride, isopropylidene(4-tert-butylcyclopentadienyl)(3-methylindenyl)zirconium dichloride, isopropylidene(4-tert-butylcyclopentadienyl)(3-tert-butylindenyl)zirconium dichloride, dimethylsilylene(4-methylcyclopentadienyl)(3-methylindenyl)zirconium dichloride, dimethylsilylene(4-tert-butylcyclopentadienyl)(3-methylindenyl)zirconium dichloride, dimethylsilylene(4-tert-butylcyclopentadienyl)(3-tert-butylindenyl)zirconium dichloride, dimethylsilylene (3-tert-butylcyclopentadienyl)(fluorenyl)zirconium dichloride, and isopropylidene(3-tert-butylcyclopentadienyl)(fluorenyl)zirconium dichloride.

Also available are compounds wherein zirconium is replaced with titanium or hafnium in the above-exemplified compounds.

Other examples of the transition metal compounds represented by the formula (II) include transition metal compounds represented by the following formula (II') or (II").

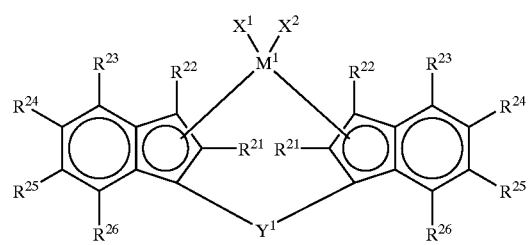

(II')

In the above formula, $M^1$ is a transition metal atom of Group 4 of the periodic table, specifically titanium, zirconium or hafnium, preferably zirconium.

Each $R^{21}$ may be the same or different and is a hydrocarbon group of 1 to 6 carbon atoms. Examples of such groups include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl.

Of these, preferable are alkyl groups wherein the carbon atom bonded to the indenyl group is a primary carbon atom. More preferable are alkyl groups of 1 to 4 carbon atoms, and particularly preferable are methyl and ethyl.

$R^{22}$, $R^{24}$, $R^{25}$ and $R^{26}$ may be the same or different, and are each a hydrogen atom, a halogen atom or the same hydrocarbon group of 1 to 6 carbon atoms. Examples of the hydrogcarbon groups include those described above for $R^{21}$.

Each $R^{23}$ may be the same or different, and is a hydrogen atom or an aryl group of 6 to 16 carbon atoms. Examples of the aryl groups include phenyl, α-naphthyl, β-naphthyl, anthryl, phenanthryl, pyrenyl, acenaphthyl, phenalenyl, aceanthrylenyl, tetrahydronaphthyl, indanyl and biphenylyl. Of these, preferable are phenyl, naphthyl, anthryl and phenanthryl.

These aryl groups may be substituted with:

halogen atoms, such as fluorine, chlorine, bromine and iodine;

hydrocarbon groups of 1 to 20 carbon atoms, such as alkyl groups (e.g., methyl, ethyl, propyl, butyl, hexyl, cyclohexyl, octyl, nonyl, dodecyl, eicosyl, norbornyl and adamantyl), alkenyl groups (e.g., vinyl, propenyl and cyclohexenyl), arylalkyl groups (e.g., benzyl, phenylethyl and phenylpropyl), and aryl groups (e.g., phenyl, tolyl, dimethylphenyl, trimethylphenyl, ethylphenyl, propylphenyl, biphenyl, α- or β-naphthyl, methylnaphthyl, anthryl, phenanthryl, benzylphenyl, pyrenyl, acenaphthyl, phenalenyl, aceanthrylenyl, tetrahydronaphthyl, indanyl and biphenylyl); and organosilyl groups, such as trimethylsilyl, triethylsilyl and triphenylsilyl.

$X^1$ and $X^2$ may be the same or different, and are identical with $X^1$ and $X^2$, respectively, in the formula (II). Of the aforesaid examples, preferable are halogen atoms and hydrocarbon groups of 1 to 20 carbon atoms.

$Y^1$ is identical with $Y^1$ in the formula (II). Of the aforesaid examples, preferable are divalent silicon-containing groups and divalent germanium-containing groups; more preferable are divalent silicon-containing groups; and particularly preferable are alkylsilylene, alkylarylsilylene and arylsilylene.

Examples of the transition metal compounds represented by the formula (II') include:
rac-dimethylsilylene-bis{1-(2-methyl-4-phenylindenyl)} zirconium dichloride, rac-dimethylsilylene-bis{1-(2-methyl-4-(α-naphthyl)indenyl)}zirconium dichloride, rac-dimethylsilylene-bis{1-(2-methyl-4-(P-naphthyl)indenyl)} zirconium dichloride, rac-dimethylsilylene-bis{1-(2-methyl- 4-(1-anthryl)indenyl)}zirconium dichloride, rac-dimethylsilylene-bis{1-(2-methyl-4-(2-anthryl)indenyl)} zirconium dichloride, rac-dimethylsilylene-bis{1-(2-methyl-4-(9-anthryl)indenyl)}zirconium dichloride, rac-dimethylsilylene-bis{1-(2-methyl-4-(9-phenanthryl) indenyl)}zirconium dichloride, rac-dimethylsilylene-bis{1-(2-methyl-4-(p-fluorophenyl)indenyl)}zirconium dichloride, rac-dimethylsilylene-bis{1-(2-methyl-4-(pentafluorophenyl)indenyl)}zirconium dichloride, rac-dimethylsilylene-bis{1-(2-methyl-4-(p-chlorophenyl) indenyl)}zirconium dichloride, rac-dimethylsilylene-bis{1-(2-methyl-4-(m-chlorophenyl)indenyl)}zirconium dichloride, rac-dimethylsilylene-bis{1-(2-methyl-4-(o-chlorophenyl)indenyl)}zirconium dichloride, rac-dimethylsilylene-bis{1-(2-methyl-4-(o,p-dichlorophenyl) phenylindenyl)}zirconium dichloride, rac-dimethylsilylene-bis{1-(2-methyl-4-(p-bromophenyl)indenyl)}zirconium dichloride, rac-dimethylsilylene-bis{1-(2-methyl-4-(p-tolyl) indenyl)}zirconium dichloride, rac-dimethylsilylene-bis{1-(2-methyl-4-(m-tolyl)indenyl)}zirconium dichloride, rac-dimethylsilylene-bis{1-(2-methyl-4-(o-tolyl)indenyl)} zirconium dichloride, rac-dimethylsilylene-bis{1-(2-methyl-4-(o,o'-dimethylphenyl)-1-indenyl)}zirconium dichloride, rac-dimethylsilylene-bis{1-(2-methyl-4-(p-ethylphenyl)indenyl)}zirconium dichloride, rac-dimethylsilylene-bis{1-(2-methyl-4-(p-i-propylphenyl) indenyl)}zirconium dichloride, rac-dimethylsilylene-bis{1-(2-methyl-4-(p-benzylphenyl)indenyl)}zirconium dichloride, rac-dimethylsilylene-bis{1-(2-methyl-4-(p-biphenyl)indenyl)}zirconium dichloride, rac-dimethylsilylene-bis{1-(2-methyl-4-(m-biphenyl)indenyl)} zirconium dichloride, rac-dimethylsilylene-bis{1-(2-methyl-4-(p-trimethylsilylphenyl)indenyl)}zirconium dichloride, rac-dimethylsilylene-bis{1-(2-methyl-4-(m-trimethylsilylphenyl)indenyl)}zirconium dichloride, rac-dimethylsilylene-bis{1-(2-phenyl-4-phenylindenyl)} zirconium dichloride, rac-diethylsilylene-bis{1-(2-methyl-4-phenylindenyl)}zirconium dichloride, rac-di-(i-propyl) silylene-bis{1-(2-methyl-4-phenylindenyl)}zirconium dichloride, rac-di-(n-butyl)silylene-bis{1-(2-methyl-4-phenylindenyl)}zirconium dichloride, rac-dicyclohexylsilylene-bis{1-(2-methyl-4-phenylindenyl)} zirconium dichloride, rac-methylphenylsilylene-bis{1-(2-methyl-4-phenylindenyl)}zirconium dichloride, rac-diphenylsilylene-bis{1-(2-methyl-4-phenylindenyl)} zirconium dichloride, rac-di(p-tolyl)silylene-bis{1-(2-methyl-4-phenylindenyl)}zirconium dichloride, rac-di(p-chlorophenyl)silylene-bis{1-(2-methyl-4-phenylindenyl)}zirconium dichloride, rac-methylene-bis{1-(2-methyl-4-phenylindenyl)}zirconium dichloride, rac-ethylene-bis{1-(2-methyl-4-phenylindenyl)}zirconium dichloride, rac-dimethylgermylene-bis{1-(2-methyl-4-phenylindenyl)}zirconium dichloride, rac-dimethylstannylene-bis{1-(2-methyl-4-phenylindenyl)}zirconium dichloride, rac-dimethylsilylene-bis{1-(2-methyl-4-phenylindenyl)} zirconium dibromide, rac-dimethylsilylene-bis{1-(2-methyl-4-phenylindenyl)}zirconium dimethyl, rac-dimethylsilylene-bis{1-(2-methyl-4-phenylindenyl)} zirconium methylchloride, rac-dimethylsilylene-bis{1-(2-methyl-4-phenylindenyl)}zirconium chloride $SO_2Me$, rac-dimethylsilylene-bis{1-(2-methyl- 4-phenylindenyl)} zirconium chloride $OSO_2Me$, rac-dimethylsilylene-bis{1-(2-ethyl-4-phenylindenyl)}zirconium dichloride, rac-dimethylsilylene-bis{1-(2-ethyl-4-($\alpha$-naphthyl)indenyl)} zirconium dichloride, rac-dimethylsilylene-bis{1-(2-ethyl-4-($\beta$-naphthyl)indenyl)}zirconium dichloride, rac-dimethylsilylene-bis{1-(2-ethyl-4-(2-methyl-1-naphthyl)indenyl)}zirconium dichloride, rac-dimethylsilylene-bis{1-(2-ethyl-4-(5-acenaphthyl)indenyl)}zirconium dichloride, rac-dimethylsilylene-bis{1-(2-ethyl-4-(9-anthryl)indenyl)}zirconium dichloride, rac-dimethylsilylene-bis{1-(2-ethyl-4-(9-phenanthryl)indenyl)}zirconium dichloride, rac-dimethylsilylene-bis{1-(2-ethyl-4-(o-methylphenyl)indenyl)}zirconium dichloride, rac-dimethylsilylene-bis{1-(2-ethyl-4-(m-methylphenyl)indenyl)}zirconium dichloride, rac-dimethylsilylene-bis{1-(2-ethyl-4-(p-methylphenyl)indenyl)}zirconium dichloride, rac-dimethylsilylene-bis{1-(2-ethyl-4-(2,3-dimethylphenyl)indenyl)}zirconium dichloride, rac-dimethylsilylene-bis{1-(2-ethyl-4-(2,4-dimethylphenyl)indenyl)}zirconium dichloride, rac-dimethylsilylene-bis{1-(2-ethyl-4-(2,5-dimethylphenyl)indenyl)}zirconium dichloride, rac-dimethylsilylene-bis{1-(2-ethyl-4-(2,4,6-trimethylphenyl)indenyl)}zirconium dichloride, rac-dimethylsilylene-bis{1-(2-ethyl-4-(o-chlorophenyl)indenyl)}zirconium dichloride, rac-dimethylsilylene-bis{1-(2-ethyl-4-(m-chlorophenyl)indenyl)}zirconium dichloride, rac-dimethylsilylene-bis{1-(2-ethyl-4-(p-chlorophenyl)indenyl)}zirconium dichloride, rac-dimethylsilylene-bis{1-(2-ethyl-4-(2,3-dichlorophenyl)indenyl)}zirconium dichloride, rac-dimethylsilylene-bis{1-(2-ethyl-4-(2,6-dichlorophenyl)indenyl)}zirconium dichloride, rac-dimethylsilylene-bis{1-(2-ethyl-4-(3,5-dichlorophenyl)indenyl)}zirconium dichloride, rac-dimethylsilylene-bis{1-(2-ethyl-4-(2-bromophenyl)indenyl)} zirconium dichloride, rac-dimethylsilylene-bis{1-(2-ethyl-4-(3-bromophenyl)indenyl)}zirconium dichloride, rac-dimethylsilylene-bis{1-(2-ethyl-4-(4-bromophenyl)indenyl)} zirconium dichloride, rac-dimethylsilylene-bis{1-(2-ethyl-4-(4-biphenylyl)indenyl)}zirconium dichloride, rac-dimethylsilylene-bis{1-(2-ethyl-4-(4-trimethylsilylphenyl)indenyl)} zirconium dichloride, rac-dimethylsilylene-bis{1-(2-n-propyl-4-phenylindenyl)} zirconium dichloride, rac-dimethylsilylene-bis{1-(2-n-propyl-4-($\alpha$-naphthyl)indenyl)} zirconium dichloride, rac-dimethylsilylene-bis{1-(2-n-propyl-4-($\beta$-naphthyl)indenyl)} zirconium dichloride, rac-dimethylsilylene-bis{1-(2-n-propyl-4-(2-methyl-1-naphthyl)indenyl)} zirconium dichloride, rac-dimethylsilylene-bis{1-(2-n-propyl-4-(5-acenaphthyl)indenyl)} zirconium dichloride, rac-dimethylsilylene-bis{1-(2-n-propyl-4-(9-anthryl)indenyl)} zirconium dichloride, rac-dimethylsilylene-bis{1-(2-n-propyl-4-(9-phenanthryl)indenyl)} zirconium dichloride, rac-dimethylsilylene-bis{1-(2-i-propyl-4-phenylindenyl)} zirconium dichloride, rac-dimethylsilylene-bis{1-(2-i-propyl-4-($\alpha$-naphthyl)indenyl)} zirconium dichloride, rac-dimethylsilylene-bis{1-(2-i-propyl-4-($\beta$-naphthyl)indenyl)} zirconium dichloride, rac-dimethylsilylene-bis{1-(2-i-propyl-4-(8-methyl-9-naphthyl)indenyl)} zirconium dichloride, rac-dimethylsilylene-bis{1-(2-i-propyl-4-(5-acenaphthyl)indenyl)} zirconium dichloride, rac-dimethylsilylene-bis{1-(2-i-propyl-4-(9-anthryl)indenyl)} zirconium dichloride, rac-dimethylsilylene-bis{1-(2-i-propyl-4-(9-phenanthryl)indenyl)} zirconium dichloride, rac-dimethylsilylene-bis{1-(2-s-butyl-4-phenylindenyl)} zirconium dichloride, rac-dimethylsilylene-bis{1-(2-s-butyl-4-($\alpha$-naphthyl)indenyl)} zirconium dichloride, rac-dimethylsilylene-bis{1-(2-s-butyl-4-($\beta$-naphthyl)indenyl)} zirconium dichloride, rac-dimethylsilylene-bis{1-(2-s-butyl-4-(2-methyl-1-naphthyl)indenyl)} zirconium dichloride, rac-dimethylsilylene-bis{1-(2-s-butyl-4-(5-acenaphthyl)indenyl)} zirconium dichloride, rac-dimethylsilylene-bis{1-(2-s-butyl-4-(9-anthryl)indenyl)} zirconium dichloride, rac-dimethylsilylene-bis{1-(2-s-butyl-4-(9-phenanthryl)indenyl)} zirconium dichloride, rac-dimethylsilylene-bis{1-(2-n-pentyl-4-phenylindenyl)} zirconium dichloride, rac-dimethylsilylene-bis{1-(2-n-pentyl-4-($\alpha$-naphthyl)indenyl)} zirconium dichloride, rac-dimethylsilylene-bis{1-(2-n-butyl-4-phenylindenyl)} zirconium dichloride, rac-dimethylsilylene-bis{1-(2-n-butyl- 4-($\alpha$-naphthyl)indenyl)} zirconium dichloride, rac-dimethylsilylene-bis{1-(2-n-butyl-4-($\beta$-naphthyl)indenyl)} zirconium dichloride, rac-dimethylsilylene-bis{1-(2-n-butyl-4-(2-methyl-1-naphthyl)indenyl)} zirconium dichloride, rac-dimethylsilylene-bis{1-(2-n-butyl-4-(5-acenaphthyl)indenyl)} zirconium dichloride, rac-dimethylsilylene-bis{1-(2-n-butyl-4-(9-anthryl)indenyl)} zirconium dichloride, rac-dimethylsilylene-bis{1-(2-n-butyl-4-(9-phenanthryl)indenyl)} zirconium dichloride, rac-dimethylsilylene-bis{1-(2-i-butyl-4-phenylindenyl)} zirconium dichloride, rac-dimethylsilylene-bis{1-(2-i-butyl-4-($\alpha$-naphthyl)indenyl)} zirconium dichloride, rac-dimethylsilylene-bis{1-(2-i-butyl-4-($\beta$-naphthyl)indenyl)} zirconium dichloride, rac-dimethylsilylene-bis{1-(2-i-butyl-4-(2-methyl-1-naphthyl)indenyl)} zirconium dichloride, rac-dimethylsilylene-bis{1-(2-i-butyl-4-(5-acenaphthyl)indenyl)} zirconium dichloride, rac-dimethylsilylene-bis{1-(2-i-butyl-4-(9-anthryl)indenyl)} zirconium dichloride, rac-dimethylsilylene-bis{1-(2-i-butyl-4-(9-phenanthryl)indenyl)} zirconium dichloride, rac-dimethylsilylene-bis{1-(2-neopentyl-4-phenylindenyl)} zirconium dichloride, rac-dimethylsilylene-bis{1-(2-neopentyl-4-($\alpha$-naphthyl)indenyl)} zirconium dichloride, rac-dimethylsilylene-bis{1-(2-n-hexyl-4-phenylindenyl)} zirconium dichloride, rac-dimethylsilylene-bis{1-(2-n-hexyl-4-($\alpha$-naphthyl)indenyl)} zirconium dichloride, rac-methylphenylsilylene-bis{1-(2-ethyl-4-phenylindenyl)} zirconium dichloride, rac-methylphenylsilylene-bis{1-(2-ethyl-4-($\alpha$-naphthyl)indenyl)} zirconium dichloride, rac-methylphenylsilylene-bis{1-(2-ethyl-4-(9-anthryl)indenyl)} zirconium dichloride, rac-methylphenylsilylene-bis{1-(2-ethyl-4-(9-phenanthryl)indenyl)} zirconium dichloride, rac-diphenylsilylene-bis{1-(2-ethyl-4-phenylindenyl)} zirconium dichloride, rac-diphenylsilylene-bis{1-(2-ethyl-4-($\alpha$-naphthyl)indenyl)} zirconium dichloride, rac-diphenylsilylene-bis{1-(2-ethyl-4-(9-anthryl)indenyl)} zirconium dichloride, rac-diphenylsilylene-bis{1-(2-ethyl-4-(9-phenanthryl)indenyl)} zirconium dichloride, rac-diphenylsilylene-bis{1-(2-ethyl-4-(4-biphenylyl)indenyl)} zirconium dichloride, rac-methylene-bis{1-(2-ethyl-4-phenylindenyl)} zirconium dichloride, rac-methylene-bis{1-(2-ethyl-4-(α-naphthyl)indenyl)} zirconium dichloride, rac-ethylene-bis{1-(2-ethyl-4-phenylindenyl)} zirconium dichloride, rac-ethylene-bis{1-(2-ethyl-4-(α-naphthyl)indenyl)} zirconium dichloride, rac-ethylene-bis{1-(2-n-propyl-4-(α-naphthyl)indenyl)} zirconium dichloride, rac-dimethylgermyl-bis{1-(2-ethyl-4-phenylindenyl)} zirconium dichloride, rac-dimethylgermyl-bis{1-(2-ethyl-4-(α-naphthyl)indenyl)} zirconium dichloride, and rac-dimethylgermyl-bis{1-(2-n-propyl-4-phenylindenyl)} zirconium dichloride.

Also available are compounds wherein zirconium is replaced with titanium or hafnium in the above-exemplified compounds.

Next, the transition metal compound represented by the formula (II") is described.

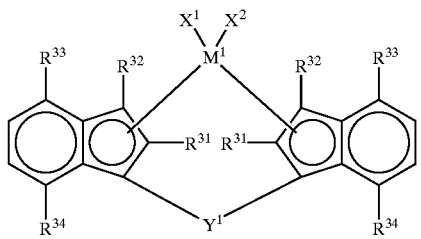

(II")

In the above formula, $M^1$ is a transition metal atom of Group 4 of the periodic table, specifically titanium, zirconium or hafnium, preferably zirconium.

$R^{31}$ and $R^{32}$ may be the same or different, and are each a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, a hydrogen atom or a halogen atom. Examples of $R^{31}$ and $R^{32}$ include those previously described with respect to $L^1$ in the formula (I).

$R^{31}$ is preferably a hydrocarbon group of 1 to 20 carbon atoms, particularly preferably a hydrocarbon group of 1 to 3 carbon atoms, i.e., methyl, ethyl or propyl.

$R^{32}$ is preferably a hydrogen atom or a hydrocarbon group of 1 to 20 carbon atoms, particularly preferably a hydrogen atom or a hydrocarbon group of 1 to 3 carbon atoms, i.e., methyl, ethyl or propyl.

$R^{33}$ and $R^{34}$ may be the same or different, and are each an alkyl group of 1 to 20 carbon atoms. Examples of the alkyl groups include methyl, ethyl, n-propyl, isopropyl, n-butyl, isobutyl, sec-butyl, tert-butyl, n-pentyl, neopentyl, n-hexyl, cyclohexyl, octyl, nonyl, dodecyl, eicosyl, norbornyl and adamantyl.

$R^{33}$ is preferably a secondary or tertiary alkyl group.

$X^1$ and $X^2$ may be the same or different, and are identical with $X^1$ and $X^2$, respectively, in the formula (II).

$Y^1$ is identical with $Y^1$ in the formula (II).

Examples of the transition metal compounds represented by the formula (II") include:
rac-dimethylsilylene-bis{1-(2,7-dimethyl-4-ethylindenyl)} zirconium dichloride, rac-dimethylsilylene-bis{1-(2,7-dimethyl-4-n-propylindenyl)} zirconium dichloride, rac-dimethylsilylene-bis{1-(2,7-dimethyl-4-i-propylindenyl)} zirconium dichloride, rac-dimethylsilylene-bis{1-(2,7-dimethyl-4-n-butylindenyl)} zirconium dichloride, rac-dimethylsilylene-bis{1-(2,7-dimethyl-4-sec-butylindenyl)} zirconium dichloride, rac-dimethylsilylene-bis{1-(2,7-dimethyl-4-t-butylindenyl)} zirconium dichloride, rac-dimethylsilylene-bis{1-(2,7-dimethyl-4-n-pentylindenyl)} zirconium dichloride, rac-dimethylsilylene-bis{1-(2,7-dimethyl-4-n-hexylindenyl)} zirconium dichloride, rac-dimethylsilylene-bis{1-(2,7-dimethyl-4-cyclohexylindenyl)} zirconium dichloride, rac-dimethylsilylene-bis{1-(2,7-dimethyl-4-methylcyclohexylindenyl)} zirconium dichloride, rac-dimethylsilylene-bis{1-(2,7-dimethyl-4-phenylethylindenyl)} zirconium dichloride, rac-dimethylsilylene-bis{1-(2,7-dimethyl-4-phenyldichloromethylindenyl)} zirconium dichloride, rac-dimethylsilylene-bis{1-(2,7-dimethyl-4-chloromethylindenyl)} zirconium dichloride, rac-dimethylsilylene-bis{1-(2,7-dimethyl-4-trimethylsilylmethylindenyl)} zirconium dichloride, rac-dimethylsilylene-bis{1-(2,7-dimethyl-4-trimethylsiloxymethylindenyl)} zirconium dichloride, rac-diethylsilylene-bis{1-(2,7-dimethyl-4-i-propylindenyl)} zirconium dichloride, rac-di(i-propyl)silylene-bis{1-(2,7-dimethyl-4-i-propylindenyl)} zirconium dichloride, rac-di(n-butyl)silylene-bis{1-(2,7-dimethyl-4-i-propylindenyl)} zirconium dichloride, rac-di(cyclohexyl)silylene-bis{1-(2,7-dimethyl-4-i-propylindenyl)} zirconium dichloride, rac-methylphenylsilylene-bis{1-(2,7-dimethyl-4-i-propylindenyl)} zirconium dichloride, rac-methylphenylsilylene-bis{1-(2,7-dimethyl-4-t-butylindenyl)} zirconium dichloride, rac-diphenylsilylene-bis{1-(2,7-dimethyl-4-t-butylindenyl)} zirconium dichloride, rac-diphenylsilylene-bis{1-(2,7-dimethyl-4-i-propylindenyl)} zirconium dichloride, rac-diphenylsilylene-bis{1-(2,7-dimethyl-4-ethylindenyl)} zirconium dichloride, rac-di(p-tolyl)silylene-bis{1-(2,7-dimethyl-4-i-propylindenyl)} zirconium dichloride, rac-di(p-chlorophenyl)silylene-bis{1-(2,7-dimethyl-4-i-propylindenyl)} zirconium dichloride, rac-dimethylsilylene-bis{1-(2-methyl-4-i-propyl-7-ethylindenyl)} zirconium dibromide, rac-dimethylsilylene-bis{1-(2,3,7-trimethyl-4-ethylindenyl)} zirconium dichloride, rac-dimethylsilylene-bis{1-(2,3,7-trimethyl-4-n-propylindenyl)} zirconium dichloride, rac-dimethylsilylene-bis{1-(2,3,7-trimethyl-4-i-propylindenyl)} zirconium dichloride, rac-dimethylsilylene-bis{1-(2,3,7-trimethyl-4-n-butylindenyl)} zirconium dichloride, rac-dimethylsilylene-bis{1-(2,3,7-trimethyl-4-sec-butylindenyl)} zirconium dichloride, rac-dimethylsilylene-bis{1-(2,3,7-trimethyl-4-t-butylindenyl)} zirconium dichloride, rac-dimethylsilylene-bis{1-(2,3,7-trimethyl-4-n-pentylindenyl)} zirconium dichloride, rac-dimethylsilylene-bis{1-(2,3,7-trimethyl-4-n-hexylindenyl)} zirconium dichloride, rac-dimethylsilylene-bis{1-(2,3,7-trimethyl-4-cyclohexylindenyl)} zirconium dichloride, rac-dimethylsilylene-bis{1-(2,3,7-trimethyl-4-methylcyclohexylindenyl)} zirconium dichloride, rac-dimethylsilylene-bis{1(2,3,7-trimethyl-4-trimethylsilylmethylindenyl)} zirconium dichloride, rac-dimethylsilylene-bis{1-(2,3,7-trimethyl-4-trimethylsiloxymethylindenyl)} zirconium dichloride, rac-dimethylsilylene-bis{1-(2,3,7-trimethyl-4-phenylethylindenyl)} zirconium dichloride, rac-dimethylsilylene-bis{1-(2,3,7-trimethyl-4-phenyldichloromethylindenyl)} zirconium dichloride, rac-dimethylsilylene-bis{1-(2,3,7-trimethyl-4-chloromethylindenyl)} zirconium dichloride, rac-diethylsilylene-bis{1-(2,3,7-trimethyl-4-i-propylindenyl)} zirconium dichloride, rac-di(i-propyl)silylene-bis{1-(2,3,7-trimethyl-4-i-propylindenyl)} zirconium dichloride, rac-di (n-butyl)silylene-bis{1-(2,3,7-trimethyl-4-i-propylindenyl)} zirconium dichloride, rac-di(cyclohexyl)silylene-bis{1-(2,3,7-trimethyl-4-i-propylindenyl)} zirconium dichloride, rac-methylphenylsilylene-bis{1-(2,3,7-trimethyl-4-i-propylindenyl)} zirconium dichloride, rac-methylphenylsilylene-bis{1-(2,3,7-trimethyl-4-t-butylindenyl)} zirconium dichloride, rac-diphenylsilylene-bis{1-(2,3,7-trimethyl-4-t-butylindenyl)} zirconium dichloride, rac-diphenylsilylene-bis{1-(2,3,7-trimethyl-4-i-propylindenyl)} zirconium dichloride, rac-diphenylsilylene-bis{1-(2,3,7-trimethyl-4-ethylindenyl)} zirconium dichloride, rac-di(p-tolyl)silylene-bis{1-(2,3,7-trimethyl-4-i-propylindenyl)} zirconium dichloride, rac-di(p-chlorophenyl)silylene-bis{1-(2,3,7-trimethyl-4-i-propylindenyl)} zirconium dichloride, rac-dimethylsilylene-bis{1-(2-methyl-4-i-propyl-7-methylindenyl)} zirconium dimethyl, rac-dimethylsilylene-bis{1-(2-methyl-4-i-propyl-7-methylindenyl)} zirconium methylchloride, rac-dimethylsilylene-bis{1-(2-methyl-4-i-propyl-7-methylindenyl)} zirconium-bis(methanesulfonato), rac-dimethylsilylene-bis{1-(2-methyl-4-i-propyl-7-methylindenyl)} zirconium-bis(p-phenylsulfinato), rac-dimethylsilylene-bis{1-(2-methyl-3-methyl-4-i-propyl-7-methylindenyl)} zirconium dichloride, rac-dimethylsilylene-bis{1-(2-methyl- 4,6-di-i-propylindenyl)} zirconium dichloride, rac-dimethylsilylene-bis{1-(2-ethyl-4-i-propyl-7-methylindenyl)} zirconium dichloride, rac-dimethylsilylene-bis{1-(2-phenyl-4-i-propyl-7-methylindenyl)} zirconium dichloride, rac-dimethylsilylene-bis{1-(2-methylindenyl)} zirconium dichloride, rac-ethylene-bis{1-(2,4,7-trimethylindenyl)} zirconium dichloride, and rac-isopropylidene-bis{1-(2,4,7-trimethylindenyl)} zirconium dichloride.

Also available are compounds wherein zirconium is replaced with titanium or hafnium in the above-exemplified compounds.

The transition metal compound wherein two ligands having a cyclopentadienyl skeleton are bonded to each other through a divalent bonding group can, for example, be represented by the following formula:

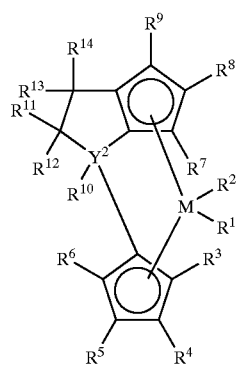

(IIa)

In the above formula, M is a transition metal atom selected from atoms of Groups 3 to 6 of the periodic table.

$Y^2$ is a carbon atom, silicon atom or germanium atom.

$R^1$ and $R^2$ may be the same or different, and are each a hydrogen atom, a group of 1 to 40 carbon atoms, a group OH, a halogen atom or a group $NR^{15}_2$ (where $R^{15}$ is a halogen atom, an alkyl group of 1 to 10 carbon atoms or an aryl group of 6 to 10 carbon atoms), or $R^1$ and $R^2$ may be bonded to form a ring together with the atom which binds them. Examples of the above groups of 1 to 40 carbon atoms include an alkyl group of 1 to 10 carbon atoms, an alkoxy group having 1 to 10 carbon atoms, an aryl group of 6 to 10 carbon atoms, an aryloxy group having 6 to 25 carbon atoms, an alkenyl group having 2 to 10 carbon atoms, an arylalkyl group having 7 to 40 carbon atoms or an arylalkenyl group having 7 to 40 carbon atoms.

$R^3$, $R^4$, $R^5$, $R^6$, $R^7$, $R^8$ and $R^9$ may be the same or different, and are each a hydrogen atom, a halogen atom, a group of 1 to 40 carbon atoms, $-SiR^{15}_3$, $-NR^{15}_2$, or $-PR^{15}_2$ (where $R^{15}$ may be the same or different, and are each a halogen atom, an alkyl group of 1 to 10 carbon atoms or an aryl group of 6 to 10 carbon atoms), or two or more of adjacent groups $R^3$, $R^4$, $R^5$, $R^6$, $R^7$, $R^8$ and $R^9$ may be bonded together with the atoms to which they are bonded to form a ring preferably having 4 to 40, particularly preferably 6 to 20, carbon atoms. Examples of the above group of 1 to 40 carbon atoms include an optionally halogenated alkyl group of 1 to 10 carbon atoms, an optionally halogenated aryl group of 6 to 30 carbon atoms, an aryloxy group of 2 to 20 carbon atoms, an alkenyl group of 2 to 12 carbon atoms, an arylalkyl group of 7 to 40 carbon atoms, an alkylaryl group of 7 to 40 carbon atoms or an arylalkenyl group of 8 to 40 carbon atoms.

$R^{10}$ is a hydrogen atom or a group of 1 to 40 carbon atoms, or $R^{10}$ may be bonded to at least one of $R^3$, $R^4$, $R^5$ or $R^6$. Examples of the above group of 1 to 40 carbon atoms include an alkyl group of 1 to 20 carbon atoms, an alkoky group of 1 to 10 carbon atoms, an aryl group of 6 to 20 carbon atoms, an aryloxy group of 2 to 20 carbon atoms, an alkenyl group of 2 to 12 carbon atoms, an arylalkyl group of 7 to 40 carbon atoms, an alkylaryl group of 7 to 40 carbon atoms or an arylalkenyl group of 8 to 40 carbon atoms. These groups may be substituted, for example, with $-NR^{15}_2$, $-SiR^{15}_3$, $-SR^{15}$ or $-OSiR^{15}_3$ (where $R^{15}$ is a halogen atom, an alkyl group of 1 to 10 carbon atoms or an aryl group of 6 to 10 carbon atoms).

$R^{11}$ and $R^{12}$ may be the same or different, and are each a hydrogen atom or a group of 1 to 40 carbon atoms. Examples of the above group of 1 to 40 carbon atoms include an alkyl group of 1 to 20 carbon atoms, an alkoky group of 1 to 10 carbon atoms, an aryl group of 6 to 20 carbon atoms, an alkenyl group of 2 to 12 carbon atoms, an arylalkyl group of 7 to 40 carbon atoms, an alkylaryl group of 7 to 40 carbon atoms or an arylalkenyl group of 8 to 40 carbon atoms. These groups may be substituted, for example, with $-NR^{15}_2$, $-SiR^{15}_3$, $-SR^{15}$ or $-OSiR^{15}_3$ (where $R^{15}$ is a halogen atom, an alkyl group of 1 to 10 carbon atoms or an aryl group of 6 to 10 carbon atoms).

$R^{13}$ and $R^{14}$ may be the same or different, and are each a hydrogen atom or a group of 1 to 40 carbon atoms. Examples of the above group of 1 to 40 carbon atoms include an alkyl group of 1 to 20 carbon atoms, an alkoky group of 1 to 10 carbon atoms, an aryl group of 6 to 20 carbon atoms, an alkenyl group of 2 to 12 carbon atoms, an arylalkyl group of 7 to 40 carbon atoms, an alkylaryl group of 7 to 40 carbon atoms or an arylalkenyl group of 8 to 40 carbon atoms. These groups may be substituted, for example, with halogen atom, $-NR^{15}_2$, $-SiR^{15}_3$, $-SR^{15}$ or $-OSiR^{15}_3$ (where $R^{15}$ is a halogen atom, an alkyl group of 1 to 10 carbon atoms or an aryl group of 6 to 10 carbon atoms).

When $Y^2$ is a carbon atom, and $R^{10}$, $R^{13}$ and $R^{14}$ are each a methyl group, at least one of $R^3$, $R^5$, $R^6$, $R^7$ and $R^9$ is not a hydrogen atom, and/or $R^8$ is a hydrogen atom.

Of the transition metal compounds represented by the above formula (IIa), preferable are those wherein M is a metal atom of Group 4 of the periodic table, for example, titanium, zirconium or hafnium, preferably zirconium, $R^1$ and $R^2$ are the same and are each an alkyl group of 1 to 4 carbon atoms or a halogen atom (e.g. fluorine, chlorine, bromine or iodine, preferably chlorine), $R^3$, $R^4$, $R^5$, $R^6$, $R^7$, $R^8$ and $R^9$ may be the same or different, and are each a hydrogen atom, an alkyl group of 1 to 10 carbon atoms or an aryl group of 6 to 24 carbon atoms, or two or more of the adjacent groups $R^3$, $R^4$, $R_5$, $R_6$, $R_7$, $R_8$ and $R_9$ are bonded together with the atoms to which they are bonded to form a ring of 4 to 20 carbon atoms, $R^{10}$ is a hydrogen atom, an aryl group of 6 to 24 carbon atoms or an alkyl group of 1 to 10 carbon atoms (preferably an alkyl group of 1 to 4 carbon atoms), $Y^2$ is a carbon atom, $R^{13}$ and $R^{14}$ may be the same or different, and are each a hydrogen atom or a hydrocarbon group of 1 to 10 carbon atoms (preferably an alkyl group of 1 to 4 or an aryl group of 6 to 10 carbon atoms), and at least one of $R^3$, $R^5$, $R^6$, $R^7$ and $R^9$ is not a hydrogen atom, and/or $R^8$ is a hydrogen atom.

Particularly preferable are transition metal compounds of formula (IIa) wherein

M is zirconium, $R^1$ and $R^2$ are the same, and are each a halogen atom, preferably chlorine, $R^3$, $R^4$, $R^5$, $R^6$, $R^7$, $R^8$ and $R^9$ may be the same or different, and are each an alkyl group of 1 to 4 carbon atoms (e.g. methyl, ethyl, propyl, isopropyl, butyl or isobutyl) or an aryl group of 6 to 14 carbon atoms (e.g. phenyl or naphthyl), or $R^3$ and $R^4$, and/or $R^5$ and $R^6$ are bonded together with the atoms to which they are bonded to form a ring 4 to 20 carbon atoms, preferably a 6-membered ring which may be substituted, $R^8$ is a hydrogen atom, $Y^2$ is a carbon atom, $R^{10}$ is a hydrogen atom, an alkyl group of 1 to 6 carbon atoms (particularly methyl) or an aryl group of 6 to 10 carbon atoms (particularly phenyl), $R^{11}$ and $R^{12}$ are the same, and are each a hydrogen atom, and $R^{13}$ and $R^{14}$ may be the same or different, and are each methyl or phenyl.

Specific examples of the transition metal compounds of formula (IIa) include:
{4-($\eta^5$-cyclopentadienyl)($\eta^5$-4,5-tetrahydropentalene)} dichlorotitanium, {4-($\eta^5$-cyclopentadienyl)($\eta^5$-4,5-tetrahydropentalene)}dichlorozirconium, {4-($\eta^5$-cyclopentadienyl)($\eta^5$-4,5-tetrahydropentalene)} dichlorohafnium, {4-($\eta^5$-cyclopentadienyl)-4-methyl-($\eta^5$-4,5-tetrahydropentalene)}dichlorozirconium, {4-($\eta^5$-cyclopentadienyl)-4-ethyl-($\eta^5$-4,5-tetrahydropentalene)} dichlorozirconium and {4-($\eta^5$-cyclopentadienyl)-4-phenyl-($\eta^5$-4,5-tetrahydropentalene)}dichlorozirconium.

In the present invention, a compound represented by the following formula (III) is also employable as the transition metal compound (A).

$$L^2M^2X^3{}_2 \tag{III}$$

In the above formula, $M^2$ is a transition metal atom of Group 4 of the periodic table.

$L^2$ is a derivative of a delocalized π-bond group and imparts a constraint geometric shape to an active site of the metal $M^2$.

Each $X^3$ may be the same or different, and is a hydrogen atom, a halogen atom, a hydrocarbon group containing 20 or less carbon atoms, a silyl group containing 20 or less silicon atoms, or a germyl group containing 20 or less germanium atoms.

Of the compounds represented by the formula (III), a compound represented by the following formula (III') is preferable.

(III')

In the above formula, $M^2$ is a transition metal atom of Group 4 of the periodic table, specifically zirconium, titanium or hafnium, preferably zirconium.

Cp is a cyclopentadienyl group π-bonded to $M^2$ or a derivative thereof.

Z is a ligand containing an oxygen atom, a sulfur atom, a boron atom or an atom of Group 14 of the periodic table, for example, —Si($R^{35}{}_2$)—, —C($R^{35}{}_2$)—, —Si($R^{35}{}_2$)Si($R^{35}{}_2$)—, —C($R^{35}{}_2$)C($R^{35}{}_2$)—, —C($R^{35}{}_2$)C($^{35}{}_2$)C($R^{35}{}_2$)—, —C($R^{35}$)=C($R^{35}$)—, —C($R^{35}{}_2$)Si($R^{35}{}_2$)— or Ge($R^{35}{}_2$)—.

$Y^2$ is a ligand containing a nitrogen atom, a phosphorus atom, an oxygen atom or a sulfur atom, for example, —N($R^{36}$)—, —O—, —S— or —P($R^{36}$)—.

Z and $Y^2$ may together form a condensed ring.

$R^{35}$ is a hydrogen atom, or a group selected from alkyl groups, aryl groups, silyl groups, halogenated alkyl groups and halogenated aryl groups and mixtures thereof. $R^{36}$ is an alkyl group of 1 to 10 carbon atoms, an aryl group of 6 to 10 carbon atoms or an aralkyl group of 7 to 10 carbon atoms, or $R^{36}$ may form together with one or more of $R^{35}$ a condensed ring containing up to 30 non-hydrogen atoms.

Examples of the transition metal compounds represented by the formula (III) include:
(tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)methylenetitanium dichloride, (tert-butylamido)dimethyl(tetramethyl-$\eta^5$-cyclopentadienyl)silanetitanium dichloride, (tert-butylamido)dimethyl(tetramethyl-$\eta^5$-cyclopentadienyl)silanezirconium dichloride, (benzylamido)dimethyl(tetramethyl-$\eta^5$-cyclopentadienyl)silanetitanium dichloride, and (phenylphosphido)dimethyl(tetramethyl-$\eta^5$-cyclopentadienyl)silanezirconium dibenzyl.

Next, the following formula (IV) represents a compound of a transition metal of Groups 8 to 10 of the periodic table.

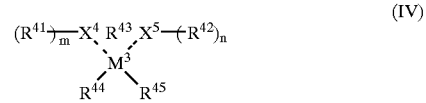

(IV)

In the above formula, $M^3$ is a transition metal atom of Groups 8 to 10 of the periodic table, preferably nickel, palladium or platinum.

$X^4$ and $X^5$ may be the same or different, and are each a nitrogen atom or a phosphorus atom.

$R^{41}$ and $R^{42}$ may be the same or different, and are each a hydrogen atom or a hydrocarbon group. Examples of the hydrocarbon groups include straight-chain or branched alkyl groups of 1 to 20 carbon atoms, such as methyl, ethyl, n-propyl, isopropyl, n-butyl, isobutyl, sec-butyl, tert-butyl, pentyl and hexyl; aryl groups of 6 to 20 carbon atoms, such as phenyl and naphthyl; and substituted aryl groups which have 1 to 5 substituents such as alkyl groups of 1 to 20 carbon atoms.

m and n may be the same or different, are each 1 or 2, and are numbers satisfying the valences of $X^4$ and $X^5$, respectively.

$R^{43}$ is

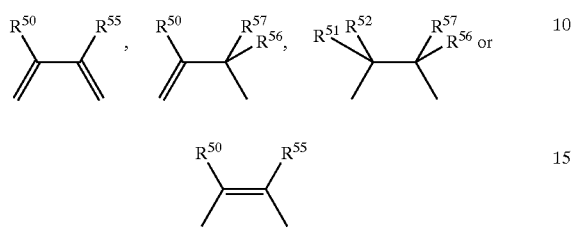

wherein $R^{50}$, $R^{55}$, $R^{51}$, $R^{52}$, $R^{56}$ and $R^{57}$ may be the same or different, and are each a hydrogen atom or a hydrocarbon group such as described above for $R^{41}$ and $R^{42}$.

Two or more groups, preferably adjacent groups, of $R^{41}$, $R^{42}$, $R^{50}$ (or $R^{51}$, $R^{52}$) and $R^{55}$ (or $R^{56}$, $R^{57}$) may be bonded to form a ring.

$R^{44}$ and $R^{45}$ may be the same or different, and are each a hydrogen atom, a halogen atom or a hydrocarbon group.

The halogen atom is fluorine, chlorine, bromine or iodine.

Examples of the hydrocarbon groups include the alkyl groups of 1 to 20 carbon atoms and the aryl groups of 6 to 20 carbon atoms described above with respect to $R^{41}$ and $R^{42}$; and aralkyl groups of 7 to 20 carbon atoms, such as benzyl. The aryl groups and the aralkyl groups may be substituted with one or more substituents such as alkyl groups of 1 to 20 carbon atoms.

$R^{44}$ and $R^{45}$ may be each a group represented by —$OR^{46}$, —$SR^{47}$, —$N(R^4)_2$ or —$P(R^{49})_2$.

$R^{46}$ to $R^{49}$ are each an alkyl group of 1 to 20 carbon atoms or an aryl group of 6 to 20 carbon atoms such as described above for $R^{41}$ and $R^{42}$; a cycloalkyl group of 6 to 20 carbon atoms such as cyclohexyl; an aralkyl group of 7 to 20 carbon atoms such as benzyl; or an organosilyl group such as methylsilyl, dimethylsilyl, trimethylsilyl, ethylsilyl, diethylsilyl or triethylsilyl. The aryl group and the aralkyl group may be substituted with one or more substituents such as alkyl groups of 1 to 20 carbon atoms. Both $R^{48}$ or both $R^{49}$ may be bonded to form a ring.

$R^{44}$ and $R^{45}$ may be bonded to form a ring.

The transition metal compound represented by the formula (IV) is preferably a compound represented by the following formula (IV'):

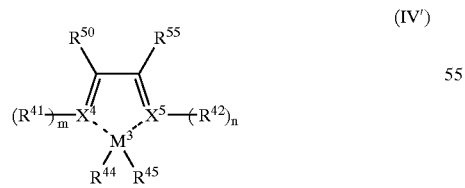

(IV')

wherein $M^3$, $X^4$, $X^5$, $R^{41}$, $R^{42}$, $R^{44}$, $R^{45}$, $R^{50}$ and $R^{55}$ are identical with those in the aforesaid formula (IV).

Listed below are examples of the transition metal compounds represented by the formula (IV') wherein iPr denotes an isopropyl group.

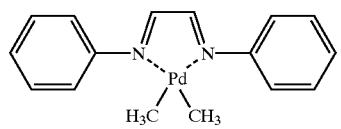

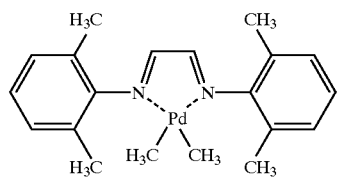

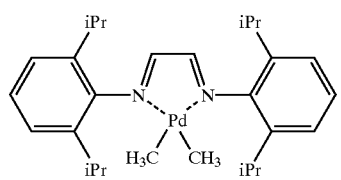

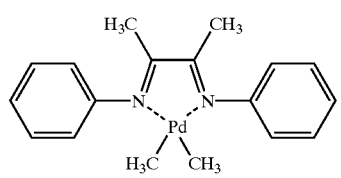

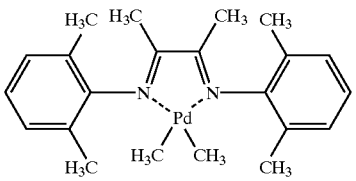

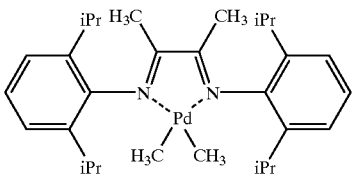

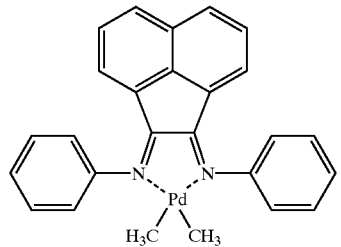

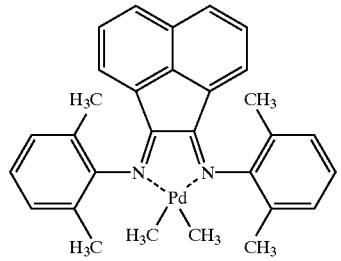

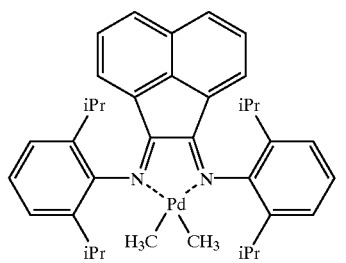
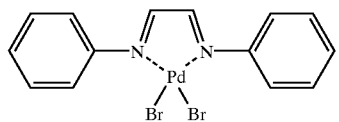
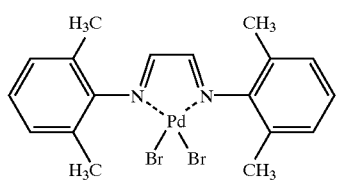
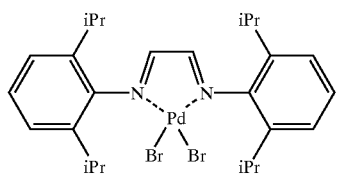
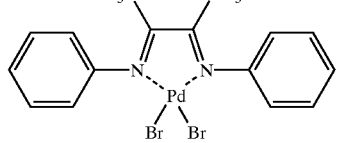
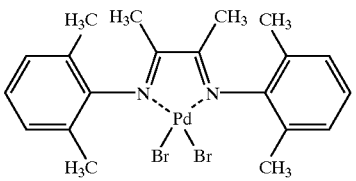
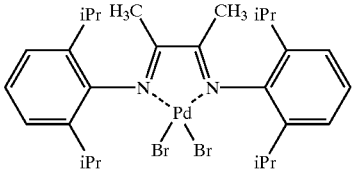
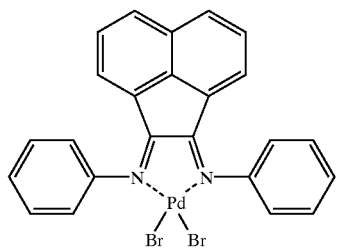
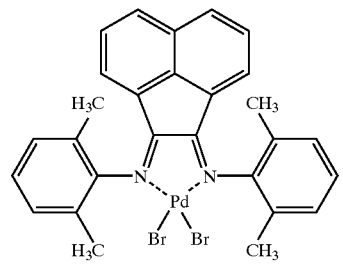
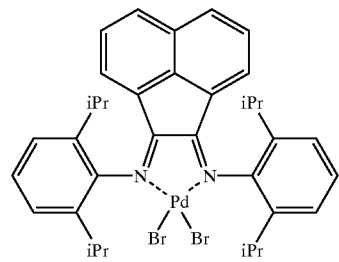
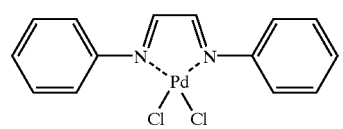
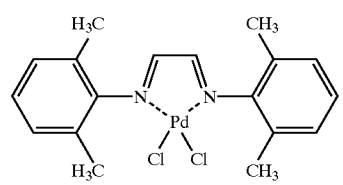
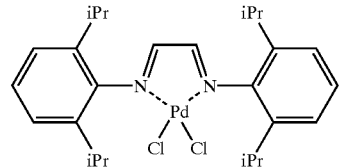
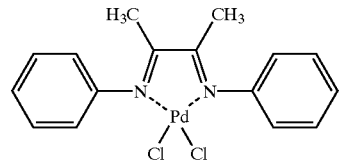
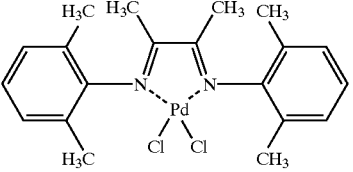
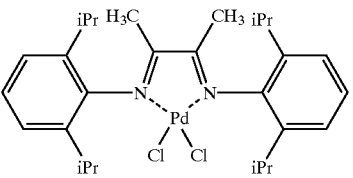

-continued
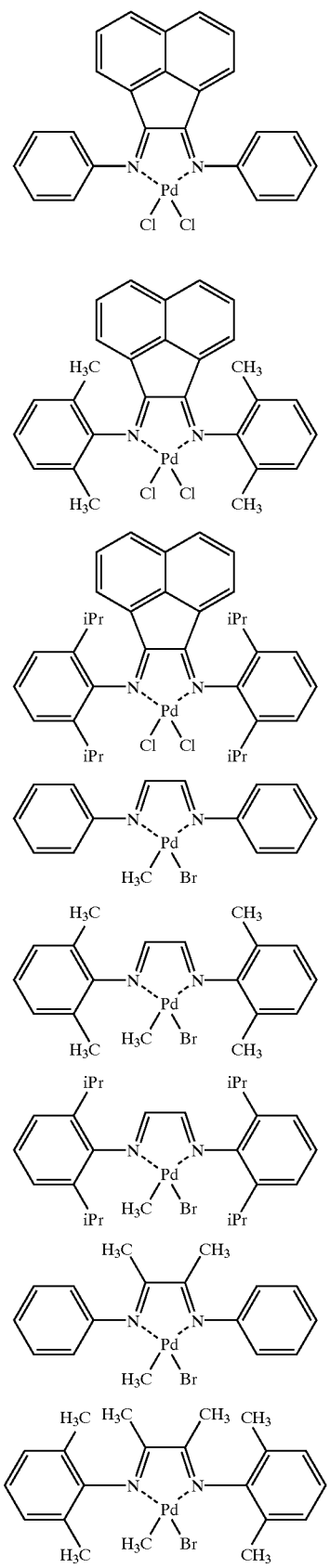
-continued
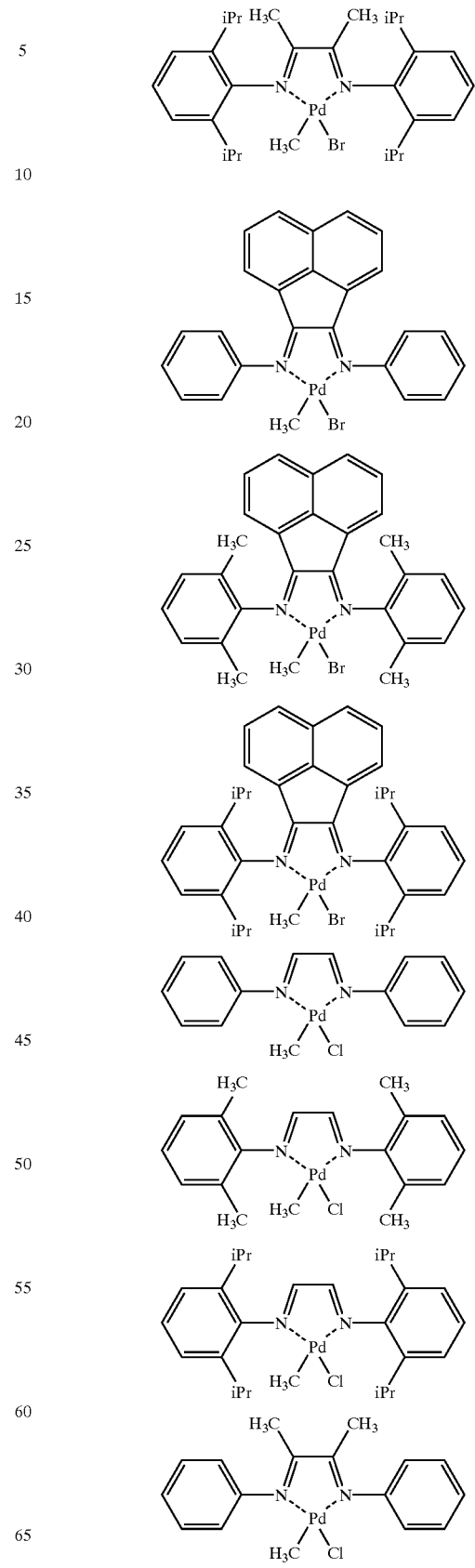

-continued
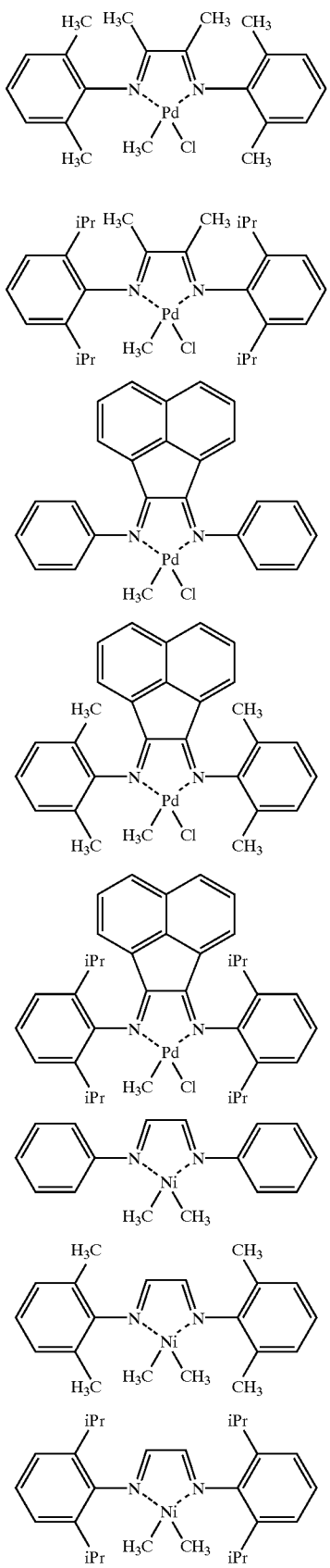
-continued
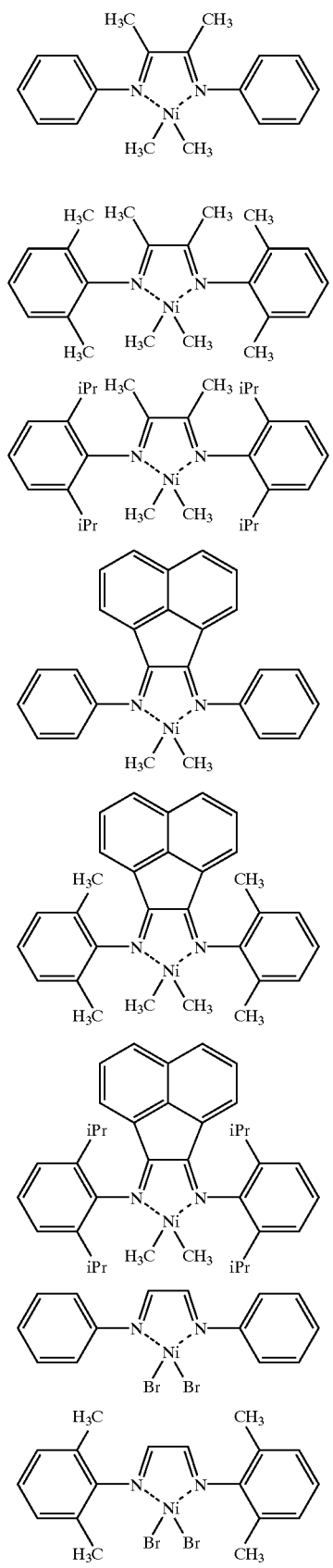

-continued
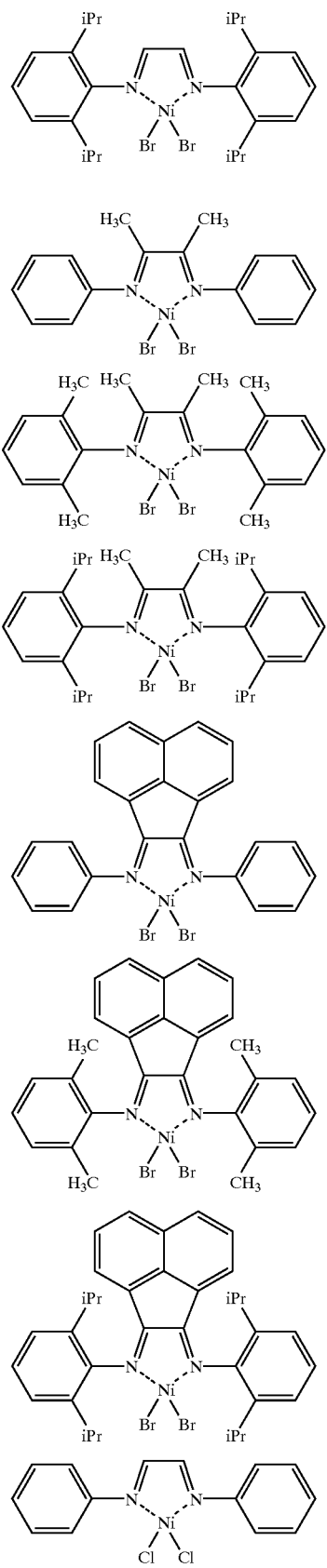
-continued
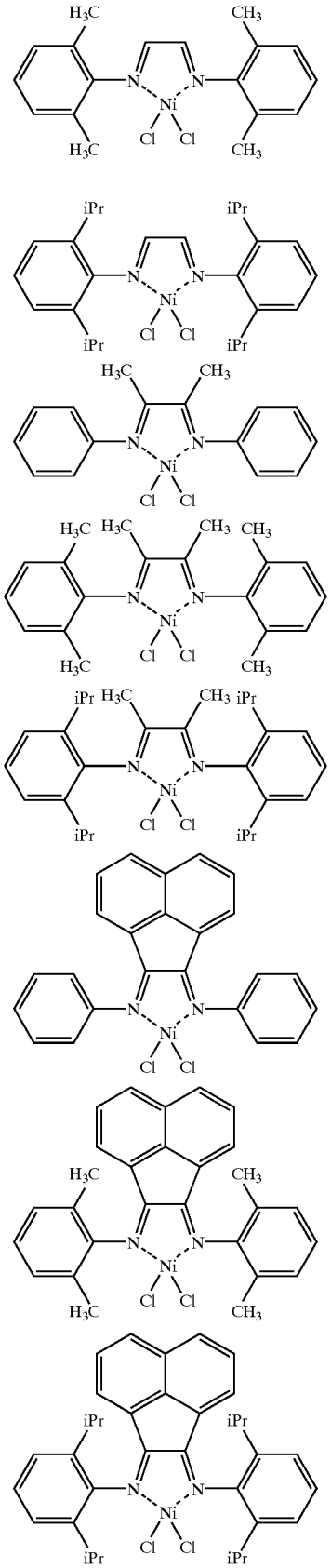

-continued
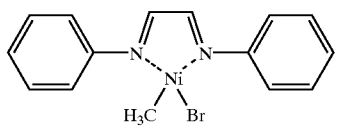
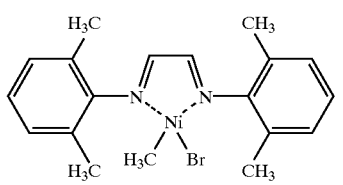
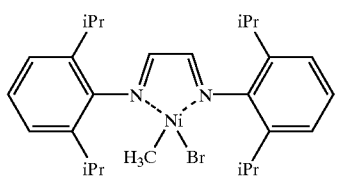
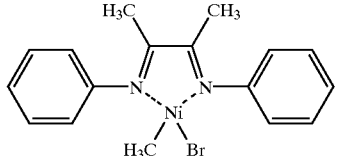
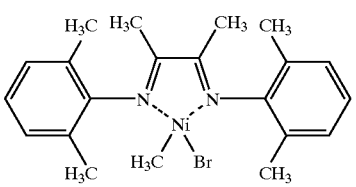
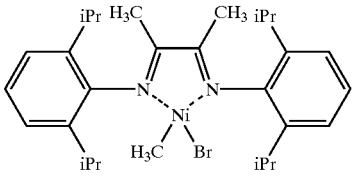
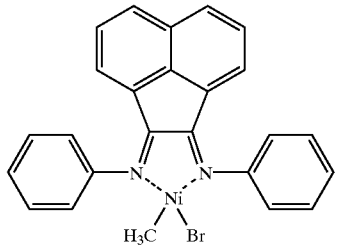
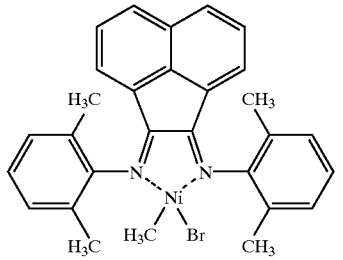
-continued
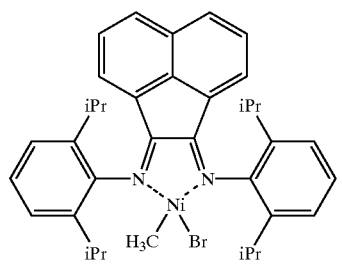
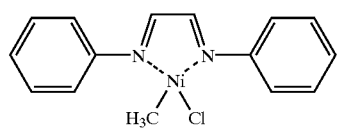
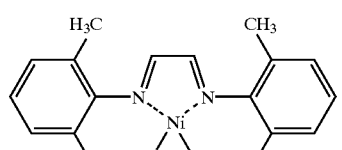
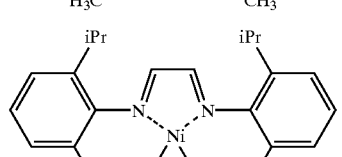
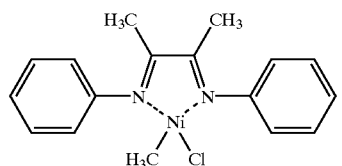
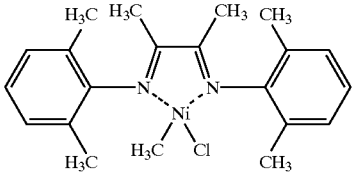
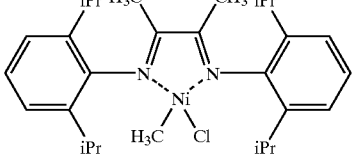
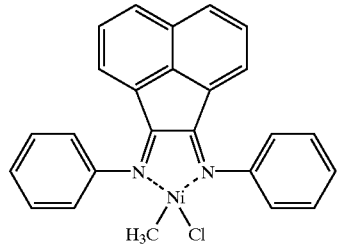

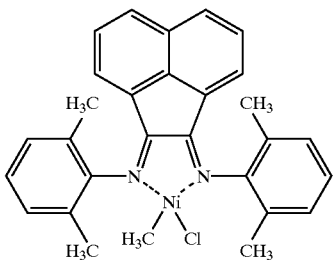
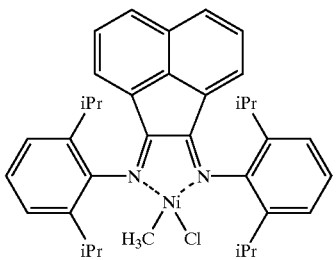
Also available as the transition metal compounds represented by the formula (IV') are compounds wherein palladium or nickel is replaced with platinum in the above-exemplified compounds.
Other examples of the compounds represented by the formula (IV) are given below wherein iPr denotes an isopropyl group.
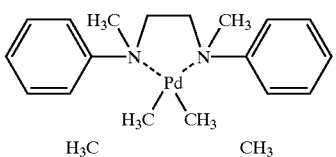
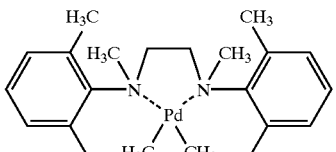
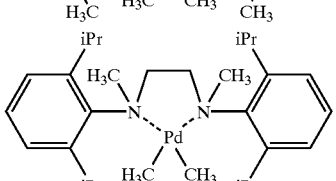
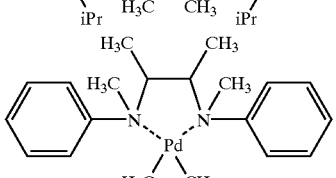
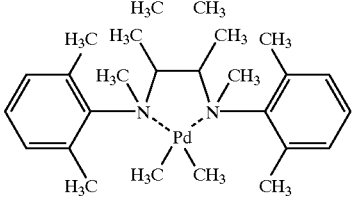
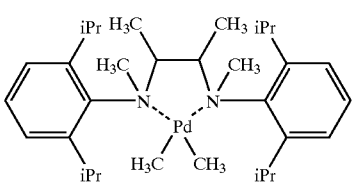
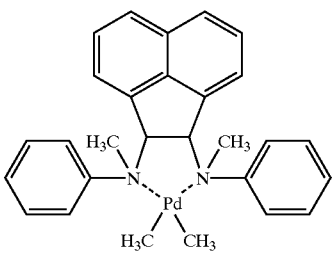
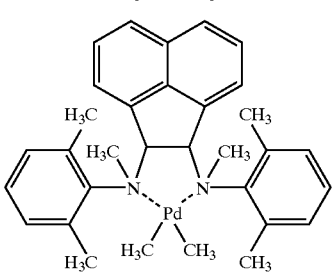
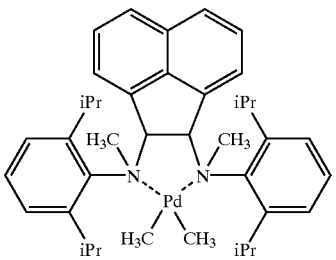
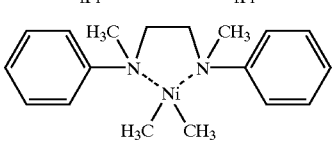
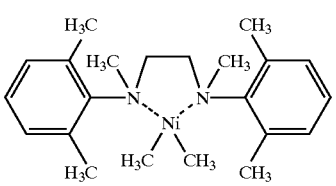
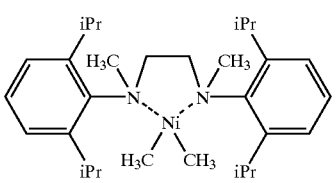
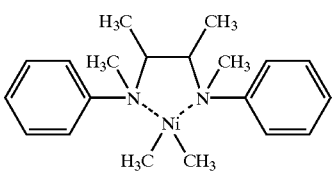

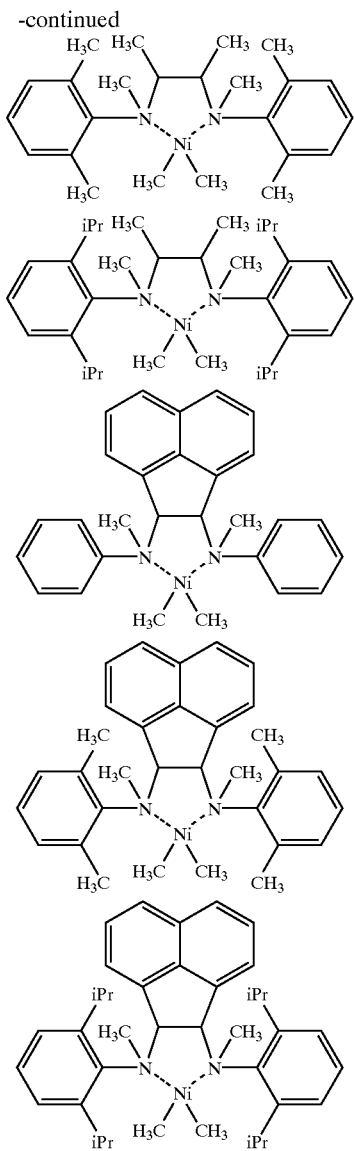

Also available as the transition metal compounds represented by the formula (IV) are compounds wherein palladium or nickel is replaced with platinum in the above-exemplified compounds.

Next, the following formula (V) represents an amide compound of a transition metal of Groups 3 to 6 of the periodic table.

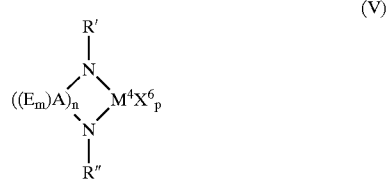

(V)

In the above formula, $M^4$ is a transition metal atom of Groups 3 to 6 of the periodic table, preferably a transition metal atom of Group 4 of the periodic table such as titanium, zirconium or hafnium.

R' and R" may be the same or different, and are each a hydrogen atom, a hydrocarbon group, a halogenated hydrocarbon group, an organosilyl group or a hydrocarbon group substituted with a substituent containing at least one element selected from nitrogen, oxygen, phosphorus, sulfur and silicon.

Examples of the hydrocarbon groups include straight-chain or branched alkyl groups of 1 to 20 carbon atoms, such as methyl, ethyl, n-propyl, isopropyl, n-butyl, isobutyl, sec-butyl, tert-butyl, pentyl, hexyl, octyl, decyl and octadecyl; aryl groups of 6 to 20 carbon atoms, such as phenyl and naphthyl; substituted aryl groups wherein these aryl groups are substituted with 1 to 5 substituents such as alkyl groups of 1 to 20 carbon atoms; cycloalkyl groups, such as cyclopentyl, cyclohexyl, norbornyl and adamantyl; alkenyl groups, such as vinyl, propenyl and cyclohexenyl; and arylalkyl groups, such as benzyl, phenylethyl and phenylpropyl.

Examples of the halogenated hydrocarbon groups include the above-exemplified hydrocarbon groups which are substituted with halogens.

Examples of the organosilyl groups include methylsilyl, dimethylsilyl, trimethylsilyl, ethylsilyl, diethylsilyl, triethylsilyl and triphenylsilyl.

Examples of the hydrocarbon groups substituted with a substituent containing at least one element selected from nitrogen, oxygen, phosphorus, sulfur and silicon include the above-exemplified hydrocarbon groups which are substituted, for example, with —COOCH$_3$, —N(CH$_3$)C(O)CH$_3$, —OC(O)CH$_3$, —CN, —N(C$_2$H$_5$)$_2$, —N(CH$_3$)S(O$_2$)CH$_3$ or —P(C$_6$H$_5$)$_2$.

m is an integer of 0 to 2.

n is an integer of 1 to 5.

A is an atom of Groups 13 to 16 of the periodic table, specifically a boron atom, a carbon atom, a nitrogen atom, an oxygen atom, a silicon atom, a phosphorus atom, a sulfur atom, a germanium atom, a selenium atom or a tin atom, preferably a carbon atom or a silicon atom. When n is 2 or more, plural A may be the same or different.

E is a substituent having at least one element selected from carbon, hydrogen, oxygen, halogen, nitrogen, sulfur, phosphorus, boron and silicon. When m is 2, two of E may be the same or different, and two of E may be bonded to form a ring.

Examples of the bonding groups represented by —((E$_m$)A)$_n$— capable of bonding the two nitrogen atoms are given below.

—CH$_2$—, —C(Me)$_2$—, —C(Ph)$_2$—, —Si(Me)$_2$—, —Si(Ph)$_2$—, —Si(Me)(Ph)—, —CH$_2$CH$_2$—, —CH$_2$Si(Me)$_2$—, —CH$_2$CH$_2$CH$_2$—, —CH$_2$C(Me)$_2$CH$_2$—, —CH$_2$C(Et)$_2$CH$_2$—, —CH$_2$C(n-Pr)$_2$CH$_2$—, —CH$_2$C(i-Pr)$_2$CH$_2$—, —CH$_2$C(n-Bu)$_2$CH$_2$—, —CH$_2$C(i-Bu)$_2$CH$_2$—, —CH$_2$C(s-Bu)$_2$CH$_2$—, —CH$_2$C(c-Pen)$_2$CH$_2$—, —CH$_2$C(c-Hex)$_2$CH$_2$—, —CH$_2$C(Ph)$_2$CH$_2$—, —CH$_2$C(Me)(Et)CH$_2$—, —CH$_2$C(Me)(i-Pr)CH$_2$—, —CH$_2$C(Me)(i-BU)CH$_2$—, —CH$_2$C(Me)(t-BU)CH$_2$—, —CH$_2$C(Me)(i-Pen)CH$_2$—, —CH$_2$C(Me)(Ph)CH$_2$—, —CH$_2$C(Et)(i-Pr)CH$_2$—, —CH$_2$C(Et)(i-Bu)CH$_2$—, —CH$_2$C(Et)(i-Pen)CH$_2$—, —CH$_2$C(i-Pr)(i-Bu)CH$_2$—, —CH$_2$C(i-Pr)(i-Pen)CH$_2$—, —CH$_2$Si(Me)$_2$CH$_2$—, —CH$_2$Si(Et)$_2$CH$_2$—, —CH$_2$Si(n-Bu)$_2$CH$_2$—, —CH$_2$Si(Ph)$_2$CH$_2$—, —CH(Me)CH$_2$CH(Me)—, —CH(Ph)CH$_2$CH(Ph)—, —Si(Me)$_2$OSi(Me)$_2$—, —CH$_2$CH$_2$CH$_2$CH$_2$—, —Si(Me)$_2$CH$_2$CH$_2$Si(Me)$_2$—,

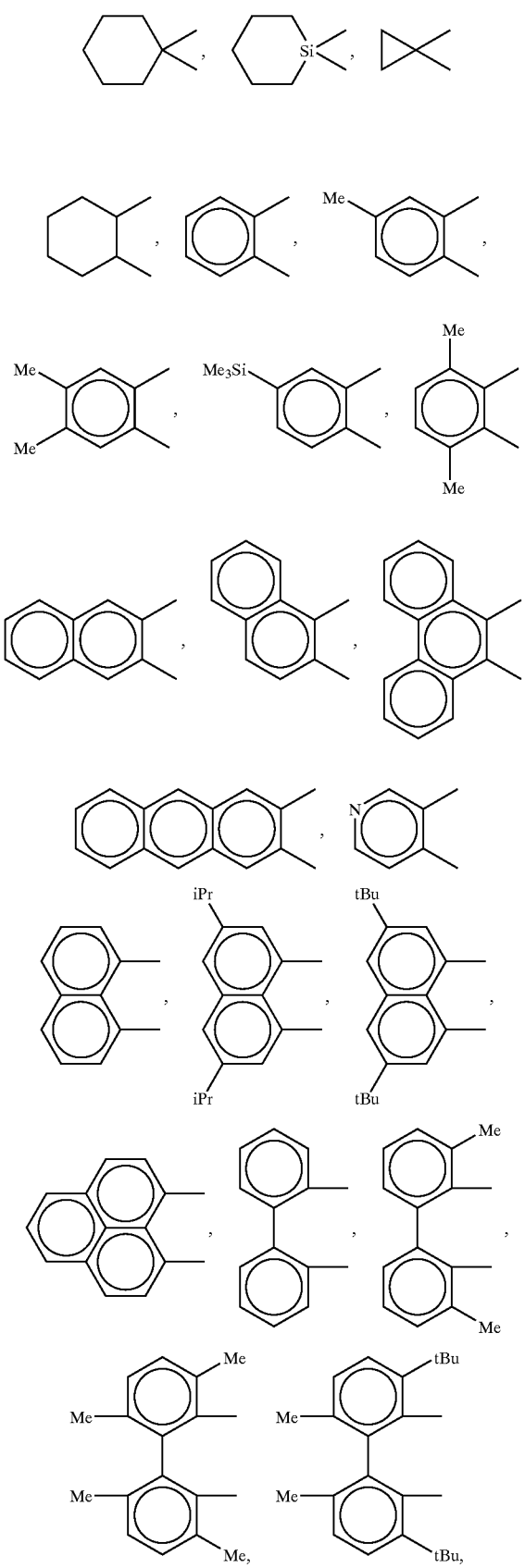
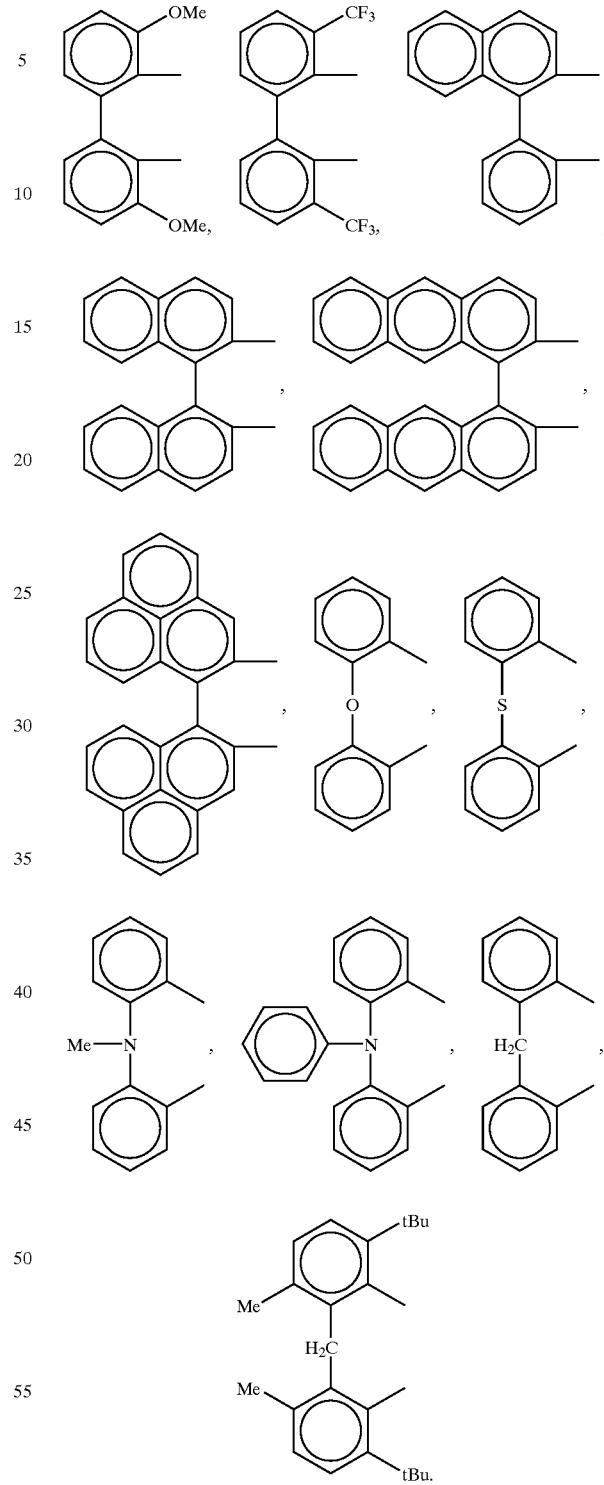

In the above examples, Me denotes a methyl group, Et denotes an ethyl group, n-Pr denotes an n-propyl group, i-Pr denotes an isopropyl group, n-Bu denotes an n-butyl group, i-Bu denotes an isobutyl group, s-Bu denotes a sec-butyl group, t-Bu denotes a tert-butyl group, i-Pen denotes an isopentyl group, c-Pen denotes a cyclopentyl group, c-Hex denotes a cyclohexyl group, and Ph denotes a phenyl group.

p is an integer of 0 to 4.

$X^6$ is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. Examples of $X^6$ include those previously described with respect to $L^1$ in the formula (I). When p is 2 or more, plural $X^6$ may be the same or different.

Of these, preferable are halogen atoms, hydrocarbon groups of 1 to 20 carbon atoms and sulfonato groups.

Listed below are examples of the transition metal amide compounds represented by the formula (V), but not limited to thereto.

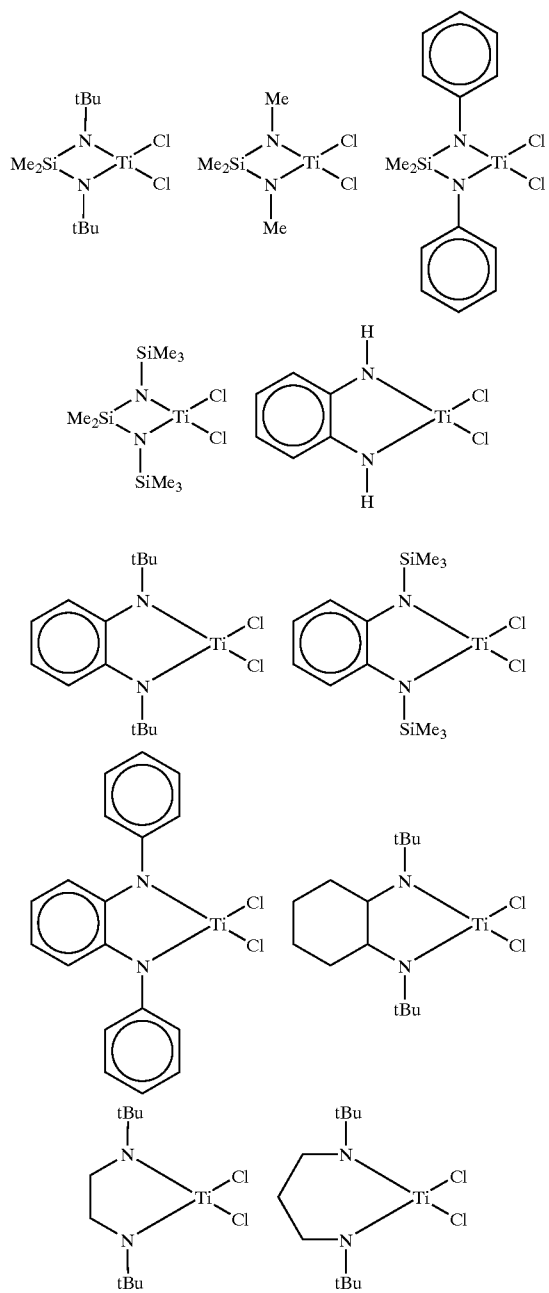
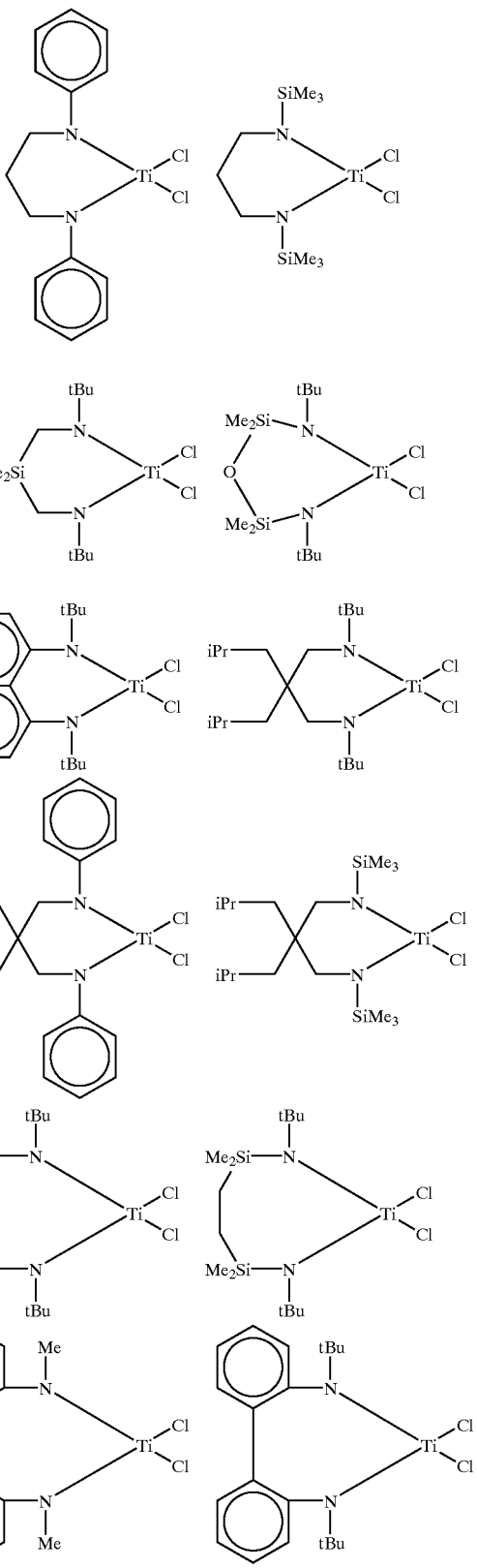

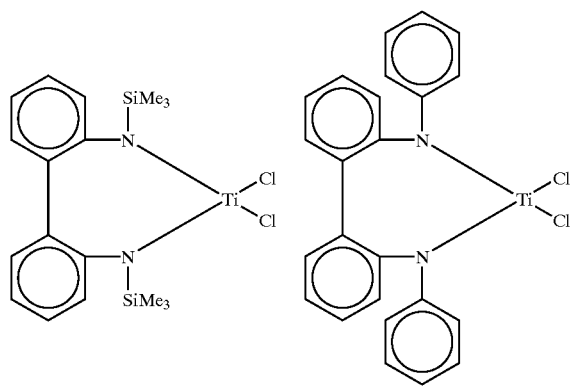

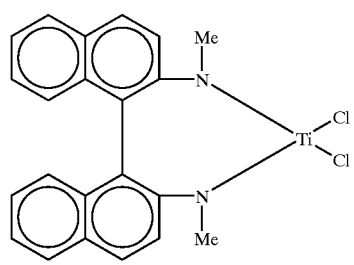

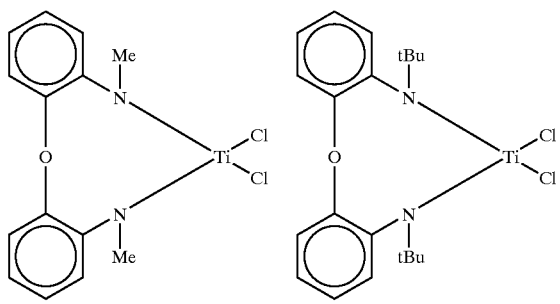

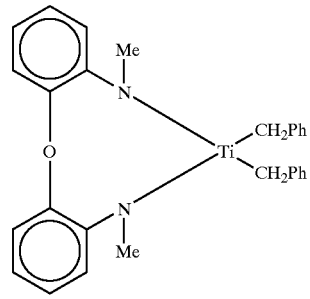

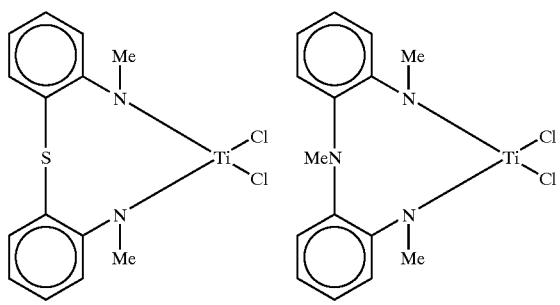

In the above examples, Me denotes a methyl group, Et denotes an ethyl group, iPr denotes an isopropyl group, and tBu denotes a tert-butyl group.

Also available in the invention are transition metal amide compounds wherein titanium is replaced with zirconium or hafnium in the above compounds.

As the transition metal amide compound represented by formula (V), preferably employed is a transition metal amide compound wherein R' and R" are each a substituted aryl group having 1 to 5 substituents such as alkyl groups, which is represented by the following formula (V').

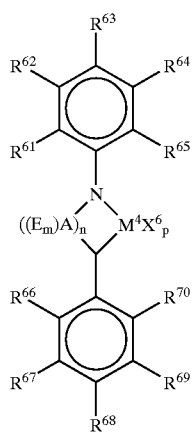

(V')

In the above formula, $M^4$ is identical with $M^4$ in the formula (V), preferably a transition metal atom of Group 4 of the periodic table such as titanium, zirconium or hafnium, particularly preferably titanium.

$R^{61}$ to $R^{70}$ may be the same or different, and are each a hydrogen atom, a halogen atom, a hydrocarbon group, a halogenated hydrocarbon group, an organosilyl group, an alkoxy group, an aryloxy group, $-COOR^{71}$, $-N(R^{72})C(O)R^{73}$, $-OC(O)R^{74}$, $-CN$, $-NR^{752}$ or $-N(R^{76})S(O_2)R^{77}$ ($R^{71}$ to $R^{77}$ are each an alkyl group of 1 to 5 carbon atoms), with the proviso that at least one of $R^{61}$ to $R^{65}$ is a group other than hydrogen and at least one of $R^{66}$ to $R^{70}$ is a group other than hydrogen.

Examples of the halogen atoms include those described with respect to $X^6$ in the formula (V). Examples of the hydrocarbon groups, the halogenated hydrocarbon groups and the organosilyl groups include those described with respect to R' and R" in the formula (V).

Examples of the alkoxy groups include methoxy, ethoxy, n-propoxy, isopropoxy, n-butoxy, isobutoxy and tert-butoxy.

Examples of the aryloxy groups include phenoxy, 2,6-dimethylphenoxy and 2,4,6-trimethylphenoxy.

Examples of the groups represented by $-COOR^{71}$, $-N(R^{72})C(O)R^{73}$, $-OC(O)R^{74}$, $-CN$, $-NR^{752}$ or $-N(R^{76})S(O_2)R^{77}$ ($R^{71}$ to $R^{77}$ are each an alkyl group of 1 to 5 carbon atoms) include $-COOCH_3$, $-N(CH_3)C(O)CH_3$, $-OC(O)CH_3$, $-CN$, $-N(C_2H_5)_2$ and $-N(CH_3)S(O_2)CH_3$.

Two or more groups, preferably adjacent groups, of the groups $R^{61}$ to $R^{65}$ may be bonded to form a ring such as an aromatic ring or an aliphatic ring together with the carbon atoms to which they are bonded. Two or more groups, preferably adjacent groups, of the groups $R^{66}$ to $R^{70}$ may also be bonded to form a ring such as an aromatic ring or an aliphatic ring together with the carbon atoms to which they are bonded.

m is an integer of 0 to 2.

n is an integer of 1 to 5.

A is identical with A in the formula (V), preferably a carbon atom or a silicon atom. When n is 2 or more, plural A may be the same or different.

E is identical with E in the formula (V), preferably a substituent containing at least one element selected from carbon, hydrogen, nitrogen and silicon. When m is 2, two E may be the same or different and may be bonded to form a ring.

Examples of the bonding groups represented by $-((E_m)A)_n-$ capable of bonding the two nitrogen atoms include those previously mentioned.

p is an integer of 0 to 4.

$X^6$ is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. Examples of $X^6$ include those previously described with respect to $L^1$ in the formula (I).

Of these, preferable are halogen atoms, hydrocarbon groups of 1 to 20 carbon atoms and sulfinato groups.

When p is 2 or more, plural $X^6$ may be the same or different.

Listed below are examples of the transition metal amide compounds represented by the formula (V'), but not limited to thereto.

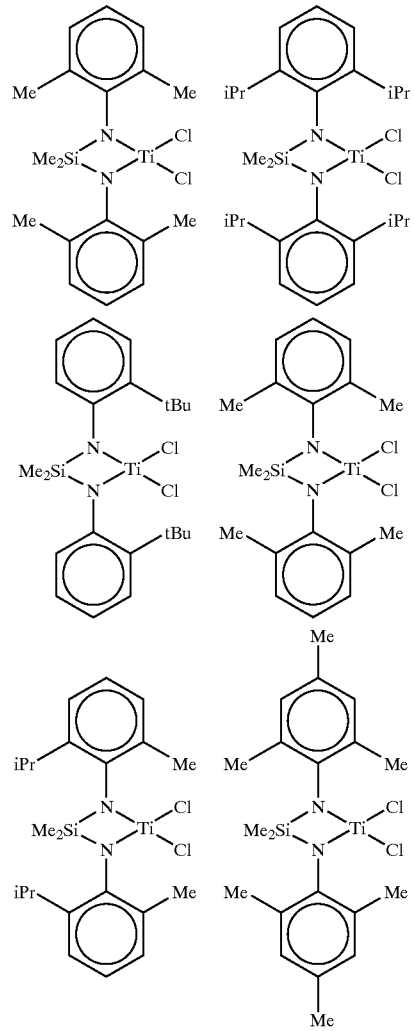

-continued
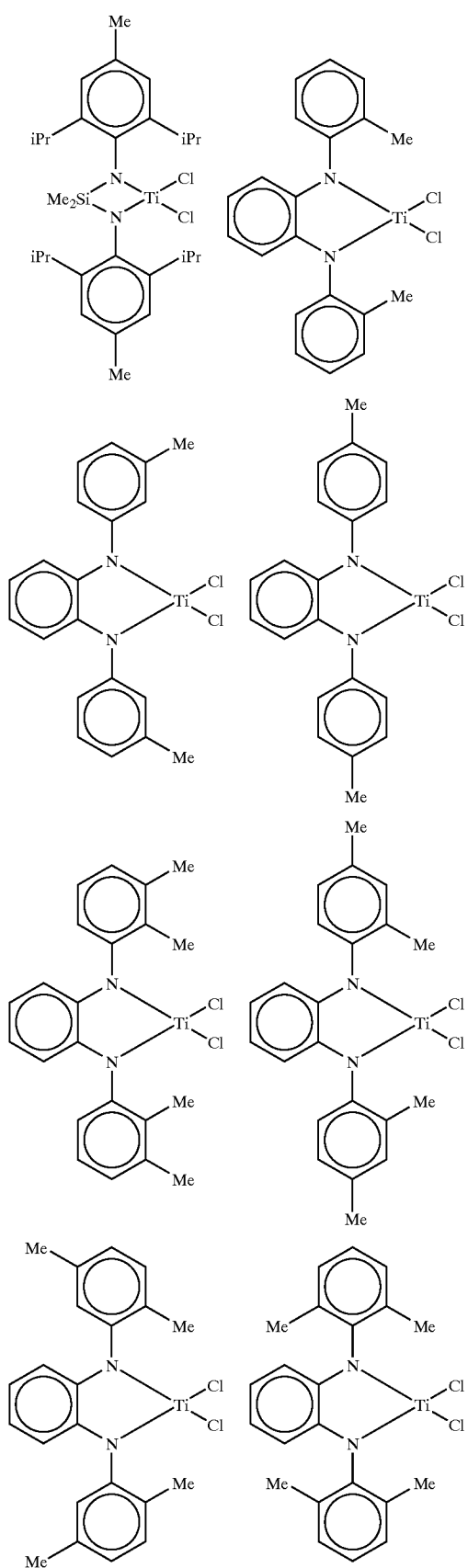
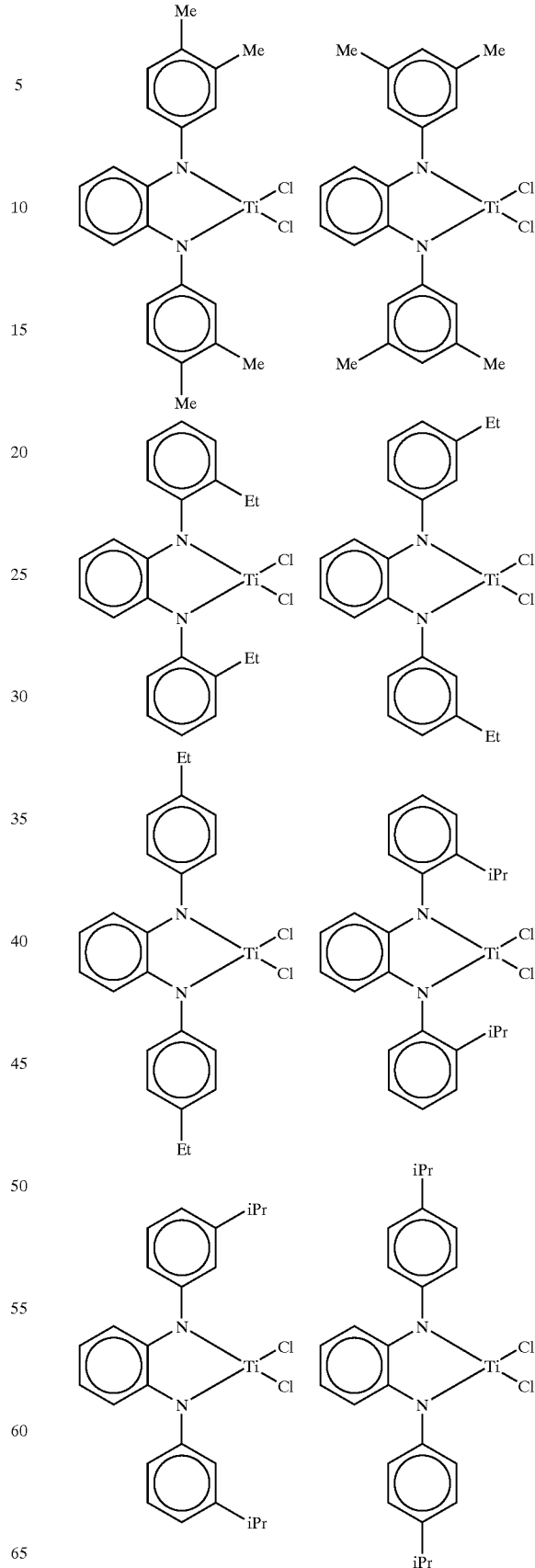

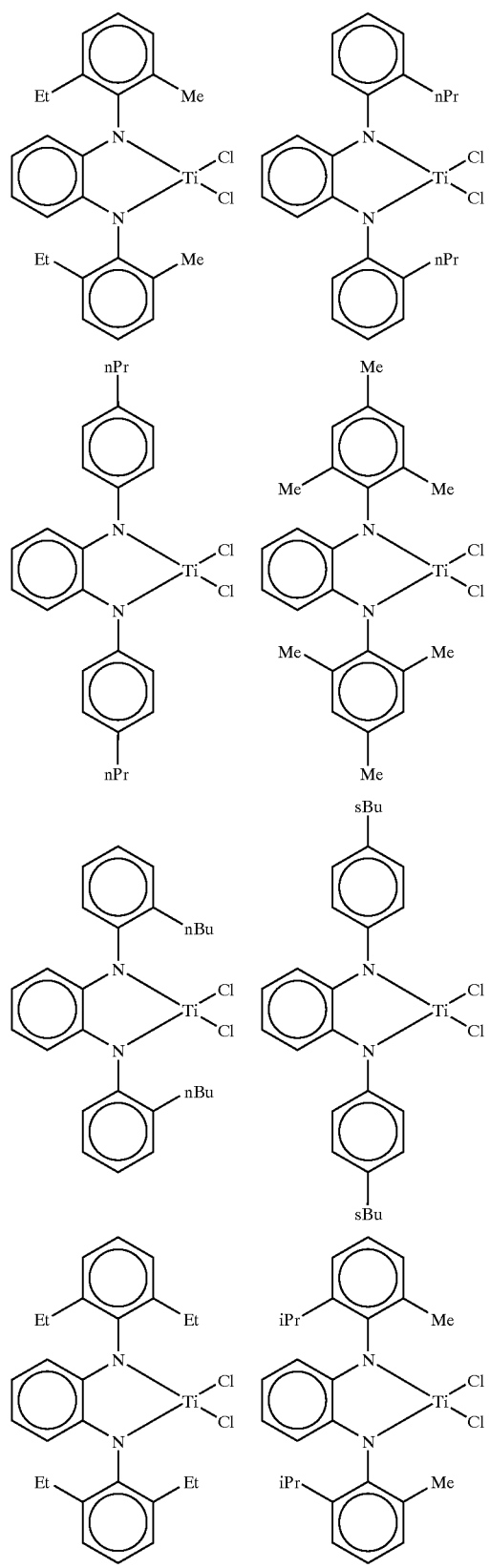
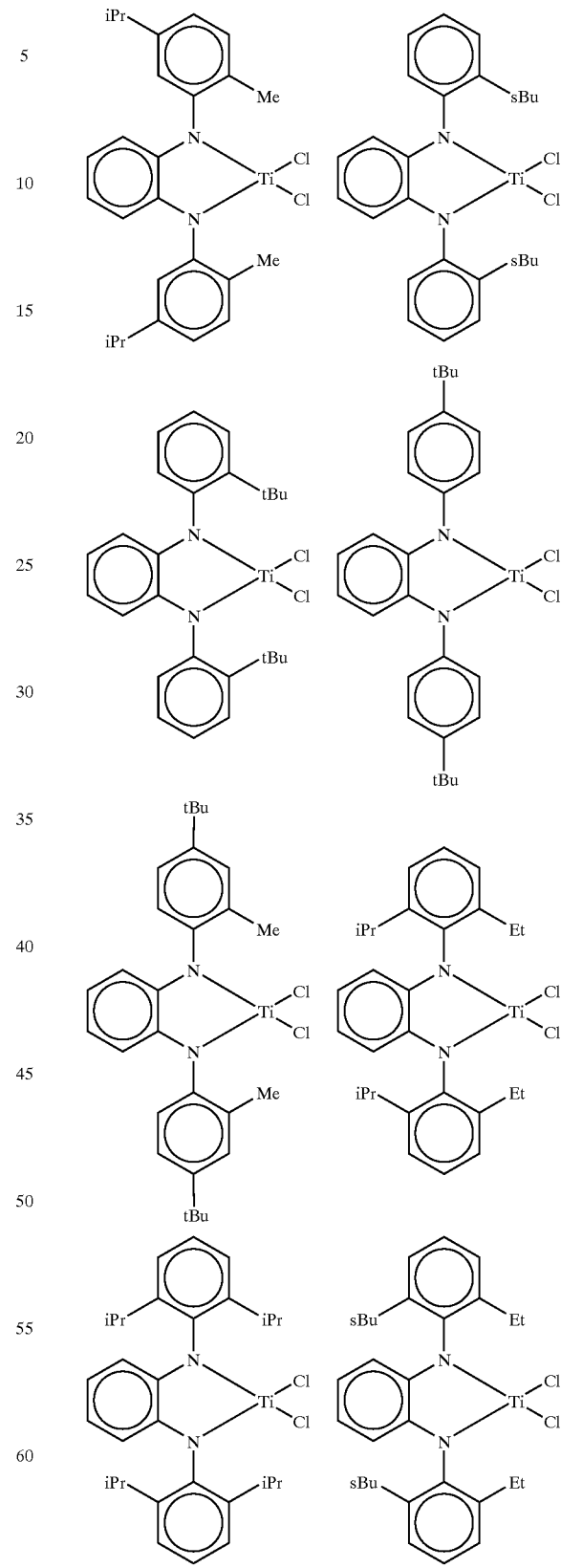

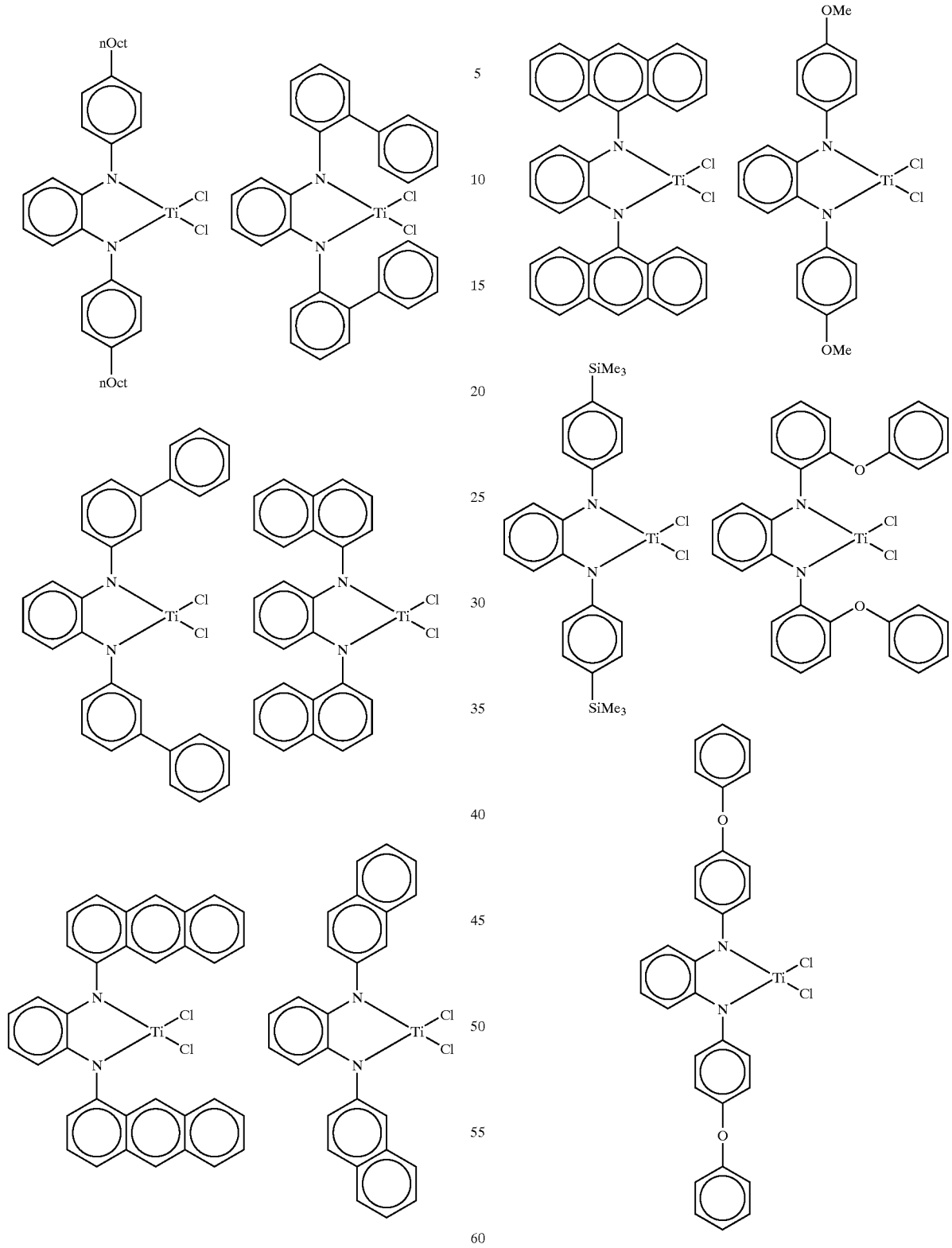

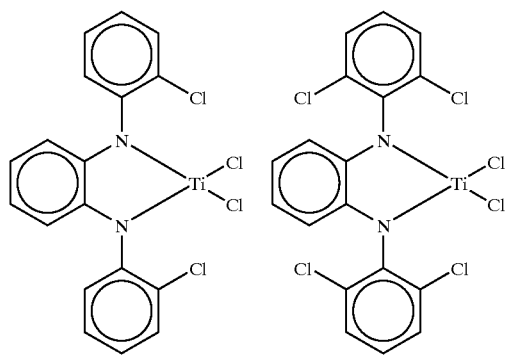
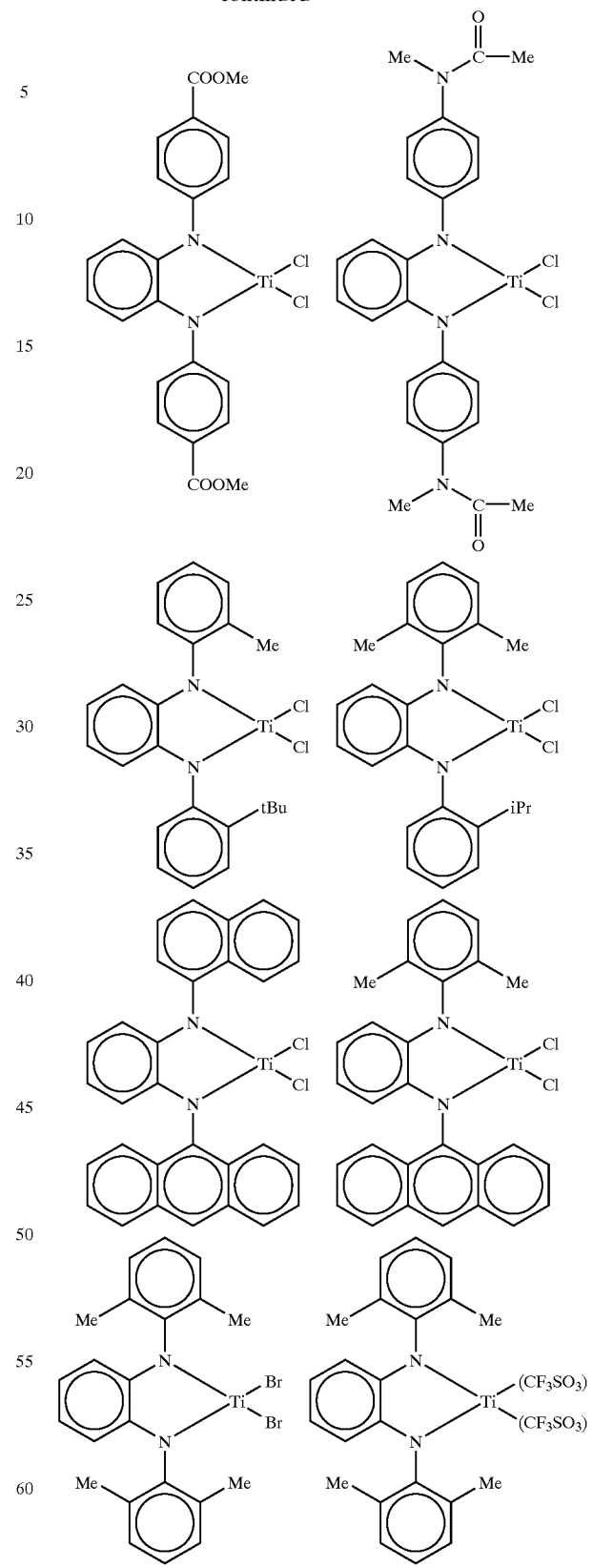

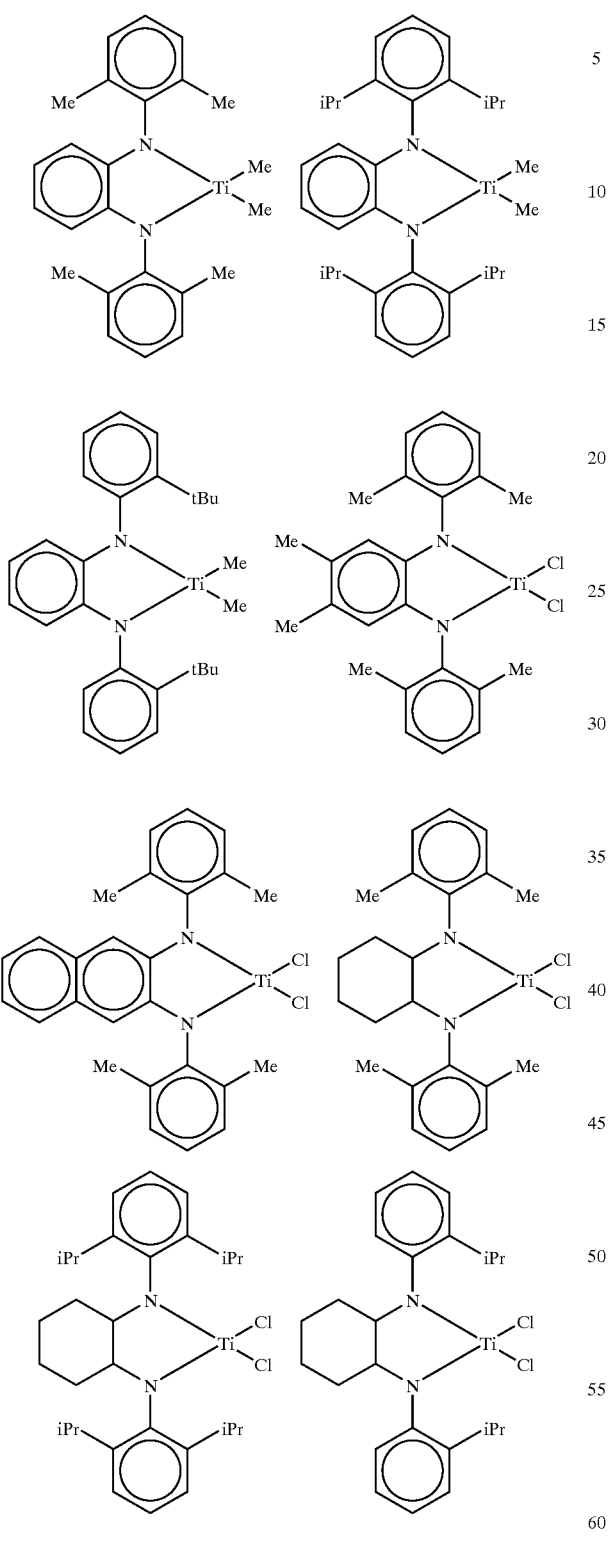
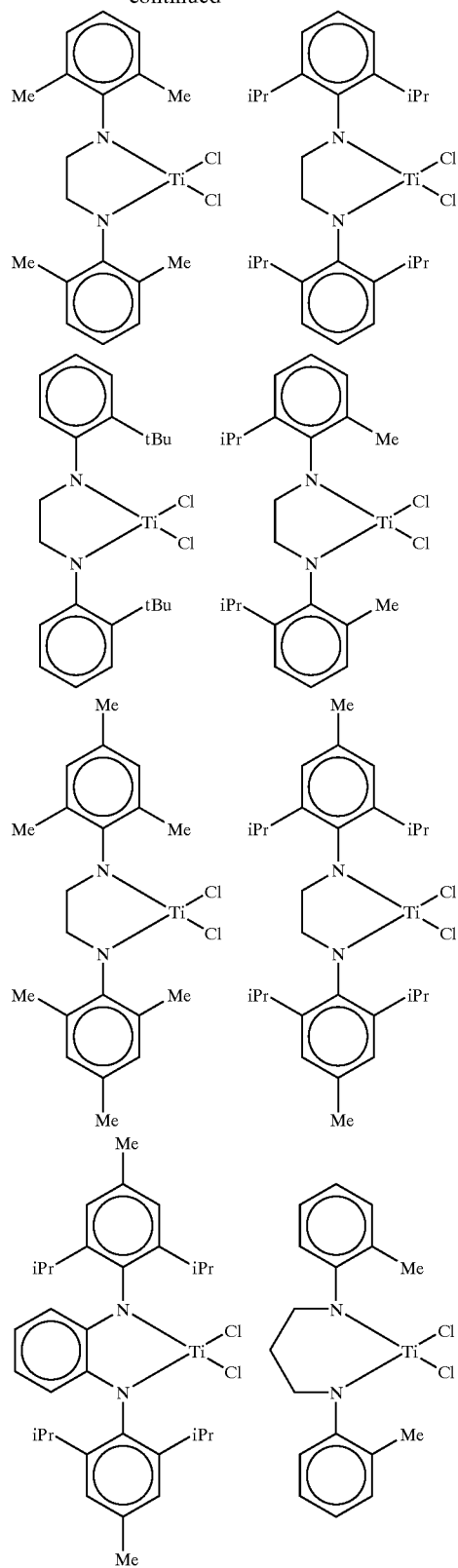

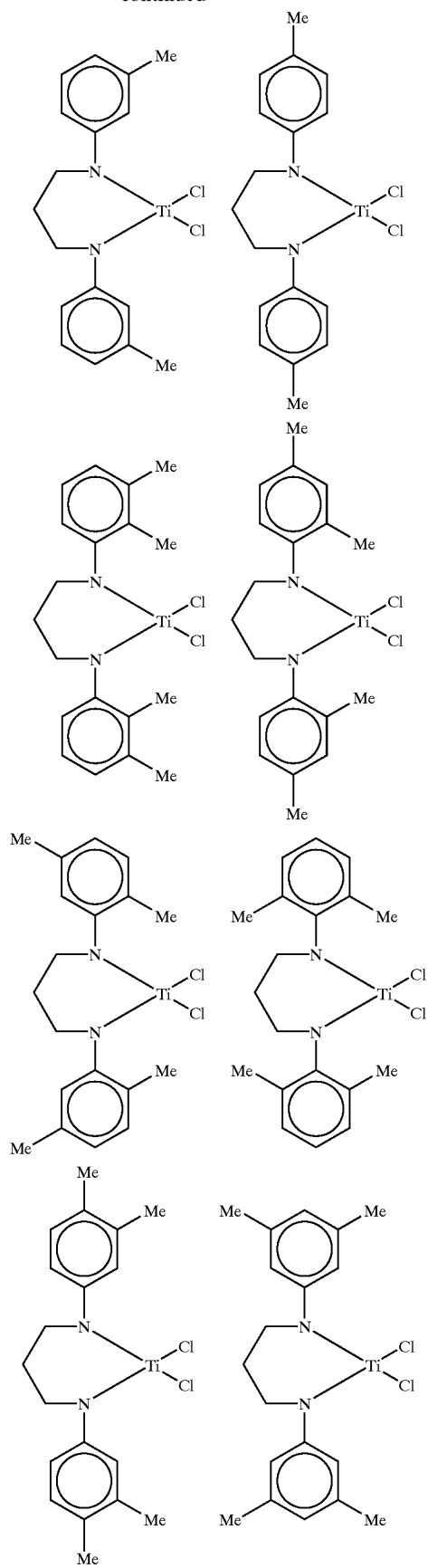
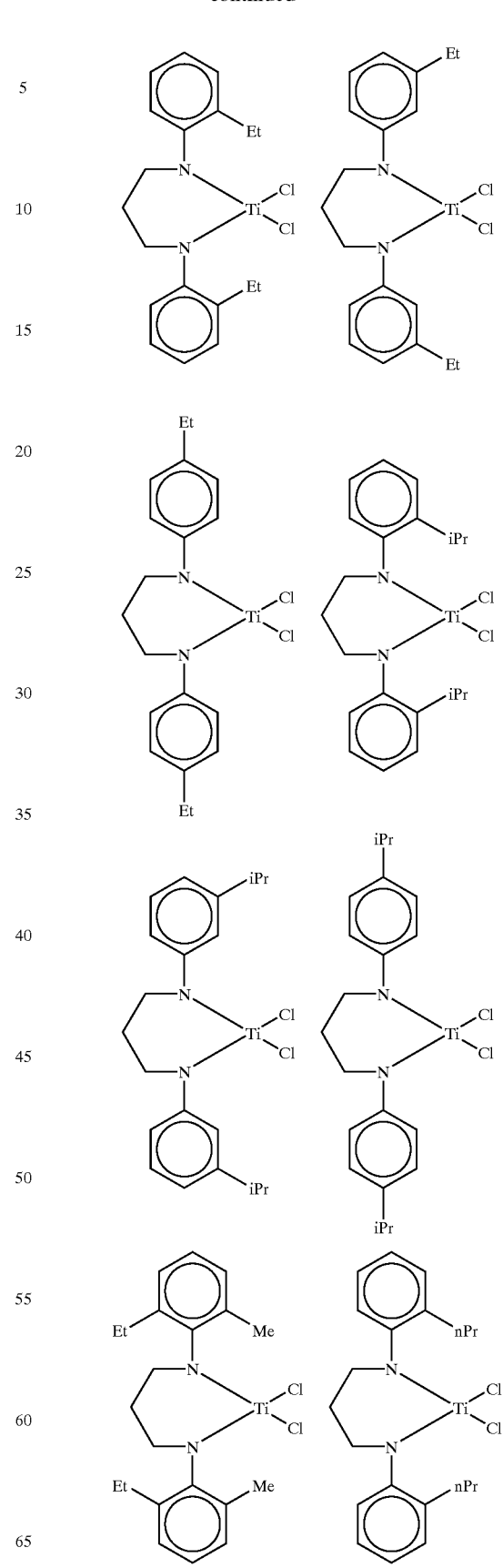

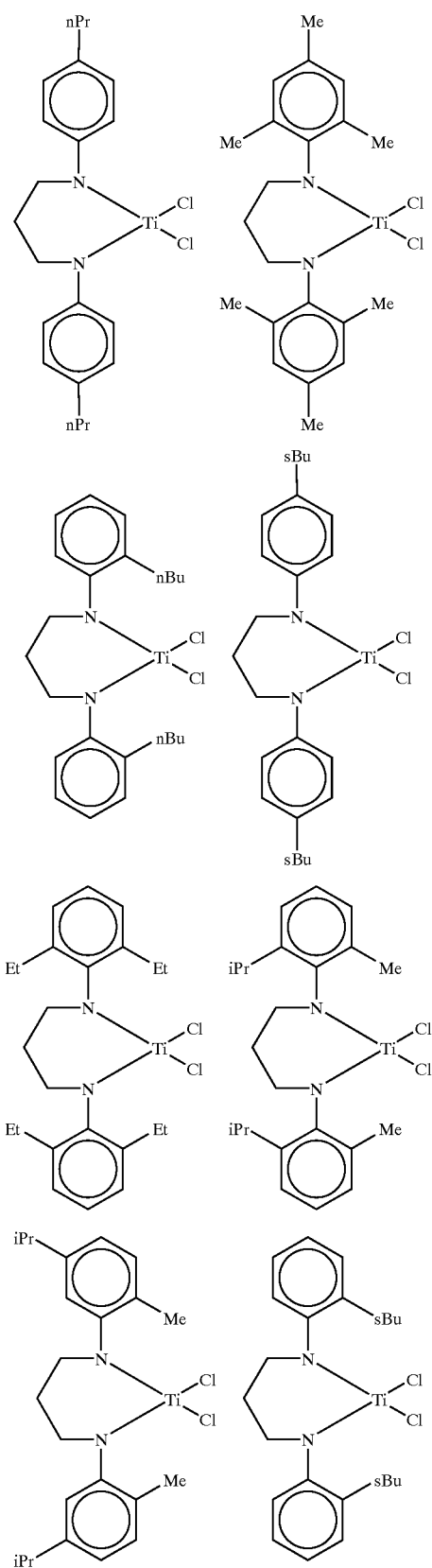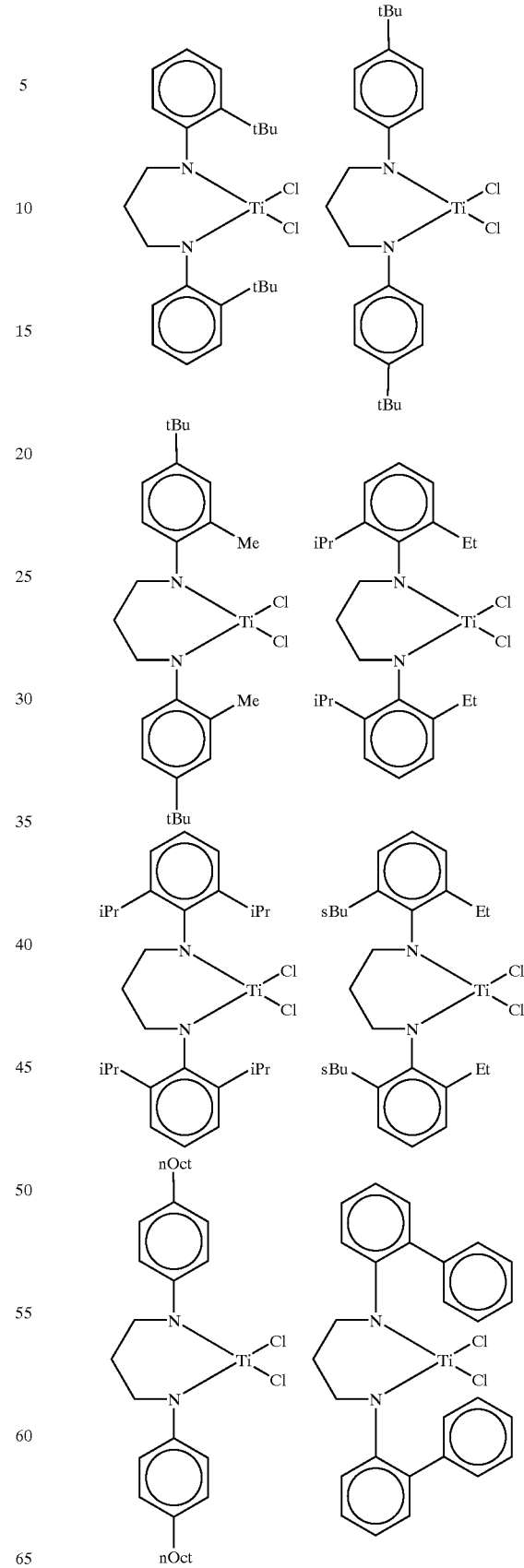

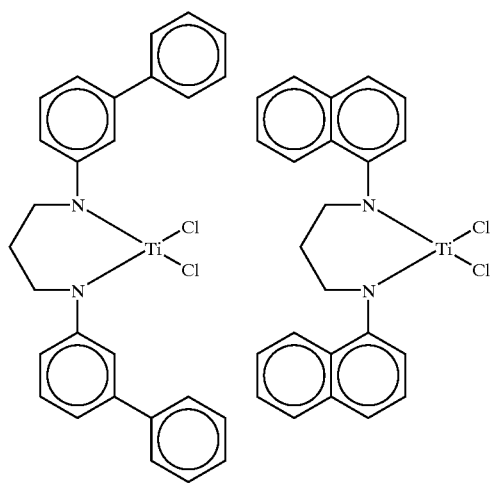
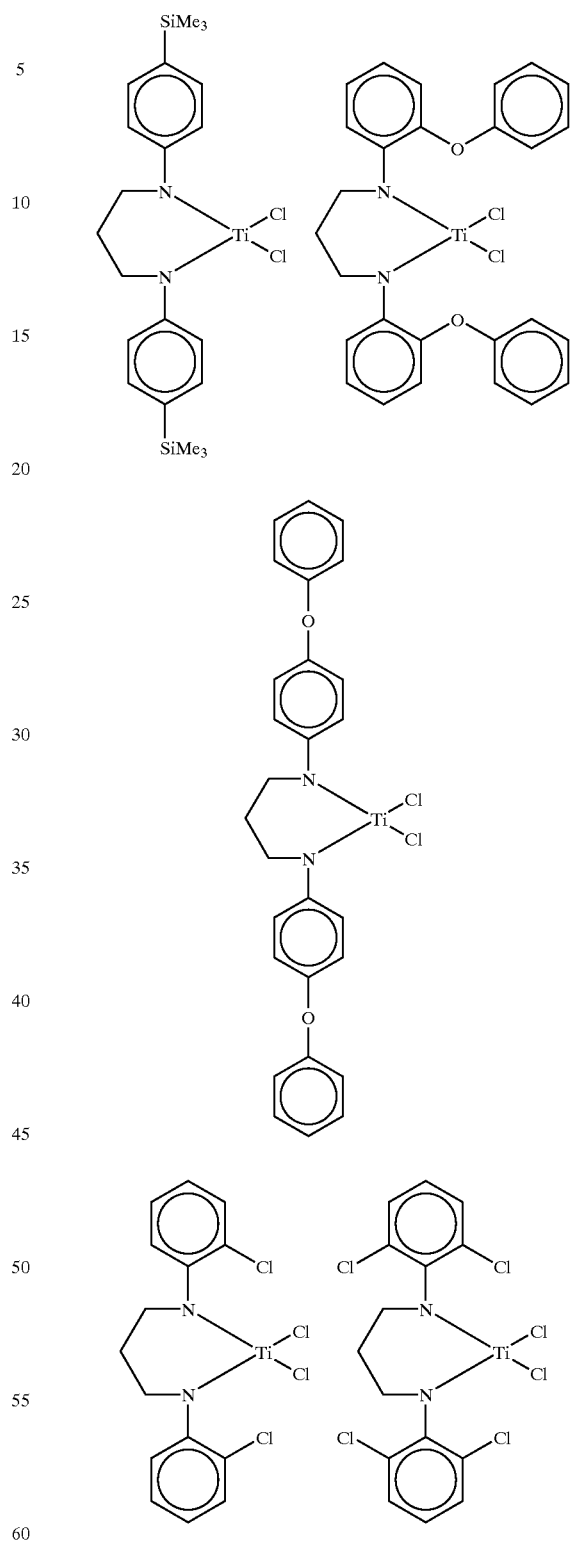

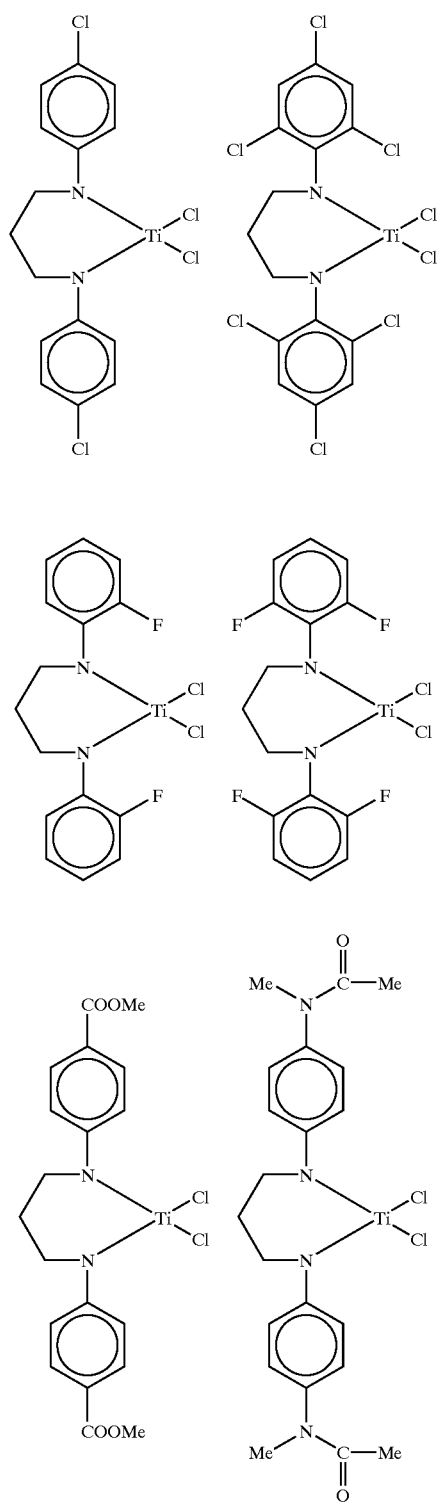
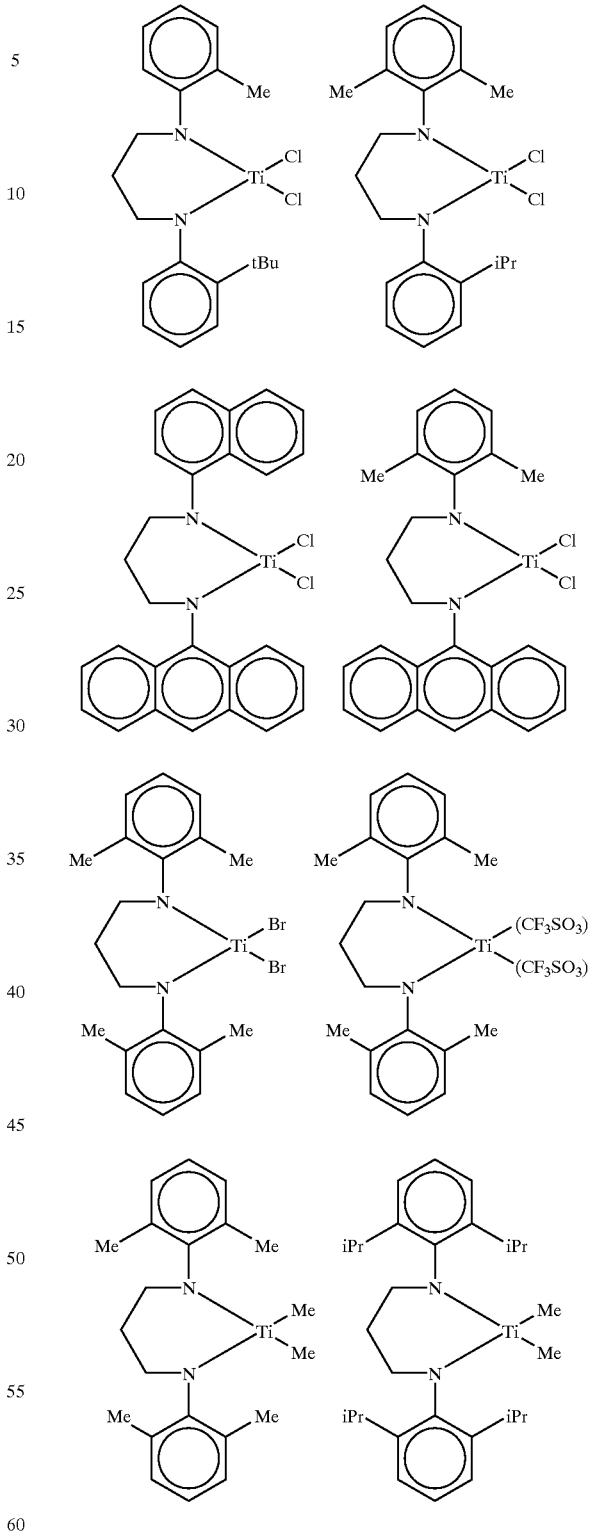

-continued
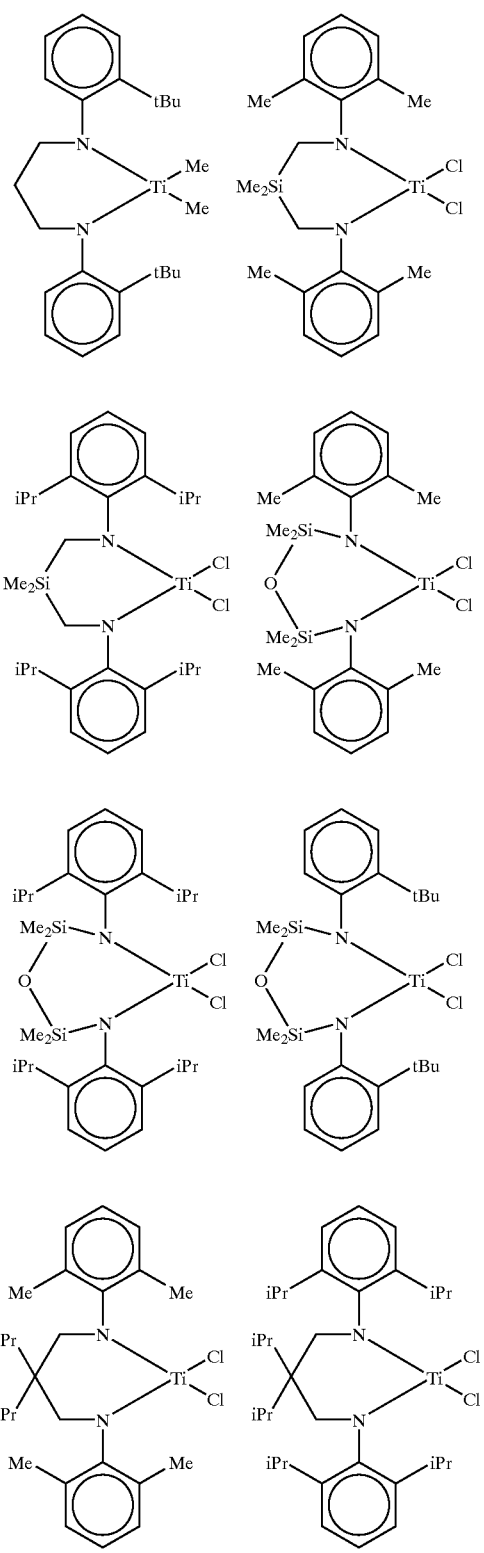
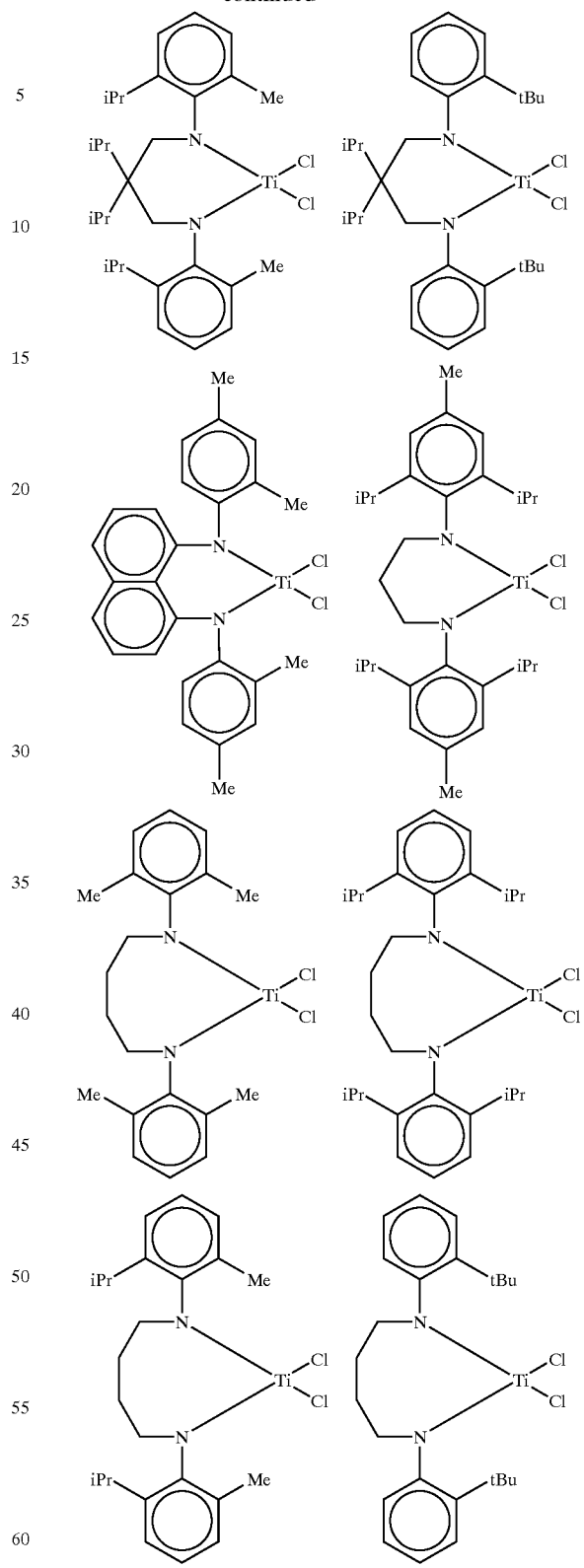

-continued
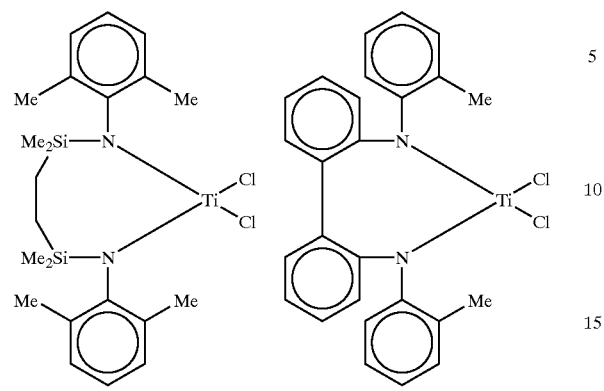
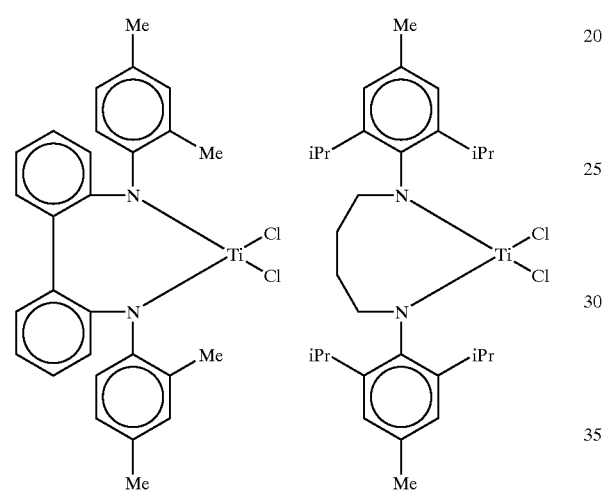
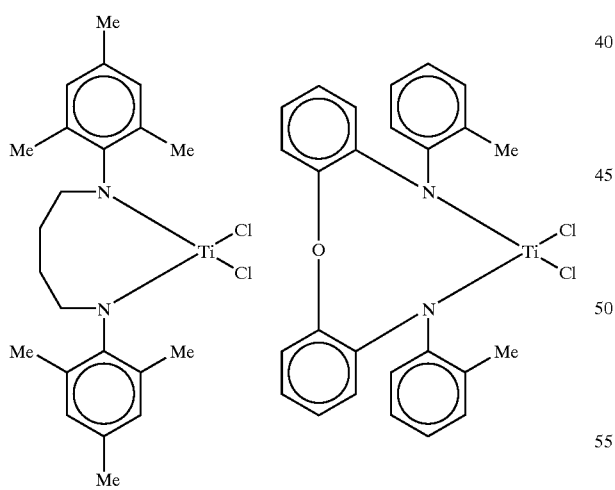
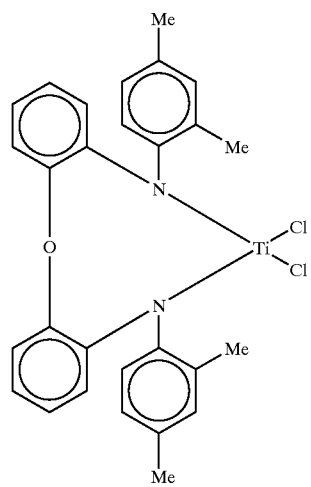
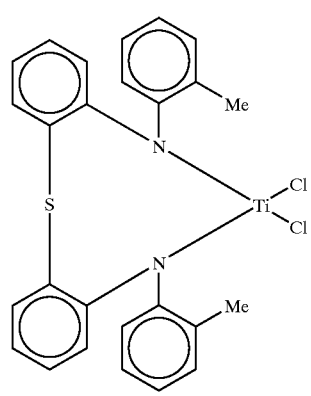
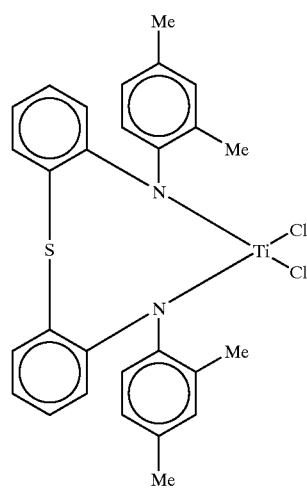

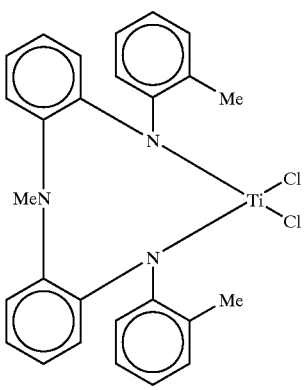

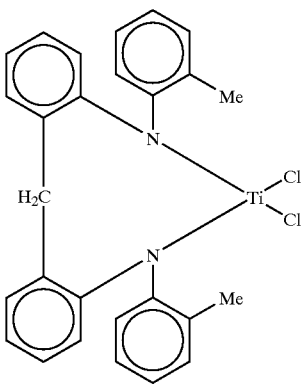

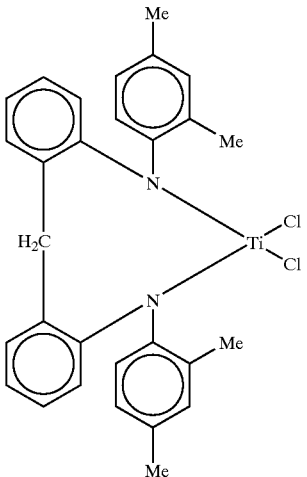

In the above examples, Me denotes a methyl group, Et denotes an ethyl group, iPr denotes an isopropyl group, nPr denotes an n-propyl group, nBu denotes an n-butyl group, sBu denotes a sec-butyl group, tBu denotes a tert-butyl group, and nOct denotes an n-octyl group.

Also available in the invention are transition metal amide compounds wherein titanium is replaced with zirconium or hafnium in the above compounds.

Next, the transition metal compound represented by the formula (VI) is described.

$$\left(\begin{array}{c} R^2 \\ R^3 \end{array} \begin{array}{c} R^1 \\ \diagdown N \\ C \\ \diagup \\ \diagdown O \end{array} \begin{array}{c} \\ \diagdown \\ MX_n \\ \diagup \end{array}\right)_m \quad (VI)$$

wherein N—M generally denotes a coordinate bond between both atoms, but in the present invention, the atoms may be or may not be coordinated.

In the above formula (VI), M is a transition metal atom of Groups 3 to 11 of the periodic table (Group 3 includes lanthanoid), preferably a metal atom of Groups 3 to 9 (Group 3 includes lanthanoid), more preferably a metal atom of Groups 3 to 5 and 9, particularly preferably a metal atom of Group 4 or 5. Examples of such metal atoms include scandium, titanium, zirconium, hafnium, vanadium, niobium, tantalum, cobalt, rhodium, yttrium, chromium, molybdenum, tungsten, manganese, rhenium, iron and ruthenium. Of these, preferable are scandium, titanium, zirconium, hafnium, vanadium, niobium, tantalum, cobalt and rhodium; more preferable are titanium, zirconium, hafnium, cobalt, rhodium, vanadium, niobium and tantalum; and particularly preferable are titanium, zirconium and hafnium.

m is an integer of 1 to 6, preferably an integer of 1 to 3. $R^1$ to $R^6$ may be the same or different, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to form a ring.

Examples of the halogen atoms include fluorine, chlorine, bromine and iodine.

Examples of the hydrocarbon groups include:
straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl;
straight-chain or branched alkenyl groups of 2 to 30 carbon atoms, preferably 2 to 20 carbon atoms, such as vinyl, allyl and isopropenyl;
straight-chain or branched alkynyl groups of 2 to 30 carbon atoms, preferably 2 to 20 carbon atoms, such as ethynyl and propargyl;
cyclic saturated hydrocarbon groups of 3 to 30 carbon atoms, preferably 3 to 20 carbon atoms, such as cyclopropyl, cyclobutyl, cyclopentyl, cyclohexyl and adamantyl;
cyclic unsaturated hydrocarbon groups of 5 to 30 carbon atoms, such as cyclopentadienyl, indenyl and fluorenyl;
aryl groups of 6 to 30 carbon atoms, preferably 6 to 20 carbon atoms, such as phenyl, naphthyl, biphenyl, terphenyl, phenanthryl and anthracenyl; and
alkyl-substituted aryl groups, such as tolyl, isopropylphenyl, t-butylphenyl, dimethylphenyl and di-t-butylphenyl.

The above hydrocarbon groups may be substituted with halogen atoms, and examples thereof include halogenated hydrocarbon groups of 1 to 30 carbon atoms, preferably 1 to 20 carbon atoms, such as trifluoromethyl, pentafluorophenyl and chlorophenyl, are also available.

The above hydrocarbon groups may also be substituted with other hydrocarbon groups, and examples thereof include aryl-substituted alkyl groups such as benzyl and cumyl.

Further, the above hydrocarbon groups may have heterocyclic compound residues; oxygen-containing groups, such as alkoxy groups, aryloxy groups, ester groups, ether groups, acyl groups, carboxyl groups, carbonato groups, hydroxyl groups, peroxy groups and carboxylic anhydride groups; nitrogen-containing groups, such as amino groups, imino groups, amide groups, imide groups, hydrazino groups, hydrazono groups, nitro groups, nitroso groups, cyano groups, isocyano groups, cyanate ester groups, amidino groups, diazo groups and ammonium salts derived from amino groups; boron-containing groups, such as boranediyl groups, boranetriyl groups and diboranyl groups; sulfur-containing groups, such as mercapto groups, thioester groups, dithioester groups, alkylthio groups, arylthio groups, thioacyl groups, thioether groups, thiocyanate ester groups, isothiocyanate ester groups, sulfonester groups, sulfonamido groups, thiocarboxyl groups, dithiocarboxyl groups, sulfo groups, sulfonyl groups, sulfinyl groups and sulfenyl groups; phosphorus-containing groups, such as phosphido groups, phosphoryl groups, thiophosphoryl groups, phosphato groups; silicon-containing groups; germanium-containing groups; or tin-containing groups.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; aryl groups of 6 to 30 carbon atoms, preferably 6 to 20 carbon atoms, such as phenyl, naphthyl, biphenyl, terphenyl, phenanthryl and anthracenyl; and substituted aryl groups which are substituted with 1 to 5 substituents such as halogen atoms, alkyl or alkoxy groups of 1 to 30 carbon atoms, preferably 1 to 20 carbon atoms, and aryl or aryloxy groups of 6 to 30 carbon atom, preferably 6 to 20 carbon atoms.

Examples of the oxygen-containing groups, the nitrogen-containing groups, the boron-containing groups, the sulfur-containing groups and the phosphorus-containing groups as $R^1$ to $R^6$ include those previously exemplified, respectively.

Examples of the heterocyclic compound residues include those derived from nitrogen-containing compounds such as pyrrole, pyridine, pyrimidine, quinoline and triazine; oxygen-containing compounds such as furan and pyran; sulfur-containing compounds such as thiophene; and further these heterocyclic compounds which are substituted with substituents such as alkyl or alkoxy groups of 1 to 30 carbon atoms, preferably 1 to 20 carbon atoms.

The silicon-containing group is, for example, a silyl group, a siloxy group, a hydrocarbon-substituted silyl group or a hydrocarbon-substituted siloxy group. Examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. An example of the hydrocarbon-substituted siloxy group is trimethylsiloxy.

Examples of the germanium-containing groups or the tin-containing groups include those wherein silicon is replaced with germanium or tin in the above-exemplified silicon-containing groups.

The above-mentioned examples of $R^1$ to $R^6$ are more specifically described below. of the preferred oxygen-containing groups as $R^1$ to $R^6$, preferred alkoxy groups include methoxy, ethoxy, n-propoxy, isopropoxy, n-butoxy, isobutoxy and tert-butoxy; preferred aryloxy groups include phenoxy, 2,6-dimethylphenoxy and 2,4,6-trimethylphenoxy; preferred acyl groups include formyl, acetyl, benzoyl, p-chlorobenzoyl and p-methoxybenzoyl; and preferred ester groups include acetyloxy, benzoyloxy, methoxycarbonyl, phenoxycarbonyl and p-chlorophenoxycarbonyl.

Of the preferred nitrogen-containing groups as $R^1$ to $R^6$, preferred amino groups include dimethylamino, ethylmethylamino and diphenylamino; preferred amido groups include acetamido, N-methylacetamido and N-methylbenzamido; preferred imido groups include acetimido and benzimido; and preferred imino groups include methylimino, ethylimino, propylimino, butylimino and phenylimino.

Of the preferred sulfur-containing groups as $R^1$ to $R^6$, preferred alkylthio groups include methylthio and ethylthio; preferred arylthio groups include phenylthio, methylphenylthio and naphthylthio; preferred thioester groups include acetylthio, benzoylthio, methylthiocarbonyl and phenylthiocarbonyl; preferred sulfonester groups include methylsulfonato, ethylsulfonato and phenylsulfonato; and preferred sulfonamido groups include phenylsulfonamido, N-methylsulfonamido and N-methyl-p-toluenesulfonamido.

$R^6$ preferably is a substituent other than hydrogen, more specifically, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group.

Preferred examples of the hydrocarbon groups $R^6$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, naphthyl, biphenylyl and triphenylyl; arylalkyl groups of 7 to 30 carbon atoms, preferably 7 to 20 carbon atoms, such as benzyl; and these groups which are substituted with substituents such as alkyl or alkoxy groups of 1 to 30 carbon atoms, preferably 1 to 20 carbon atoms, halogenated alkyl groups of 1 to 30 carbon atoms, preferably 1 to 20 carbon atoms, aryl or aryloxy groups of 6 to 30 carbon atom, preferably 6 to 20 carbon atoms, halogens, cyano group, nitro group and hydroxyl group.

Preferred examples of the hydrocarbon-substituted silyl groups $R^6$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Particularly preferable are trimethylsilyl, triethylsilyl, diphenylmethylsilyl, triphenylsilyl, dimethylphenylsilyl, dimethyl-t-butylsilyl and dimethyl(pentafluorophenyl)silyl.

In the present invention, $R^6$ is particularly preferably selected from branched alkyl groups of 3 to 30 carbon atoms, preferably 3 to 20 carbon atoms, such as isopropyl, isobutyl, sec-butyl, tert-butyl and neopentyl, these alkyl groups substituted with aryl groups of 6 to 30 carbon atoms, preferably 6 to 20 carbon atoms, such as cumyl, and cyclic saturated hydrocarbon groups of 3 to 30 carbon atoms, preferably 3 to 20 carbon atom, such as adamantyl, cyclopropyl, cyclobutyl, cyclopentyl and cyclohexyl; and also aryl groups of 6 to 30 carbon atoms, preferably 6 to 20 carbon atoms, such as phenyl, naphthyl, fluorenyl, anthranyl and phenanthryl, and hydrocarbon-substituted silyl groups.

Two or more groups, preferably adjacent groups, of the groups $R^1$ to $R^6$ may be bonded to form an alicyclic ring, an aromatic ring or a heterocyclic ring containing a hetero atom such as a nitrogen atom. These rings may have substituents.

When m is 2 or more, two groups of $R^1$ to $R^6$ may be bonded, with the proviso that two $R^1$ are not bonded each other. Further, when m is 2 or more, each $R^1$, each $R^2$, each $R^3$, each $R^4$, each $R^5$ or each $R^6$ may be the same or different, respectively.

n is a number satisfying the valence of M, specifically an integer of 0 to 5, preferably an integer of 1 to 4, more preferably an integer of 1 to 3.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When n is 2, plural X may be the same or different.

Examples of the halogen atoms include fluorine, chlorine, bromine and iodine.

Examples of the hydrocarbon groups include those previously exemplified with respect to $R^1$ to $R^6$. Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl, but not limited thereto. The hydrocarbon groups include halogenated hydrocarbons, specifically, hydrocarbon groups of 1 to 20 carbon atoms, each of which is substituted with at least one halogen atom.

Of these, preferable are hydrocarbon groups of 1 to 20 carbon atoms.

Examples of the heterocyclic compound residues include those previously exemplified with respect to $R^1$ to $R^6$.

Examples of the oxygen-containing groups include those previously exemplified with respect to $R^1$ to $R^6$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy; acetoxy group; and carbonyl group, but not limited thereto.

Examples of the sulfur-containing groups include those previously exemplified with respect to $R^1$ to $R^6$. Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups, but not limited thereto.

Examples of the nitrogen-containing groups include those previously exemplified with respect to $R^1$ to $R^6$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylaminot ditolylamino, dinaphthylamino and methylphenylamino, but not limited thereto.

Examples of the boron-containing groups include $BR_4$ (R is, for example, a hydrogen atom, an alkyl group, an aryl group which may have a substituent and a halogen atom).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (including phosphido groups), such as methylphosphite, ethylphosphite and phenylphosphite; phosphonic acid group; and phosphinic acid group, but not limited thereto.

Examples of the silicon-containing groups include those as previously exemplified with respect to $R^1$ to $R^6$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylphenyl.

Examples of the germanium-containing groups include those previously exemplified with respect to $R^1$ to $R^6$. Specifically, there can be mentioned groups wherein silicon is replaced with tin in the above-exemplified silicon-containing groups.

Examples of the halogen-containing groups include fluorine-containing groups, such as $PF_6$ and $BR_4$; chlorine-containing groups, such as $ClO_4$ and $SbCl_6$; and iodine-containing groups, such as $IO_4$, but not limited thereto.

Examples of the aluminum-containing groups include $AlO_4$ (R is, for example, a hydrogen atom, an alkyl group, an aryl group which may have a substituent or a halogen atom), but not limited thereto.

When n is 2 or more, plural X may be the same or different, and plural X may be bonded to form a ring.

Examples of the transition metal compounds represented by the formula (VI) are given below, but not limited thereto.

In the following examples, M is a transition metal atom, specifically Sc(III), Ti(III), Ti(IV), Zr(III), Zr(IV), Hf(IV), V(IV), Nb(V), Ta(V), Co(II), Co(III), Rh(II), Rh(III) or Rh(IV), but not limited thereto. Of these, preferable is Ti(IV), Zr(IV) or Hf(IV).

X is halogen such as Cl or Br, or an alkyl group such as methyl, but not limited thereto. When plural X are present, they may be the same or different.

n is defined by the valence of the metal M. For example, in the case where two monoanions are bonded to the metal M, if the valence of M is 2 then n=o; if the valance of M is 3 then n=l; if the valence of M is 4 then n=2; and if the valence of M is 5 then n=3. Thus, for example, if the metal is Ti(IV) then n=2; if the metal is Zr(IV) then n=2; and if the metal is Hf(IV) then n=2.

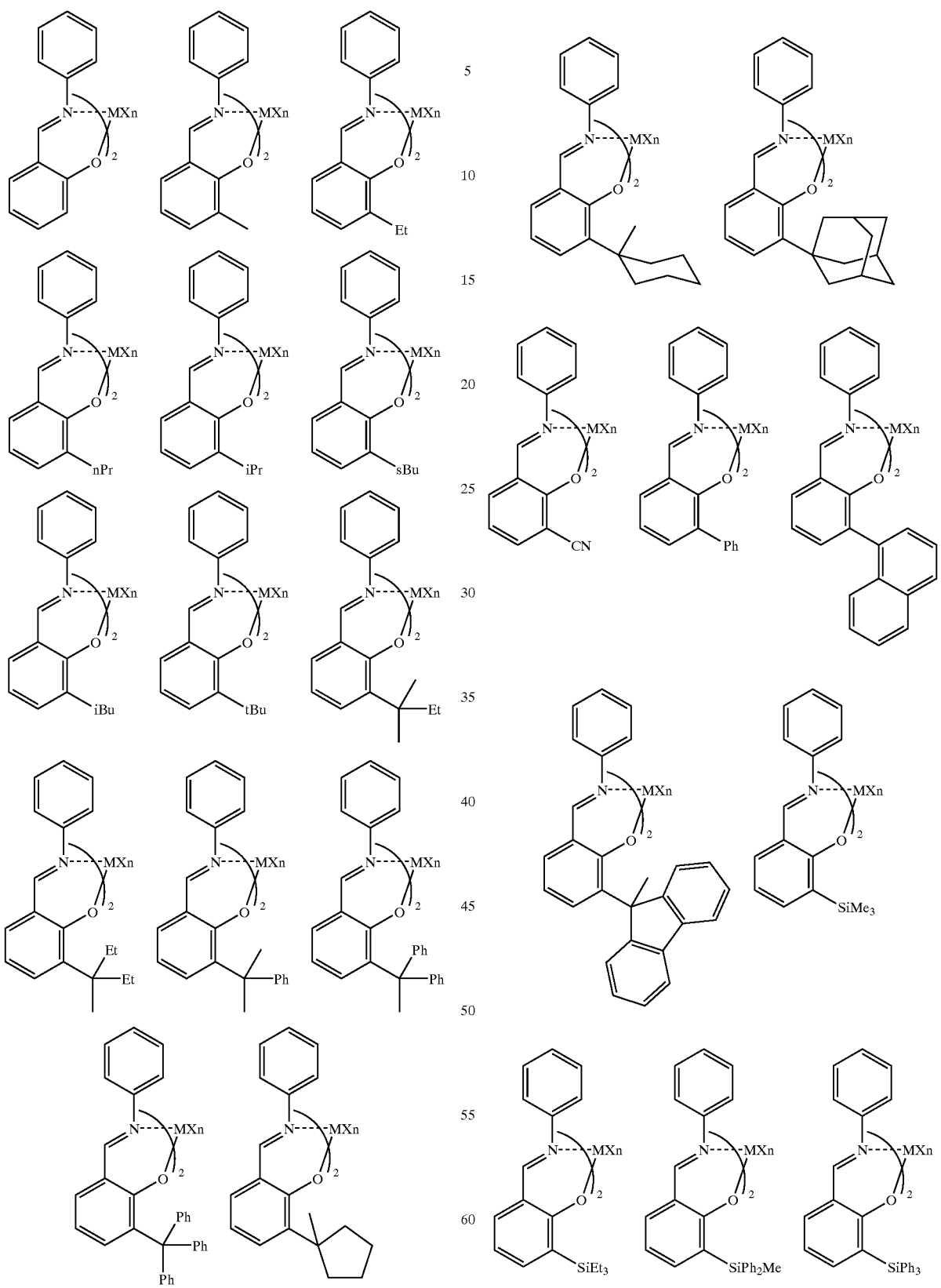

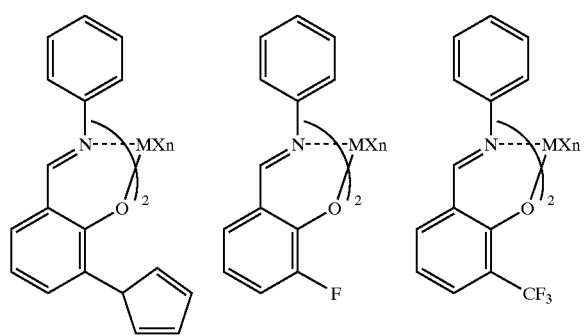
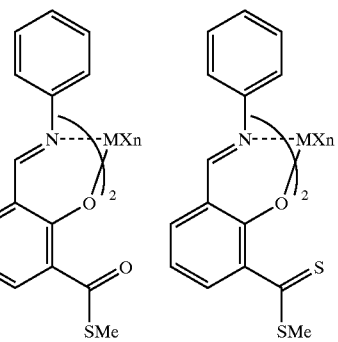
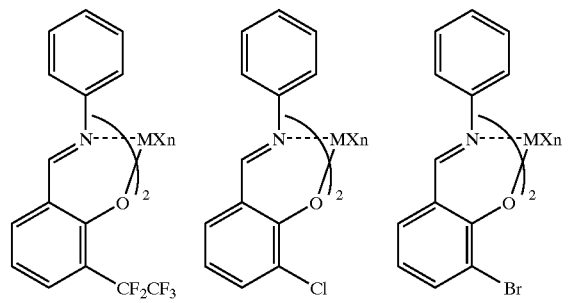
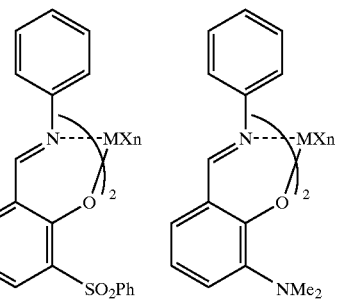
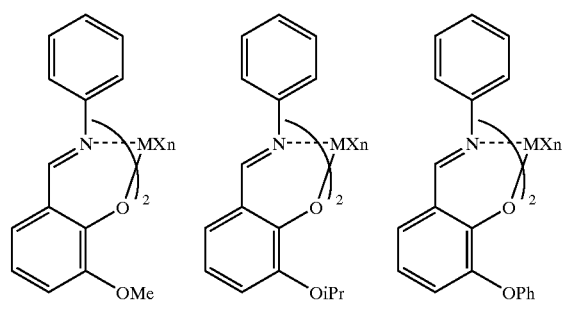
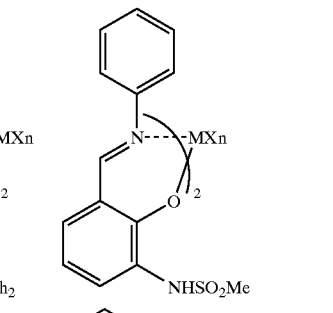
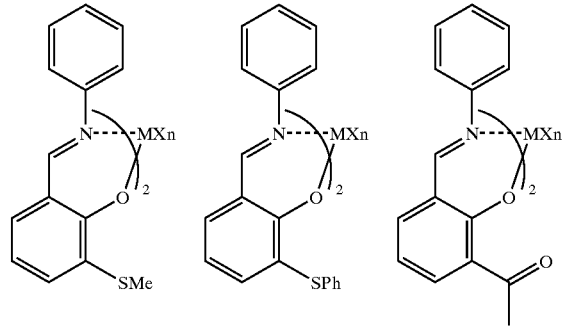
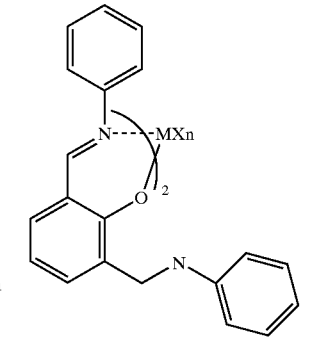
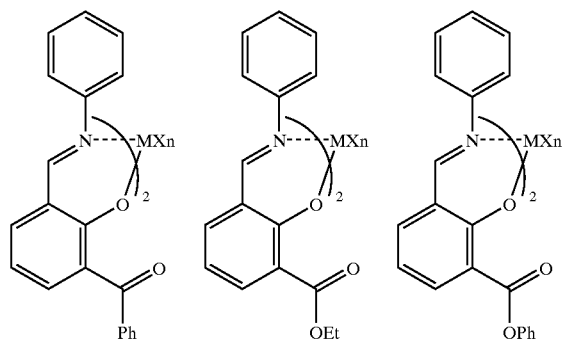
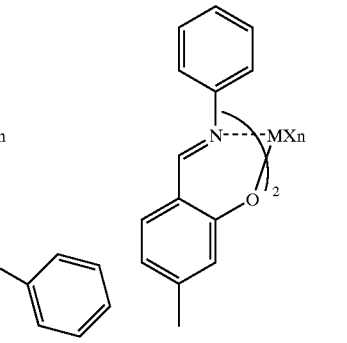

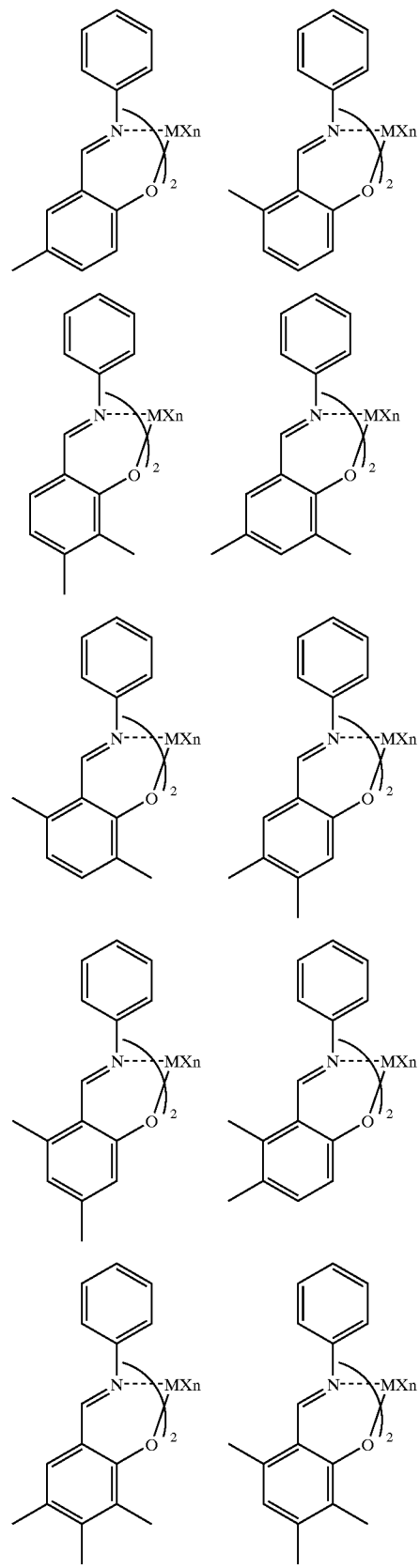
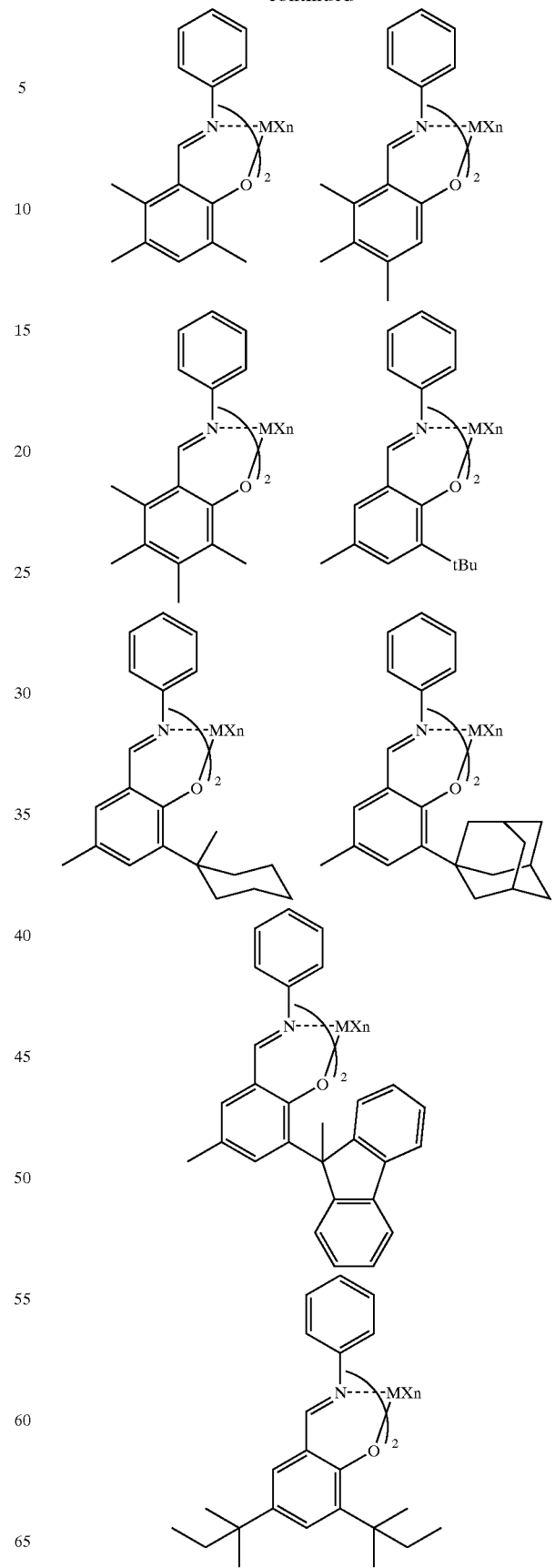

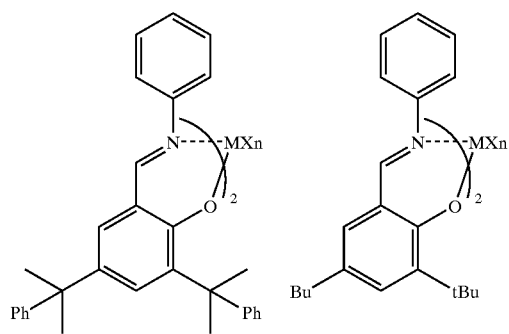
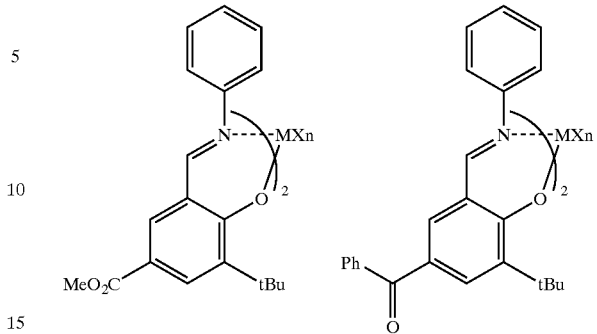
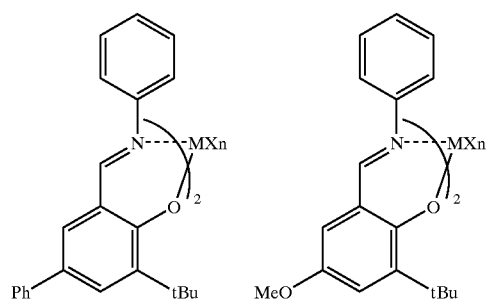
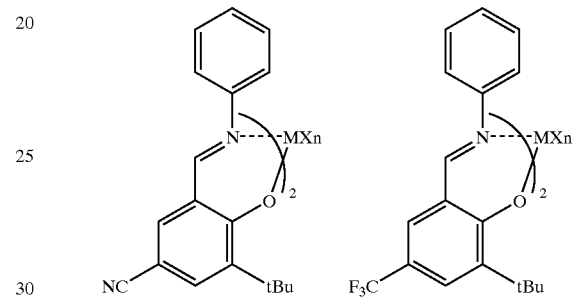
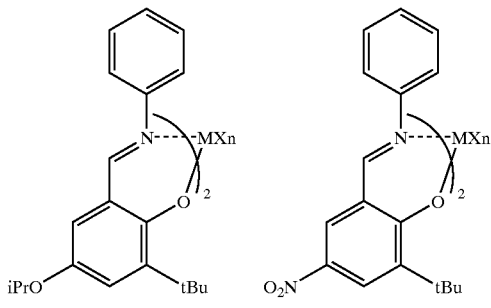
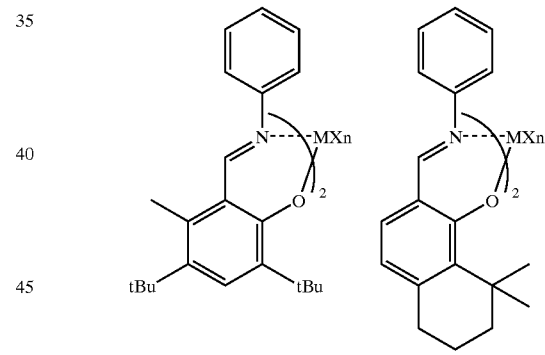
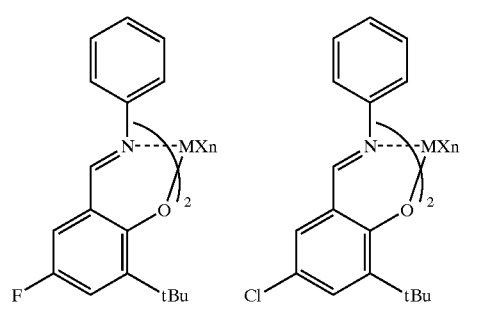
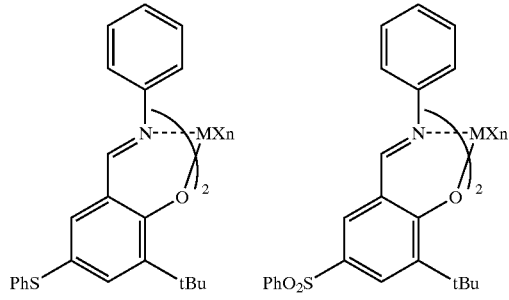
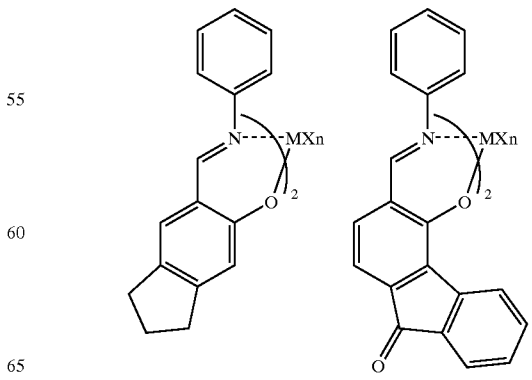

121
-continued
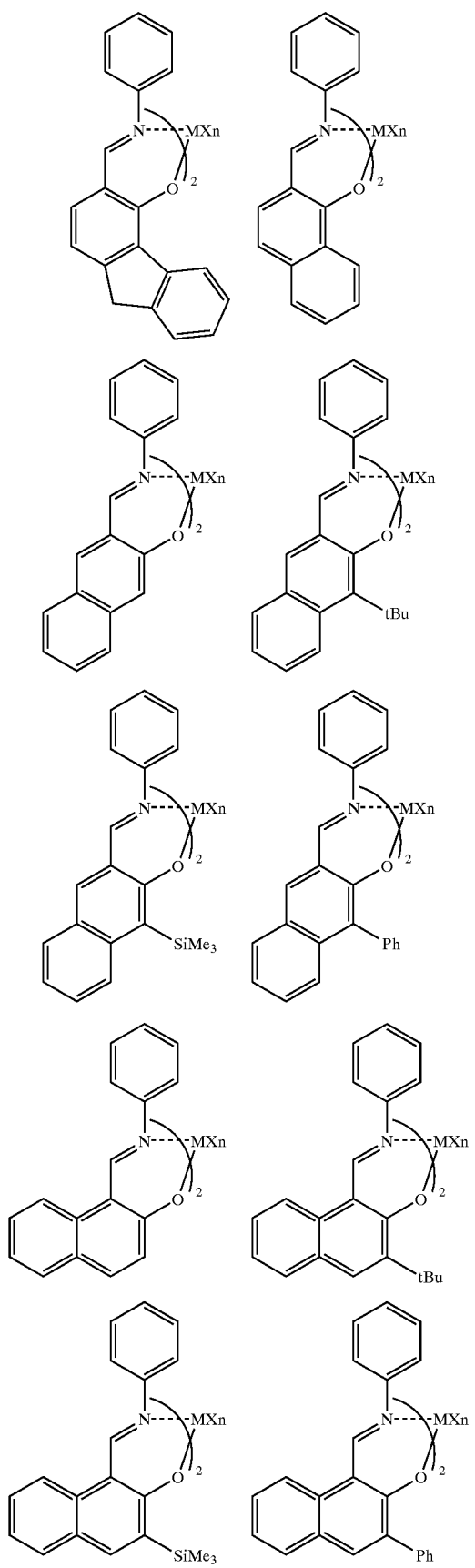
122
-continued
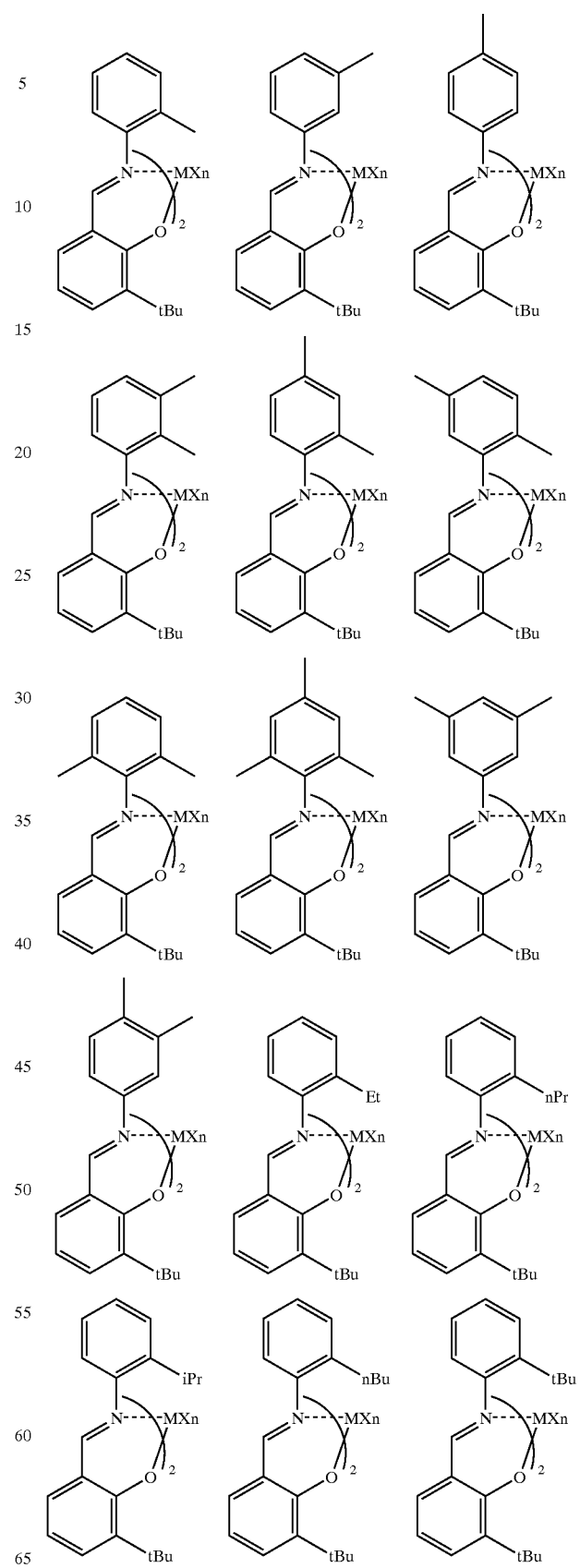

-continued
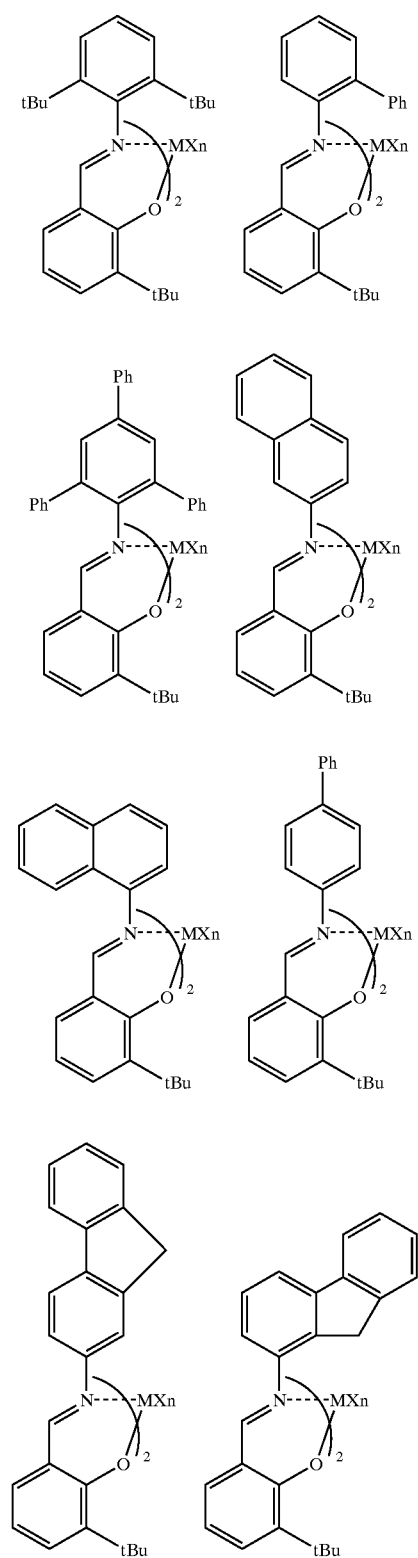
-continued
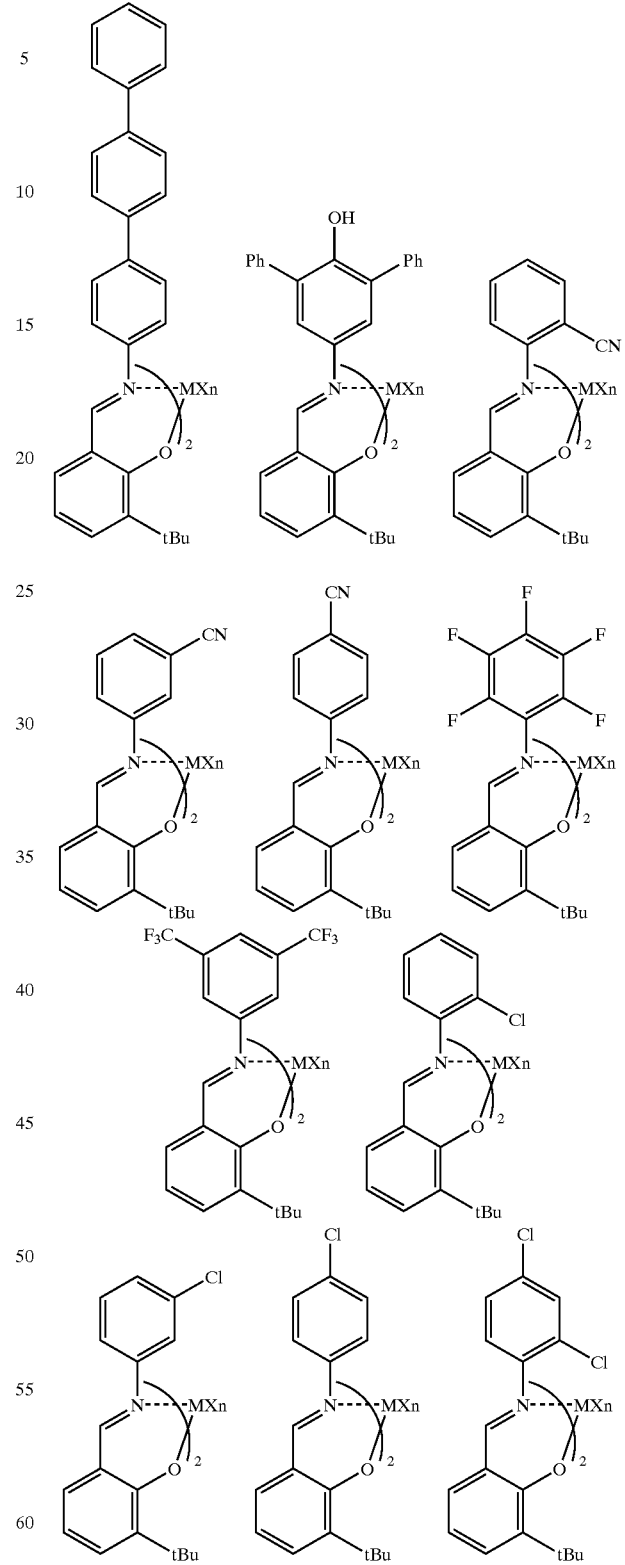

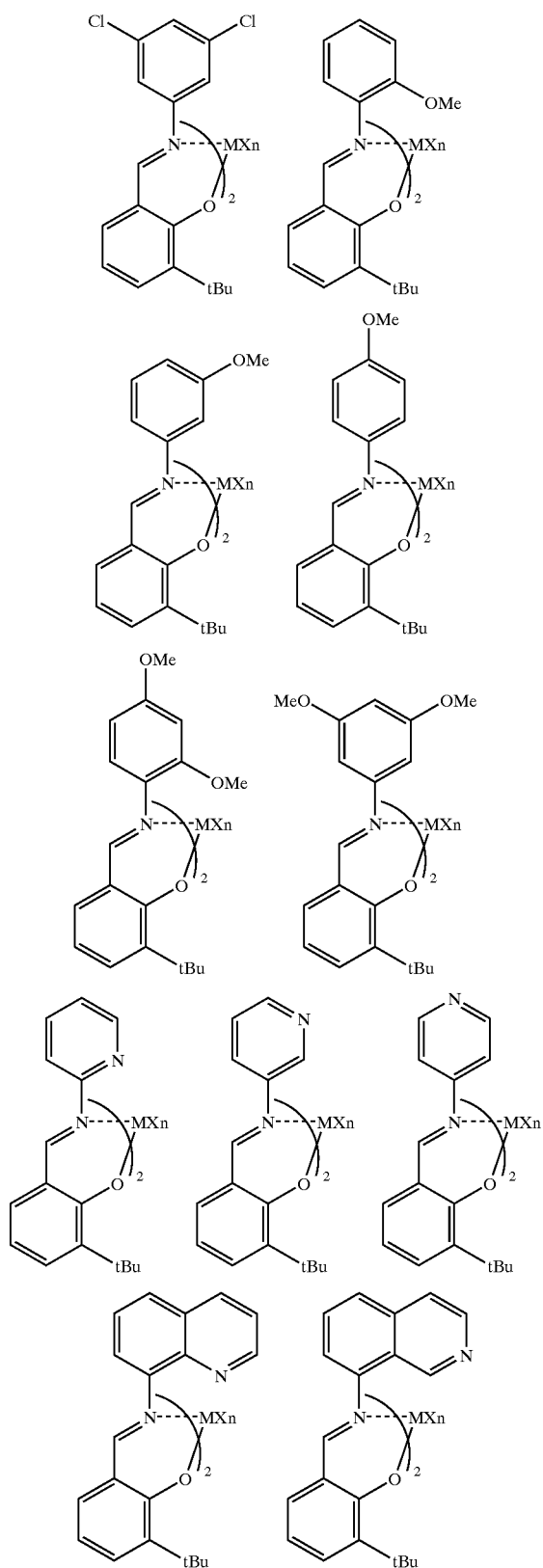
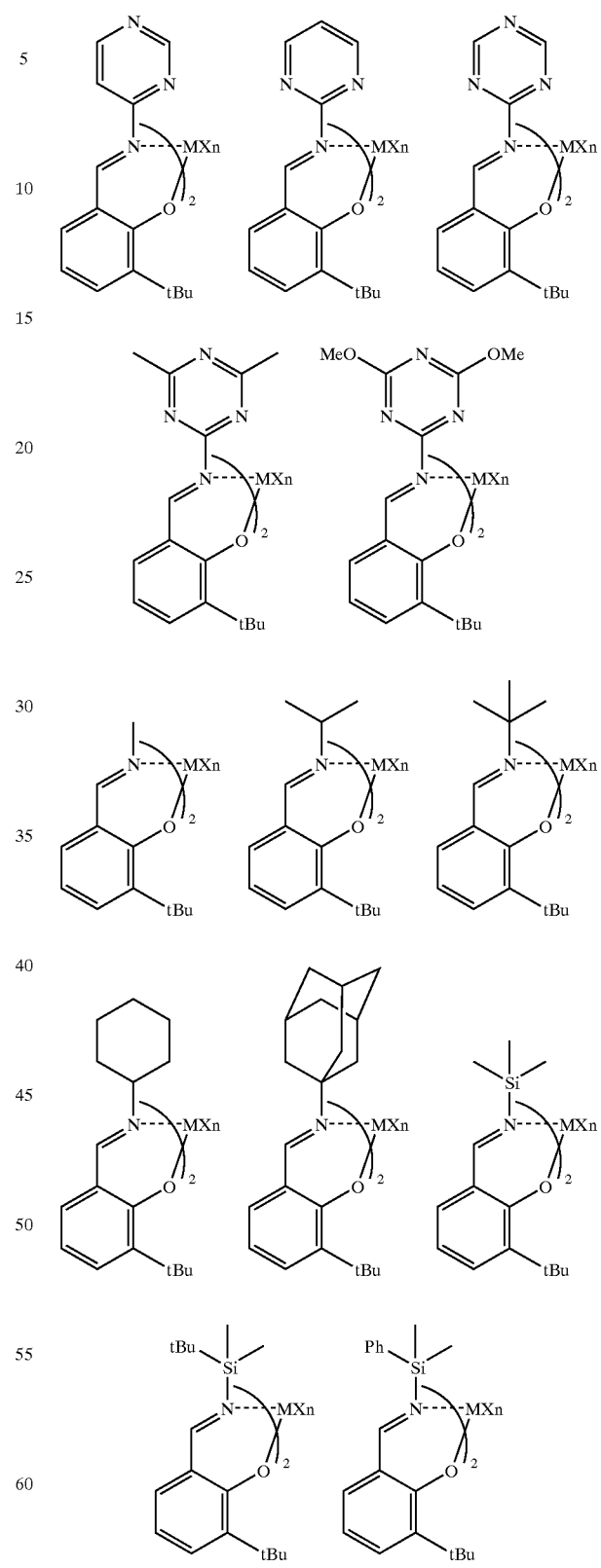

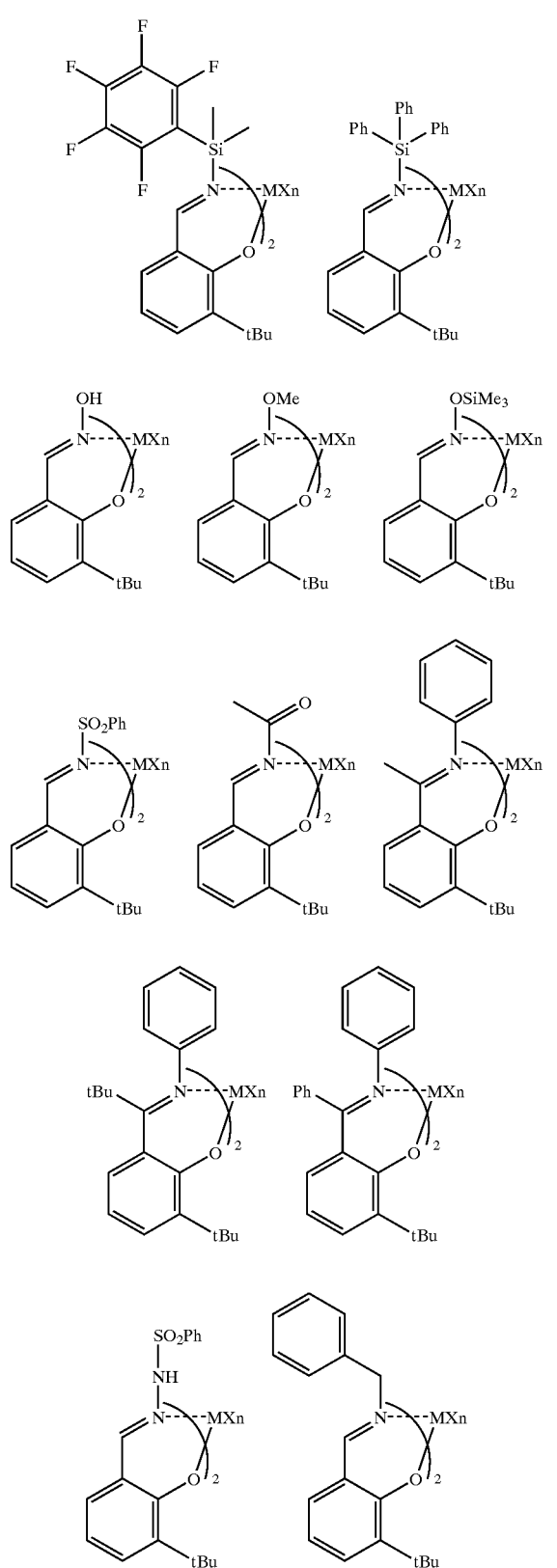
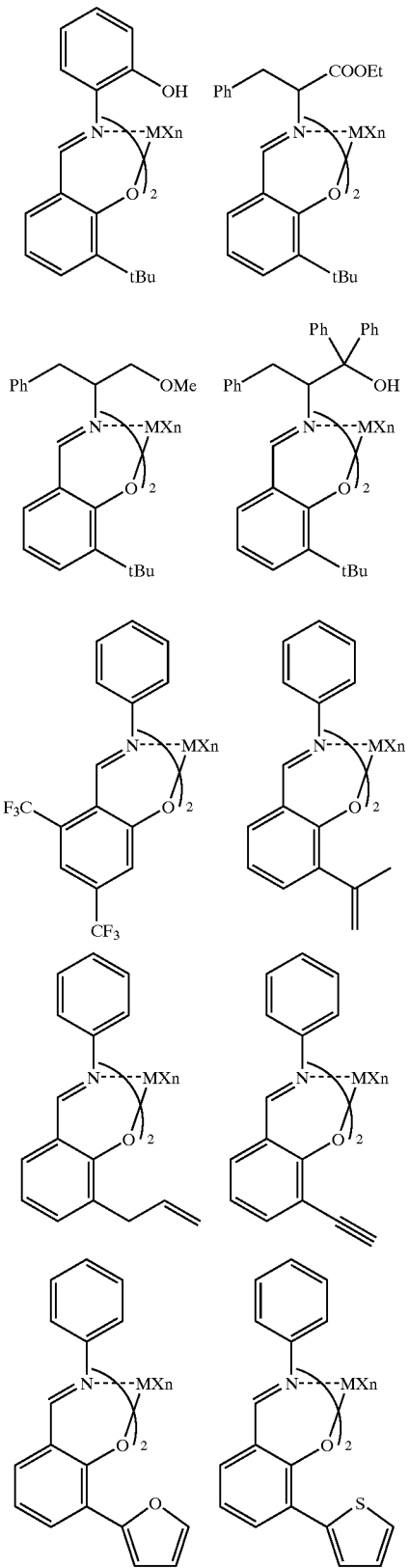

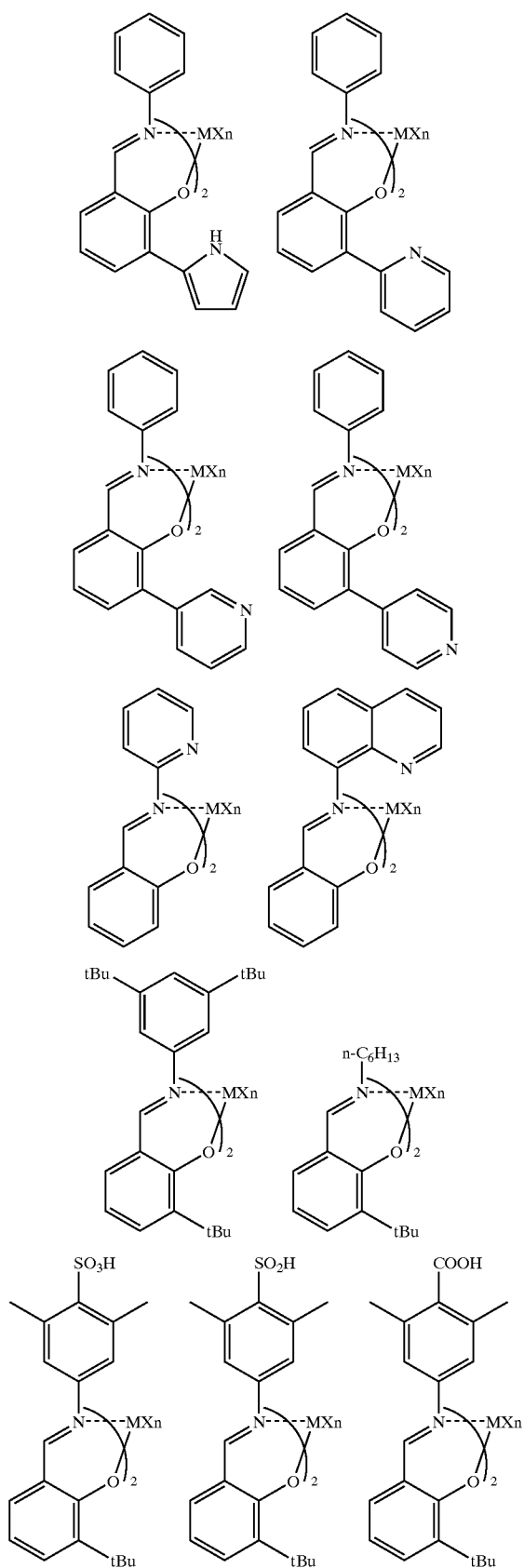
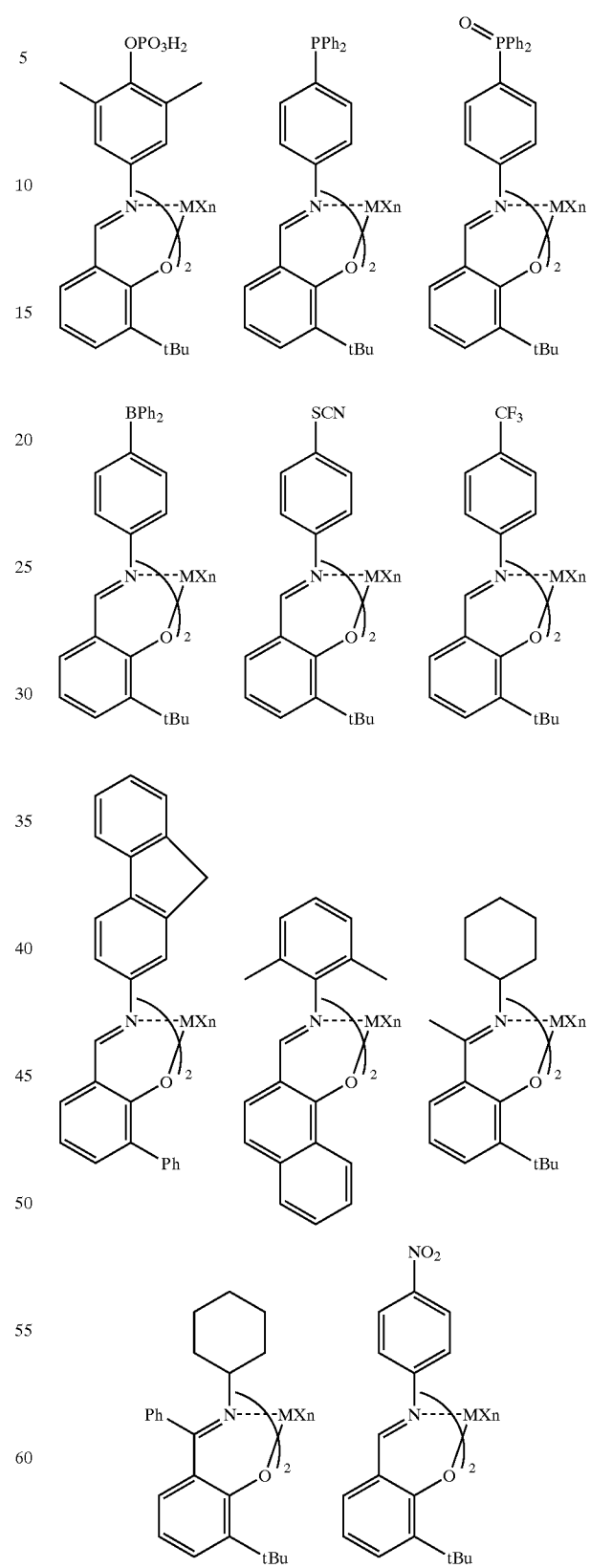

131
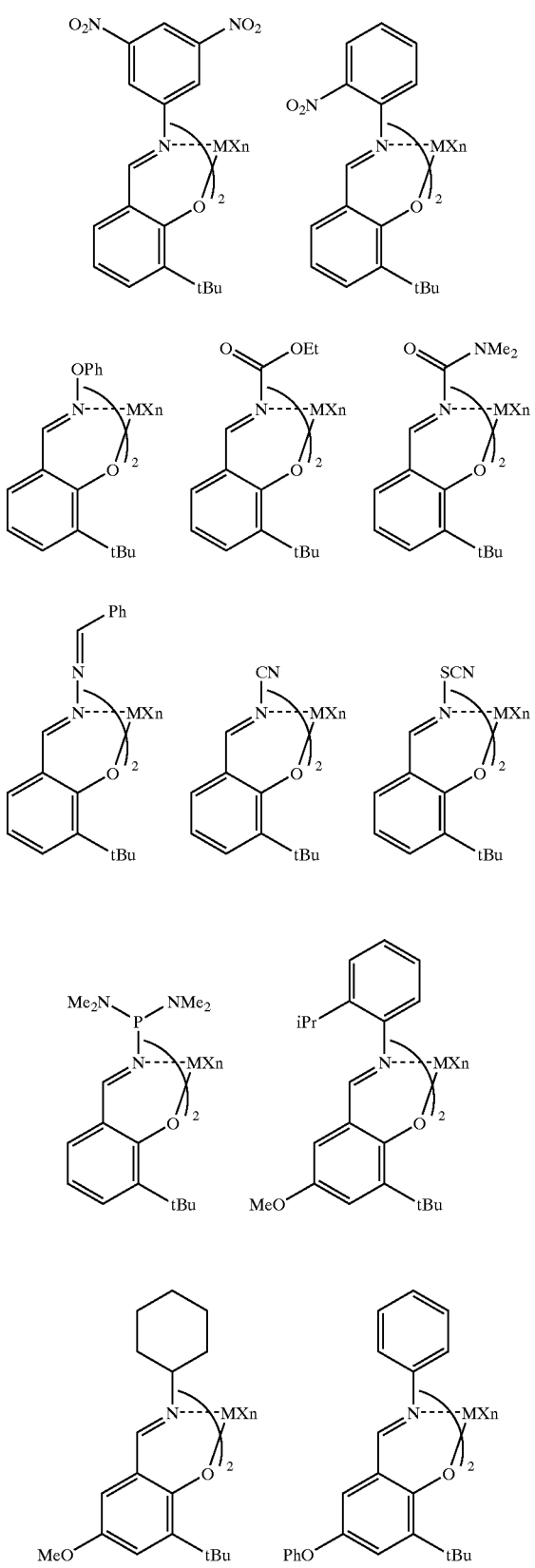
132
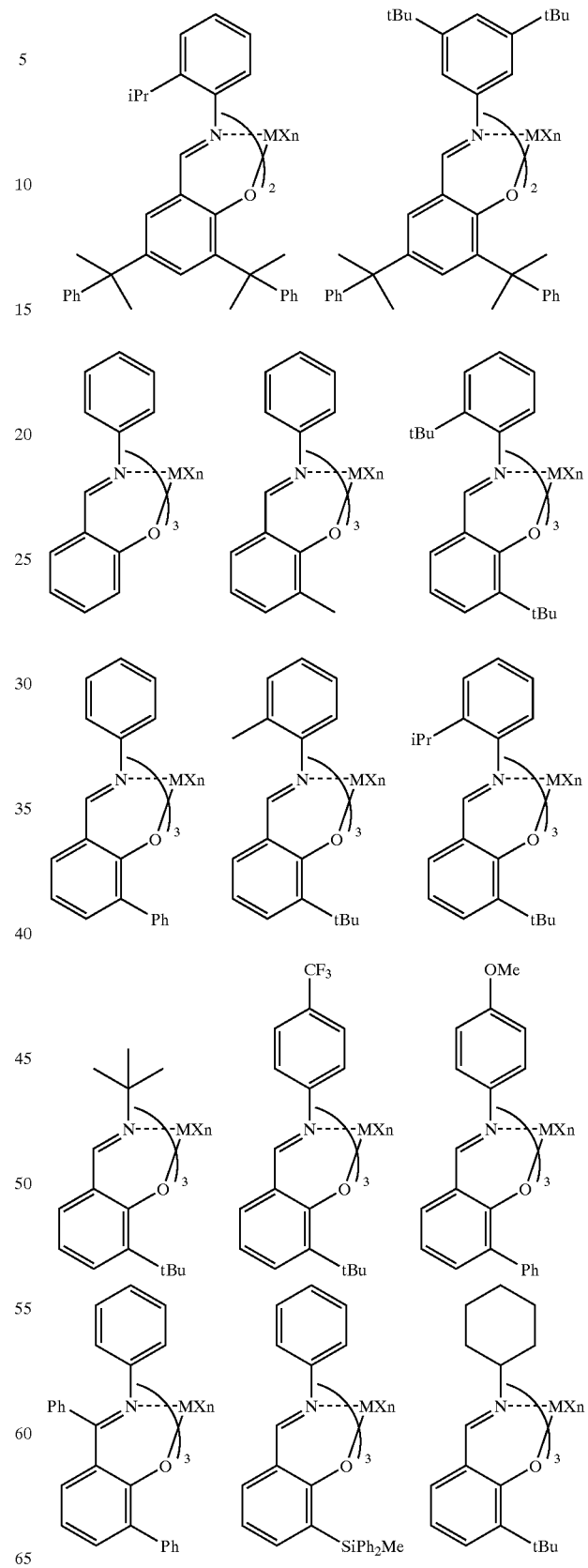

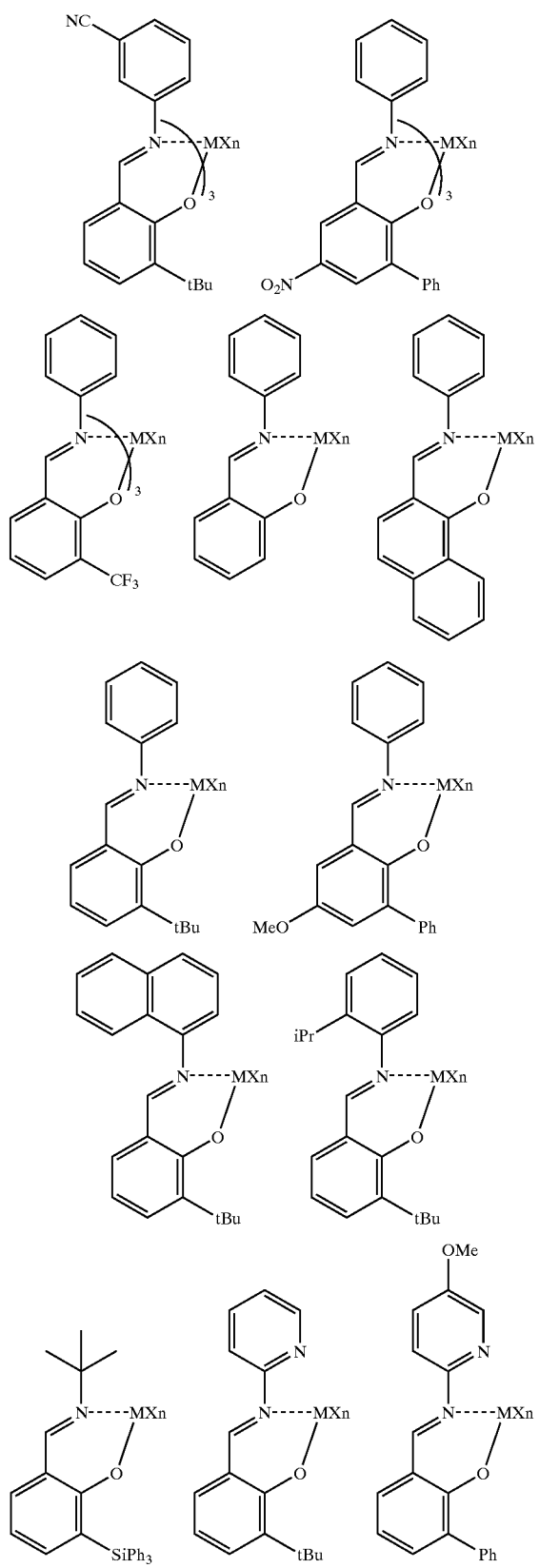
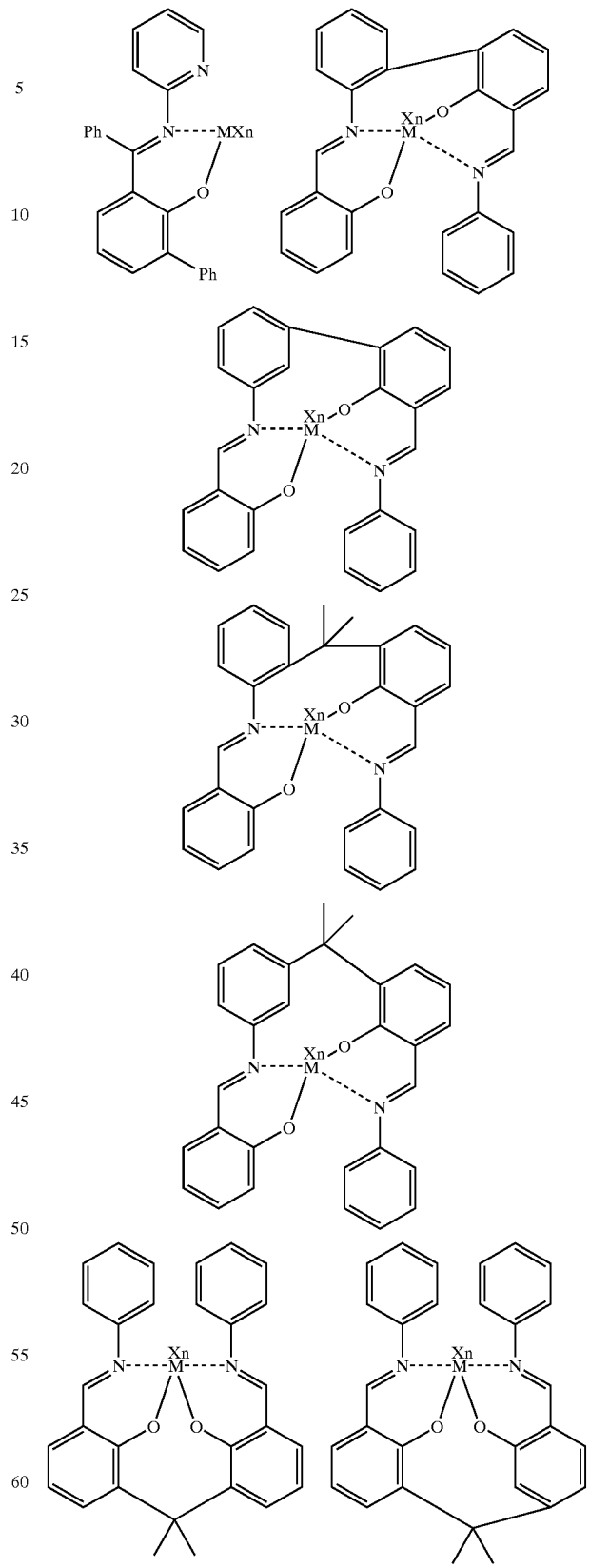

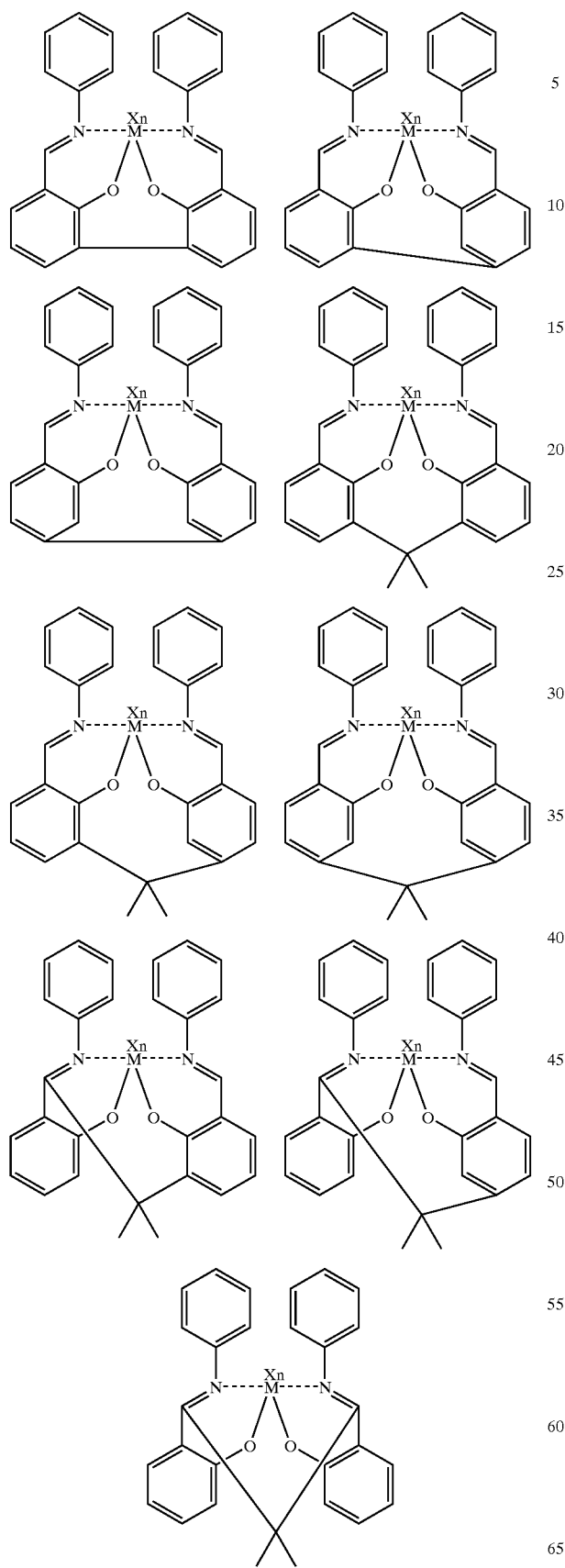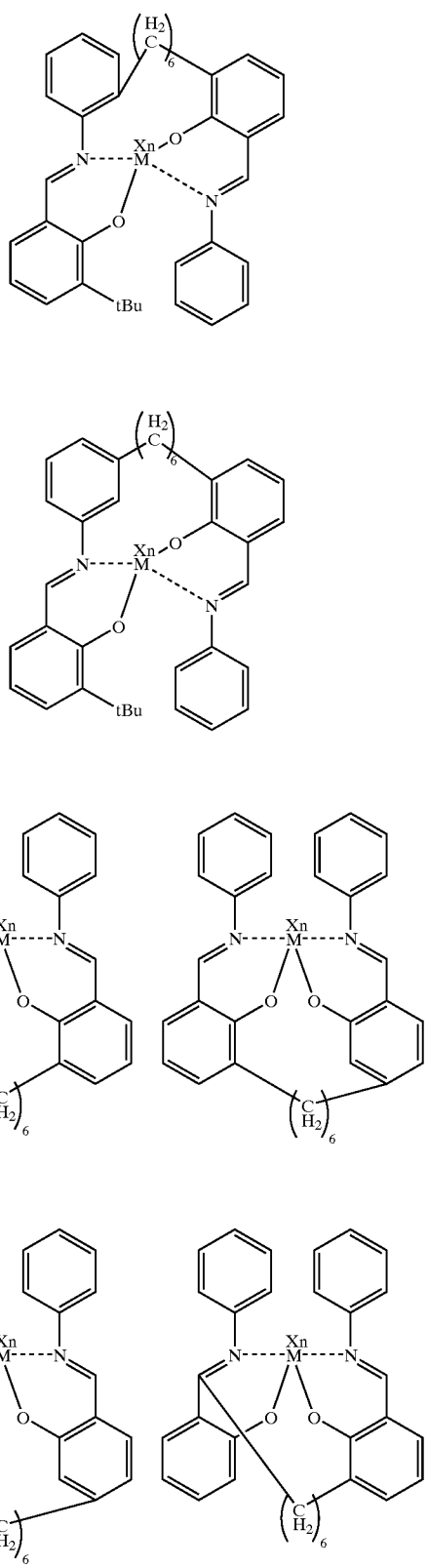

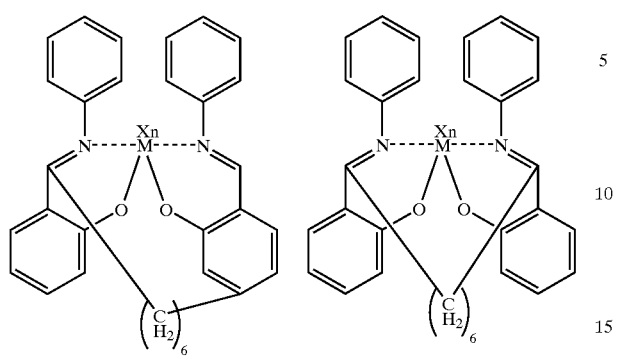
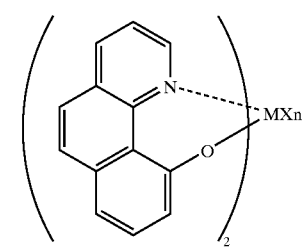
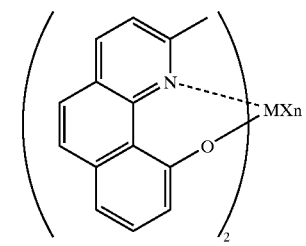
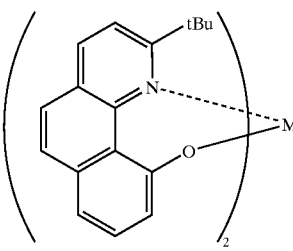
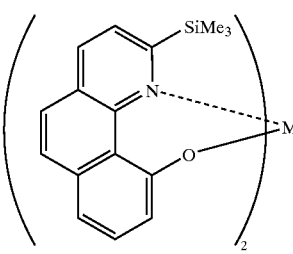
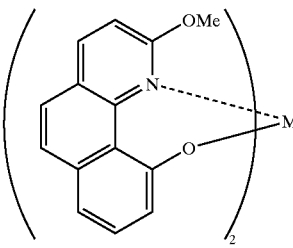
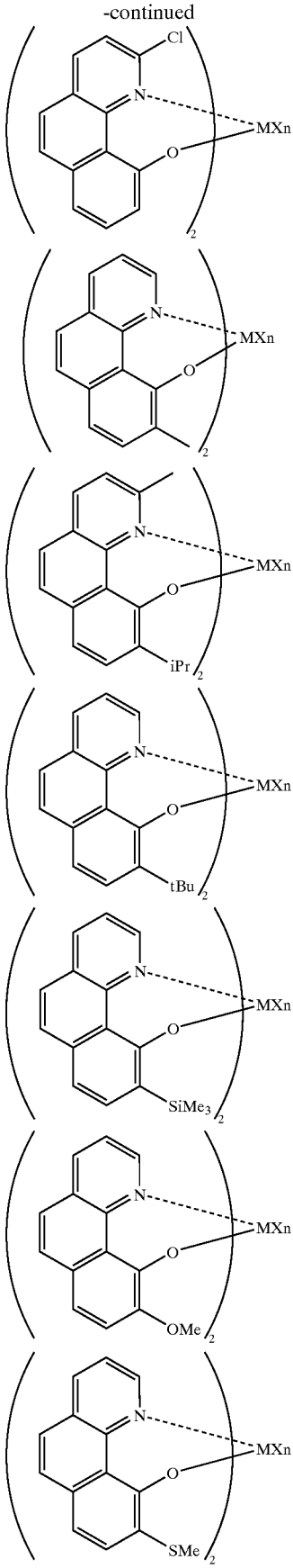

-continued
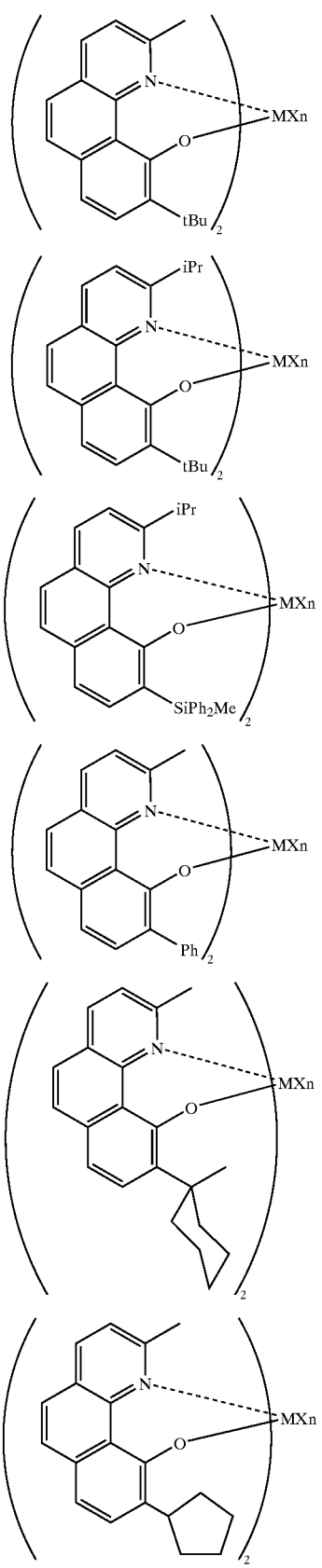
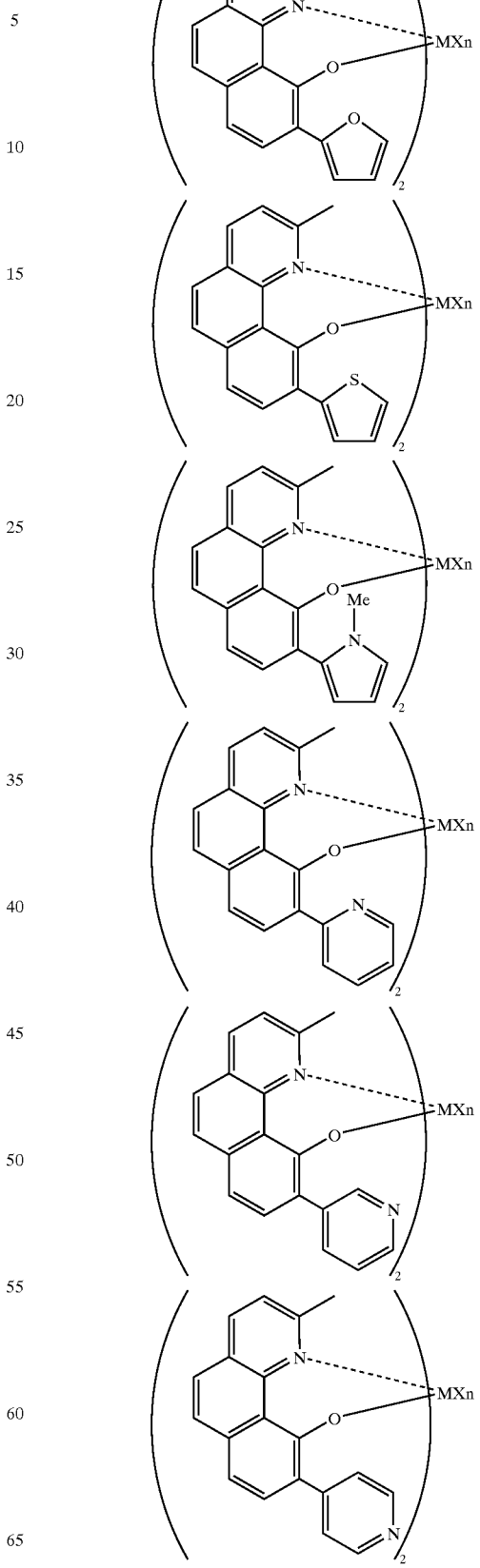

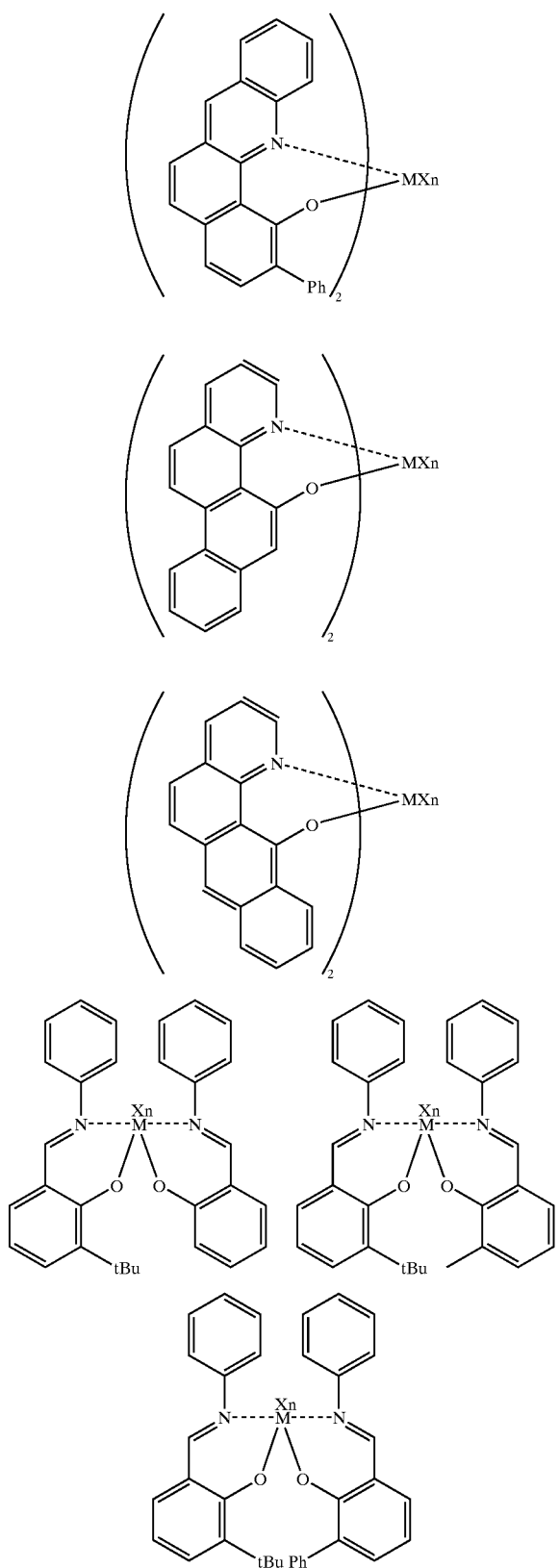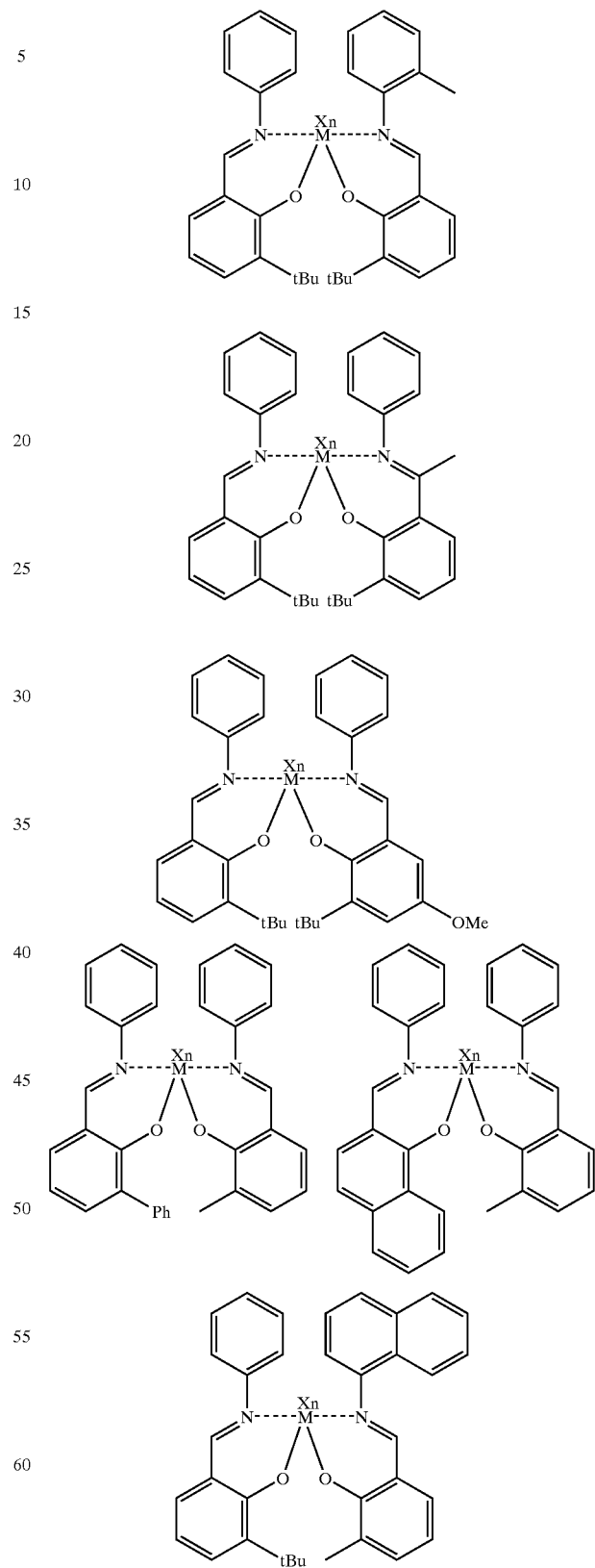

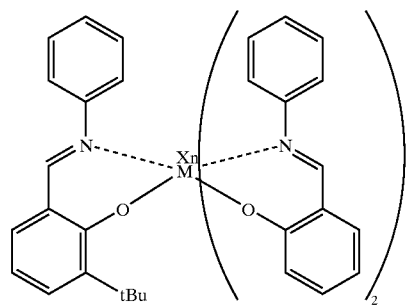
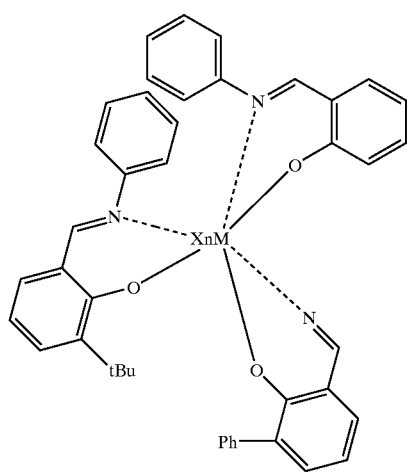
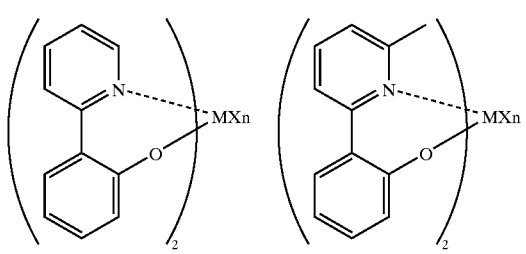
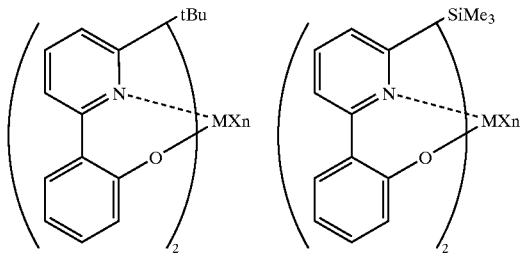
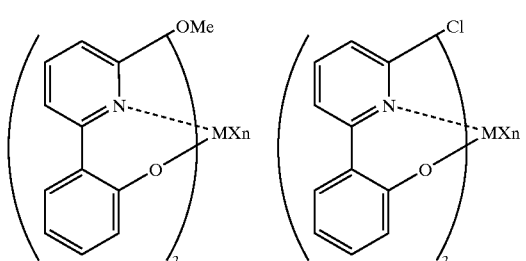
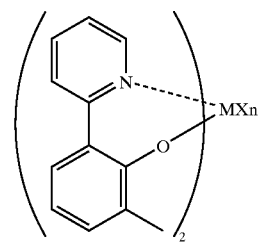
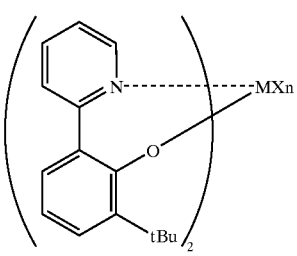
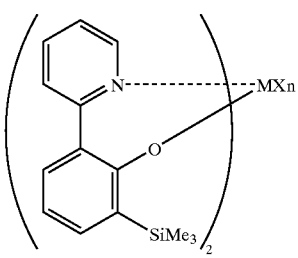
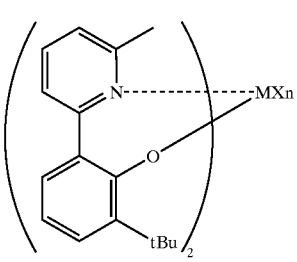
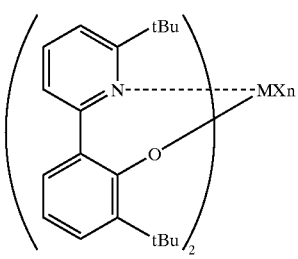
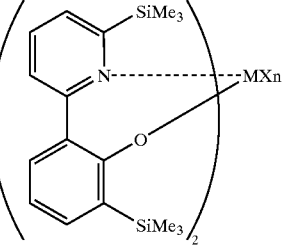

-continued
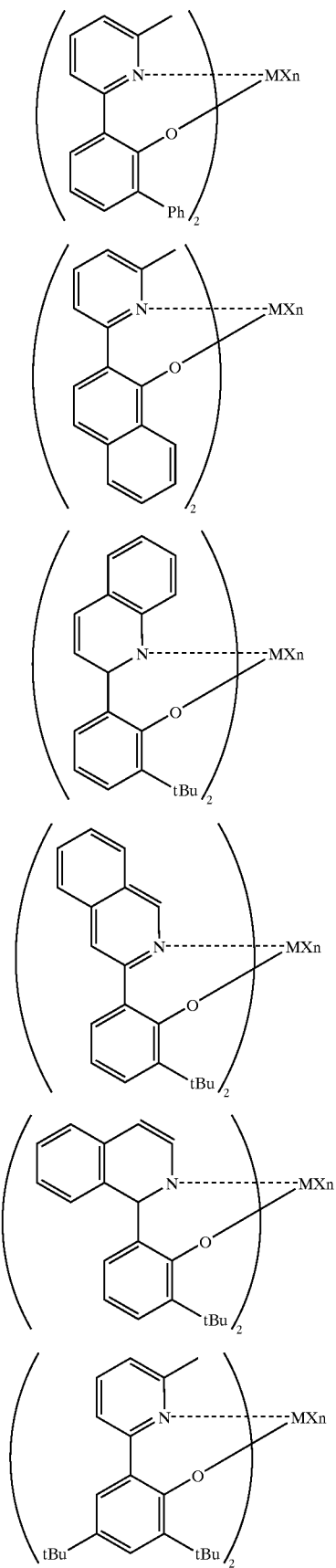
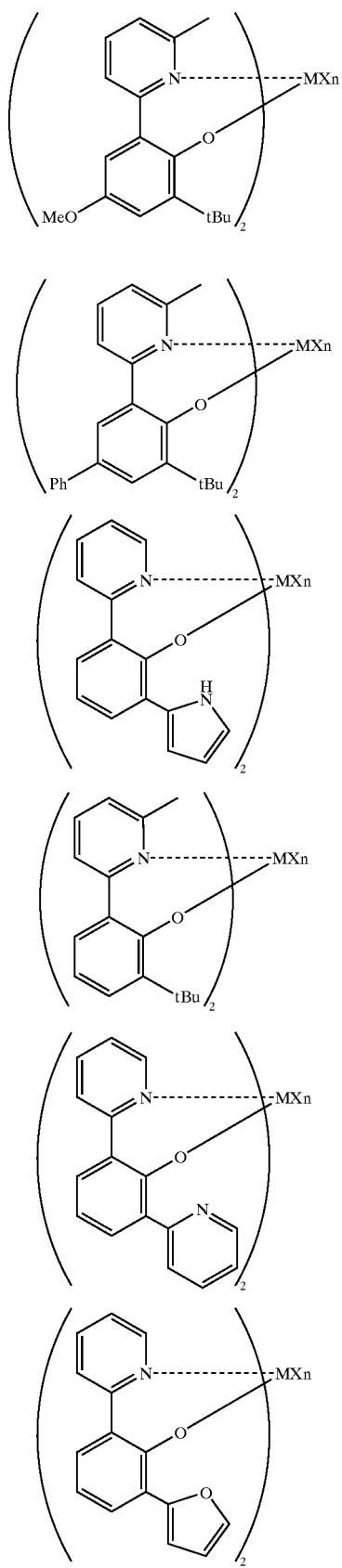

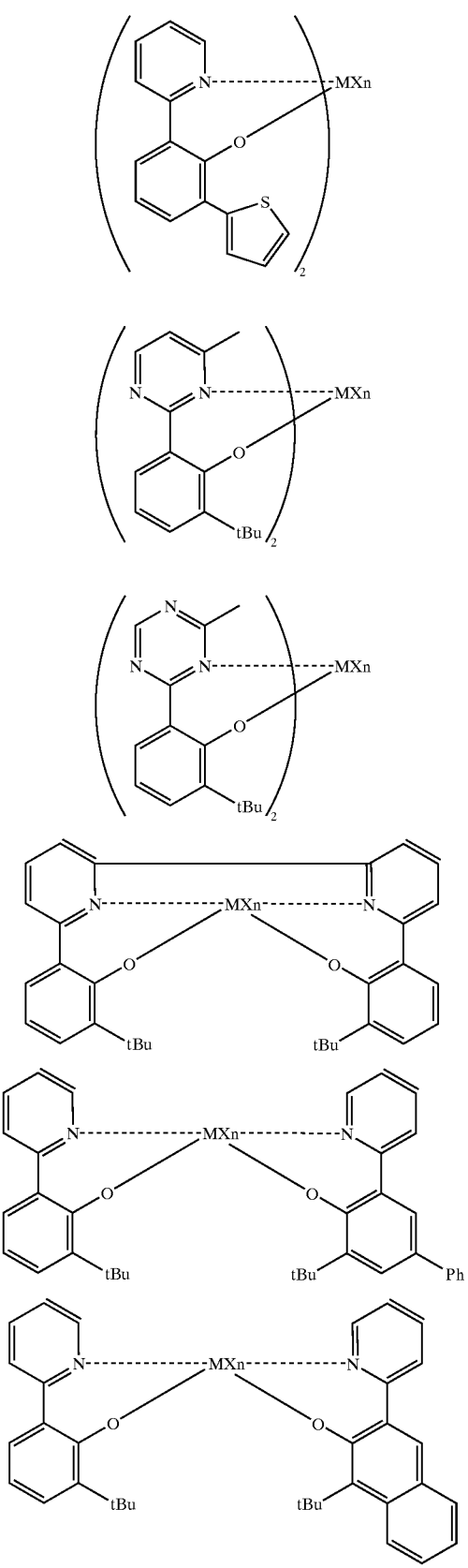
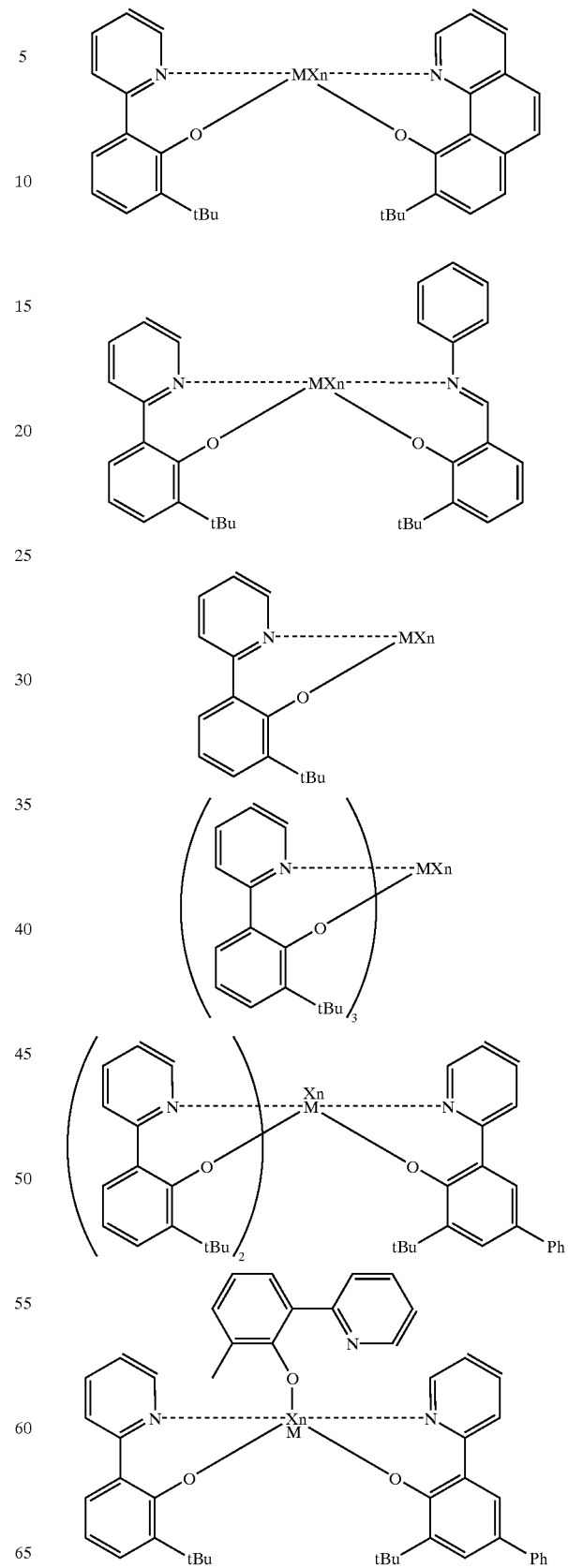

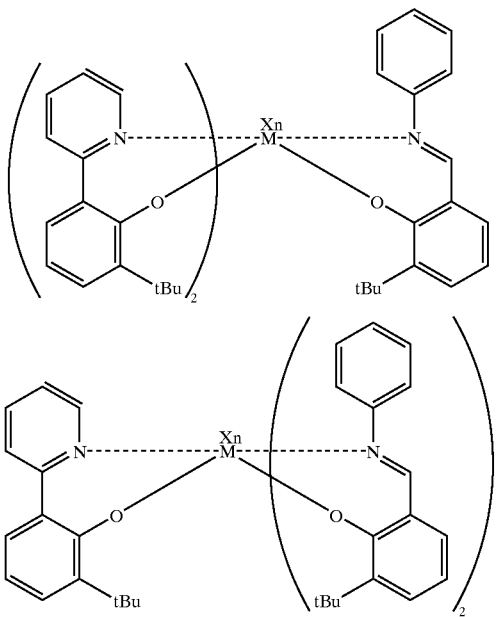
More specific examples of the transition metal compounds are given below:
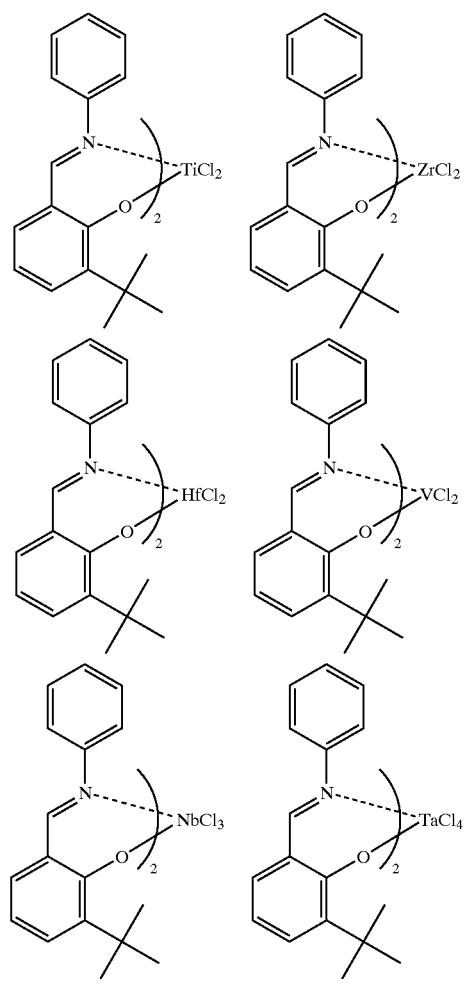
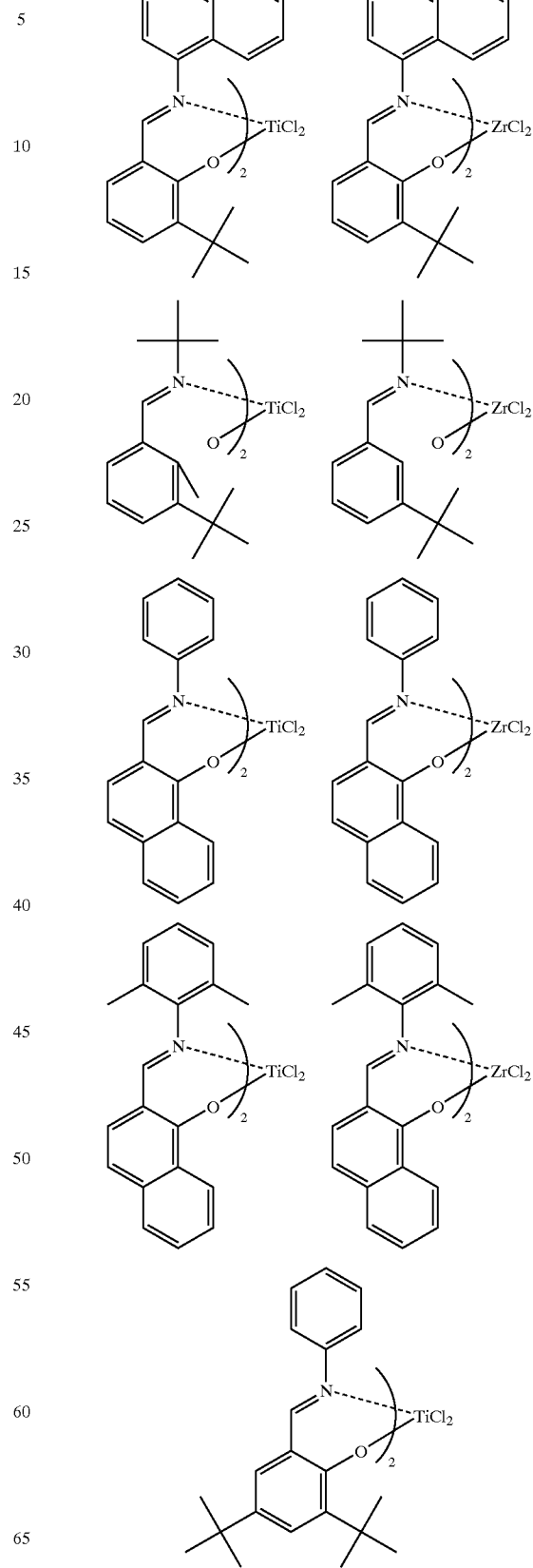

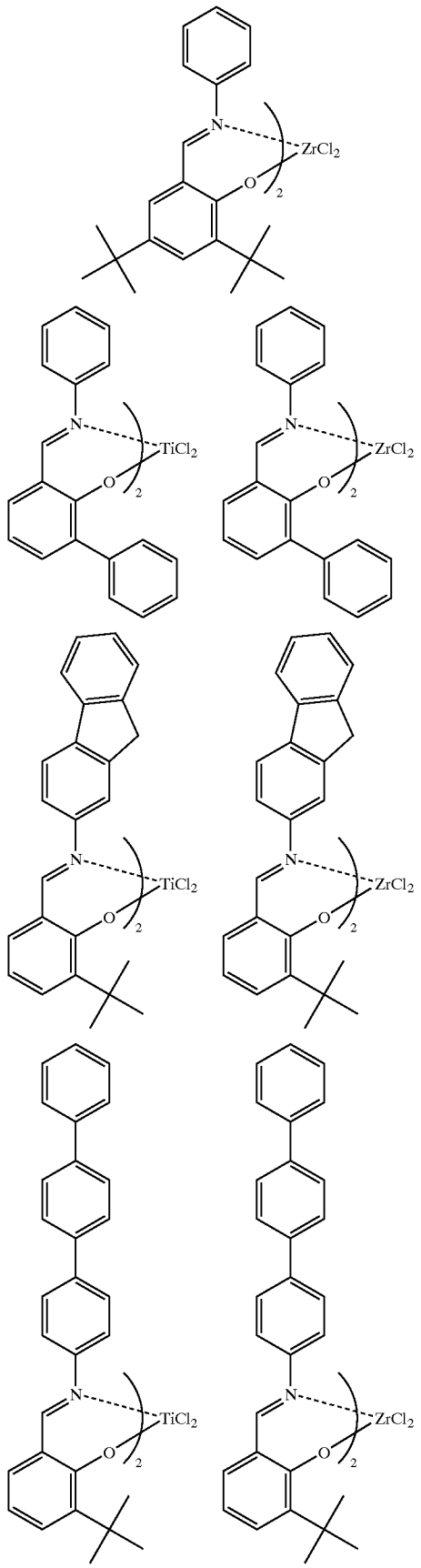
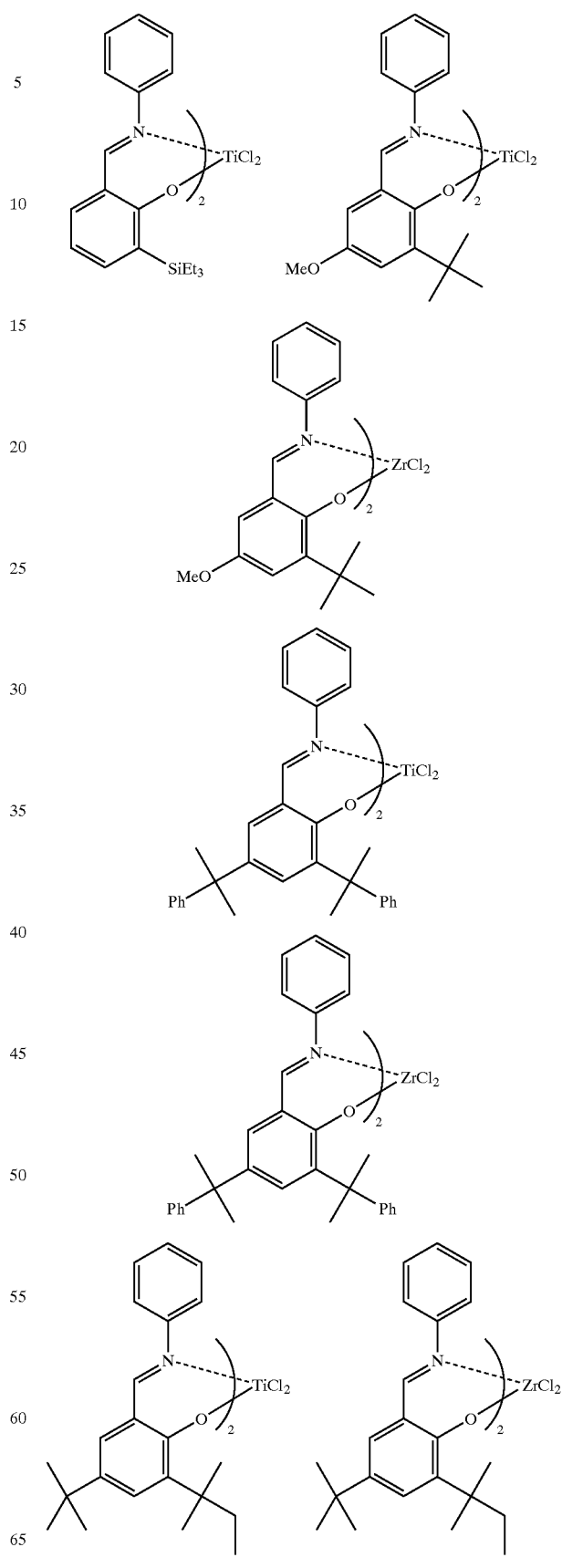

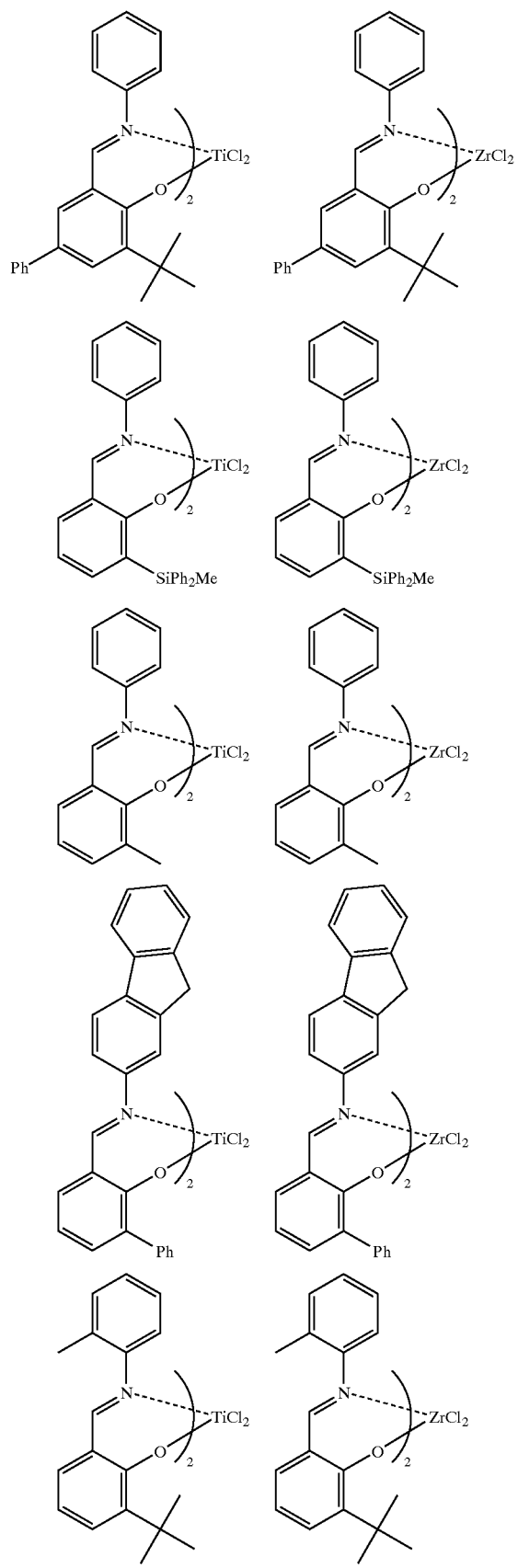
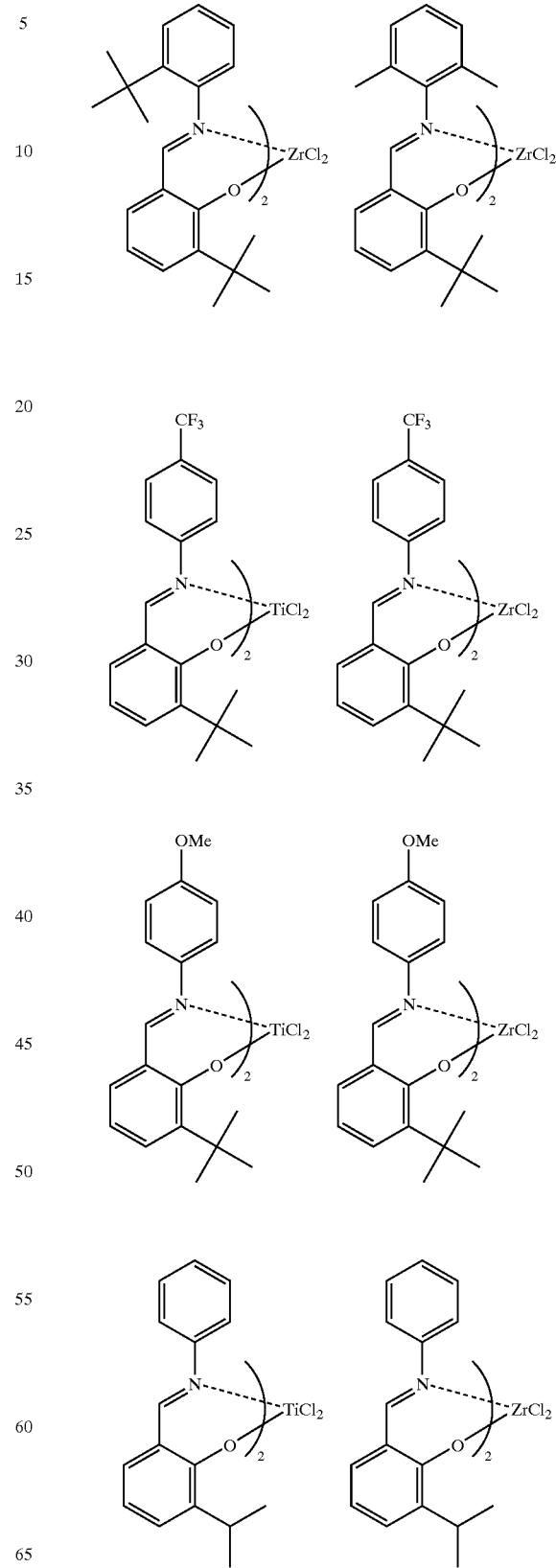

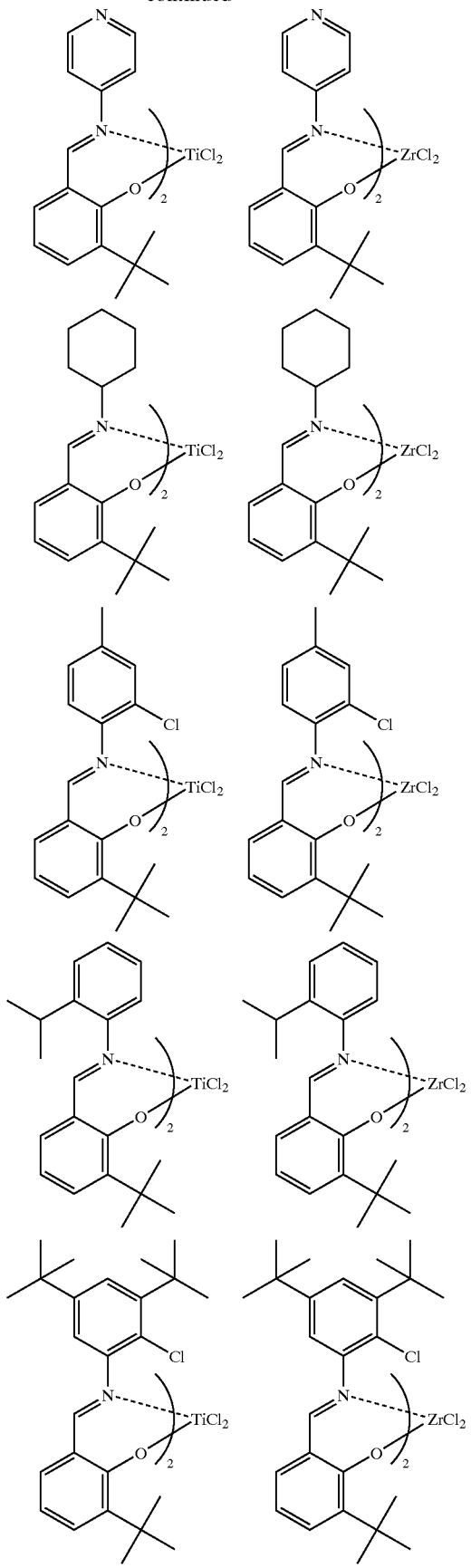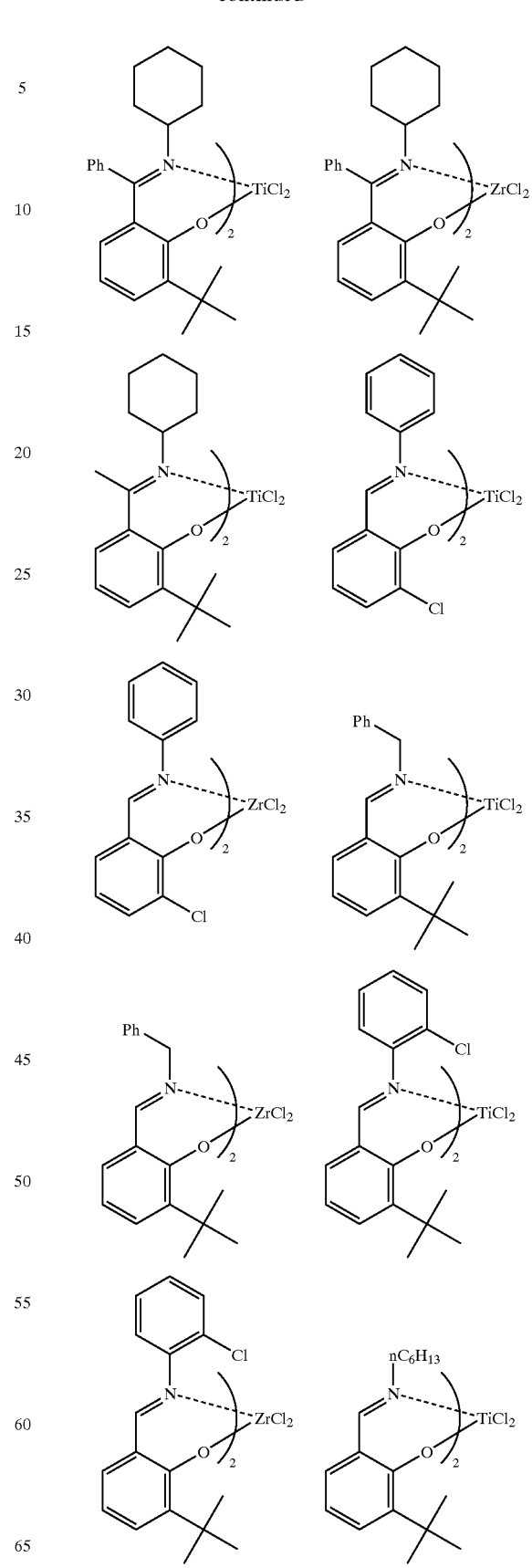

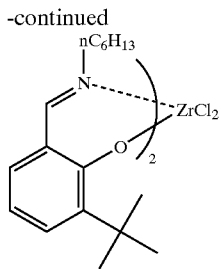

In the above examples, Me denotes a methyl group, Et denotes an ethyl group, iPr denotes an isopropyl group, tBu denotes a tert-butyl group, and Ph denotes a phenyl group.

Next, the transition metal compound represented by the formula (VII) is described.

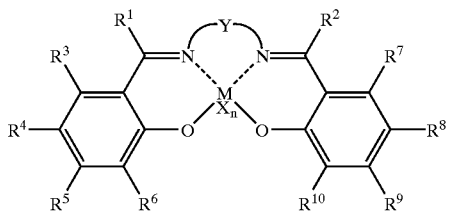

(VII)

In the above formula, M is a transition metal atom of Groups 3 to 11 of the periodic table.

$R^1$ to $R^{10}$ may be the same or different, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to form a ring.

n is a number satisfying the valence of M.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When n is 2 or more, plural X may be the same or different, and may be bonded to form a ring.

Y is a divalent bonding group containing at least one element selected from the group consisting of oxygen, sulfur, carbon, nitrogen, phosphorus, silicon, selenium, tin and boron. When Y is a hydrocarbon group, the hydrocarbon group is a bonding group comprising 3 or more carbon atoms.

It is preferable that in the formula (VII), at least one of $R^6$ and $R^{10}$, particularly each of them, is a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group.

As M, $R^1$ to $R^{10}$ and X in the formula (VII), there can be employed those exemplified with respect to M, $R^1$ to $R^5$ and X in the formula (VI), respectively. Examples of Y are described later.

The transition metal compound represented by the formula (VII) preferably is a transition metal compound represented by the following formula (VII-a).

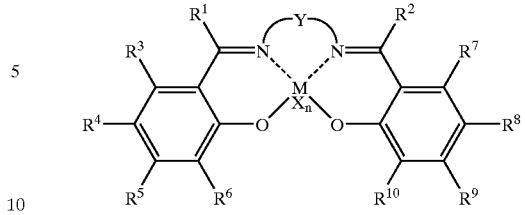

(VII-a)

In the above formula, M is a transition metal atom of Groups 3 to 11, preferably of Group 4 or 5, more preferably of Group 4, in the prioridc table, for example, titanium, zirconium or hafnium, particularly titanium.

$R^1$ to $R^{10}$ may be the same or different, and are each a hydrogen atom, a halogen atom, a hydrocarbon group, a hydrocarbon-substituted silyl group, an alkoxy group, an aryloxy group, an ester group, an amido group, an amino group, a sulfonamido group, a nitrile group or a nitro group. Two or more groups, preferably adjacent groups, of $R^1$ to $R^{10}$ may be bonded to form a ring.

n is a number satisfying the valence of M, usually an integer of 0 to 4, preferably an integer of 1 to 4, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. When n is 2 or more, plural X may be the same or different, and may be bonded to form a ring.

Y is a divalent bonding group containing at least one element selected from the group consisting of oxygen, sulfur, carbon, nitrogen, phosphorus, silicon, selenium, tin and boron. When Y is a hydrocarbon group, the hydrocarbon group is a bonding group comprising 3 or more carbon atoms.

Such a bonding group has a structure wherein the main chain is constituted of preferably 3 or more atoms, more preferably 4 or more atoms, particularly preferably 4 to 10 atoms. The bonding group may have a substituent.

It is preferable that in the formula (VII-a), at least one of $R^6$ and $R^{10}$, particularly each of them, is a halogen atom, a hydrocarbon group, a hydrocarbon-substituted silyl group, an alkoxy group, an aryloxy group, an ester group, an amido group, an amino group, a sulfonamido group, a nitrile group or a nitro group.

Examples of X and $R^1$ to $R^{10}$ in the formula (VII-a) include those described with respect to X and $R^1$ to $R^{10}$ in the formula (VII), respectively. X is particularly preferably a halogen atom, a hydrocarbon group of 1 to 20 carbon atoms or a sulfonato group. When n is 2 or more, the ring formed by bonding two or more of X may be an aromatic ring or an alicyclic ring.

Examples of the divalent bonding groups Y include chalcogen atoms, such as —O—, —S— and —Se—; nitrogen- or phosphorus-containing groups, such as —NH—, —N(CH$_3$)—, —PH— and —P(CH$_3$)—; silicon-containing groups, such as —SiH$_2$— and —Si(CH$_3$)$_2$—; tin-containing groups, such as —SnH$_2$— and —Sn(CH$_3$)$_2$—; and boron-containing groups, such as —BH—, —B(CH$_3$)— and —BF—. Examples of the hydrocarbon groups include saturated hydrocarbon groups of 3 to 20 carbon atoms, such as —(CH$_2$)$_4$—, —(CH$_2$)$_5$— and —(CH$_2$)$_6$—; cyclic saturated hydrocarbon groups, such as cyclohexylidene and cyclohexylene; these saturated hydrocarbon groups which are partially substituted with hydrocarbon groups of 1 to 10 carbon atoms, halogens such as fluorine, chlorine and bromine, and hetero atoms such as oxygen, sulfur, nitrogen, phosphorus, silicon, selenium, tin and boron; residues of cyclic unsaturated hydrocarbon compounds having 6 to 20 carbon atoms (e.g., benzene, naphthalene and anthracene); and residues of heterocyclic compounds having 3 to 20 carbon atoms and containing hetero atoms (e.g., pyridine, quinoline, thiophene and furan).

Listed below are examples of the transition metal compounds represented by the formula (VII), but not limited thereto.

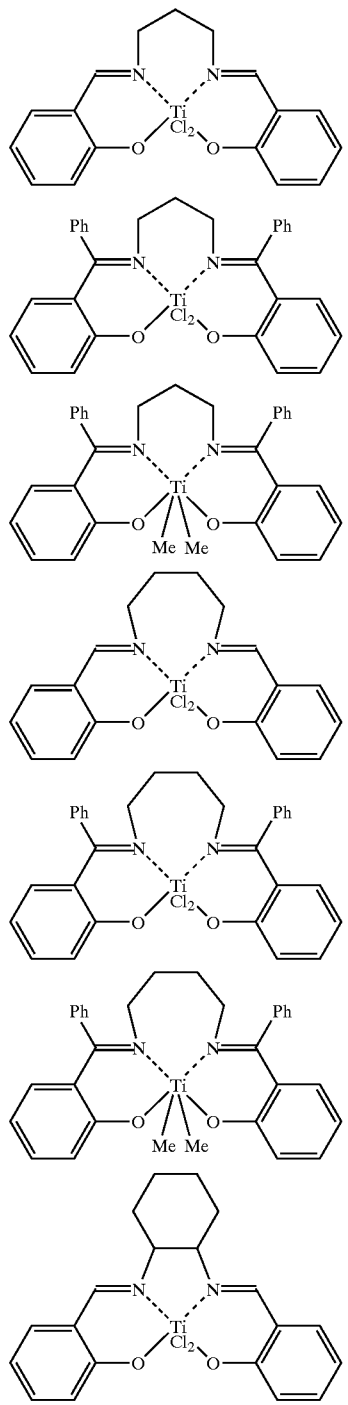

-continued

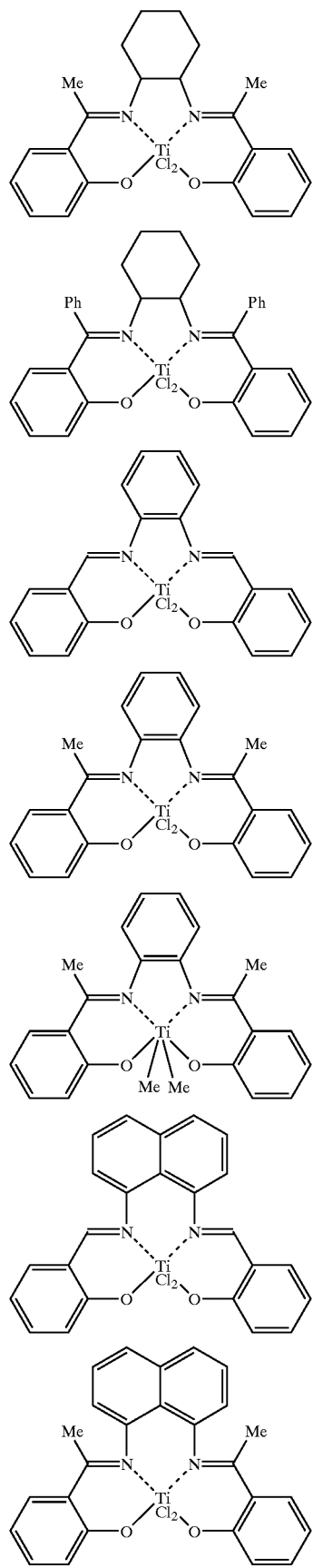

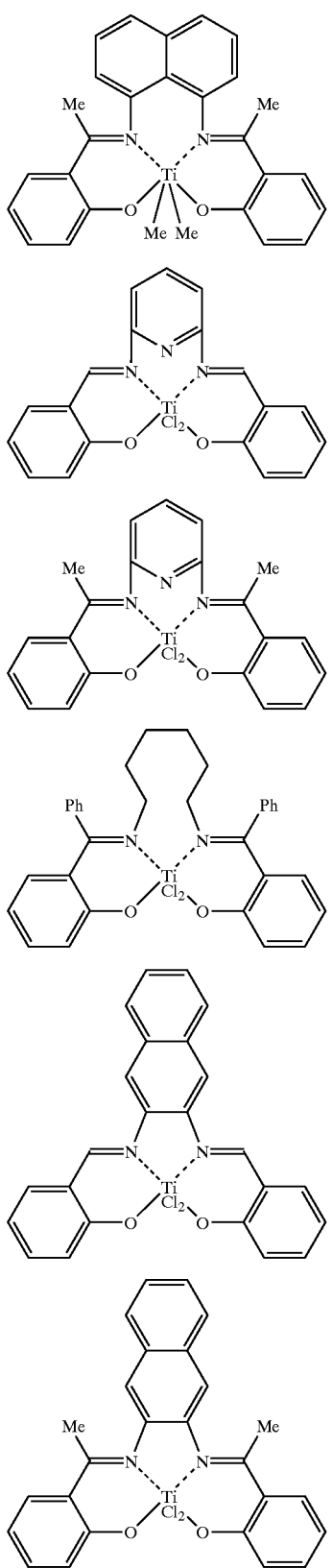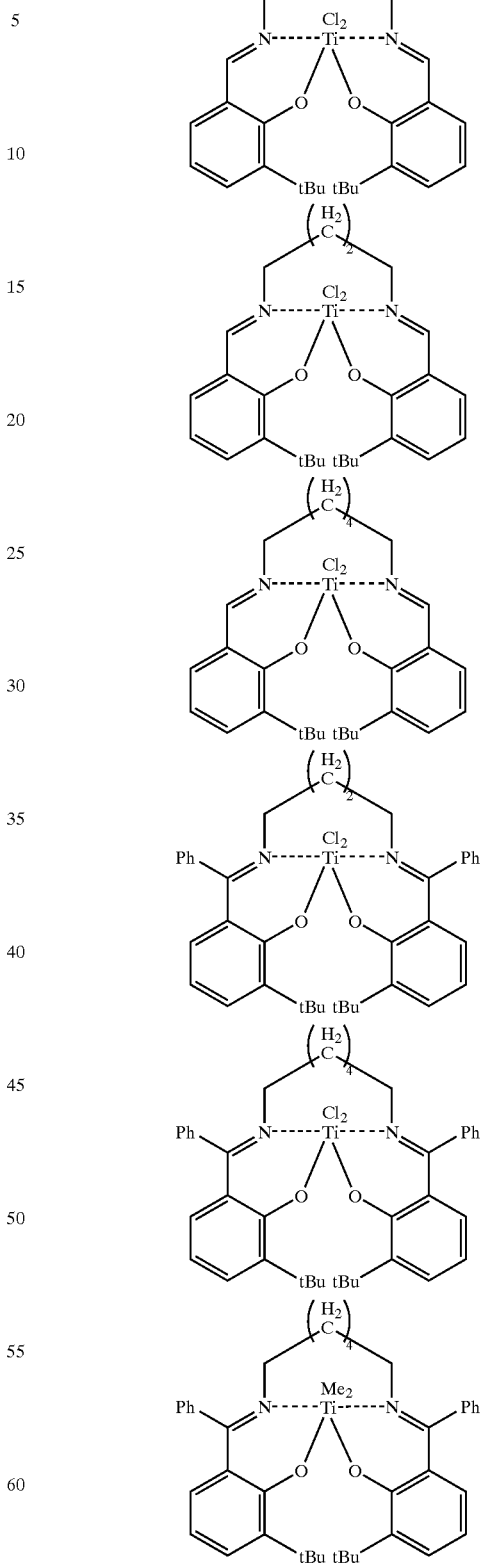

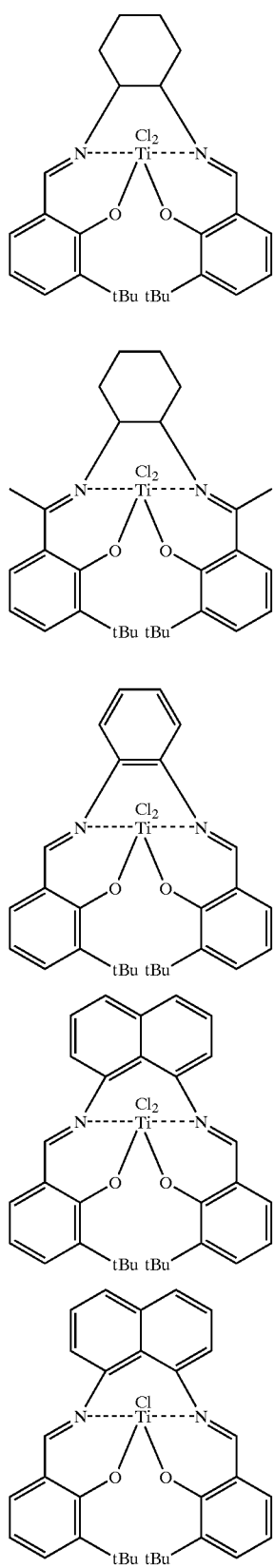

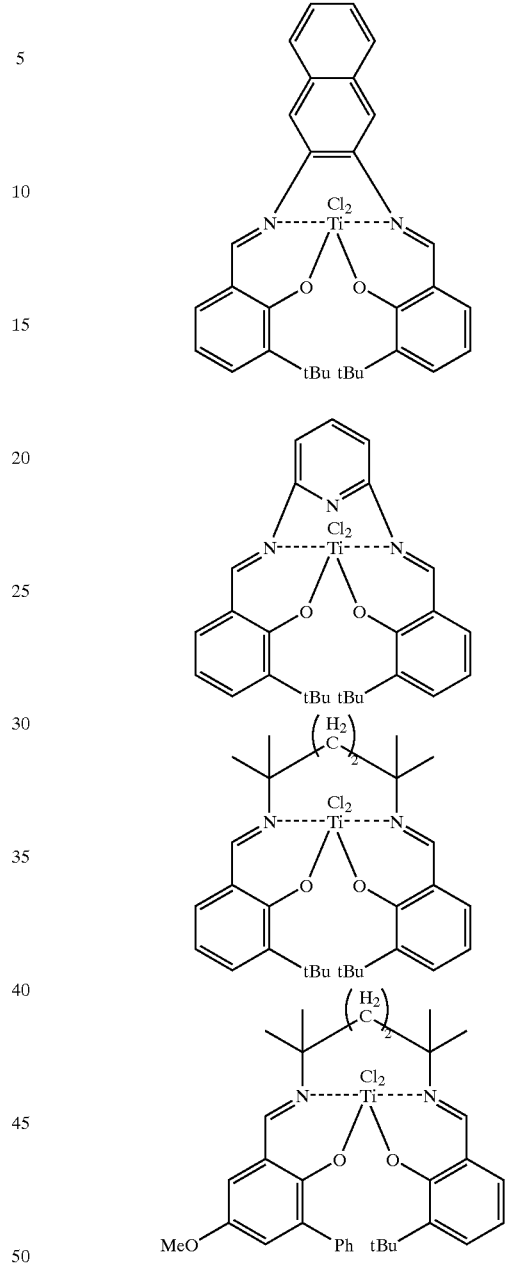

In the above examples, Me denotes a methyl group, Ph denotes a phenyl group, and tBu denotes a tert-butyl group.

In the present invention, transition metal compounds wherein titanium is replaced with a metal other than titanium, such as zirconium or hafnium, in the above compounds are also employable.

The transition metal compounds represented by the formulae (VI) and (VII) can be prepared without specific limitation, and they can be prepared by, for example, the following process.

In the first place, the ligand for constituting the transition metal compound according to the invention can be obtained by reacting a salicylaldehyde compound with a primary amine compound of the formula $R^1$—$NH_2$ ($R^1$ has the same meaning as defined for $R^1$ in the formula (VI) and (VII)), e.g., an aniline compound or an alkylamine compound. In more detail, the both starting materials are dissolved in a solvent, for example, any of those commonly used for such reactions, preferably an alcohol solvents, such as methanol or ethanol or hydrocarbon solvents, such as toluene. The resulting solution is stirred for about 1 to 48 hours at room temperature to reflux temperature to obtain the corresponding ligand in a high yield.

In the synthesis of the ligand compound, catalysts, for example, acid catalysts, such as formic acid, acetic acid or toluenesulfonic acid may be used. In order to proceed the reaction, it is also possible to use anhydrating agents, such as molecular sieves, magnesium sulfate or sodium sulfate, or to perform dehydration by the Dien and Stark method.

In the next place, the ligand obtained above can be reacted with a compound containing the transition metal M, to synthesize the corresponding transition metal compound. In more detail, the resulting ligand is dissolved in a solvent, and if necessary, is contacted with a base to prepare a phenoxide salt, followed by mixing with a metallic compound such as a metallic halide or a metallic alkylate at a low temperature, and stirring for about 1 to 48 hours at −78° C. to room temperature or under reflux. Any solvents commonly used in such reactions are employable, and preferable are polar solvents such as ethers, e.g., tetrahydrofuran (THF), and hydrocarbon solvents such as toluene. Preferred examples of the bases used for preparing the phenoxide salt include, but not limited to, metallic salts such as lithium salts (e.g., n-butyllithium) and sodium salts (e.g., sodium hydride), and organic bases such as triethylamine and pyridine.

Depending on the properties of the compound, the step of preparing a phenoxide salt may be omitted and the ligand can be directly reacted with the metallic compound to synthesize the corresponding transition metal compound.

It is possible to replace the metal atom M in the synthesized transition metal compound with another transition metal in a conventional manner. Further, any one of $R^1$ to $R^6$ which is hydrogen can be substituted with a substituent other than hydrogen at any synthesis steps.

Next, the transition metal compound represented by the formula (VIII) is described.

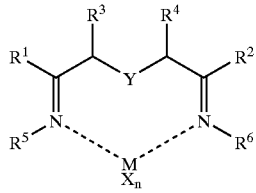

(VIII)

In the above formula, M is a transition metal atom of Groups 8 to 11, preferably of Group 8 or 9, of the periordic table, such as iron, ruthenium, osmium, cobalt, rhodium or iridium, particularly preferably iron or cobalt.

$R^1$ to $R^4$ may be the same or different, and are each a hydrogen atom, a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group.

Examples of the halogen atoms include fluorine, chlorine, bromine and iodine.

Examples of the hydrocarbon groups include, but not limited to, straight-chain or branched alkyl groups of 1 to 20 carbon atoms, such as methyl, ethyl, n-propyl, isopropyl, n-butyl, isobutyl, sec-butyl, tert-butyl, pentyl and hexyl; aryl groups of 6 to 20 carbon atoms, such as phenyl, naphthyl and anthryl; and substituted aryl groups which are substituted with 1 to 5 substituents such as alkyl groups of 1 to 20 carbon atoms; cycloalkyl groups, such as cyclopentyl, cyclohexyl, norbornyl and adamantyl; alkenyl groups, such as vinyl, propenyl and cyclohexenyl; and arylalkyl groups, such as benzyl, phenylethyl and phenylpropyl.

Examples of the halogenated hydrocarbon groups include groups wherein the above-exemplified hydrocarbon groups are substituted with halogens, but not limited thereto.

Examples of the heterocyclic compounds include nitrogen-containing heterocyclic compounds, oxygen-containing heterocyclic compounds and sulfur-containing heterocyclic compounds, but not limited thereto.

Examples of the oxygen-containing groups, the nitrogen-containing groups, the boron-containing groups, the sulfur-containing groups and the phosphorus-containing groups includem those previously described with respect to $R^1$ to $R^6$ in the formula (VI), respectively, but not limited thereto.

Examples of the silicon-containing groups include hydrocarbon-substituted silyl groups, silyl ether groups of the hydrocarbon-substituted silyls, silicon-substituted alkyl groups and silicon-substituted aryl groups, but not limited to thereto.

Examples of the germanium-containing groups include hydrocarbon-substituted germyl groups, germyl ether groups of the hydrocarbon-substituted germyls, germanium-substituted alkyl groups and germanium-substituted aryl groups, but not limited thereto.

Examples of the tin-containing groups include hydrocarbon-substituted stannyl groups, stannyl ether groups of the hydrocarbon-substituted stannyls, tin-substituted alkyl groups and tin-substituted aryl groups, but not limited thereto.

Of the oxygen-containing groups, preferred examples f the alkoxy groups include methoxy, ethoxy, n-propoxy, isopropoxy, n-butoxy, isobutoxy and tert-butoxy; referred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred example of the amino groups include dimethylamino, ethylmethylamino and diphenylamino; preferred examples of the amido groups include acetamido, N-methylacetamido and N-methylbenzamido; preferred examples of the imido groups include acetimido and benzimido; and preferred examples of the imino groups include methylimino, ethylimino, propylimino, butylimino and phenylimino.

Of the sulfur-containing groups, preferred examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of the sulfonester groups include methylsulfonato, ethylsulfonato and phenylsulfonato; and preferred examples of the sulfonamido groups include phenylsulfonamido, N-methylsulfonamido and N-methyl-p-toluenesulfonamido.

$R^1$ and $R^5$, $R^2$ and $R^6$, $R^1$ and $R^3$, $R^2$ and $R^4$, and $R^3$ and $R^4$ may be bonded to form an aromatic ring, an alicyclic ring, or a heterocyclic ring containing a hetero atom such as a nitrogen atom, a sulfur atom or an oxygen atom. These rings may have a substituent.

n is a number satisfying the valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. Examples of X include those previously described with respect to L in the formula (I). When n is 2 or more, plural groups indicated by X may be the same or different.

Of these, preferable is a halogen atom, a hydrocarbon group of 1 to 20 carbon atoms or a sulfinato group.

Y is an atom of Group 15 or 16 of the periodic table, specifically a nitrogen atom, a phosphorus atom, an arsenic atom, an antimony atom, an oxygen atom, a sulfur atom, a selenium atom, a tellurium atom or the like, preferably a nitrogen atom, an oxygen atom or a sulfur atom.

In the present invention, the imine compound represented by the formula (VIII) is preferably a transition metal imine compound represented by the following formula (VIII-a).

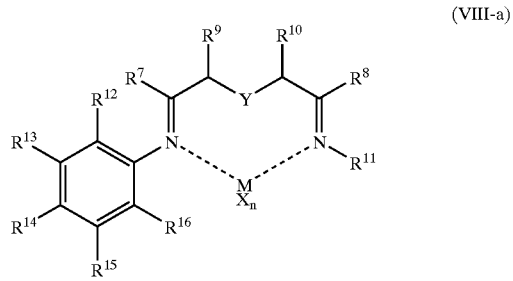

(VIII-a)

In the above formula, M is a transition metal atom of Groups 8 to 11 of the periodic table, preferably a transition metal atom of Group 8 or 9, such as iron, ruthenium, osmium, cobalt, rhodium or iridium, particularly preferably iron or cobalt.

$R^7$ to $R^{10}$ may be the same or different, and are each a hydrogen atom, a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group. Examples of $R^7$ to $R^{10}$ include those described above with respect to $R^1$ to $R^4$ in the formula (VIII), respectively.

$R^{11}$ is a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group. Examples of $R^{11}$ include those described above with respect to $R^1$ to $R^4$ in the formula (VIII).

$R^7$ and $R^9$, $R^8$ and $R^{10}$, $R^8$ and $R^{11}$, and $R^9$ and $R^{10}$ may be bonded to form an aromatic ring, an alicyclic ring, or a heterocylic ring containing a hetero atom such as a nitrogen atom, a sulfur atom or an oxygen atom. These rings may have a substituent.

$R^{12}$ to $R^{16}$ may be the same or different, and are each a hydrogen atom, a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group. Examples of $R^{12}$ and $R^{16}$ include those described above with respect to $R^1$ to $R^4$ in the formula (VIII), respectively.

At least one of $R^{12}$ to $R^{16}$ is a group other than a hydrogen atom. Two or more groups of $R^{12}$ to $R^{16}$ may be bonded to form a ring. Preferably, the adjacent groups may be bonded to form an alicyclic ring, an aromatic ring or a heterocyclic ring containing a hetero atom such as a nitrogen atom. These rings may further have a substituent.

n is a number satisfying the valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. When n is 2 or more, plural X may be the same or different. Examples of X include the same atoms and groups those previously described.

Y is an atom of Group 15 or 16 of the periodic table, specifically a nitrogen atom, a phosphorus atom, an arsenic atom, an antimony atom, an oxygen atom, a sulfur atom, a selenium atom, a tellurium atom or the like, preferably a nitrogen atom, an oxygen atom or a sulfur atom.

In the present invention, the imine compound represented by the formula (VIII) is more preferably a transition metal imine compound represented by the following formula (VIII-b).

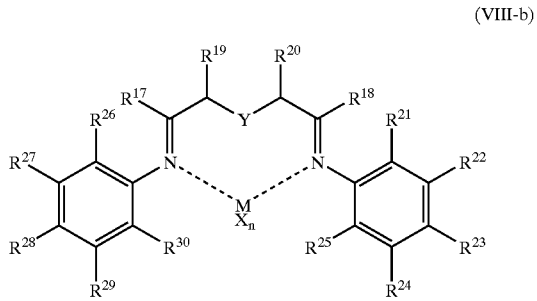

(VIII-b)

In the above formula, M is a transition metal atom of Groups 8 to 11 of the periodic table, preferably a transition metal atom of Group 8 or 9, such as iron, ruthenium, osmium, cobalt, rhodium or iridium, particularly preferably iron or cobalt.

$R^{17}$ to $R^{20}$ may be the same or different, and are each a hydrogen atom, a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group. Examples of $R^{17}$ to $R^{20}$ include those previously described with respect to $R^1$ to $R^4$ in the formula (VIII).

$R^{17}$ and $R^{19}$, $R^{18}$ and $R^{20}$, and $R^{19}$ and $R^{20}$ may be bonded to form an aromatic ring, an alicyclic ring, or a heterocyclic ring containing a hetero atom such as a nitrogen atom, a sulfur atom or an oxygen atom. These rings may further have a substituent.

$R^{21}$ to $R^{30}$ may be the same or different, and are each a hydrogen atom, a halogen atom, a hydrocarbon group, a halogenated hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group.

At least one of $R^{21}$ to $R^{25}$ is a group other than a hydrogen atom, and at least one of $R^{26}$ to $R^{30}$ is a group other than a hydrogen atom. Two or more groups of $R^{21}$ to $R^{25}$ may be bonded to form a ring, and two or more groups of $R^{26}$ to $R^{30}$ may be bonded to form a ring. Preferably, the adjacent groups may be bonded to form an alicyclic ring, an aromatic ring or a heterocyclic ring containing a hetero atom such as a nitrogen atom. These rings may further have a substituent.

n is a number satisfying the valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. When n is 2 or more, plural X may be the same or different. Examples of X include those previously described.

Y is an atom of Group 15 or 16 of the periodic table, specifically a nitrogen atom, a phosphorus atom, an arsenic atom, an antimony atom, an oxygen atom, a sulfur atom, a selenium atom, a tellurium atom or the like, preferably a nitrogen atom, an oxygen atom or a sulfur atom.

Listed below are examples of the transition metal imine compounds represented by the formulas (VIII), (VIII-a) and (VIII-b), but not limited thereto.

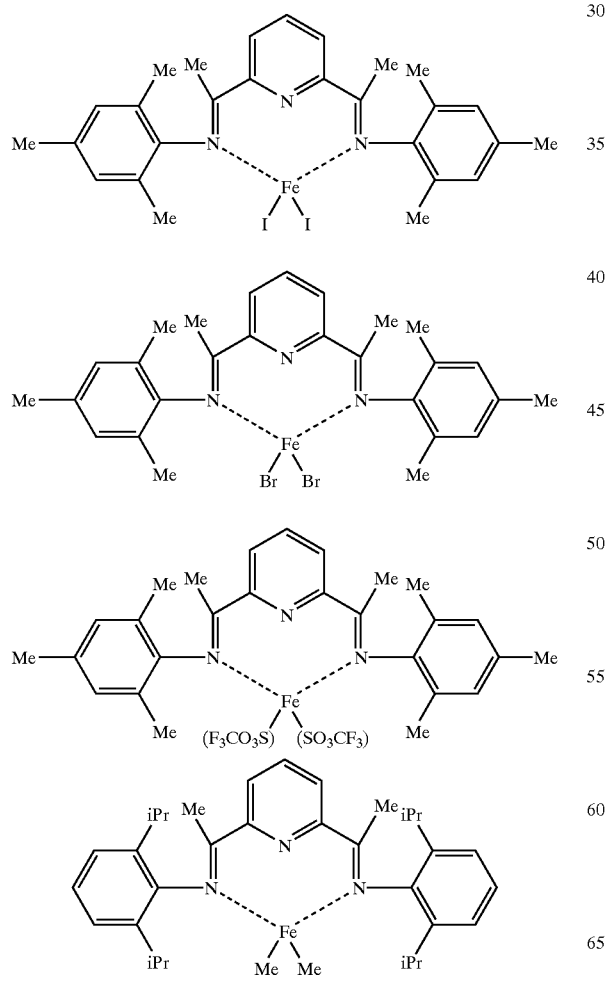

-continued

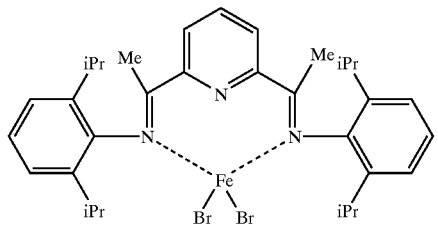

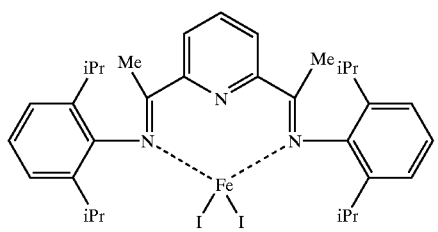

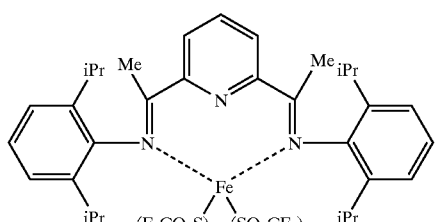

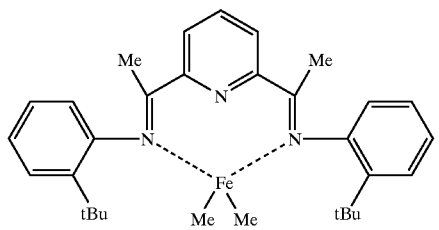

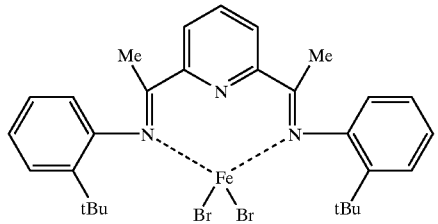

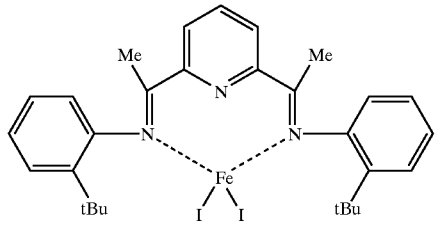

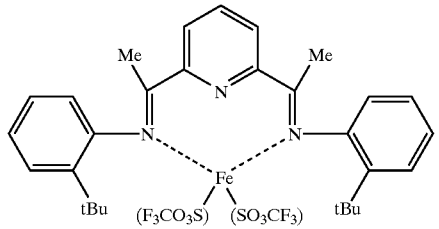

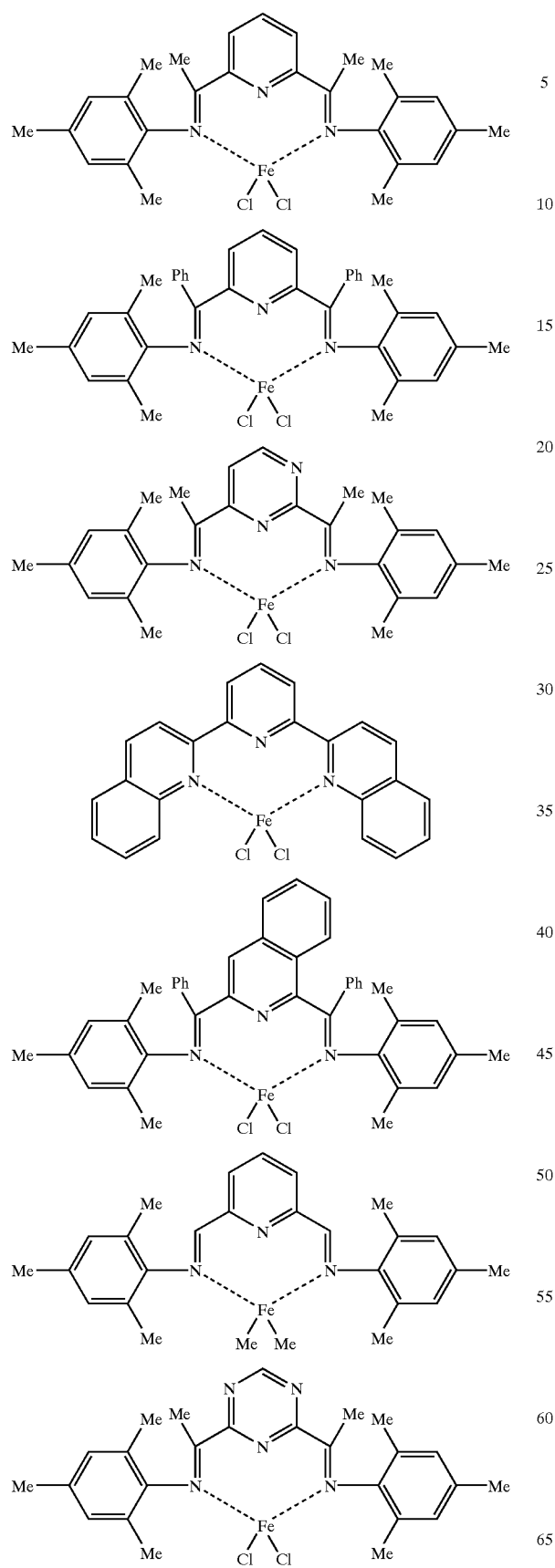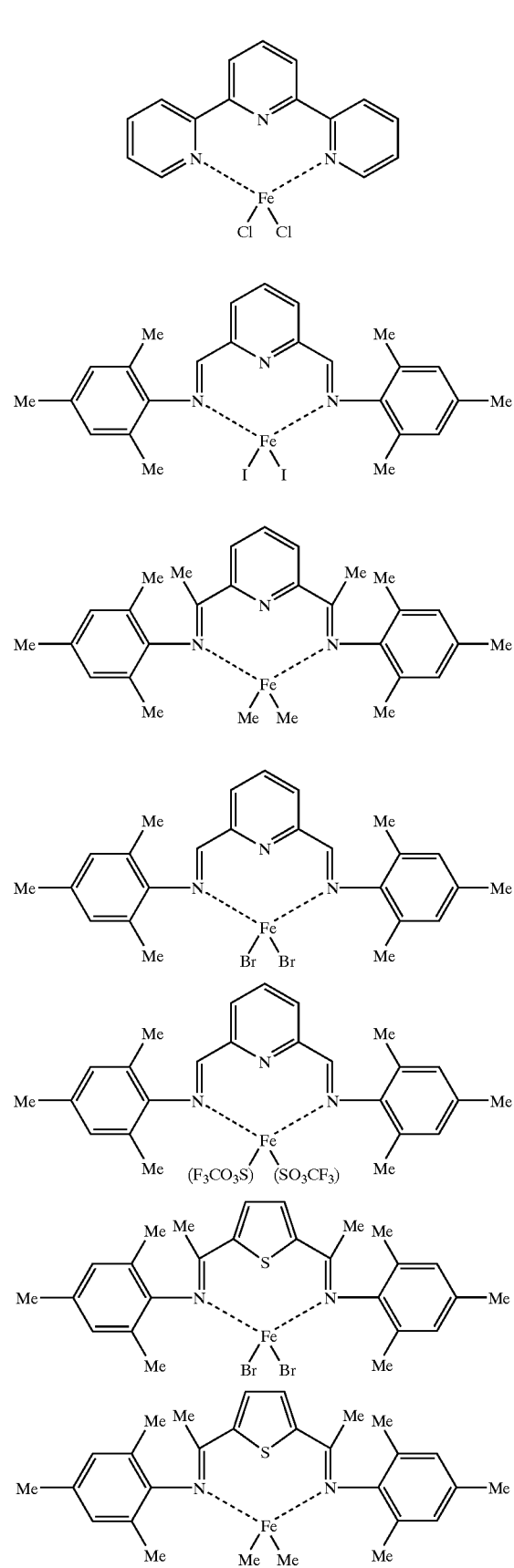

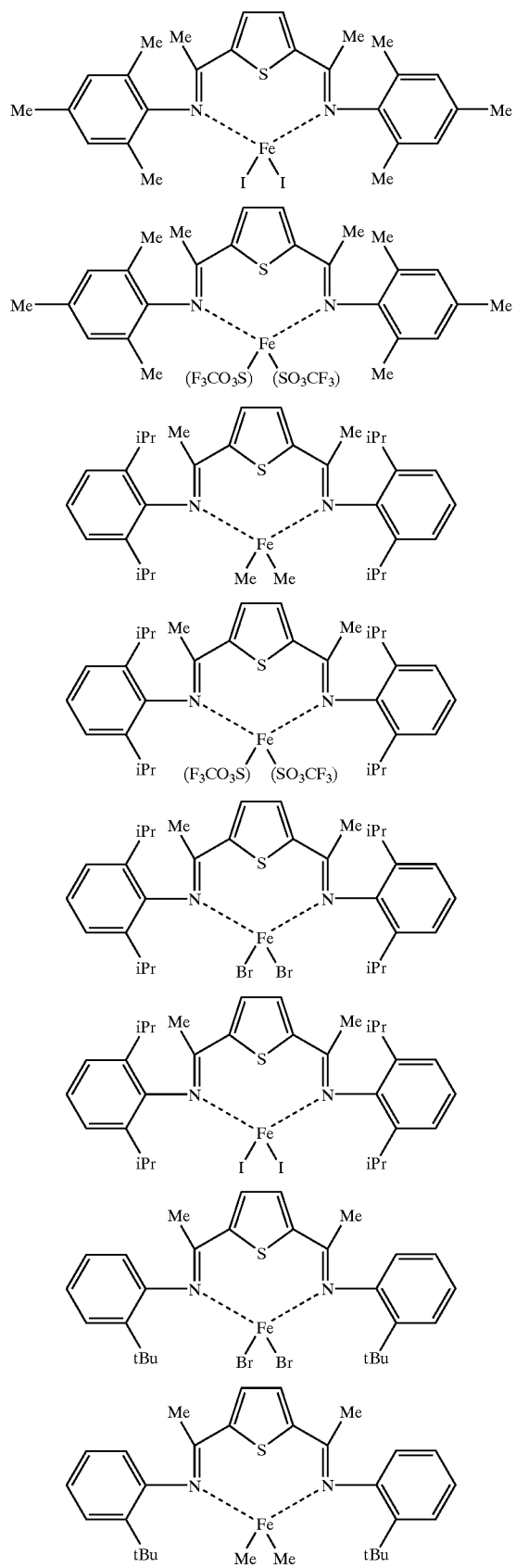
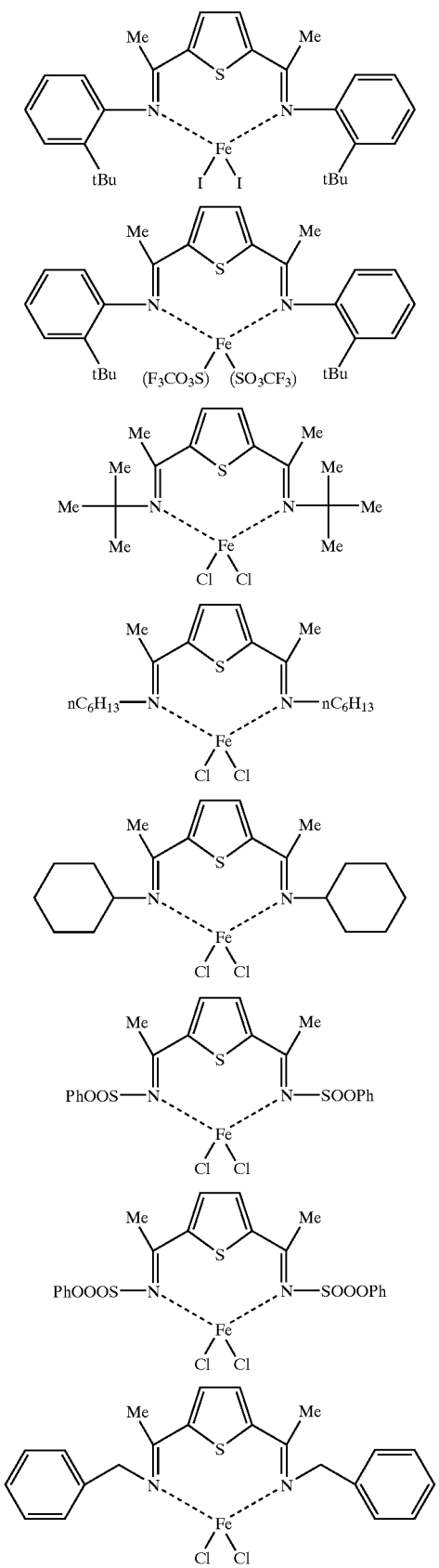

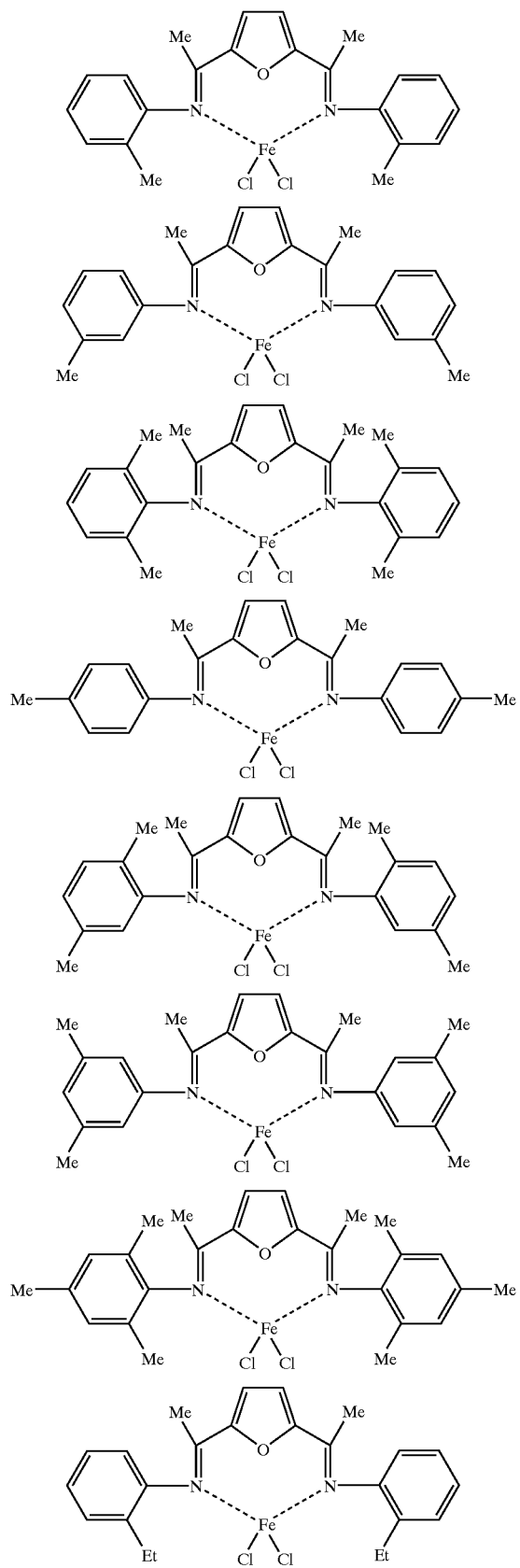
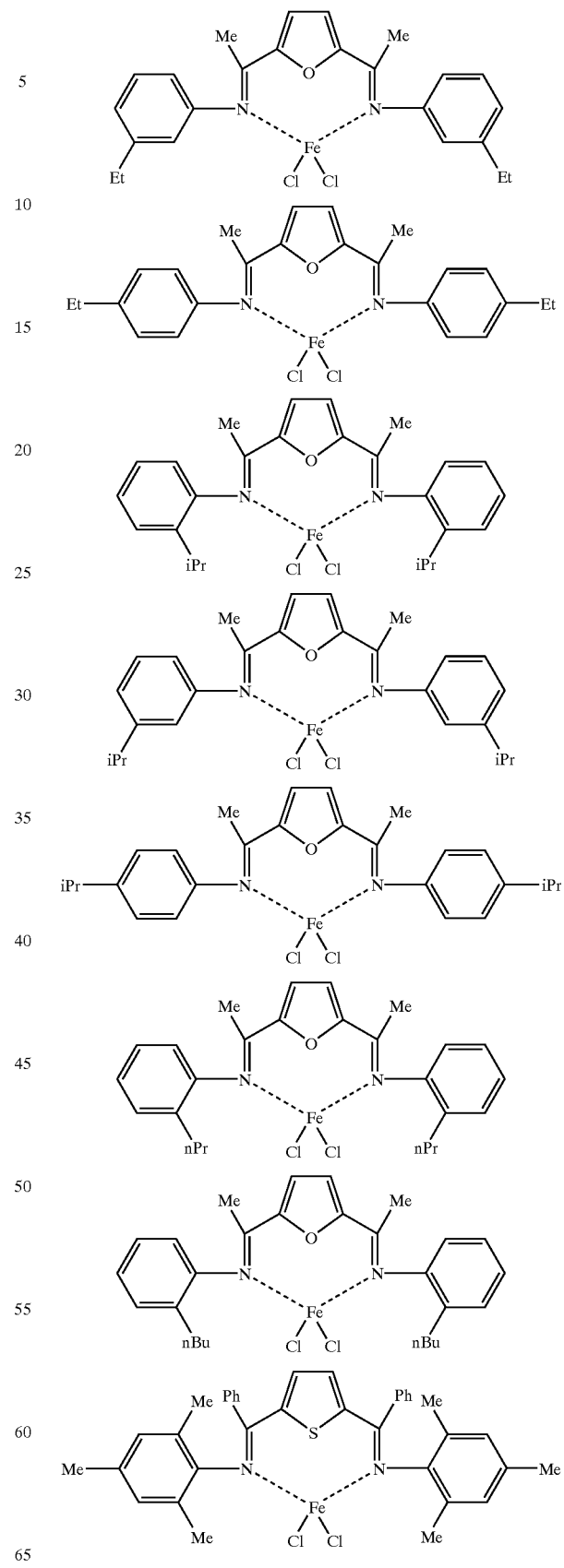

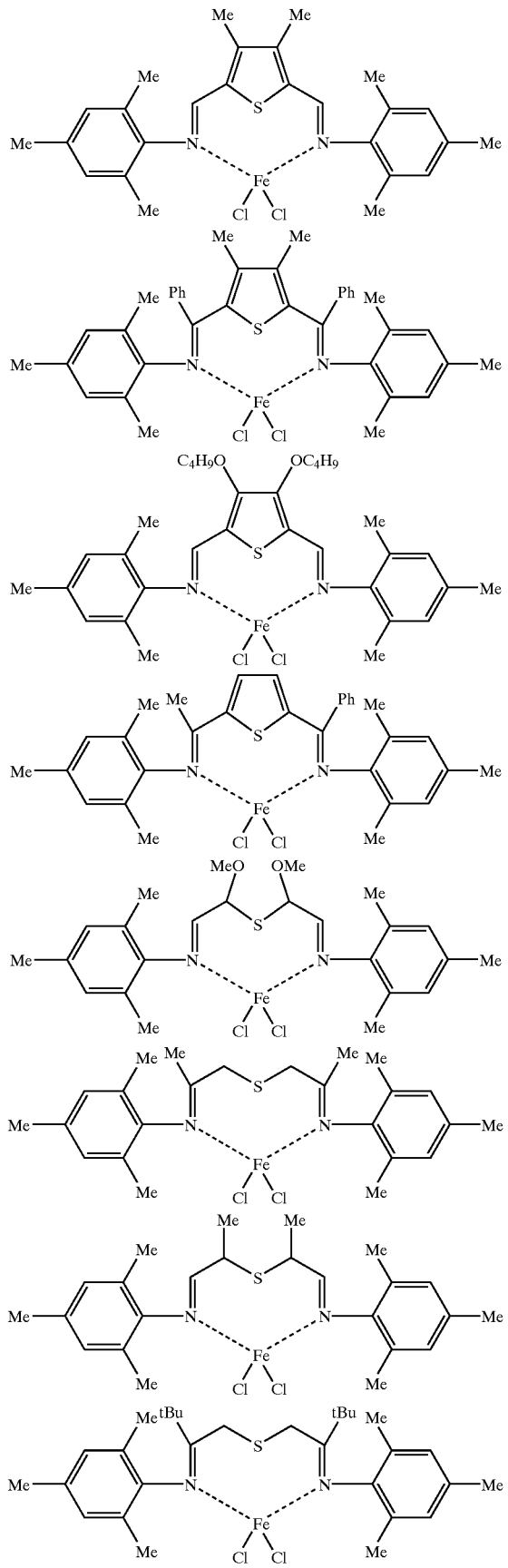
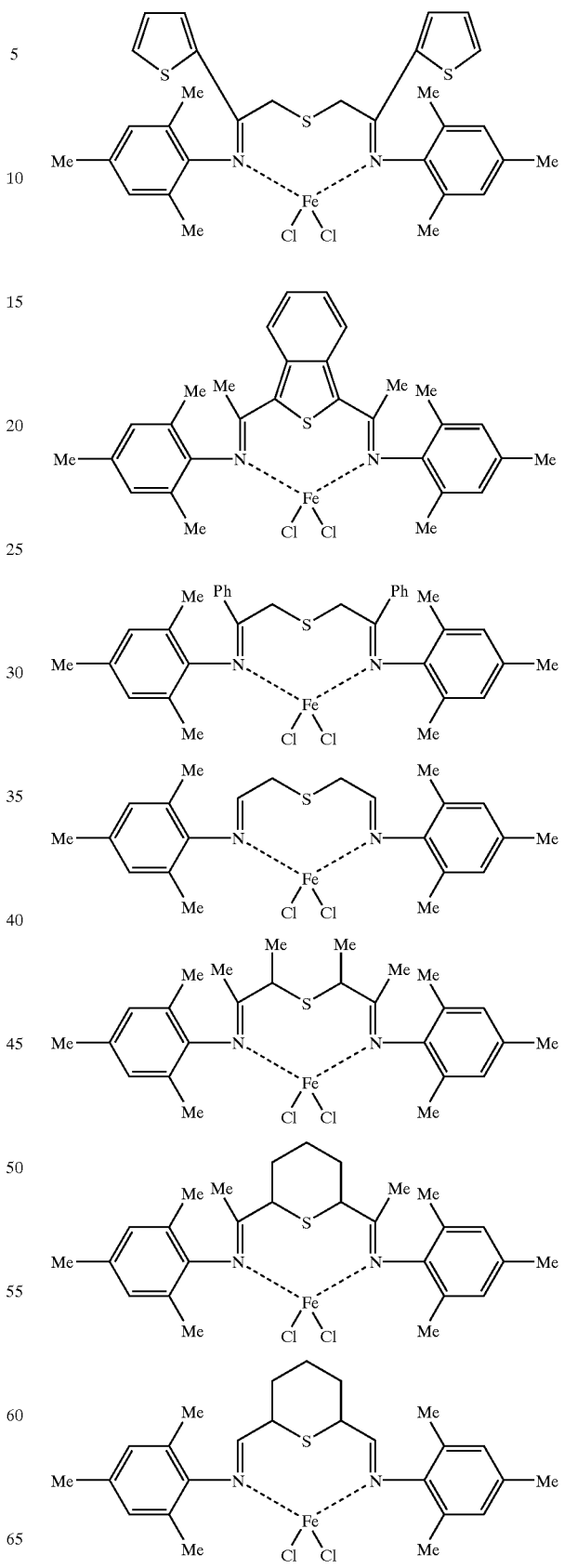

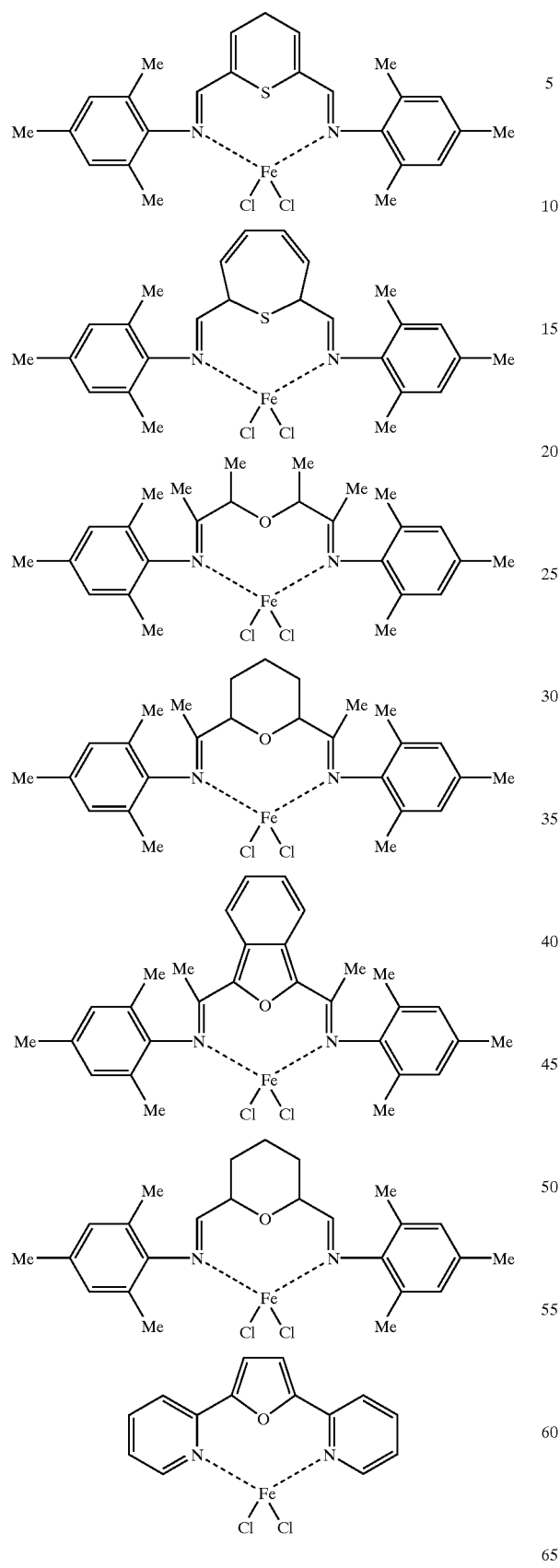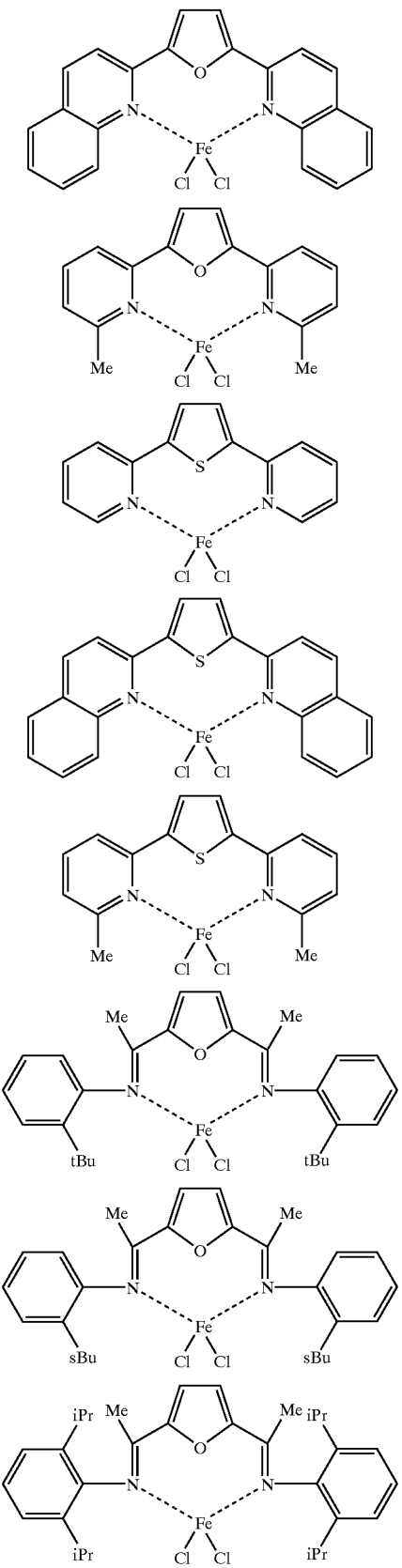

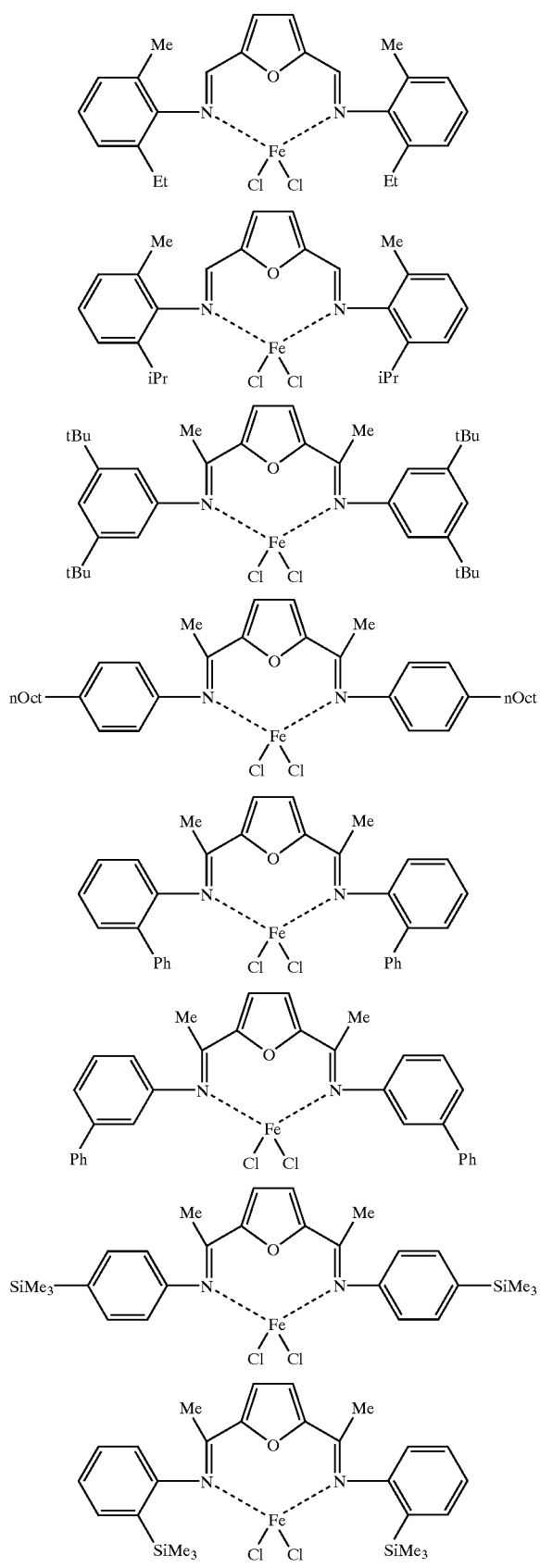
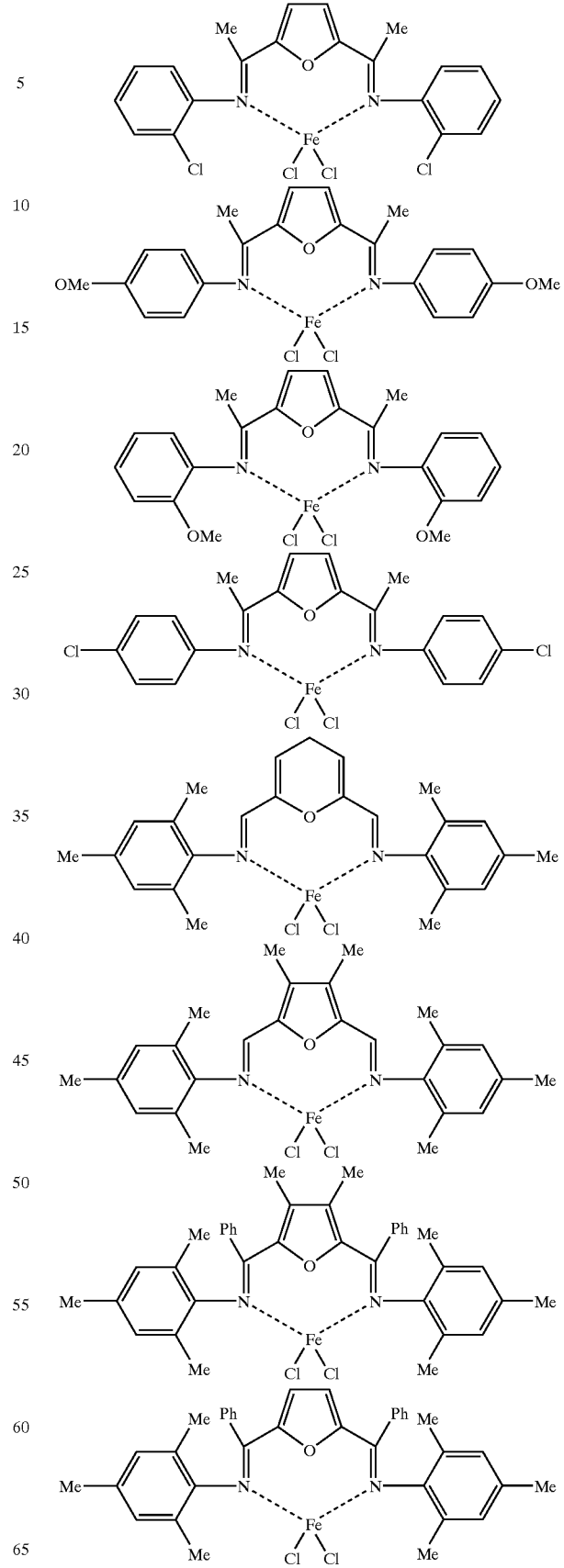

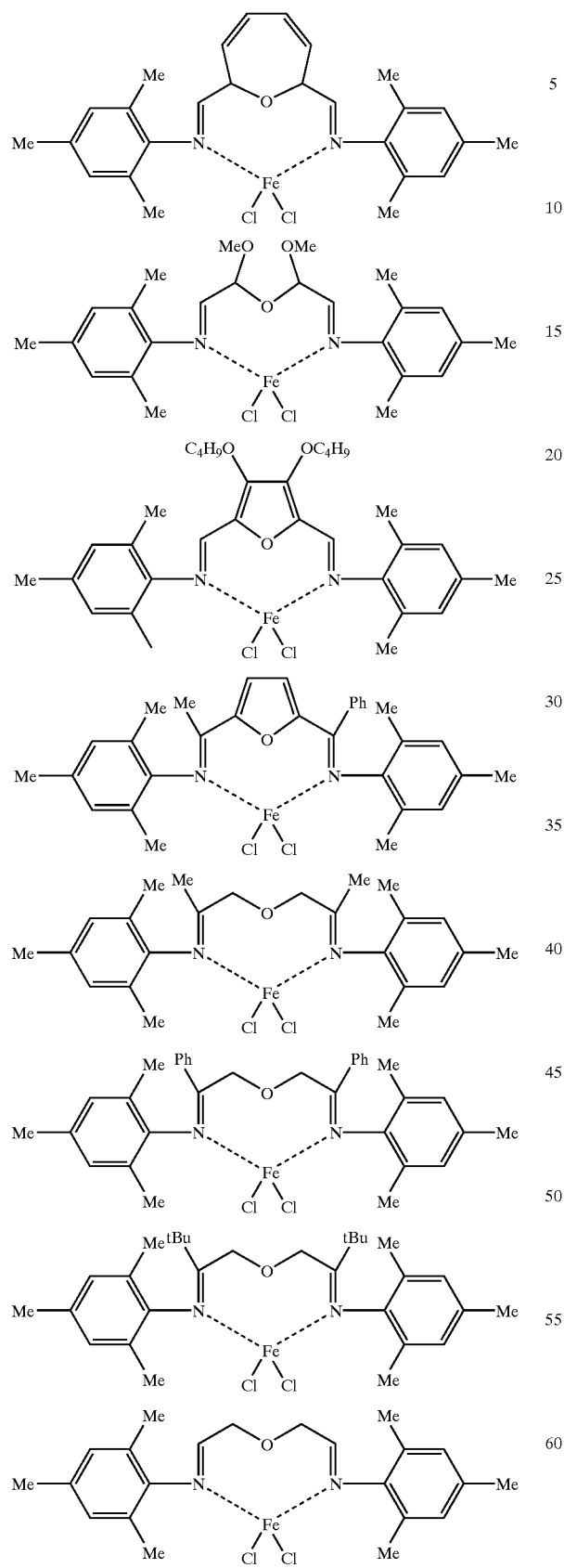
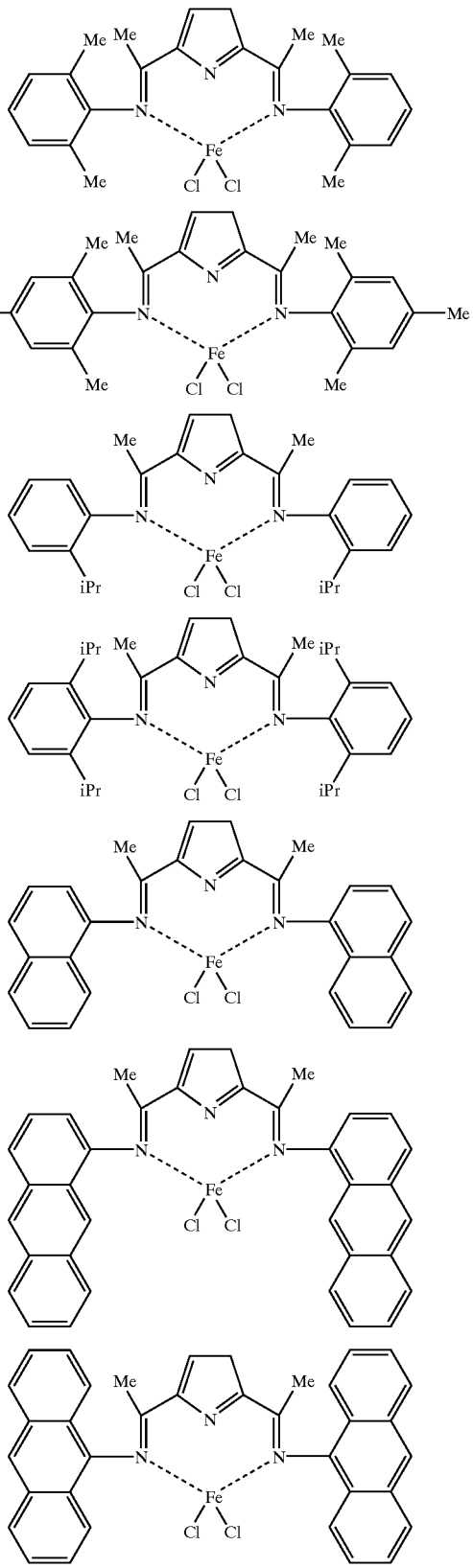

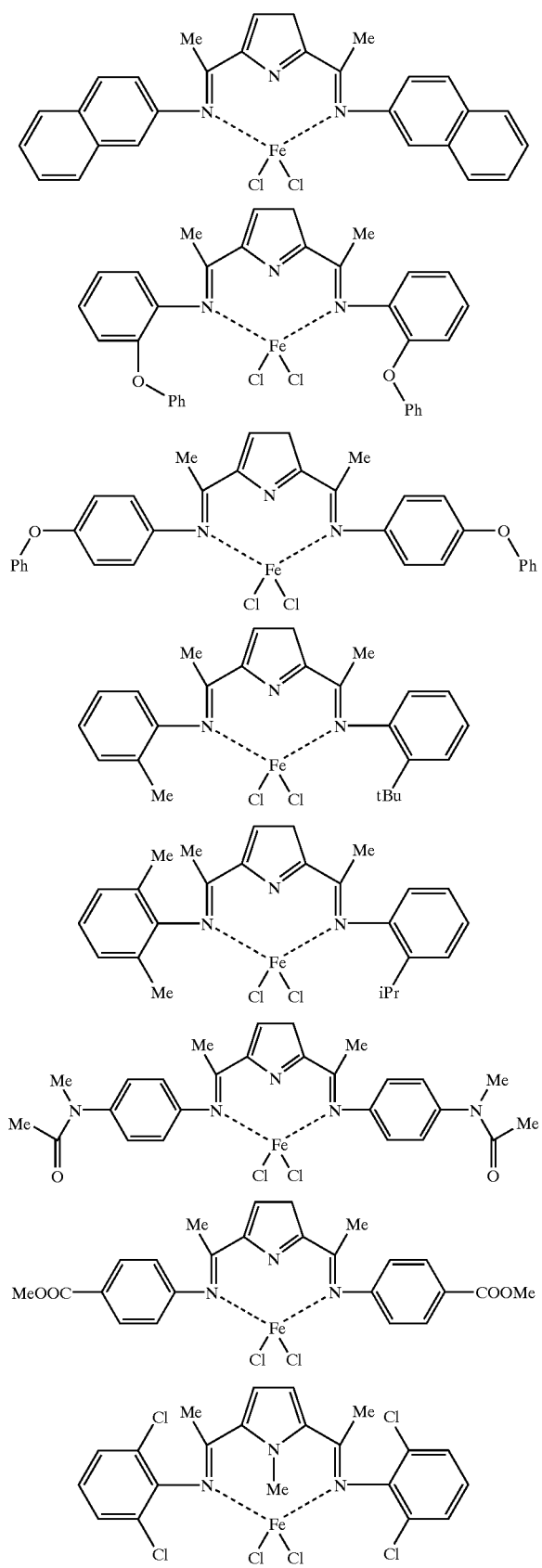
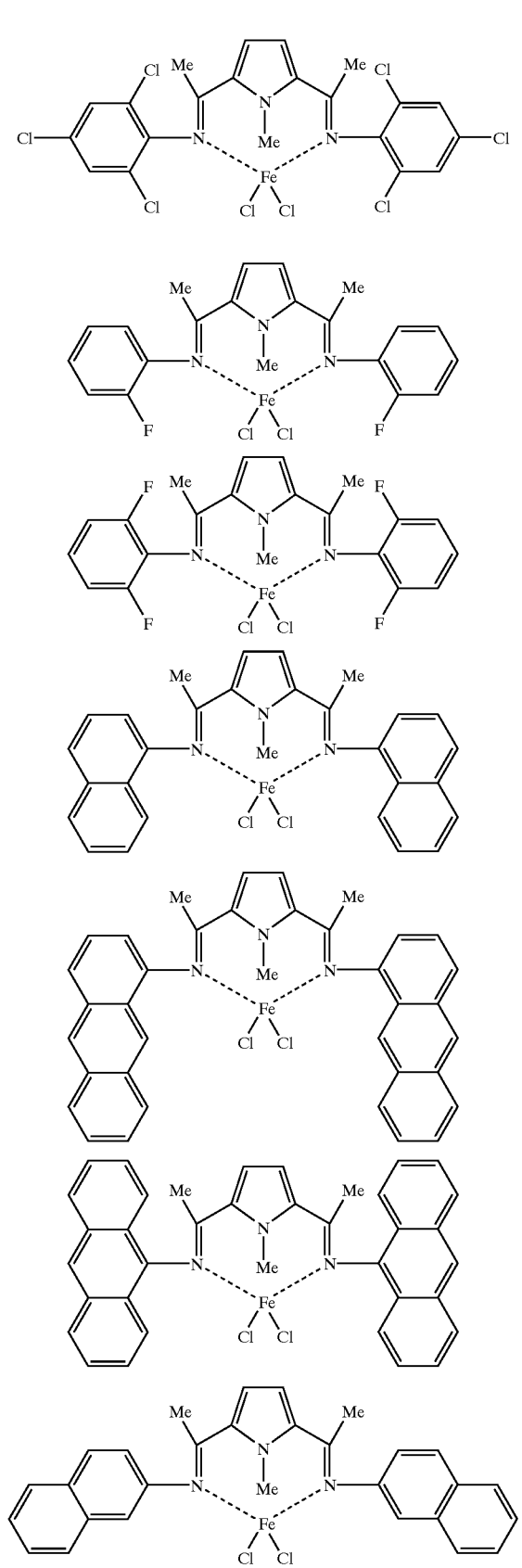

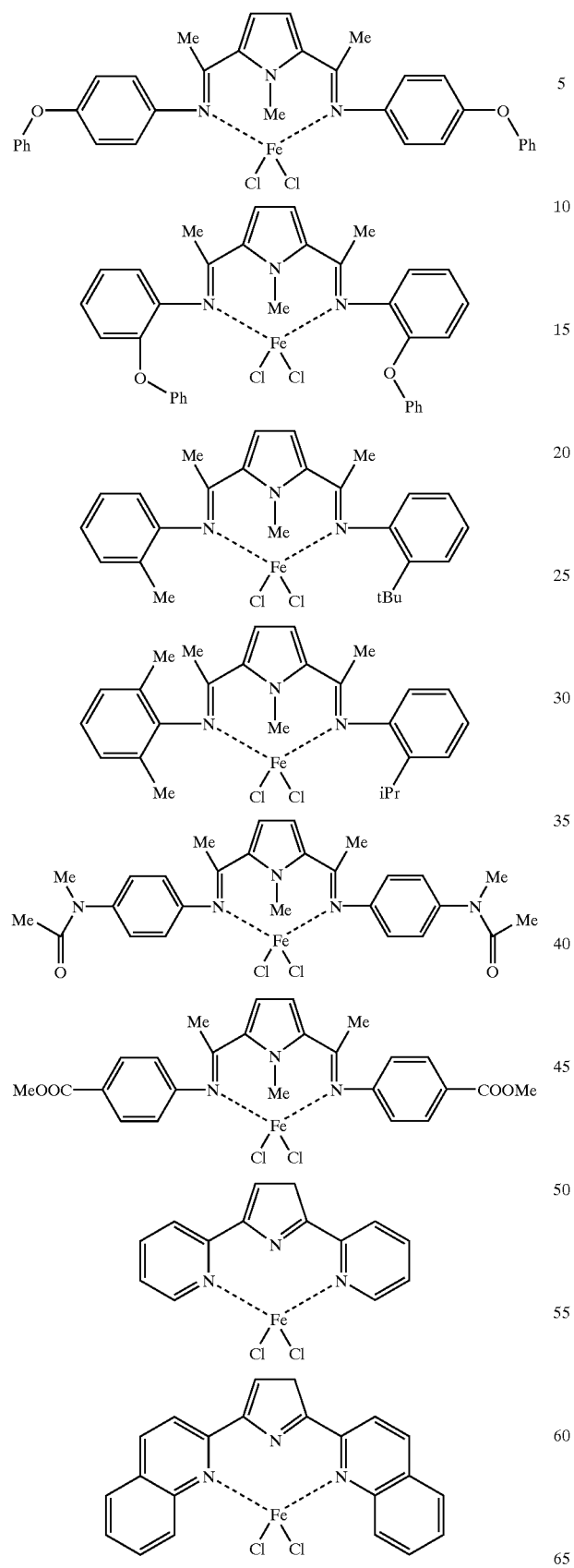
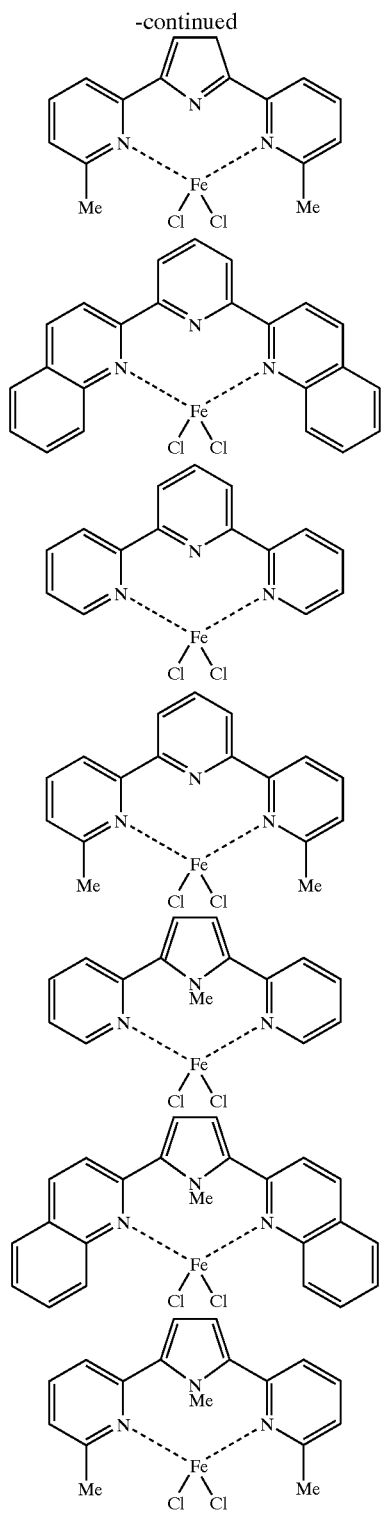

In the above examples, Me denotes a methyl group, Et denotes an ethyl group, nPr denotes an n-propyl group, iPr denotes an isopropyl group, sBu denotes a sec-butyl group, tBu denotes a tert-butyl group, nOc denotes an n-octyl group, and Ph denotes a phenyl group.

In the present invention, compounds wherein iron is replaced with cobalt in the above transition metal compounds can be also exemplified.

The transition metal compounds mentioned above can be used singly or in combination of two or more kinds.

In the present invention, further, transition metal compounds represented by the following formulae are also employable in addition to the transition metal compounds of the formulae (I) to (VIII).

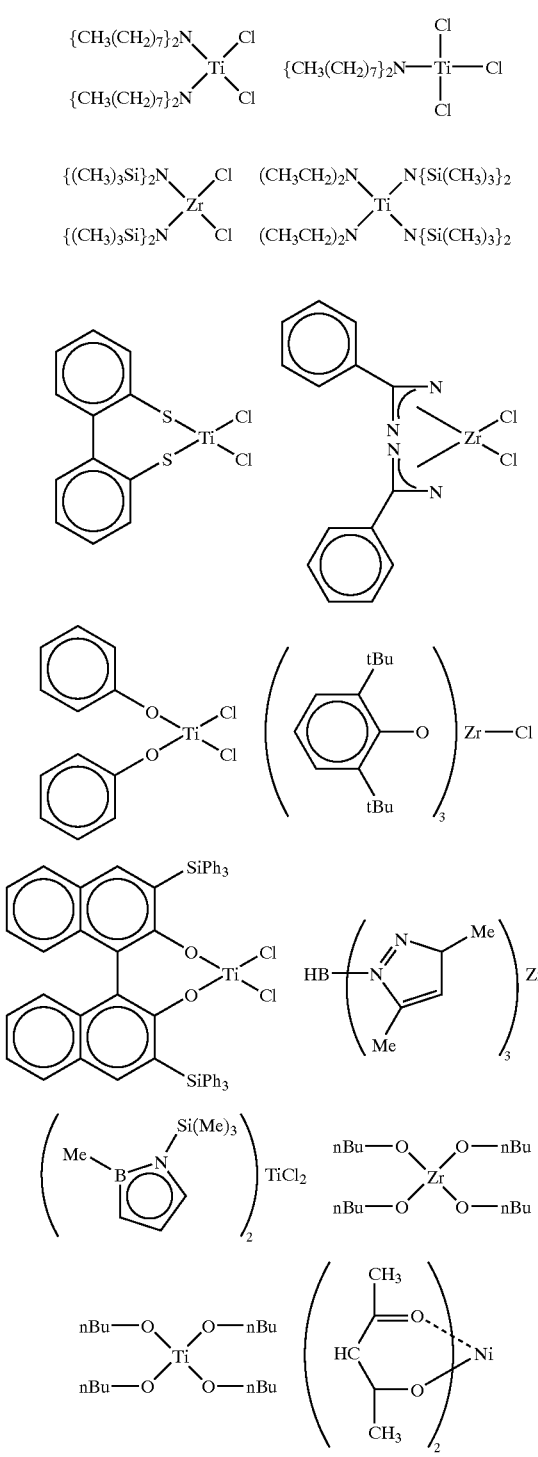
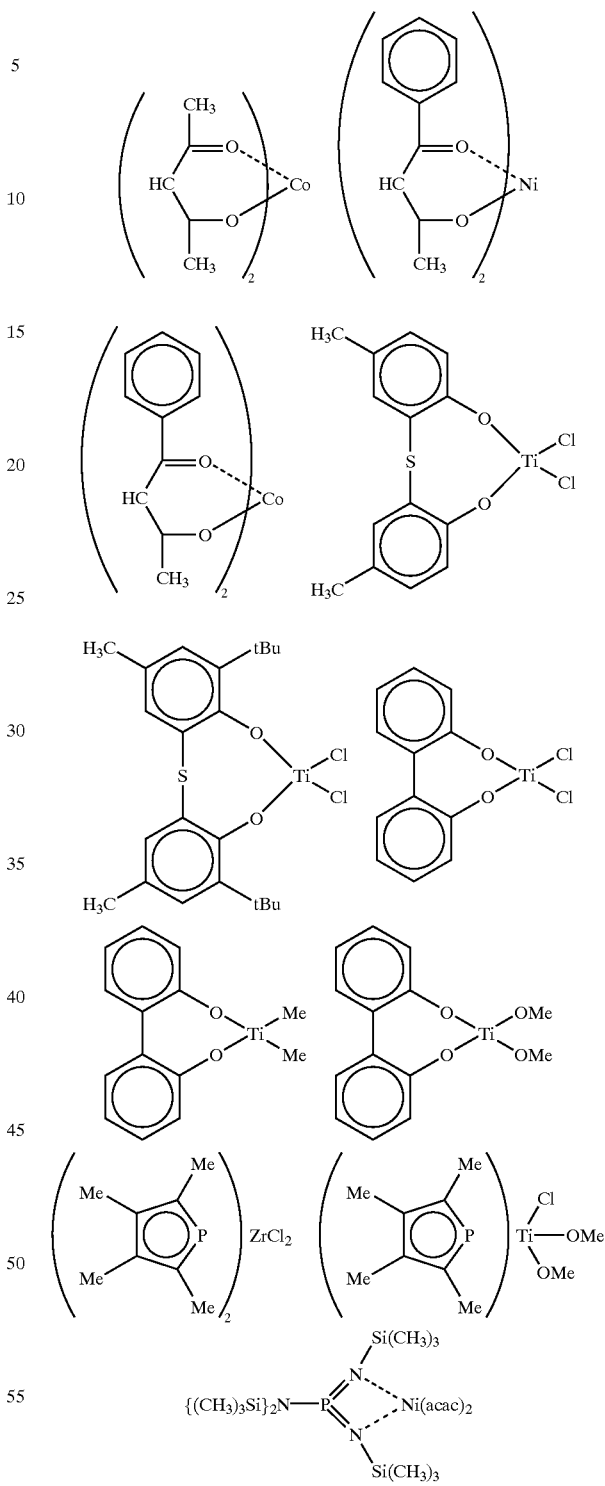

(C) Organic Compound Containing Element of Group 13 of the Periodic Table

The organic compound (C) containing an element of Group 13 of the periodic table for use in the invention is specifically an organoaluminum compound represented by the following formula:

$$R^a_m Al(OR^b)_n H_p X_q$$

wherein $R^a$ and $R^b$ may be the same or different and are each a hydrocarbon group of 1 to 15 carbon atoms, preferably a hydrocarbon group of 1 to 4 carbon atoms; X is a halogen atom; and m, n, p and q are numbers satisfying the conditions of $0<m\leq3$, $0<n\leq3$, $0<p\leq3$, $0<q\leq3$ and $m+n+p+q=3$.

Examples of such organoaluminum compounds include:

(1) organoaluminum compounds represented by the formula:

$$R^a_m Al(OR^b)_{3-m}$$

wherein $R^a$ and $R^b$ may be the same or different and are each a hydrocarbon group of 1 to 15 carbon atoms, preferably a hydrocarbon group of 1 to 4 carbon atoms; and m is preferably a number satisfying the condition of $1.5\leq m3$;

(2) organoaluminum compounds represented by the formula:

$$R^a_m AlX_{3-m}$$

wherein $R^a$ is a hydrocarbon group of 1 to 15 carbon atoms, preferably a hydrocarbon group of 1 to 4 carbon atoms; X is a halogen atom; and m is preferably a number satisfying the condition of $0<m\leq3$;

(3) organoaluminum compounds represented by the formula:

$$R^a_m AlH_{3-m}$$

wherein $R^a$ is a hydrocarbon group of 1 to 15 carbon atoms, preferably a hydrocarbon group of 1 to 4 carbon atoms; and m is preferably a number satisfying the condition of $2\leq m<3$; and (4) organoaluminum compounds represented by the formula:

$$R^a_{mAl(OR^b)_n X_q}$$

wherein $R^a$ and $R^b$ may be the same or different and are each a hydrocarbon group of 1 to 15 carbon atoms, preferably a hydrocarbon group of 1 to 4 carbon atoms; X is a halogen atom; and m, n and q are numbers satisfying the conditions of $0<m\leq3$, $0\leq n<3$, $0\leq q<3$ and $m+n+q=3$.

More specific examples of the organoaluminum compounds include:

tri-n-alkylaluminums, such as triethylaluminum and tri-n-butylaluminum;

tri-branched chain alkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum;

triarylaluminums, such as triphenylaluminum and tritolylaluminum;

dialkylaluminum hydrides, such as diisobutylaluminum hydride;

trialkenylaluminums, such as triisoprenylaluminum;

alkylaluminum alkoxides, such as isobutylaluminum methoxide, isobutylaluminum ethoxide and isobutylaluminum isopropoxide;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $R^a_{2.5}Al(OR^b)_{0.5}$ or the like;

dialkylaluminum halides, such as diethylaluminum chloride, dibutylaluminum chloride and diethylaluminum bromide;

alkylaluminum sesquihalides, such as ethylaluminum sesquichloride, butylaluminum sesquichloride and ethylaluminum sesquibromide;

partially halogenated alkylaluminums, such as alkylaluminum dihalides (e.g., ethylaluminum dichloride, propylaluminum dichloride and butylaluminum dibromide);

dialkylaluminum hydrides, such as diethylaluminum hydride and dibutylaluminum hydride;

partially hydrogenated alkylaluminums, such as alkylaluminum dihydrides (e.g., ethylaluminum dihydride, propylaluminum dihydride); and partially alkoxylated and halogenated alkylaluminums, such as ethylaluminum ethoxychloride, butylaluminum butoxychloride and ethylaluminum ethoxybromide.

Also employable is a compound analogous to the above-mentioned organoaluminum compound, for example, an organoaluminum compound wherein two or more aluminum compounds are bonded through a nitrogen atom. Specifically, there can be mentioned a compound of the formula $(C_2H_5)_2AlN(C_2H_5)Al(C_2H_5)_2$.

Further, isoprenylaluminum represented by the formula $(i-C_4H_9)_x Al_y(C_5H_{10})_2$ is also employable as the organic compound (C).

Although the catalyst for ethylenically unsaturated monomer polymerization (ethylenically unsaturated monomer polymerization catalyst) according to the invention comprises the components (A), (B) and (C), the catalyst may further comprise a particulate carrier (D) on which only the component (A) is supported or the component (B) and/or the component (C) is supported together with the component (A).

The particulate carrier (D) employable in the invention is an inorganic or organic compound in the form of a granular or fine particle solid having a particle diameter of usually 10 to 300 μm, preferably 20 to 200 μm. The inorganic carrier is preferably a porous oxide, and examples thereof include $SiO_2$, $Al_2O_3$, MgO, $ZrO_2$, $TiO_2$, $B_2O_3$, CaO, ZnO, BaO, $ThO_2$, and mixtures thereof, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are oxides containing at least one of $SiO_2$ and $Al_2O_3$ as a main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although properties of the particulate carrier (D) vary depending on the type or the preparation process, the carrier preferably used in the invention desirably has a specific surface area of 50 to 1,000 m²/g, preferably 100 to 700 m²/g, and has a pore volume of 0.3 to 2.5 cm³/g. The inorganic carrier is used, if necessary, after calcined at a temperature of 100 to 1,000° C., preferably 150 to 700° C.

Another example of the particulate carrier is an organic compound in the form of a granular or fine particle solid having a particle diameter of 10 to 300 μm. Examples of such organic compounds include (co)polymers produced mainly from α-olefins of 2 to 14 carbon atoms such as ethylene, propylene, 1-butene and 4-methyl-1-pentene and (co)polymers produced mainly from vinylcyclohexane or styrene.

The ethylenically unsaturated monomer polymerization catalyst of the invention comprises (A) the compound of a transition metal selected from Groups 3 to 12, (B) the compound obtained by the reaction of the compounds (i), (ii) and (iii) or the reaction of the compounds (i), (ii), (iii) and (iv), (C) the organic compound containing an element of Group 13, and optionally, (D) the particulate carrier. FIG. 1 shows steps of a process for preparing the ethylenically unsaturated monomer polymerization catalyst of the invention.

The polymerization can be carried out by, for example, the following processes, though the use of the components and the order of addition of the components are arbitrarily selected.

(1) The component (A), the component (B) and the component (C) are added to the polymerization reactor in an arbitrary order.

(2) A catalyst component obtained by previously contacting the component (A) with the component (B), and the component (C) are added to the polymerization reactor in an arbitrary order.

(3) A catalyst component obtained by previously contacting the component (A) with the component (C), and the component (B) are added to the polymerization reactor in an arbitrary order.

(4) A catalyst component in which the component (A) is supported on the particulate carrier (D), the component (B) and the component (C) are added to the polymerization reactor in an arbitrary order.

(5) A catalyst component in which the component (A) and the component (B) are supported on the particulate carrier (D), and the component (C) are added to the polymerization reactor in an arbitrary order.

(6) A catalyst component in which the component (A) and the component (C) are supported on the particulate carrier (D), and the component (B) are added to the polymerization reactor in an arbitrary order.

(7) A catalyst component in which the component (A), the component (B) and the component (C) are supported on the particulate carrier (D) is added to the polymerization reactor.

An ethylenically unsaturated monomer may be prepolymerized onto the solid catalyst component in which the component (A) and the component (B) are supported on the particulate carrier (D).

In the process for ethylenically unsaturated monomer polymerization according to the invention, an ethylenically unsaturated monomer is polymerized or copolymerized in the presence of the above-described polymerization catalyst, to obatain a polymer.

In the present invention, the polymerization can be carried out in any of liquid phase polymerization such as solution polymerization or suspension polymerization and gas phase polymerization.

Inert hydrocarbon media employable in the liquid phase polymerization include, for example, aliphatic hydrocarbons, such as propane, butane, pentane, hexane, heptane, octane, decane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. The ethylenically unsaturated monomer, per se, used for the polymerization can also be used as a medium.

In the (co)polymerization of the ethylenically unsaturated monomer using the polymerization catalyst, the component (A) can be used in an amount of usually $10^{-12}$ to $10^{-2}$ mol, preferably $10^{-10}$ to $10^{-2}$ mol, based on 1 liter of the reaction volume.

The component (B) can be used in such an amount that the molar ratio of the Group 13 atom ($M_B$) in the component (B) to the transition metal atom ($M_A$) in the component (A) ($M_B/M_A$) is usually 0.01 to 10,000, preferably 0.05 to 2,000. The component (C) can be used in such an amount that the molar ratio of the component (C) to the transition metal atom (M) in the component (A) ((C)/(M)) is usually 1 to 50,000, preferably 1 to 20,000.

The temperature for the polymerization of an ethylenically unsaturated monomer using the polymerization catalyst can be in the range of usually −50 to 200° C., preferably 0 to 170° C. The polymerization pressure can be in the range of usually atmospheric pressure to 100 kg/cm², preferably atmospheric pressure to 50 kg/cm². The polymerization reaction can be carried out by any of batchwise, semi-continuous and continuous processes. It is also possible to conduct polymerization in two or more stages under different reaction conditions.

The molecular weight of the resulting (co)polymer of the ethylenically unsaturated monomer can be adjusted by allowing hydrogen to be present in the polymerization reaction system or by varying the polymerization temperature.

Examples of the ethylenically unsaturated monomers for which the polymerization catalyst of the invention is utilized include:

1-olefins, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene;

aryl group-substituted ethylenically unsaturated monomers, such as styrene and α-methylstyrene;

unsaturated fatty acids, such as acrylic acid, methacrylic acid, fumaric acid, maleic anhydride, itaconic acid, itaconic anhydride and bicyclo(2,2,1)-5-heptene-2,3-dicarboxylic acid;

unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate;

dienes;

trienes; and tetraenes.

Examples of the resulting (co)polymers of ethylenically unsaturated monomers include polyethylene, polypropylene, polybutene, polypentene, polyhexene, poly-4-methyl-1-pentene, ethylene/propylene copolymer, ethylene/butene copolymer, ethylene/pentene copolymer, ethylene/hexene copolymer, ethylene/4-methyl-1-pentene, copolymer, ethylene/octene copolymer, ethylene/propylene/butene terpolymer, ethylene/butene/hexene terpolymer, ethylene/butene/octene terpolymer, propylene/butene copolymer, propylene/pentene copolymer, propylene/ hexene copolymer, propylene/octene copolymer, ethylene/ styrene copolymer, propylene/styrene copolymer, ethylene/ propylene/styrene terpolymer, ethylene/octene/styrene terpolymer, ethylene/α-olefin/diene terpolymer (examples of dienes: butadiene, isoprene, 1,4-hexadiene, dicyclopentadiene, 5-ethylidene-2-norbornene, 7-methyl-1, 6-octadiene), ethylene/α-olefin/triene terpolymer (examples of trienes: chain or cyclic trienes such as 6,10-dimethyl-1, 5,9-undecatriene and 5,9-dimethyl-1,4,8-decatriene), and ethylene/α-olefin/tetraene terpolymer (examples of tetraenes: 6,10,14-trimethyl-1,5,9,13-pentadecatriene, 5,9,13-trimethyl-1,4,8,12-tetradecatriene). Examples of the α-olefins of the terpolymers include propylene, n-butene, pentene, n-hexene and decene.

EFFECT OF THE INVENTION

The catalyst component for ethylenically unsaturated monomer polymerization according to the invention is capable of providing a highly active catalyst for ethylenically unsaturated monomer polymerization when used in combination with a transition metal compound such as a metallocene compound.

The catalyst and the process for ethylenically unsaturated monomer polymerization according to the invention exhibit high polymerization activities and can produce (co) polymers of ethylenically unsaturated monomers having excellent properties.

EXAMPLE

The present invention is further described with reference to the following examples, but it should be construed that the invention is in no way limited to those examples.

In the present invention, the intrinsic viscosity (η) is measured in decahydronaphthalene (decalin) at 135° C. and expressed in dl/g.

Example 1

Preparation of Solution A of Catalyst Component

To 70 ml of a dehydrated toluene solution of 7.41 g (30.0 mmol) of bromopentafluorobenzene in a flask thoroughly purged with nitrogen, 19 ml of a hexane solution of 30. 6 mmol of n-BuLi was added at −78° C., and the mixture was stirred at −78° C. for 4 hours. To the mixture, 300 ml of a dehydrated toluene solution of 2.67 g (10.0 mmol) of aluminum tribromide was added. After natural temperature rise, the mixture was stirred at room temperature for 12 hours. The resulting slurry was filtered through a glass filter to obtain a filtrate. Then, a hydrous nitrogen obtained by adding 0.09 ml of distilled water to dry nitrogen was bubbled through the filtrate with stirring at 0° C. Thereafter, stirring was performed at room temperature for 3 hours and then at 60° C. for another 3 hours. The resulting solution was cooled to −40° C., and thereto was dropwise added 40 ml of a dehydrated toluene solution of 1.39 g (5.0 mmol) of triphenylchloromethane. After the dropwise addition, the mixture was stirred at room temperature for 12 hours to prepare a solution A of a catalyst component.

Example 2

Preparation of Solution B of Catalyst Component

In a flask thoroughly purged with nitrogen, a hydrous nitrogen obtained by adding 0.045 ml of distilled water to dry nitrogen was bubbled through 20 ml of a dehydrated toluene solution of 5 mmol of triisobutylaluminum with stirring at 0° C. Thereafter, stirring was performed at room temperature for 3 hours. The resulting solution was cooled to 0° C., and thereto was dropwise added 10 ml of a dehydrated toluene solution of 1.84 g (10.0 mmol) of pentafluorophenol. After the dropwise addition, the mixture was stirred at room temperature for 12 hours and then at 60° C. for 2 hours. The resulting solution was cooled to 0° C., and thereto was dropwise added 10 ml of a dehydrated toluene solution of 0.69 g (2.5 mmol) of triphenylchloromethane. After the dropwise addition, the mixture was stirred at room temperature for 12 hours to prepare a solution B of a catalyst component.

Example 3

Preparation of Solution C of Catalyst Component

In a flask thoroughly purged with nitrogen, a hydrous nitrogen obtained by adding 0.045 ml of distilled water to dry nitrogen was bubbled through 20 ml of a dehydrated toluene solution of 5 mmol of triisobutylaluminum with stirring at 0° C. Thereafter, stirring was performed at room temperature for 3 hours. The resulting solution was cooled to 0° C., and thereto was dropwise added 10 ml of a dehydrated toluene solution of 2.12 g (10.0 mmol) of pentafluorobenzoic acid. After the dropwise addition, the mixture was stirred at room temperature for 12 hours and then further stirred at 60° C. for 5 hours. The resulting solution was cooled to 0° C., and thereto was dropwise added 10 ml of a dehydrated toluene solution of 0.69 g (2.5 mmol) of triphenylchloromethane. After the dropwise addition, the mixture was stirred at room temperature for 12 hours to prepare a solution C of a catalyst component.

Example 4

Preparation of Solution D of Catalyst Component

In a flask thoroughly purged with nitrogen, 30 ml of a dehydrated o-xylene solution of 1.56 g (8.5 mmol) of 2,3,4,5,6-pentafluoroaniline was dropwise added slowly to 40 ml of a dehydrated o-xylene solution of 17 mmol of triethylaluminum with stirring at room temperature. After the dropwise addition, the mixture was stirred for 35 hours under heating at 130° C. The solvent was removed from the resulting solution, and then 50 ml of dehydrated toluene was added. The resulting solution was cooled to 0° C., and thereto was dropwise added 70 ml of a dehydrated toluene solution of 12.52 g (68 mmol) of pentafluorophenol. After the dropwise addition, the mixture was stirred at room temperature for 12 hours and then at 60° C. for 2 hours. The resulting solution was cooled to 0° C., and thereto was dropwise added 50 ml of a dehydrated toluene solution of 2.37 g (8.5 mmol) of triphenylchloromethane. After the dropwise addition, the mixture was stirred at room temperature for 12 hours to prepare a solution D of a catalyst component.

Example 5

Preparation of Solution E of Catalyst Component

In a flask thoroughly purged with nitrogen, a hydrous nitrogen obtained by adding 0.045 ml of distilled water to dry nitrogen was bubbled through 20 ml of a dehydrated toluene solution of 5 mmol of tri-n-octylaluminum with stirring at 0° C. Thereafter, stirring was performed at room temperature for 5 hours. The resulting solution was cooled to 0° C., and thereto was dropwise added 10 ml of a dehydrated toluene solution of 0.69 g (2.5 mmol) of triphenylchloromethane. After the dropwise addition, the mixture was stirred at room temperature for 12 hours to prepare a solution E of a catalyst component.

Example 6

Ethylene Polymerization

To a 500-ml glass autoclave thoroughly purged with nitrogen, 400 ml of toluene was introduced. Then, ethylene was passed through the system at a rate of 100 l/hr, and the system was maintained at 75° C. for 10 minutes. To the system, 0.28 mmol of triisobutylaluminum was added, then 0.0008 mmol of rac-dimethylsilylene-bis(2-methyl-4-phenylindenyl)zirconium dichloride was added, and finally the solution A of a catalyst component was added in an amount of 0.0032 mmol in terms of Al atom, to initiate polymerization. To the system, an ethylene gas was continuously fed at a rate of 100 l/hr to perform polymerization at 75° C. for 6 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 8.00 g of a polymer was obtained. The polymerization activity was 100 kg-PE/mmol-Zr·hr, and the obtained polymer had an intrinsic viscosity ($\eta$) of 6.10 dl/g.

Example 7

Ethylene Polymerization

Ethylene polymerization was carried out in the same manner as in Example 6, except that the solution B of a catalyst component prepared in Example 2 was used in place of the solution A of a catalyst component. As a result, 1.44 g of a polymer was obtained. The polymerization activity was 18 kg-PE/mmol-Zr·hr, and the obtained polymer had an intrinsic viscosity ($\eta$) of 3.50 dl/g.

Example 8

Ethylene Polymerization

Ethylene polymerization was carried out in the same manner as in Example 6, except that the solution D of a catalyst component prepared in Example 4 was added in an amount of 0.016 mmol in terms of Al atom in place of adding the solution A of a catalyst component in an amount of 0.0032 mmol in terms of Al atom. As a result, 0.50 g of a polymer was obtained. The polymerization activity was 6.25 kg-PE/mmol-Zr·hr, and the obtained polymer had an intrinsic viscosity ($\eta$) of 3.48 dl/g.

Example 9

Ethylene Polymerization

To a 500-ml glass autoclave thoroughly purged with nitrogen, 400 ml of toluene was introduced. Then, ethylene was passed through the system at a rate of 100 l/hr, and the system was maintained at 75° C. for 10 minutes. To the system, 0.28 mmol of triisobutylaluminum was added, then 0.0008 mmol of ethylene-bis(indenyl)zirconium dichloride was added, and finally the solution A of a catalyst component was added in an amount of 0.0032 mmol in terms of Al atom, to initiate polymerization. To the system, an ethylene gas was continuously fed at a rate of 100 l/hr to perform polymerization at 75° C. for 6 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 5.80 g of a polymer was obtained. The polymerization activity was 72.5 kg-PE/mmol-Zr·hr, and the obtained polymer had an intrinsic viscosity ($\eta$) of 1.8 dl/g.

Example 10

Ethylene Polymerization

Ethylene polymerization was carried out in the same manner as in Example 9, except that the solution B of a catalyst component prepared in Example 2 was used in place of the solution A of a catalyst component and the polymerization time was varied to 10 minutes. As a result, 1.44 g of a polymer was obtained. The polymerization activity was 10.8 kg-PE/mmol-Zr·hr, and the obtained polymer had an intrinsic viscosity ($\eta$) of 1.43 dl/g.

Example 11

Ethylene Polymerization

Ethylene polymerization was carried out in the same manner as in Example 10, except that the solution C of a catalyst component prepared in Example 3 was used in place of the solution B of a catalyst component. As a result, 0.80 g of a polymer was obtained. The polymerization activity was 6.0 kg-PE/mmol-Zr·hr, and the obtained polymer had an intrinsic viscosity ($\eta$) of 1.58 dl/g.

Example 12

Propylene Polymerization

To a 500-ml glass autoclave thoroughly purged with nitrogen, 400 ml of toluene was introduced. Then, propylene was passed through the system at a rate of 100 l/hr, and the system was maintained at 50° C. for 20 minutes. To the system, 0.28 mmol of triisobutylaluminum was added, then 0.0008 mmol of rac-dimethylsilylene-bis(2-methyl-4-phenylindenyl)zirconium dichloride was added, and finally the solution A of a catalyst component was added in an amount of 0.0032 mmol in terms of Al atom, to initiate polymerization. To the system, a propylene gas was continuously fed at a rate of 100 l/hr to perform polymerization at 50° C. for 30 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 2.40 g of a polymer was obtained. The polymerization activity was 6.00 kg-PP/mmol-Zr·hr, and the obtained polymer had an intrinsic viscosity ($\eta$) of 3.60 dl/g.

Example 13

Propylene Polymerization

Propylene polymerization was carried out in the same manner as in Example 12, except that rac-dimethylsilylene-bis(2-methyl-4-phenylindenyl)zirconium dichloride was replaced with ethylene-bis(indenyl)zirconium dichloride. As a result, 0.24 g of a polymer was obtained. The polymerization activity was 0.60 kg-PP/mmol-zr-hr, and the obtained polymer had an intrinsic viscosity ($\eta$) of 0.45 dl/g.

Example 14

Ethylene/propylene Copolymerization

To a 500-ml glass autoclave thoroughly purged with nitrogen, 400 ml of toluene was introduced. Then, a mixed gas of ethylene (40 l/hr) and propylene (60 l/hr) was passed through the system, and the system was maintained at 50° C. for 20 minutes. To the system, 0.28 mmol of triisobutylaluminum was added, then 0.0008 mmol of rac-dimethylsilylene-bis(2-methyl-4-phenylindenyl)zirconium dichloride was added, and finally the solution A of a catalyst component was added in an amount of 0.0032 mmol in terms of Al atom, to initiate polymerization. To the system, a mixed gas of ethylene (40 l/hr) and propylene (60 l/hr) was continuously fed to perform polymerization at 50° C. for 30 minutes at atmospheric pressure. Thereafter, a small amount of methanol was added to terminate the polymerization. The polymer solution was washed with a hydrochloric acid aqueous solution and concentrated to precipitate a polymer, followed by vacuum drying at 130° C. for 12 hours. As a result, 2.80 g of a polymer was obtained. The polymerization activity was 7.00 kg-polymer/mmol-Zr·hr, and the obtained polymer had an intrinsic viscosity (1n) of 0.67 dl/g and a density of 0.864 g/cm$^3$.

Example 15

Ethylene/octene Copolymerization

To a 500-ml glass autoclave thoroughly purged with nitrogen, 380 ml of toluene, and then 20 ml of 1-octene were introduced. Then, ethylene was passed through the system at a rate of 100 l/hr, and the system was maintained at 50° C. for 20 minutes. To the system, 0.28 mmol of triisobutylaluminum was added, then 0.0008 mmol of rac-dimethylsilylene-bis(2-methyl-4-phenylindenyl)zirconium dichloride was added, and finally the solution A of a catalyst component was added in an amount of 0.0032 mmol in terms of Al atom, to initiate polymerization. To the system, an ethylene gas was continuously fed at a rate of 100 l/hr to perform polymerization at 50° C. for 30 minutes at atmospheric pressure. Thereafter, a small amount of methanol was added to terminate the polymerization.

The polymer solution was washed with a hydrochloric acid aqueous solution and concentrated to precipitate a polymer, followed by vacuum drying at 130° C. for 12 hours. As a result, 0.36 g of a polymer was obtained. The polymerization activity was 0.90 kg-polymer/mmol-Zr·hr, and the obtained polymer had an intrinsic viscosity (η) of 0.89 dl/g and a density of 0.858 g/cm$^3$.

Example 16

Ethylene Polymerization

To a 500-ml glass autoclave thoroughly purged with nitrogen, 250 ml of toluene was introduced. Then, ethylene was passed through the system at a rate of 100 l/hr, and the system was maintained at 25° C. for 10 minutes. To the system, 0.0625 mmol of triisobutylaluminum was added, then 0.0025 mmol of the following Ni catalyst was added, and finally the solution A of a catalyst component was added in an amount of 0.005 mmol in terms of Al atom, to initiate polymerization. To the system, an ethylene gas was continuously fed at a rate of 100 l/hr to perform polymerization at 25° C. for 15 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 0.20 g of a polymer was obtained. The polymerization activity was 0.32 kg-PE/mmol-Zr·hr.

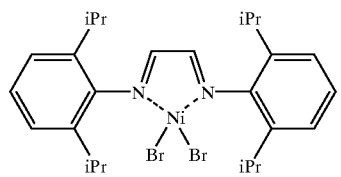

Example 17

Ethylene Polymerization

To a 500-ml glass autoclave thoroughly purged with nitrogen, 250 ml of toluene was introduced. Then, ethylene was passed through the system at a rate of 100 l/hr, and the system was maintained at 25° C. for 10 minutes. To the system, 0.833 mmol of triisobutylaluminum was added, then 0.0105 mmol of 2,2'-thiobis(4-methyl-6-t-butylphenoxy) titanium dichloride was added, and finally the solution A of a catalyst component was added in an amount of 0.021 mmol in terms of Al atom, to initiate polymerization. To the system, an ethylene gas was continuously fed at a rate of 100 l/hr to perform polymerization at 25° C. for 60 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 4.50 g of a polymer was obtained. The polymerization activity was 0.43 kg-PE/mmol-Zr·hr.

The results in Examples 6 to 17 are set forth in Table 3.

TABLE 3

| | Transition metal component | | Solution of catalyst component | | Organoaluminum compound | | | | | | |
|---|---|---|---|---|---|---|---|---|---|---|---|
| | Type | Zr concentration (mmol) | Type | Al concentration (mmol) | Type | Al concentration (mmol) | Temperature | Time (min) | Yield (g) | Activity (kg/mmol-Zn · hr) | (η) (dl/g) |
| Ex. 6 | (1) | 0.0008 | (A) | 0.0032 | TIBA | 0.280 | 75 | 6 | 8.00 | 100.00 | 6.10 |
| Ex. 7 | (1) | 0.0008 | (B) | 0.0032 | TIBA | 0.280 | 75 | 6 | 1.44 | 18.00 | 3.50 |
| Ex. 8 | (1) | 0.0008 | (D) | 0.0160 | TIBA | 0.280 | 75 | 6 | 0.50 | 6.25 | 3.48 |
| Ex. 9 | (2) | 0.0008 | (A) | 0.0032 | TIBA | 0.280 | 75 | 6 | 5.80 | 72.50 | 1.80 |
| Ex. 10 | (2) | 0.0008 | (B) | 0.0032 | TIBA | 0.280 | 75 | 10 | 1.44 | 10.8 | 1.43 |
| Ex. 11 | (2) | 0.0008 | (C) | 0.0032 | TIBA | 0.280 | 75 | 10 | 0.80 | 6.00 | 1.58 |

TABLE 3-continued

| | Transition metal component | | Solution of catalyst component | | Organoaluminum compound | | | | | |
|---|---|---|---|---|---|---|---|---|---|---|
| | Type | Zr concentration (mmol) | Type | Al concentration (mmol) | Type | Al concentration (mmol) | Temperature | Time (min) | Yield (g) | Activity (kg/mmol-Zn · hr) | (η) (dl/g) |
| Ex. 12 | (1) | 0.0008 | (A) | 0.0032 | TIBA | 0.280 | 50 | 30 | 2.40 | 6.00 | 3.60 |
| Ex. 13 | (2) | 0.0008 | (A) | 0.0032 | TIBA | 0.280 | 50 | 30 | 0.24 | 0.60 | 0.45 |
| Ex. 14 | (1) | 0.0008 | (A) | 0.0032 | TIBA | 0.280 | 50 | 30 | 2.80 | 7.00 | 0.67 |
| Ex. 15 | (1) | 0.0008 | (A) | 0.0032 | TIBA | 0.280 | 50 | 30 | 0.36 | 0.90 | 0.89 |
| Ex. 16 | (3) | 0.0025 | (A) | 0.0050 | TIBA | 0.0625 | 25 | 15 | 0.20 | 0.32 | — |
| Ex. 17 | (4) | 0.0105 | (A) | 0.0210 | TIBA | 0.833 | 25 | 60 | 4.50 | 0.43 | — |

TIBA: triisobutylaluminum
(1) rac-Me$_2$Si (2-Me-4-Ph-Ind)$_2$ZrCl$_2$
(2) Et (Ind)$_2$ZrCl$_2$
(3)
(4)

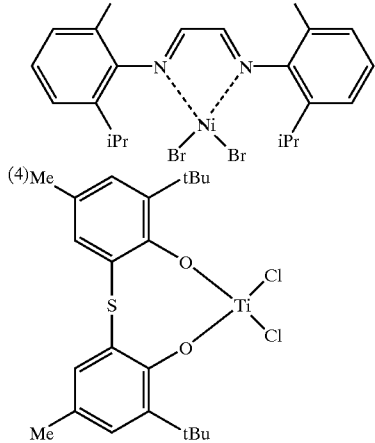

In Table 3, the terms "Zr concentration" and "Al concentration" represent the concentration of the compound in terms of Zr atom and Al atom, respectively.

Example 18

Preparation of Solution F of Catalyst Component

In a flask thoroughly purged with nitrogen, 30 ml of a dehydrated o-xylene solution of 1.83 g (10.0 mmol) of 2,3,4,5,6-pentafluoroaniline was dropwise added slowly to 20 ml of a dehydrated o-xylene solution of 20 mmol of diethylaluminum chloride with stirring at room temperature. After the dropwise addition, the mixture was stirred for 40 hours under heating at 125° C. The solvent was removed from the resulting solution, and then 50 ml of hexane was added and stirred. The solution portion was removed by decantation, and to the insoluble portion was added 100 ml of dehydrated toluene to obtain a toluene solution (solution f-1).

Separately, in a flask thoroughly purged with nitrogen, 2.95 ml of an n-hexane solution of 4.69 mmol of n-BuLi was added to 20 ml of a dehydrated toluene solution of 0.57 ml (4.56 mmol) of pentafluorobenzene with stirring at −78° C., and the mixture was stirred at −78° C. for 7 hours to obtain a solution (solution f-2).

From the solution f-1, an aliquot of 2.28 mmol in terms of Al atom was dispensed, and the whole amount of the solution f-2 was dropwise added slowly to the dispensed solution with stirring at −78° C. After natural temperature rise, the mixture was stirred at room temperature for 12 hours. The resulting slurry was filtered through a glass filter to obtain a filtrate (solution f-3).

From the solution f-3, an aliquot of 0.852 mmol in terms of Al atom was dispensed into a flask thoroughly purged with nitrogen. Then, 10 ml of a dehydrated toluene solution of 0.24 g (0.86 mmol) of triphenylchloromethane was dropwise added to the dispensed solution with stirring at −78° C. After natural temperature rise, the mixture was stirred at room temperature for 12 hours to prepare a solution F of a catalyst component.

Example 19

Preparation of Solution G of Catalyst Component

In a flask thoroughly purged with nitrogen, 1.00 g (4.62 mmol) of diphenylsilanediol and 50 ml of dehydrated toluene were stirred at room temperature. The mixture was cooled to −78° C. with stirring, followed by dropwise adding slowly 30 ml of a dehydrated toluene solution of 9.24 mmol of diethylaluminum chloride. After the dropwise addition and natural temperature rise, the mixture was stirred at room temperature for 12 hours and then for 6 hours under heating at 100° C. The solvent was removed from the resulting solution, and then 50 ml of hexane was added and stirred. The solution portion was removed by decantation, and to the insoluble portion was added 100 ml of dehydrated toluene to obtain a toluene solution (solution g-1).

Separately, in a flask thoroughly purged with nitrogen, 11.50 ml (18.50 mmol) of an n-hexane solution of n-BuLi was added to 20 ml of a dehydrated toluene solution of 2.30 ml (18.50 mmol) of pentafluorobenzene with stirring at −78° C., and the mixture was stirred at −78° C. for 7 hours to obtain a solution (solution g-2).

The solution g-2 was dropwise added slowly to the solution g-1 with stirring at −78° C. After natural temperature rise, the mixture was stirred at room temperature for 12 hours. The resulting slurry was filtered through a glass filter to obtain a filtrate (solution g-3).

Then, 30 ml of a dehydrated toluene solution of 1.28 g (4.60 mmol) of triphenylchloromethane was dropwise added to the solution g-3 with stirring at −78° C. After natural temperature rise, the mixture was stirred at room temperature for 12 hours to prepare a solution G of a catalyst component.

Example 20

Ethylene Polymerization

To a 500-ml glass autoclave thoroughly purged with nitrogen, 400 ml of toluene was introduced. Then, ethylene was passed through the system at a rate of 100 l/hr, and the system was maintained at 75° C. for 10 minutes. To the system, 0.28 mmol of triisobutylaluminum was added, then 0.0008 mmol of rac-dimethylsilylene-bis(2-methyl-4-phenylindenyl)zirconium dichloride was added, and finally the solution F of a catalyst component was added in an amount of 0.0032 mmol in terms of Al atom, to initiate polymerization. To the system, an ethylene gas was continuously fed at a rate of 100 l/hr to perform polymerization at 75° C. for 6 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 5.90 g of a polymer was obtained. The polymerization activity was 73.75 kg-PE/mmol-Zr·hr, and the obtained polymer had an intrinsic viscosity ($\eta$) of 5.63 dl/g.

Example 21

Ethylene Polymerization

Ethylene polymerization was carried out in the same manner as in Example 20, except that ethylene-bis(indenyl)zirconium dichloride was used in place of rac-dimethylsilylene-bis(2-methyl-4-phenylindenyl)zirconium dichloride. As a result, 7.20 g of a polymer was obtained. The polymerization activity was 90.00 kg-PE/mmol-Zr·hr, and the obtained polymer had an intrinsic viscosity ($\eta$) of 1.75 dl/g.

Example 22

Ethylene Polymerization

Ethylene polymerization was carried out in the same manner as in Example 20, except that the solution G of a catalyst component was used in place of the solution F of a catalyst component. As a result, 4.57 g of a polymer was obtained. The polymerization activity was 57.13 kg-PE/mmol-Zr·hr, and the obtained polymer had an intrinsic viscosity ($\eta$) of 6.91 dl/g.

Example 23

Ethylene Polymerization

Ethylene polymerization was carried out in the same manner as in Example 20, except that ethylene-bis(indenyl)zirconium dichloride was used in place of rac-dimethylsilylene-bis(2-methyl- 4-phenylindenyl)zirconium dichloride and the solution G of a catalyst component was used in place of the solution F of a catalyst component. As a result, 10.64 g of a polymer was obtained. The polymerization activity was 133.00 kg-PE/mmol-Zr·hr, and the obtained polymer had an intrinsic viscosity ($\eta$) of 1.48 dl/g.

Example 24

Ethylene Polymerization

To a 500-ml glass autoclave thoroughly purged with nitrogen, 250 ml of toluene was introduced. Then, ethylene was passed through the system at a rate of 100 l/hr, and the system was maintained at 25° C. for 10 minutes. To the system, 0.25 mmol of triisobutylaluminum was added, then 0.005 mmol of a zirconium compound represented by the following formula was added, and finally the solution G of a catalyst component was added in an amount of 0.012 mmol in terms of Al atom, to initiate polymerization. To the system, an ethylene gas was continuously fed at a rate of 100 l/hr to perform polymerization at 25° C. for 5 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 2.10 g of a polymer was obtained. The polymerization activity was 5.04 kg-PE/mmol-Zr·hr, and the obtained polymer had an intrinsic viscosity ($\eta$) of 0.15 dl/g.

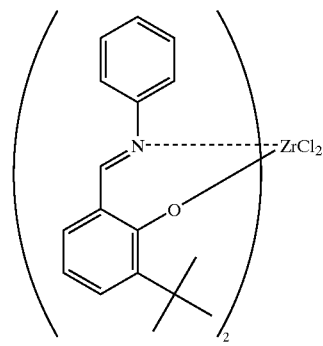

Example 25

Ethylene Polymerization

Ethylene polymerization was carried out in the same manner as in Example 24, except that a titanium compound represented by the following formula was used in place of the zirconium compound represented by the above formula. As a result, 0.40 g of a polymer was obtained. The polymerization activity was 0.48 kg-PE/mmol-Ti·hr, and the obtained polymer had an intrinsic viscosity ($\eta$) of 6.32 dl/g.

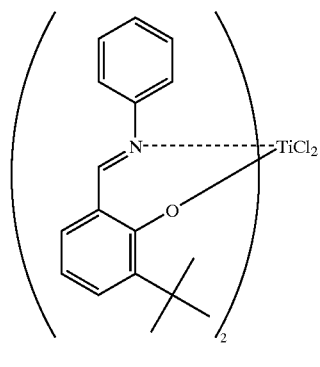

Example 26

Ethylene Polymerization

Ethylene polymerization was carried out in the same manner as in Example 24, except that a zirconium compound represented by the following formula was used in place of the zirconium compound represented by the above formula. As a result, 2.15 g of a polymer was obtained. The polymerization activity was 5.16 kg-PE/mmol-Zr·hr, and the obtained polymer had an intrinsic viscosity ($\eta$) of 1.17 dl/g.

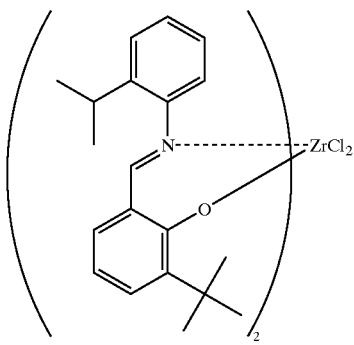

Example 27

Ethylene Polymerization

Ethylene polymerization was carried out in the same manner as in Example 24, except that a titanium compound represented by the following formula was used in place of the zirconium compound represented by the above formula. As a result, 0.15 g of a polymer was obtained. The polymerization activity was 0.18 kg-PE/mmol-Ti·hr, and the obtained polymer had an intrinsic viscosity ($\eta$) of 6.31 dl/g.

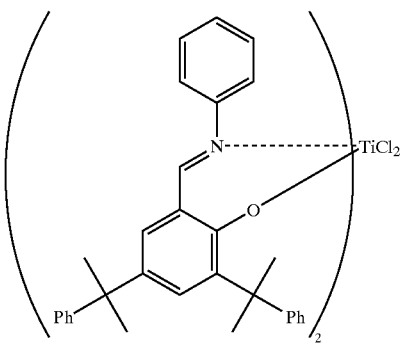

Example 28

Ethylene Polymerization

To a 500-ml glass autoclave thoroughly purged with nitrogen, 250 ml of toluene was introduced. Then, ethylene was passed through the system at a rate of 100 l/hr, and the system was maintained at 25° C. for 10 minutes. To the system, 0.100 mmol of triisobutylaluminum was added, then 0.005 mmol of an iron compound represented by the following formula was added, and finally the solution G of a catalyst component was added in an amount of 0.010 mmol in terms of Al atom, to initiate polymerization. To the system, an ethylene gas was continuously fed at a rate of 100 l/hr to perform polymerization at 25° C. for 5 minutes at atmospheric pressure. Thereafter, a small amount of methanol was added to terminate the polymerization. The polymer solution was added to a large excess of methanol to precipitate a polymer, followed by vacuum drying at 80° C. for 12 hours. As a result, 0.45 g of a polymer was obtained. The polymerization activity was 10.80 kg-PE/mmol-Fe·hr, and the obtained polymer had an intrinsic viscosity ($\eta$) of 3.01 dl/g.

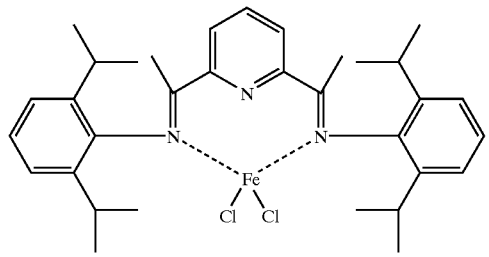

The results in Examples 20 to 28 are set forth in Table 4.

TABLE 4

| | Transition metal component | | Solution of catalyst component | | Organoaluminum compound | | | | | | |
|---|---|---|---|---|---|---|---|---|---|---|---|
| | Type | Concentration (mmol) | Type | Al concentration (mmol) | Type | Al concentration (mmol) | Temperature (° C.) | Time (min) | Yield (g) | Activity (kg/mmol-metal · hr) | Intrnsic viscosity ($\eta$) (dl/g) |
| Ex. 20 | (1) | 0.0008 | F | 0.0032 | TIBA | 0.280 | 75 | 6 | 5.90 | 73.75 | 5.63 |
| Ex. 21 | (2) | 0.0008 | F | 0.0032 | TIBA | 0.280 | 75 | 6 | 7.20 | 90.00 | 1.75 |
| Ex. 22 | (1) | 0.0008 | G | 0.0032 | TIBA | 0.280 | 75 | 6 | 4.57 | 57.13 | 6.91 |
| Ex. 23 | (2) | 0.0008 | G | 0.0032 | TIBA | 0.280 | 75 | 6 | 10.64 | 133.00 | 1.48 |
| Ex. 24 | (5) | 0.005 | G | 0.012 | TIBA | 0.250 | 25 | 5 | 2.10 | 5.04 | 0.15 |

TABLE 4-continued

| | Transition metal component | | Solution of catalyst component | | Organoaluminum compound | | Temperature (° C.) | Time (min) | Yield (g) | Activity (kg/mmol-metal · hr) | Intrnsic viscosity (η) (dl/g) |
|---|---|---|---|---|---|---|---|---|---|---|---|
| | Type | Concentration (mmol) | Type | Al concentration (mmol) | Type | Al concentration (mmol) | | | | | |
| Ex. 25 | (6) | 0.005 | G | 0.012 | TIBA | 0.250 | 25 | 5 | 0.40 | 0.48 | 6.32 |
| Ex. 26 | (7) | 0.005 | G | 0.012 | TIBA | 0.250 | 25 | 10 | 2.15 | 5.16 | 1.17 |
| Ex. 27 | (8) | 0.005 | G | 0.012 | TIBA | 0.250 | 25 | 10 | 0.15 | 0.18 | 6.31 |
| Ex. 28 | (9) | 0.005 | G | 0.010 | TIBA | 0.100 | 25 | 5 | 0.45 | 10.80 | 3.01 |

TIBA: triisobutylaluminum (1) rac-Me$_2$Si (2-Me-4-Ph-Ind)$_2$ZrCl$_2$ (2) Et(Ind)$_2$ZrCl$_2$ (5) 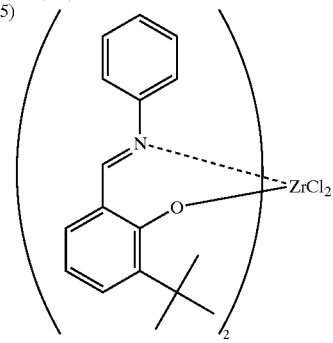

(6) 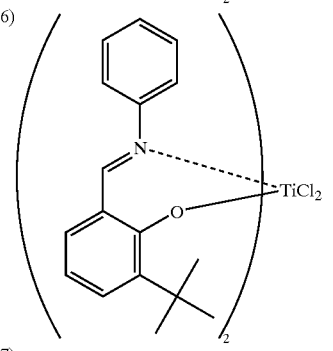

(7) 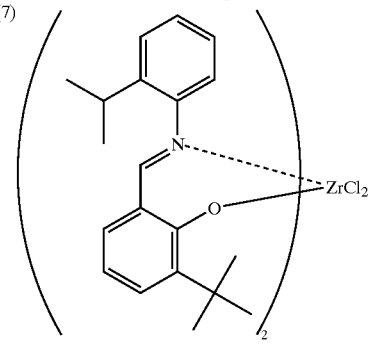

(8) 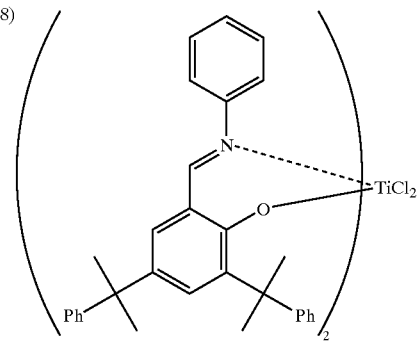

TABLE 4-continued

| Transition metal component | | Solution of catalyst component | | Organoaluminum compound | | Temperature (° C.) | Time (min) | Yield (g) | Activity (kg/mmol-metal · hr) | Intrinsic viscosity (η) (dl/g) |
|---|---|---|---|---|---|---|---|---|---|---|
| Type | Concentration (mmol) | Type | Al concentration (mmol) | Type | Al concentration (mmol) | | | | | |

(9) 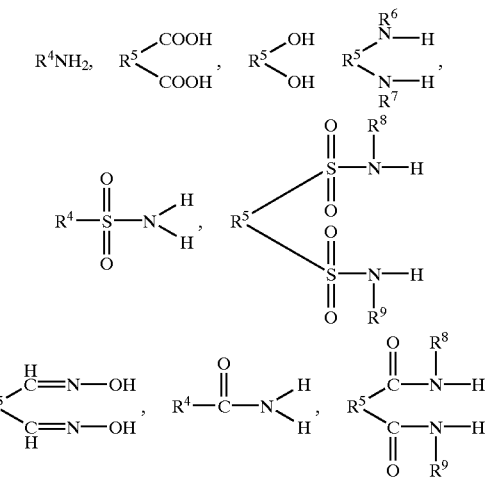

In Table 4, the term "concentration" represents the concentration of the corresponding compound in terms of the metal atom.

What is claimed is:

1. A catalyst component for ethylenically unsaturated monomer polymerization, comprising a compound obtained by the reaction of the following compounds (i), (ii), (iii) and optionally (iv) in any order:

(i) a compound comprising a metal of Group 13 of the periodic table;

(ii) a compound capable of reacting with the compound (i) to be bonded to two or more of the Group 13 metal;

(iii) a compound capable of reacting with a compound comprising a metal of Group 13 of the periodic table to form an ionizing ionic compound; and (iv) at least one compound selected from a hydrocarbon compound, a halogenated hydrocarbon compound, a hydroxy hydrocarbon compound, a silanol compound, a boronic acid compound, an organic carboxylic acid compound, an organic sulfonic acid compound, a hydroxylamine compound, a sulfonamide compound, a ketoimide compound, an amide compound, an oxime compound, an amine compound, an imide compound, a diimine compound, an imine compound, a diketone compound, and metallic salts thereof.

2. A catalyst component for ethylenically unsaturated monomer polymerization, comprising a compound obtained by the reaction of the following compounds (i), (ii) and optionally (iv) in any order, and then further the following compound (iii):

(i) a compound represented by the following formula:

$$MR^1R^2R^3$$

wherein M is an atom of Group 13 of the periodic table; $R^1$, $R^2$ and $R^3$ may be the same or different and are each a halogen atom, a hydrogen atom, a hydroxy group or an organic group; and two groups of $R^1$, $R^2$ and $R^3$ may be bonded to form a ring;

(ii) a compound capable of reacting with the compound (i) to be bonded to two or more M;

(iii) a compound capable of reacting with the reaction product obtained by reacting the compound (i), the compound (ii) and optionally the compound (iv) with each other in any order to form an ionizing ionic compound;

(iv) at least one compound selected from a hydrocarbon compound, a halogenated hydrocarbon compound, a hydroxy hydrocarbon compound, a silanol compound, a boronic acid compound, an organic carboxylic acid compound, an organic sulfonic acid compound, a hydroxylamine compound, a sulfonamide compound, a ketoimide compound, an amide compound, an oxime compound, an amine compound, an imide compound, a diimine compound, an imine compound, a diketone compound, and metallic salts thereof.

3. The catalyst component as claimed in claim 1, wherein the compound (i) is an aluminum compound represented by the following formula:

$$R^a{}_mAl(OR^b)_nX_p$$

wherein $R^a$ and $R^b$ may be the same or different and are each a hydrocarbon group of 1 to 15 carbon atoms; X is a halogen atom; and m, n and p are numbers satisfying the conditions of $0 \leq n \leq 3$, $0 \leq n \leq 3$, $0 \leq p \leq 3$ and $m+n+p=3$.

4. The catalyst component as claimed in claim 1, wherein the compound (ii) is at least one compound selected from the group consisting of $H_2O$, $H_2S$ and compounds represented by the following formulae:

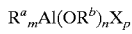

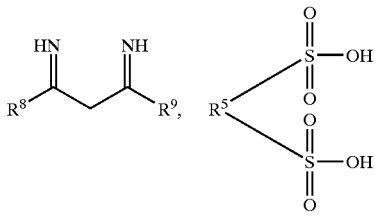

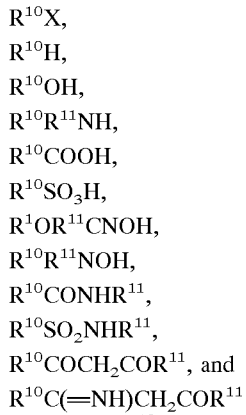

wherein $R^4$ is a hydrogen atom, a hydrocarbon group, a halogenated hydrocarbon group, a silicon-containing group, a germanium-containing group, a tin-containing group or an oxygen-containing group; $R^5$ is a divalent hydrocarbon group, a divalent halogenated hydrocarbon group, a divalent silicon-containing group, a divalent germanium-containing group, a divalent tin-containing group, a divalent boron-containing group or a single bond; $R^6$ and $R^7$ may be the same or different and are each a hydrogen atom, a hydrocarbon group, a halogenated hydrocarbon group, a silicon-containing group, a germanium-containing group, a tin-containing group or an oxygen-containing group; each of $R^6$ and $R^7$ may be bonded to a carbon atom for constituting $R^5$ to form a ring; and $R^8$ and $R^9$ may be the same or different and are each a hydrogen atom, a hydrocarbon group or a halogenated hydrocarbon group.

5. The catalyst component as claimed in claim 1, wherein the compound (iii) is a compound capable of forming an ionizing ionic compound having a carbonium cation, an oxonium cation, an ammonium cation, a phosphonium cation, a cycloheptyltrienyl cation or a ferrocenium cation.

6. The catalyst component as claimed in claim 1, wherein the compound (iv) is at least one compound selected from compounds represented by the following formulae:

$R^{10}X$, $R^{10}H$, $R^{10}OH$, $R^{10}R^{11}NH$, $R^{10}COOH$, $R^{10}SO_3H$, $R^1OR^{11}CNOH$, $R^{10}R^{11}NOH$, $R^{10}CONHR^{11}$, $R^{10}SO_2NHR^{11}$, $R^{10}COCH_2COR^{11}$, and $R^{10}C(=NH)CH_2COR^{11}$ wherein $R^{10}$ is a hydrocarbon group, a halogenated hydrocarbon group, a silicon-containing group, a germanium-containing group, a tin-containing group or a boron-containing group; $R^{11}$ is a hydrogen atom, an alkoxy group or any of a hydrocarbon group, a halogenated hydrocarbon group, a silicon-containing group, a germanium-containing group, a tin-containing group and a boron-containing group each of which is the same as or different from $R^{10}$; and X is a halogen atom.

7. A catalyst component for ethylenically unsaturated monomer polymerization, being represented by the following formula:

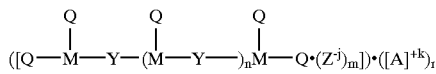

wherein each M may be the same or different and is an atom of Group 13 of the periodic table; n is an integer of 0 or more; Y is a divalent bonding group, and when n is 1 or more, plural Y may be the same or different; Z is a group capable of being bonded to one or more M; m is an integer of not less than 1 and not more than n+1; each Q may be the same or different and is a halogen atom or is a group selected from the following groups:

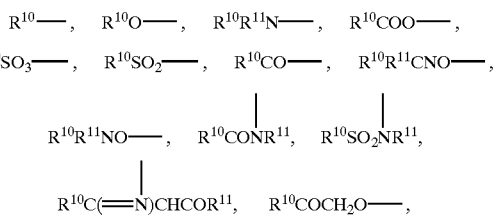

(wherein $R^{10}$ is a hydrocarbon group, a halogenated hydrocarbon group, a silicon-containing group, a germanium-containing group, a tin-containing group or a boron-containing group, and $R^{11}$ is a hydrogen atom, an alkoxy group or any of a hydrocarbon group, a halogenated hydrocarbon group, a silicon-containing group, a germanium-containing group, a tin-containing group and a boron-containing group each of which is the same as or different from $R^{10}$); A is a cation; and k is a number satisfying the condition of K=jm/r and is a valence of the cation A.

8. The catalyst component as claimed in claim 7, wherein the divalent bonding group Y is a divalent bonding group selected from the following divalent bonding groups:

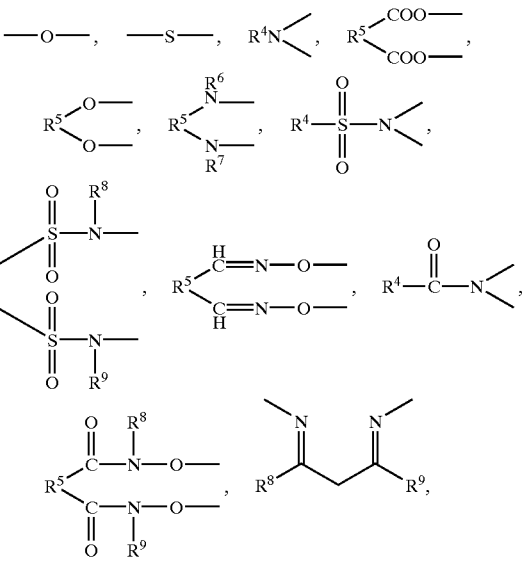

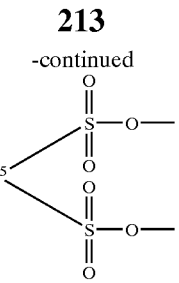

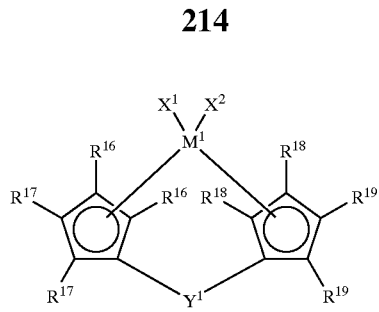

wherein R⁴ is a hydrogen atom, a hydrocarbon group, a halogenated hydrocarbon group, a silicon-containing group, a germanium-containing group, a tin-containing group or an oxygen-containing group; R⁵ is a divalent hydrocarbon group, a divalent halogenated hydrocarbon group, a divalent silicon-containing group, a divalent germanium-containing group, a divalent tin-containing group, a divalent boron-containing group or a single bond; R⁶ and R⁷ may be the same or different and are each a hydrogen atom, a hydrocarbon group, a halogenated hydrocarbon group, a silicon-containing group, a germanium-containing group, a tin-containing group or an oxygen-containing group; each of R⁶ and R⁷ may be bonded to a carbon atom for constituting R⁵ to form a ring; and R⁸ and R⁹ may be the same or different and are each a hydrogen atom, a hydrocarbon group or a halogenated hydrocarbon group.

9. The catalyst component as claimed in claim 7 wherein the group Z capable of being bonded to one or more X is a group selected from a halogen anion, a hydride, a carbainon, an alcoholate, an arylalcoholate, an alkylcarboxylate, an arylcarboxylate, a thiolate, a carbothiolate, a dithiocarbonate, a trithiocarbonate, a sulfonate, a sulfamate and a phosphate.

10. The catalyst component as claimed in claim 7, wherein the cation A is a cation selected from the group consisting of a carbonium cation, an oxonium cation, an ammonium cation, a phosphonium cation, a cycloheptyltrienyl cation, a ferrocenium cation and metallic cations of Groups 1 and 11 of the periodic table.

11. A catalyst for ethylenically unsaturated monomer polymerization, comprising:

(A) a compound of a transition metal selected from Groups 3 to 12 of the periodic table, (B) the catalyst component as claimed in claim 1, and (C) an organic compound containing an element of Group 13 of the periodic table.

12. The catalyst as claimed in claim 11, wherein the component (A) is a transition metal compound represented by any one of the following formulas (I) to (VIII):

$$M^1 L^1_x \quad (I)$$

wherein M¹ is a transition metal atom of Group 4 of the periodic table; x is a number satisfying the valence of the transition metal atom M¹; L¹ is a ligand coordinated to the transition metal atom; at least one L¹ is a ligand having cyclopentadienyl skeleton; L¹ other than the ligand having cyclopentadienyl skeleton is a hydrocarbon group of 1 to 20 carbon atoms, a halogenated hydrocarbon group of 1 to 20 carbon atoms, an oxygen-containing group, a sulfur-containing group, a nitrogen-containing group, a phosphorus-containing group, a silicon-containing group, a halogen atom or a hydrogen atom; and when two or more ligands having cyclopentadienyl skeleton are present, two of them may be bonded through an optionally substituted alkylene group or an optionally substituted silylene group;

wherein M¹ is a transition metal atom of Group 4 of the periodic table; R¹⁶, R¹⁷, R¹⁸ and R¹⁹ may be the same or different and are each a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, a hydrogen atom or a halogen atom; a part of the adjacent groups of R¹⁶, R¹⁷, R¹⁸ and R¹⁹ may be bonded to form a ring together with carbon atoms to which they are bonded; X¹ and X² may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and Y¹ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO₂—, —Ge—, —Sn—, —NR²⁰—, —P(R²⁰)—, —P(O)(R²⁰)—, —BR²⁰— or —AlR²⁰— (each R²⁰ may be the same or different and is a hydrocarbon group of 1 to 20 carbon atoms, a halogenated hydrocarbon group of 1 to 20 carbon atoms, a hydrogen atom or a halogen atom);

$$L^2 M^2 X^3_2 \quad (III)$$

wherein M² is a transition metal atom of Group 4 of the periodic table; L² is a derivative of a delocalized π-bond group and imparts a constraint geometric shape to an active site of the metal M²; and each X³ may be the same or different and is a hydrogen atom, a halogen atom, a hydrocarbon group containing 20 or less carbon atoms, a silyl group containing 20 or less silicon atoms, or a germyl group containing 20 or less germanium atoms;

wherein M³ is a transition metal atom of Groups 8 to 10 of the periodic table; X⁴ and X⁵ may be the same or different and are each a nitrogen atom or a phosphorus atom; R⁴¹ and R⁴² may be the same or different and are each a hydrogen atom or a hydrocarbon group; m and n may be the same or different, are each 1 or 2, and are numbers satisfying the valences of X⁴ and X⁵, respectively; R⁴³ is

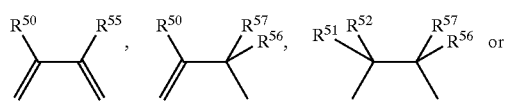

-continued

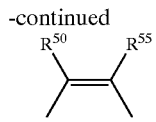

($R^{50}$ $R^{55}$, $R^{51}$, $R^{52}$, $R^{56}$ and $R^{57}$ may be the same or different and are each a hydrogen atom or the same hydrocarbon group as defined for $R^{41}$ and $R^{42}$); two or more groups, preferably adjacent groups, of $R^{41}$, $R^{42}$, $R^{50}$ (or $R^{51}$, $R^{52}$) and $R^{55}$ (or $R^{56}$, $R^{57}$) may be bonded to form a ring; $R^{44}$ and $R^{45}$ may be the same or different and are each a hydrogen atom, a halogen atom, a hydrocarbon group, —$OR^{46}$, —$SR^{47}$, —$N(R^{48})_2$ or —$P(R^{49})_2$ ($R^{46}$ to R are each an alkyl group of 1 to 20 carbon atoms, an aryl group of 6 to 20 carbon atoms, a cycloalkyl group of 6 to 20 carbon atoms, an aralkyl group of 7 to 20 carbon atoms or an organosilyl group, $R^{48}$ and $R^{49}$ may be bonded to form a ring, and $R^{49}$ and $R^{49}$ may be bonded to form a ring); and $R^{44}$ and $R^{45}$ may be bonded to form a ring;

(V)

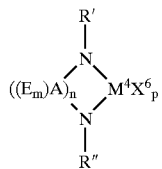

wherein $M^4$ is a transition metal atom of Groups 3 to 6 of the periodic table; $R^1$ and $R^{11}$ may be the same or different and are each a hydrogen atom, a hydrocarbon group, a halogenated hydrocarbon group, an organosilyl group or a hydrocarbon group substituted with a substituent containing at least one element selected from nitrogen, oxygen, phosphorus, sulfur and silicon; m is an integer of 0 to 2; n is an integer of 1 to 5; A is an atom of Groups 13 to 16 of the periodic table, and when n is 2 or more, plural A may be the same or different; E is a substituent having at least one element selected from carbon, hydrogen, oxygen, halogen, nitrogen, sulfur, phosphorus, boron and silicon, and when m is 2, two E may be the same or different and may be bonded to form a ring; p is an integer of 0 to 4; and $X^6$ is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and when p is 2 or more, plural $X^6$ may be the same or different;

(VI)

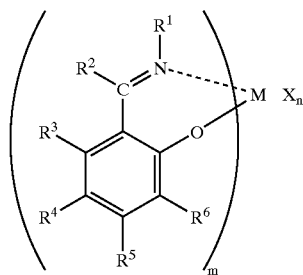

wherein M is a transition metal atom of Groups 3 to 11 of the periodic table; m is an integer of 1 to 3; $R^1$ to $R^6$ may be the same or different and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, two or more of them may be bonded to form a ring, and when m is 2 or more, two groups of $R^1$ to $R^6$ may be bonded, with the proviso that two $R^1$ are not bonded to each other; n is a number satisfying the valence of M; and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, plural groups X may be the same or different and may be bonded to form a ring;

(VII)

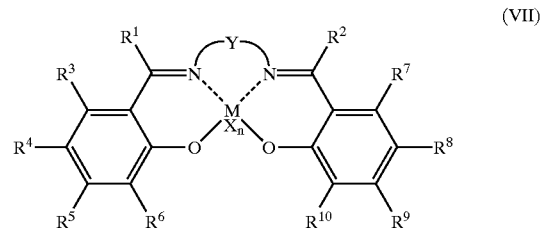

wherein M is a transition metal atom of Groups 3 to 11 of the periodic table; $R^1$ to $R^{10}$ may be the same or different and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to form a ring; n is a number satisfying the valence of M; X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, plural groups X may be the same or different and may be bonded to form a ring; and Y is a divalent bonding group containing at least one element selected from the group consisting of oxygen, sulfur, carbon, nitrogen, phosphorus, silicon, selenium, tin and boron, and when Y is a hydrocarbon group, the hydrocarbon group is a bonding group comprising 3 or more carbon atoms;

(VIII)

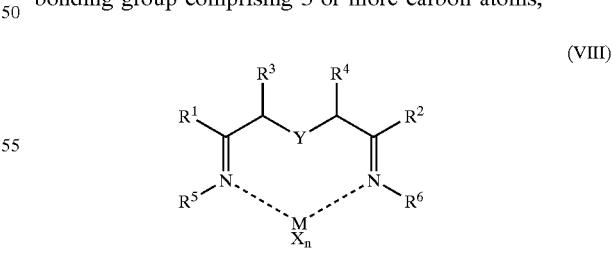

wherein M is a transition metal atom of Groups 8 to 11 of the periodic table; $R^1$ to $R^4$ may be the same or different and are each a hydrogen atom, a halogen atom, a halogenated hydrocarbon group, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group; $R^5$ and $R^6$ may be the same or different and are each a halogen atom, a halogenated hydrocarbon group, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group; $R^1$ and $R^5$, $R^2$ and $R^6$, $R^1$ and $R^3$, $R^2$ and $R^4$, and $R^3$ and $R^4$ may be bonded to form a ring; n is a number satisfying the valence of M; X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and when n is 2 or more, plural X may be the same or different; and Y is an atom of Group 15 or 16 of the periodic table.

13. The catalyst as claimed in claim 11, wherein component (C) is an organoaluminum compound.

14. The catalyst as claimed in claim 11, further comprising (D) a particulate carrier on which only the component (A) is supported or the component (B) and/or the component (C) is supported together with the component (A).

* * * * *